Aug. 30, 1966 R. S. CARTER ETAL 3,270,325
PARALLEL MEMORY, MULTIPLE PROCESSING, VARIABLE
WORD LENGTH COMPUTER
Filed Dec. 23, 1963 68 Sheets-Sheet 1

INVENTORS
RICHARD S. CARTER
WALTER W. WELZ
BY Melvin P. Williams
ATTORNEY

FIG. 2 MEMORY CHARACTER SELECTION
( DETAILS ON FIG. 3 )

Aug. 30, 1966 R. S. CARTER ET AL 3,270,325
PARALLEL MEMORY, MULTIPLE PROCESSING, VARIABLE WORD LENGTH COMPUTER
Filed Dec. 23, 1963 68 Sheets-Sheet 3

PRIMARY CHANNEL GATE
(DETALS ON FIG 5)

PRIMARY CHANNEL GATE DETAILS

SECONDARY CHANNEL REGISTERS

Z REGISTER DETAILS

SECONDARY REGISTER CONTROLS

CASE 2
FIRST A CYCLE
(SEE FIGS. 6, 15 FOR DETAILS)

CASE 2
SECOND A CYCLE
(NO B CYCLE BETWEEN 1ST. & 2ND. A CYCLES)
(SEE FIGS. 6, 15 FOR DETAILS)

CASE 3
FIRST A CYCLE
(SEE FIGS. 6, 15 FOR DETAILS)

CASE 4
SECOND A CYCLE
(SEE FIGS. 6, 15 FOR DETAILS)

FIG. 19 MEMORY INPUT ODD/EVEN CONTROLS
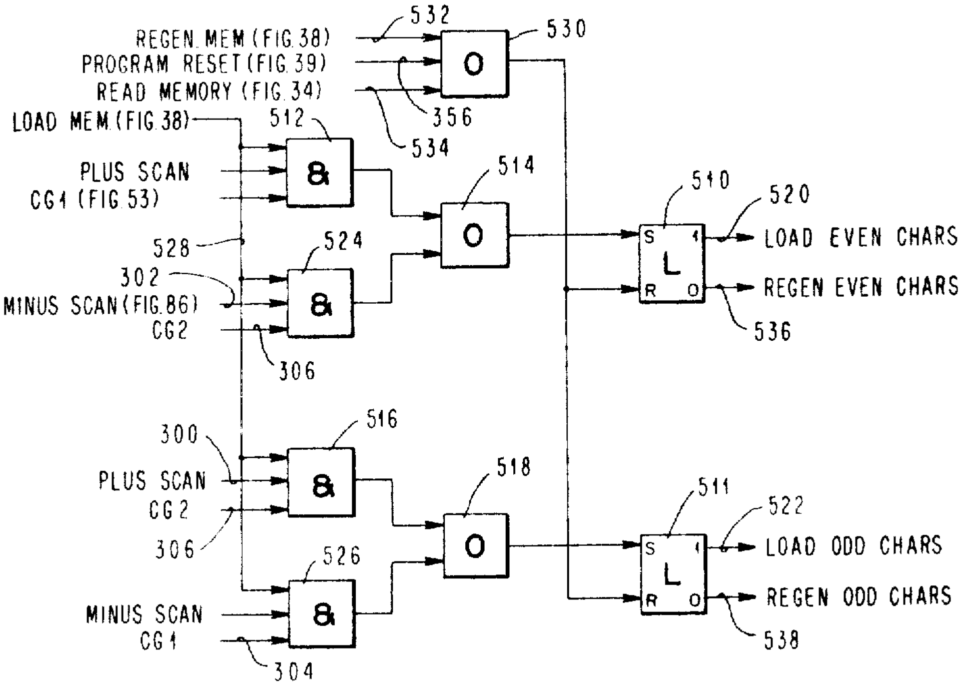
FIG. 20 ALTERNATIVE FORM OF FIG. 19
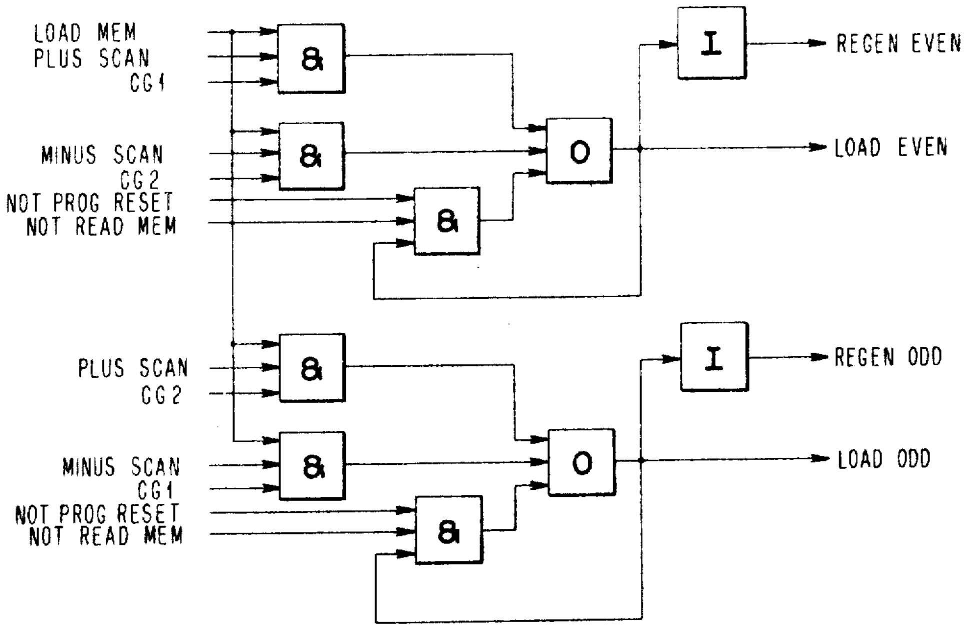

MEMORY INPUT LOAD CHAR. CTRLS. FIG. 21
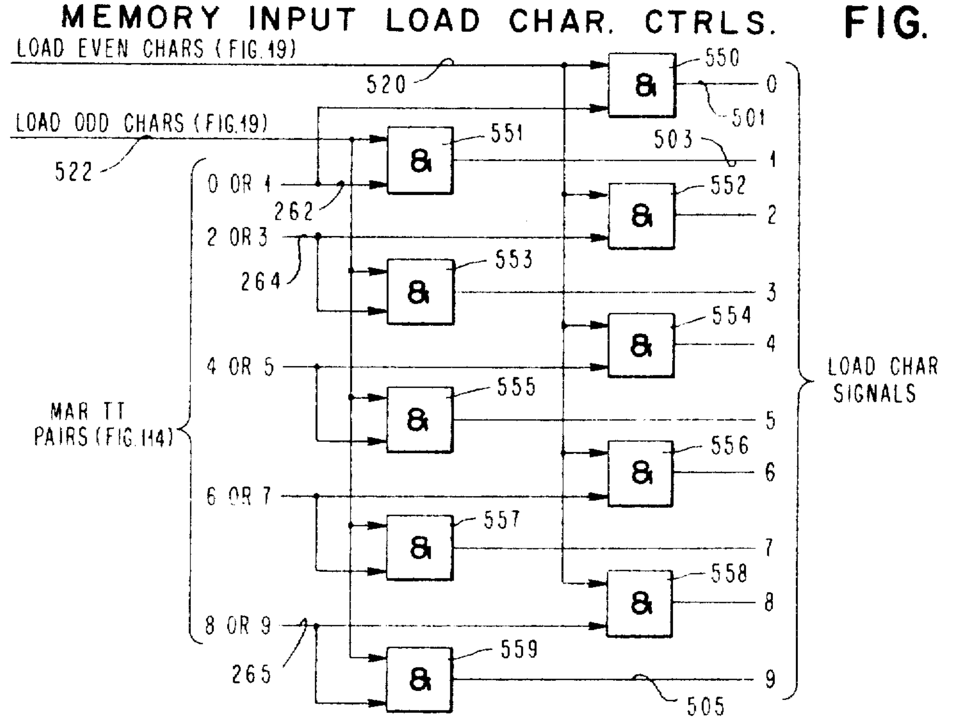
MEMORY INPUT REGEN CHAR. CTRLS. FIG. 22
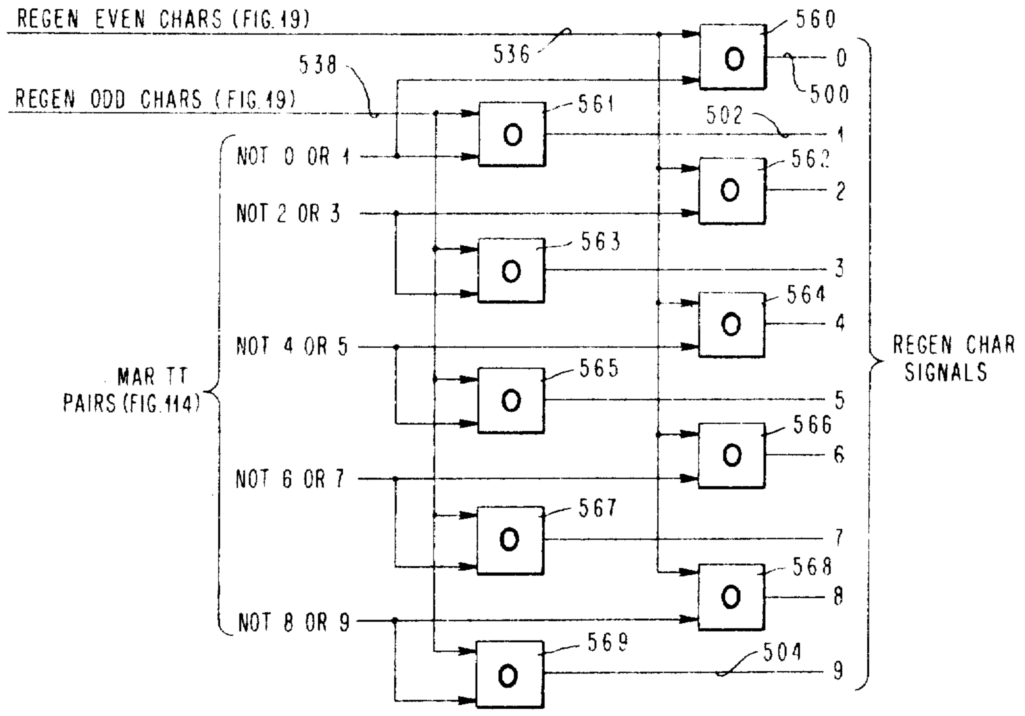

MEMORY REGEN & LOAD DETAILS (CHAR O)

FIG. 27

BINARY GATES FOR CLOCK

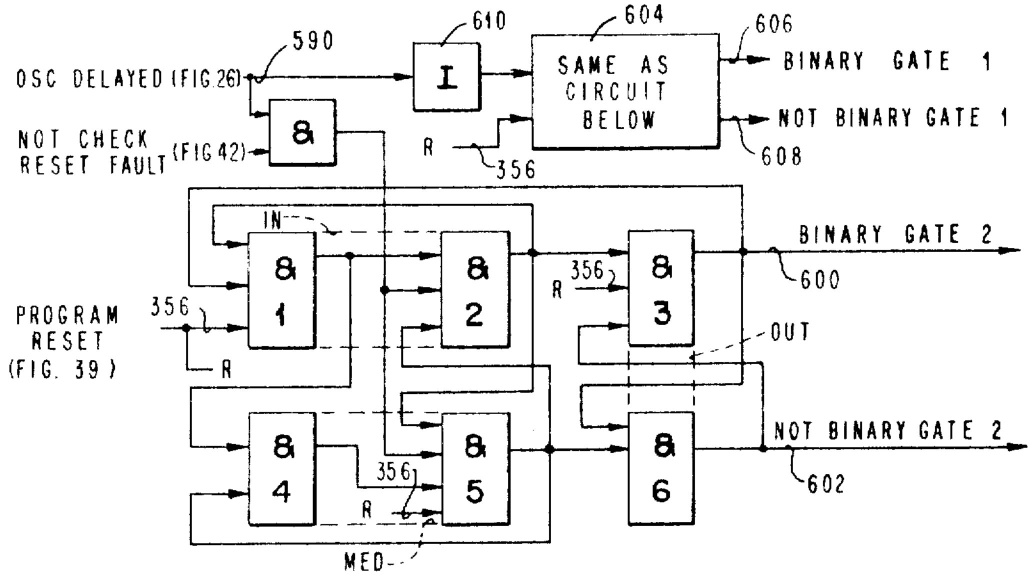

FIG. 28

BINARY GATE 2
GENERATION CHART

| | | | "AND" CKT OUTPUTS | | | | | | LATCHES | | | |
|---|---|---|---|---|---|---|---|---|---|---|---|---|
| T | R | OSC | 1 | 2 | 4 | 5 | 3 | 6 | IN | MED | OUT | REMARKS |
| 1 | − | + | + | − | − | + | + | − | OFF | OFF | OFF | { WITH RESET, 2 FOLLOWS |
| 2 | − | − | + | + | − | + | + | − | − | OFF | OFF | { OSC, OTHERS, UNAFFECTED |
| 3 | + | + | + | − | − | + | + | − | OFF | OFF | OFF | NO EFFECT |
| 4 | + | − | − | + | + | + | + | − | ON | − | OFF | 1/2 ON ; 4/5 UNLATCH |
| 5 | + | + | + | + | + | − | − | + | − | ON | ON | OUTPUT REVERSES 4/5 ON, 1/2 UNLATCH |
| 6 | + | − | + | + | − | + | − | + | − | OFF | ON | 4/5 OFF |
| 7 | + | + | + | − | − | + | + | − | − | OFF | OFF | THIS IS REPEAT OF T3, ETC. |
| 12 | + | − | + | + | − | + | + | − | − | OFF | OFF | |
| 13 | + | + | + | − | − | + | + | − | OFF | OFF | OFF | SAME AS T3, ETC. |
| 14 | + | − | − | + | + | + | + | − | ON | − | OFF | |
| 15 | + | + | + | + | + | − | − | + | − | ON | ON | |
| 16 | + | − | + | + | − | + | − | + | − | OFF | ON | |

FIG. 29

| | OSC | IN | MED | OUT |
|---|---|---|---|---|
| 1 | + | 0 | 0 | 0 |
| 2 | − | 1 | 1 | 0 |
| 3 | + | 1 | 1 | 1 |
| 4 | − | 1 | 0 | 1 |
| 5 | + | 0 | 0 | 0 |

FIG. 32 MAIN CYCLE CLOCK
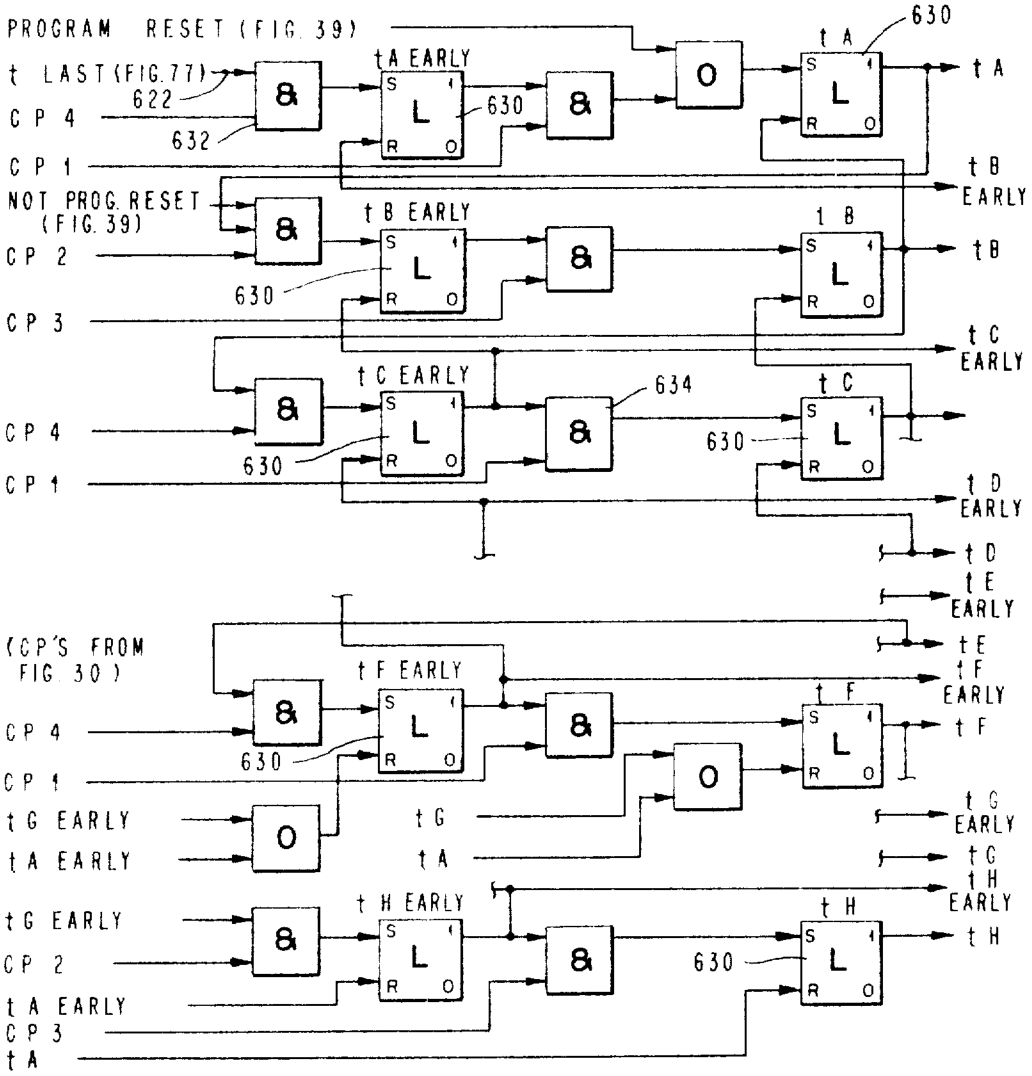
FIG. 33 TIMING NOMENCLATURE EXAMPLES
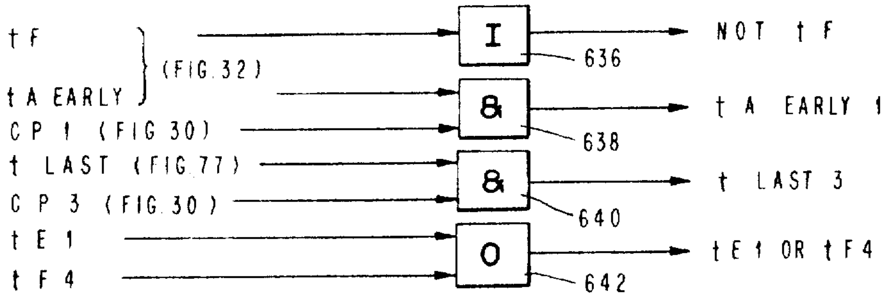

BASIC READ TIMING

CYCLE CHART
X CYCLE

BASIC WRITE TIMING

BASIC WRITE TIMING

FIG. 43 INSTRUCTION CIRCUITS
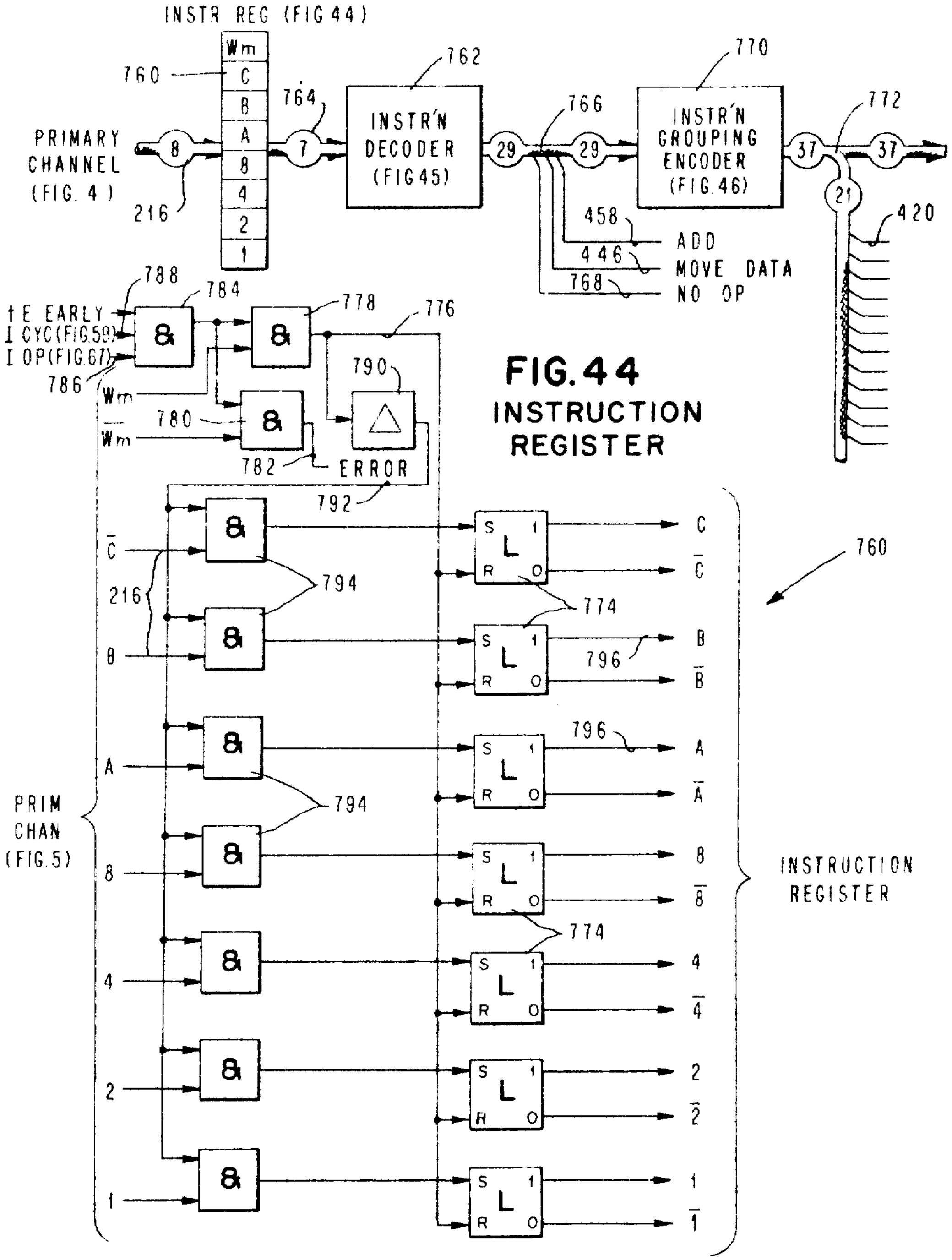
FIG. 43, FIG. 44 INSTRUCTION REGISTER

INSTRUCTION DECODER

INSTRUCTION GROUPING ENCODER

FIG. 52
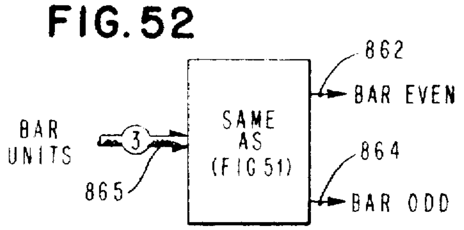
FIG. 50
2 OUT OF 5 CODE
| | 2/5 → | 0 | 1 | 2 | 4 | 8 |
|---|---|---|---|---|---|---|
| DECIMAL | 0 | | | X | | X |
| | 1 | X | X | | | |
| | 2 | X | | X | | |
| | 3 | | X | X | | |
| | 4 | X | | | X | |
| | 5 | | X | | X | |
| | 6 | | | X | X | |
| | 7 | | | | X | X |
| | 8 | X | | | | X |
| | 9 | | X | | | X |
FIG. 51
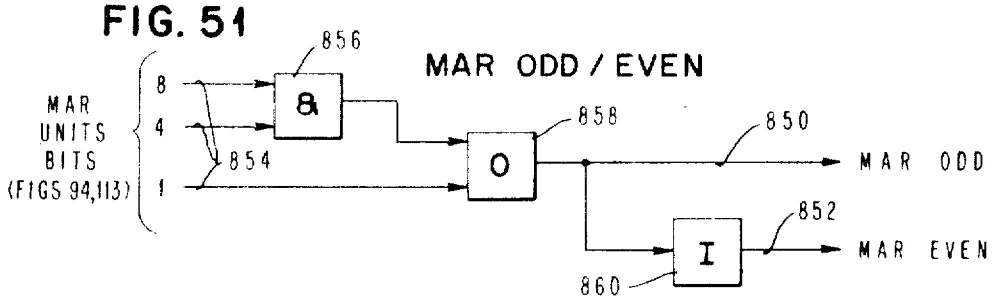
FIG. 53
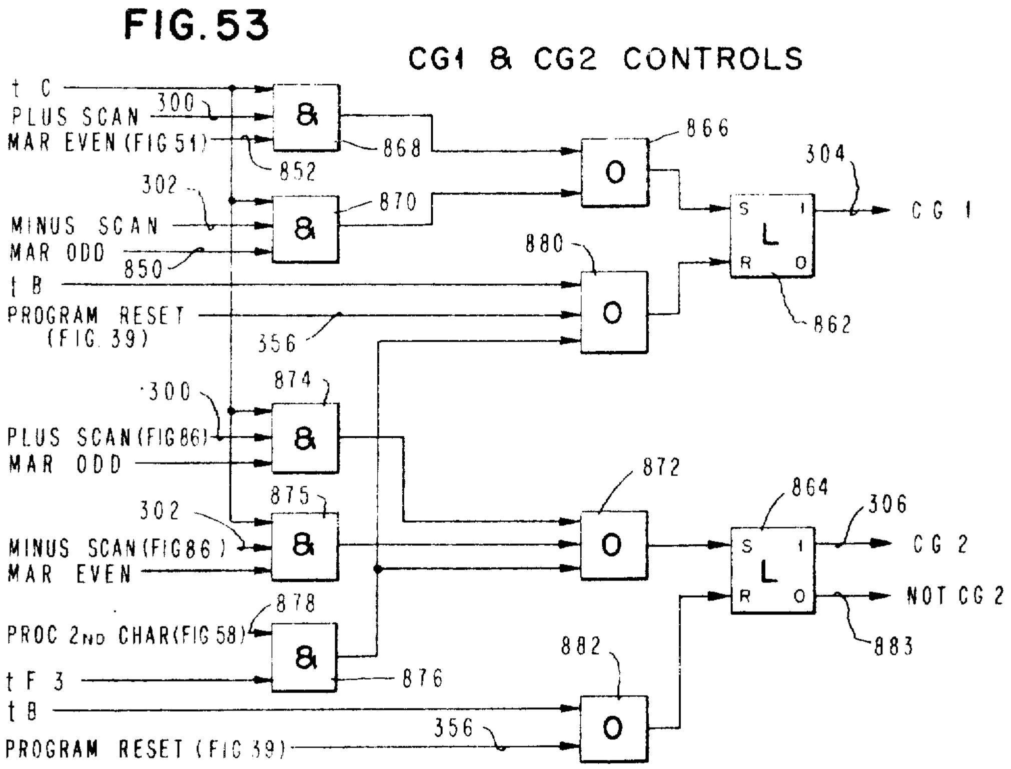

FIG. 54 OVERLAP BOUNDARY
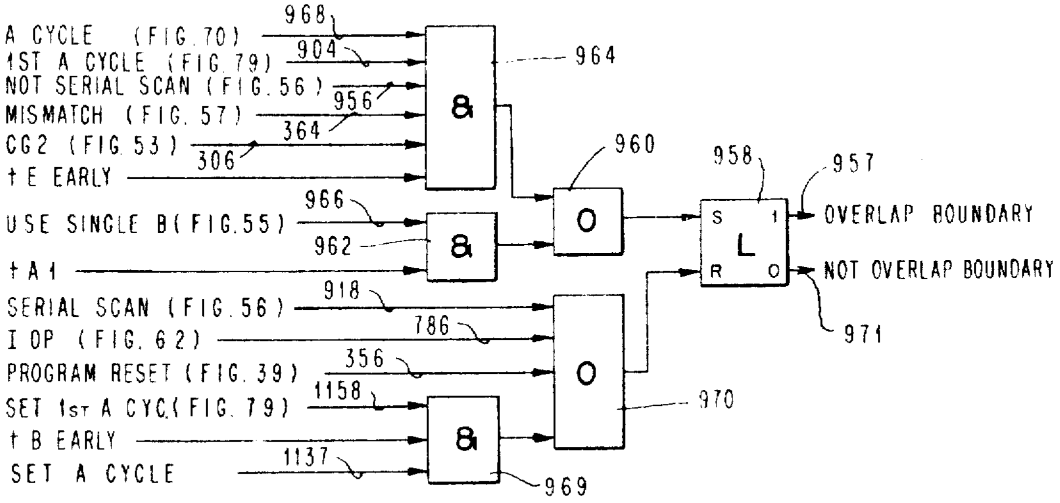
FIG. 55 USE SINGLE B CHARACTER
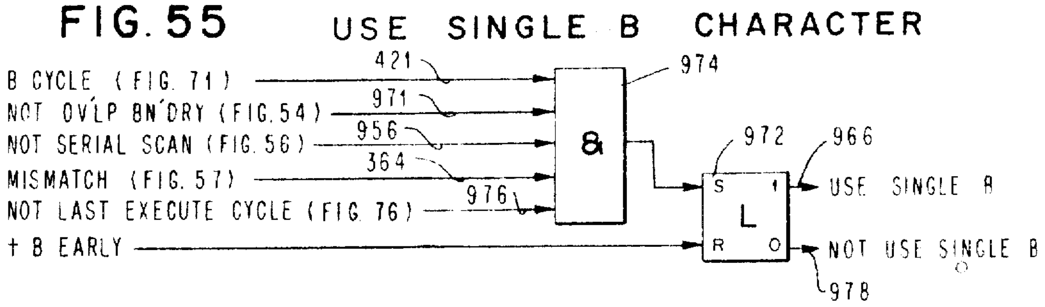
FIG. 56 SERIAL SCAN
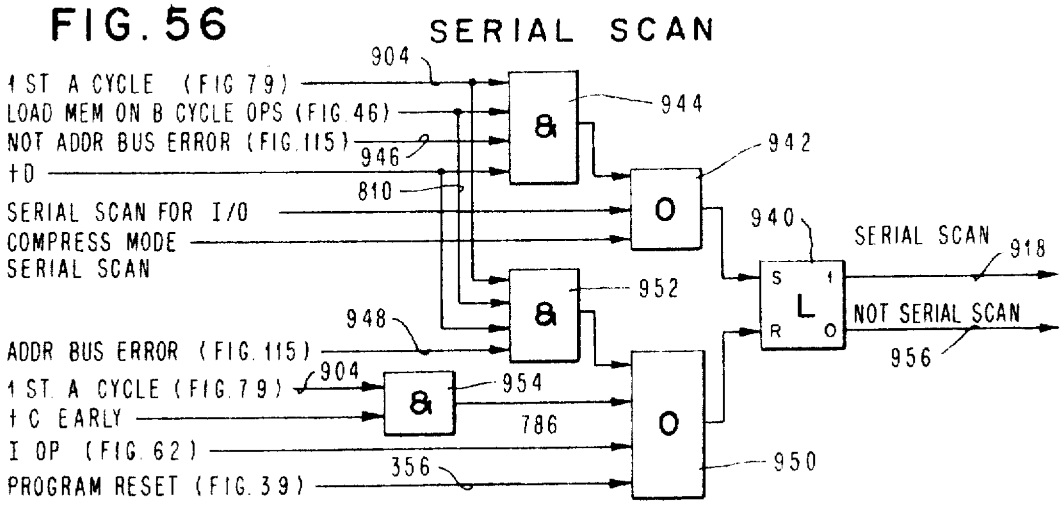

PROC 2ND. CHAR CONTROLS

I CYCLE

NEXT CYCLE IS I CYCLE

I RING

I RING OPERATION

A CYCLE LATCH

B CYCLE LATCH

C CYCLE AND D CYCLE LATCHES

MOD BY 0

PLUS / MINUS SCAN

MOD BY 1

FIG. 91 ADDRESS MODIFIER UNITS 3
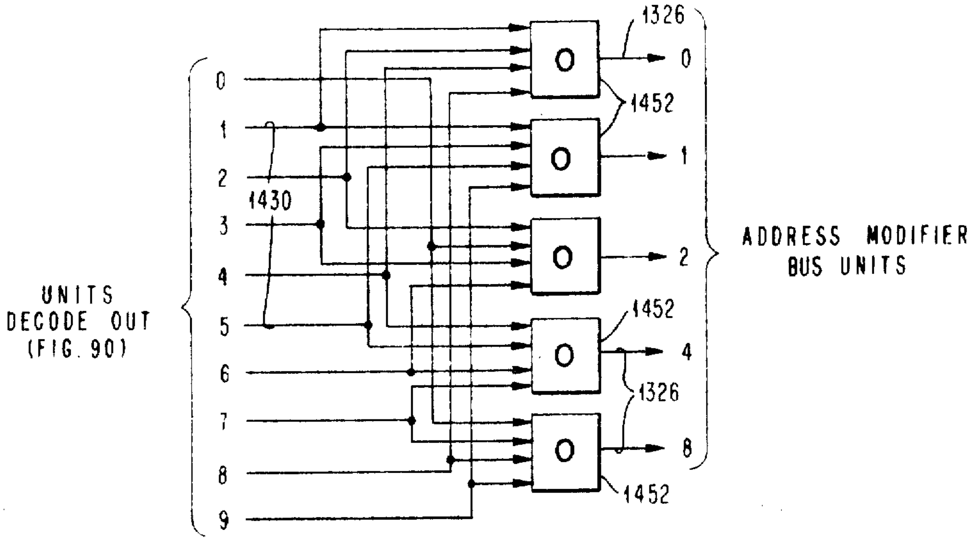
FIG. 92 ADDRESS MODIFIER TENS
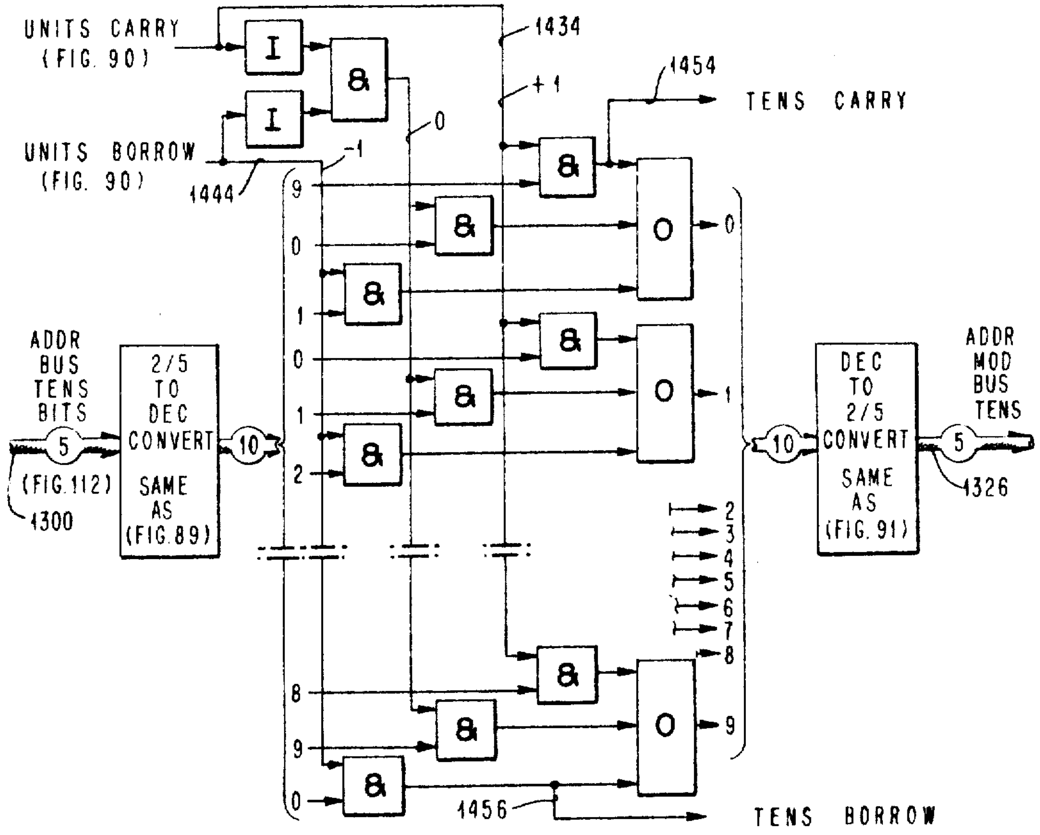

FIG. 96 SERIAL SET
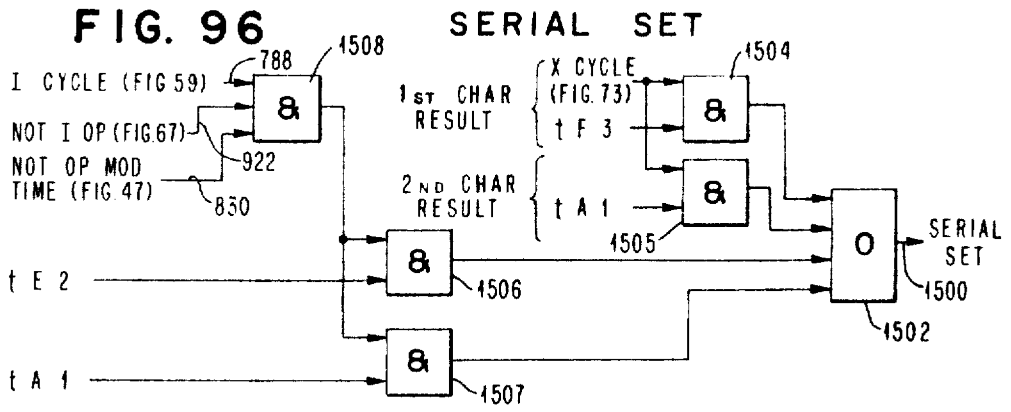
FIG. 97 AAR/BAR MODIFIER SET/RESET
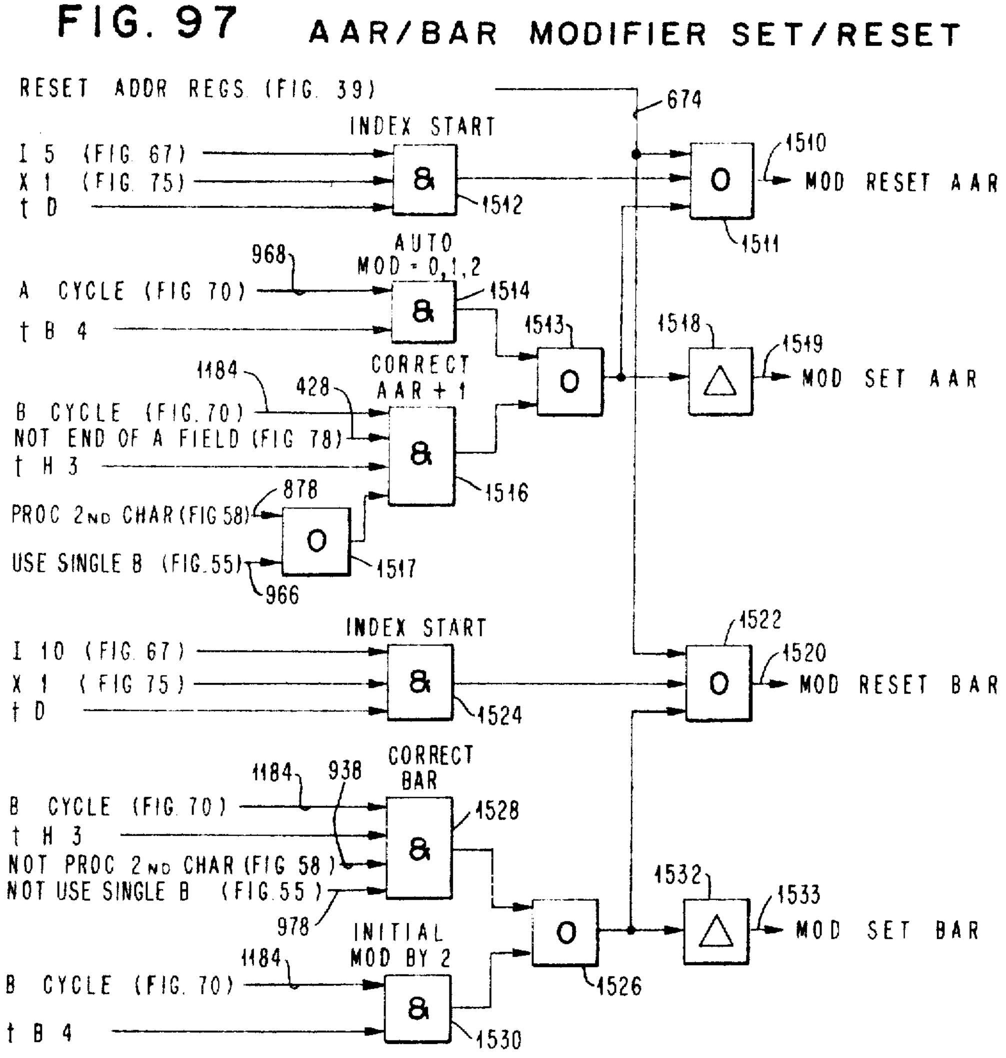

AAR UNITS POSITION (DETAILS)

GATE AAR TO ARO

GATE BAR TO ARO

ARO
(DETAILS)

United States Patent Office 3,270,325

Patented August 30, 1966

3,270,325

PARALLEL MEMORY, MULTIPLE PROCESSING, VARIABLE WORD LENGTH COMPUTER

Richard S. Carter and Walter W. Welz, Poughkeepsie, N.Y., assignors to International Business Machines Corporation, New York, N.Y., a corporation of New York

Filed Dec. 23, 1963, Ser. No. 332,648
46 Claims. (Cl. 340—172.5)

Figure 1:
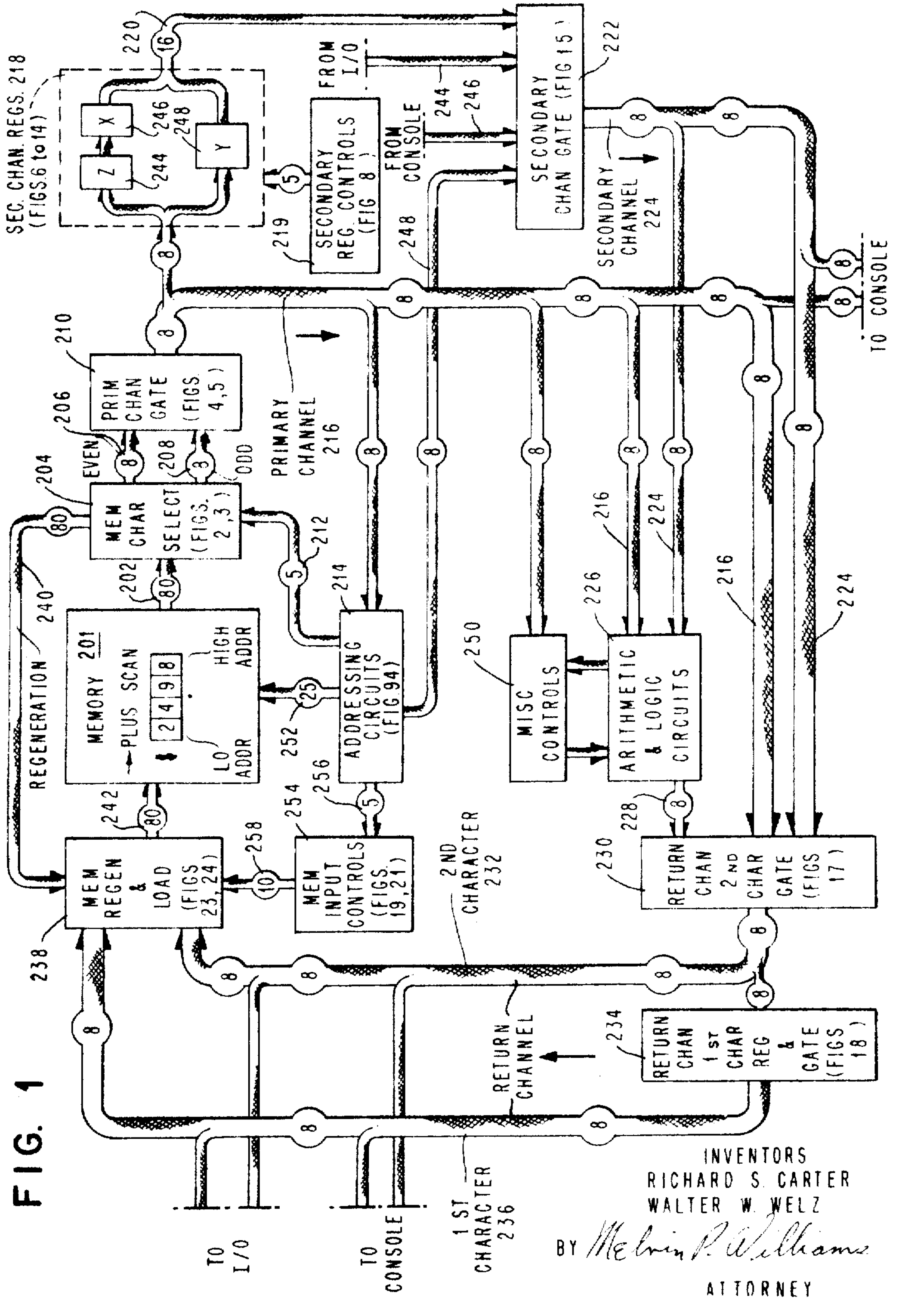

This invention relates to data processing and more particularly to a data processing system, or computer, wherein each memory cycle will supply a plurality of character manifestations in parallel, and the main processing unit will process said plurality of characters within the timing allotment of a single memory cycle, said characters combined in various-length groups.

Due to the fact that computers are generally operated by electricity, the significance of each occurrence is usually manifested by the presence or absence of a signal or some electrical condition. Thus, an electrical signal being present might indicate the presence of the related condition and the lack of a signal may indicate that such condition does not exist. For this reason, most modern computers utilize the binary number system to formulate characters and machine conditions. Thus, the various groups used within a computer would each comprise a particular coded combination of binary bits, each bit having particular significance within the group.

In this description, "character" is defined to be a minimum group of coded binary manifestations having human language significance (such as a letter, number, or special character), and a "byte" is a group of coded manifestation which relate to the workings of a computer; a byte may equal a character in many cases. A "word" is defined to be a plurality of characters having, in combination, a certain significance to a computer, or a certain human language significance (such as the four characters, 2, 4, 9, 8 means $24.98), and a "field" is a group of characters or bytes which are related within the memory; a field may be coextensive with a word.

Computers may process words of a fixed length (that is, a fixed number of characters per word) or of a variable length (that is, as many characters as may be desired in any particular instance).

This invention is particularly related to machines having a variable word length.

CONTENTS

| Section | Col. | Figs. | Sheets |
|---|---|---|---|
| 1. Prior Art in General | 3 | | |
| a. Memory Boundaries | 3 | | |
| b. Variable Word Length | 3 | | |
| c. Flexible Addressing | 4 | | |
| d. Multiple Processing: Serial vs. parallel | 5 | | |
| e. Additional Characteristics of Memory devices | 6 | | |
| 2. Variable Word Length, Flexible Address Multiple Processing | 8 | | |
| a. Prior Art | 8 | | |
| b. Objects | 9 | | |
| c. Brief Description of Invention | 10 | | |
| 3. Various High Speed Computer Components | 11 | | |
| a. Speed Considerations—General | 11 | | |
| b. Address Modification—Objects | 12 | | |
| c. Brief Description of Address Modification | 12 | | |
| d. Indexing Objects | 12 | | |
| e. Brief Description of Indexing | 13 | | |
| f. Boundary Adjusting Register Objects | 13 | | |
| g. Brief Description of Boundary Adjusting Registers | 13 | | |
| h. Clock Ring Objects | 13 | | |
| j. Brief Description of Clock Ring | 14 | | |
| k. Miscellaneous | 14 | | |
| 4. Description of the Figures | 14 | | |
| 5. Chart of Outputs of Figures | 15 | | |
| 6. Brief Description of Illustrative Embodiment | 17 | 1 | 1 |

CONTENTS—Continued

| Section | Col. | Figs. | Sheets |
|---|---|---|---|
| 7. Memory Output Circuits | 20 | | |
| a. Memory Character Selection | 20 | 2, 3 | 2, 3 |
| b. Primary Channel Gate | 22 | 4, 5 | 4, 5 |
| 8. Secondary Channel Registers | 24 | | |
| a. The Register | 24 | 6, 7 | 6 |
| b. Introduction to Secondary Register Control | 24 | 8 | 7 |
| c. Secondary Register Control Circuits | 27 | 8 | 7 |
| d. Exemplary Operation of Secondary Registers | 28 | 9, 10 | 8 |
| Case 1.—Two Useful Secondary (A) Characters, One Useful Primary (B) Character | 28 | | |
| e. Exemplary Operation of Secondary Registers | 29 | 11, 12 | 9 |
| Case 2.—One Useful Secondary Character, Two Useful Primary Characters | 29 | | |
| f. Exemplary Operation of Secondary Registers | 30 | 13 | 10 |
| Case 3.—One Useful Secondary Character, One Useful Primary Character | 30 | | |
| g. Exemplary Operation of Secondary Registers | 30 | 14 | 10 |
| Case 4.—Two Useful Secondary Characters, Two Useful Primary Characters | 30 | | |
| h. Summation of Secondary Registers | 31 | | |
| 9. Secondary and Return Channels | 31 | | |
| a. Secondary Channel Gate | 31 | 15, 16 | 11 |
| b. Return Channel 2d Character Gate | 33 | 17 | 12 |
| c. Return Channel 1st Character Register and Gate | 33 | 18 | 13 |
| 10. Memory Regenerate and Load | 34 | | |
| a. In General | 34 | 23 | 16 |
| b. Memory Input Odd/Even Controls | 35 | 19 | 14 |
| c. Memory Input Load/Regen Controls | 36 | 21, 22 | 15 |
| d. Memory Regen and Load Details | 37 | 24 | 17 |
| 11. Basic Timing Control | 38 | | |
| a. Basic Timing | 38 | 25, 26 | 18 |
| b. Clock Gates | 39 | 27, 28, 29 | 19 |
| c. Clock Pulses | 41 | 30 | 20 |
| d. Main Cycle Clock | 41 | 31, 32 | 20, 21 |
| e. Timing Nomenclature Examples | 43 | 33 | 21 |
| f. Read/Write Timings | 43 | 34, 37, 38 | 22, 23 |
| 12. Start, Stop and Error Circuits | 44 | | |
| a. Reset and Other Switches | 44 | 39 | 24 |
| b. Error Stop | 44 | 41 | 25 |
| c. Check Test | 45 | 42 | 25 |
| d. Computer Stop | 45 | 40 | 24 |
| e. Summation of Error Stop | 46 | | |
| 13. Instruction Circuits | 47 | | |
| a. Brief Description | 47 | 43 | 26 |
| b. Instruction Register | 47 | 44 | 26 |
| c. Instruction Decoder/Encoder | 48 | 45, 46 | 27 |
| d. OP Modification Circuits | 49 | 47–49 | 28 |
| e. Summation of Instruction Circuits | 49 | | |
| 14. Special Addressing Controls | 50 | | |
| a. Plus/Minus Scan | 50 | 86 | 48 |
| b. MAR Odd/Even | 50 | 51, 52 | 29 |
| c. CG1 and CG2 Controls | 51 | 53 | 29 |
| d. Match Circuits | 51 | 57 | 31 |
| e. Process 2d Character | 52 | 58 | 31 |
| f. Serial Scan | 53 | 56 | 30 |
| 15. Special Boundary Controls | 54 | | |
| a. General | 54 | | |
| b. Overlap Boundary | 55 | 54 | 30 |
| c. Use Single B | 55 | 55 | 30 |
| d. Summation of Special Boundary Controls | 56 | | |
| 16. Instruction Readout Circuits | 56 | | |
| a. General | 56 | | |
| b. I Cycle | 57 | 56, 60 | 32 |
| c. I Ring and I Ring Controls | 59 | 61–67 | 33–35 |
| d. Illustration | 62 | 68 | 36 |
| e. Last I Cycle | 63 | 39 | 37 |
| 17. Execution Cycle Control (A, B, and X Cycles) | 65 | | |
| a. A Cycle Latch | 65 | 70 | 38 |
| b. 1st A Cycle | 65 | 79 | 43 |
| c. B Cycle Latch | 66 | 71 | 38 |
| d. C and D Cycle Latches | 67 | 72 | 39 |
| e. X Cycle Latch | 67 | 73 | 39 |
| f. X Ring | 68 | 74, 75 | 40, 41 |
| 18. Termination of Execute Cycles | 69 | | |
| a. Last Execute Cycle | 69 | 76 | 42 |
| b. Time(t)Last | 70 | 77 | 43 |
| c. End of "A" Field | 70 | 78 | 43 |
| 19. Brief Description of Address Circuits | 70 | 80 | 44 |
| 20. Index Registers and Address Generator | 72 | 81b | 45 |
| a. Registers | 72 | 81a | 45 |
| b. Generator | 73 | 82–84 | 46, 47 |
| 21. Address Modification | 74 | | |
| a. MOD BY 0 | 74 | 85 | 48 |
| b. MOD BY 1 | 75 | 87 | 49 |
| c. MOD BY 2 | 76 | 88 | 50 |
| d. Plus and Minus MOD BY'S | 77 | 86 | 48 |
| e. Address Modification Per Se | 77 | 89–93 | 51–5 |

CONTENTS—Continued

| Section | Col. | Figs. | Sheets |
|---|---|---|---|
| 22. Address Entry Channel Decode and Gate | 78 | 95 | 56 |
| 23 Address Registers | 79 | ---------- | -------- |
| a. Parallel Setting and Resetting Address Registers A-D | 79 | 97, 101 | 57, 59 |
| b. Serial Setting and Resetting, A-D | 81 | 96, 98-100 | 57-59 |
| c. Setting and Resetting IAR | 83 | 101 | 59 |
| d. Address Register—Example: AAR | 84 | 102, 103 | 60, 61 |
| 24. ARO—Address Read Out | 85 | ---------- | -------- |
| a. Gating Controls For ARO | 85 | 104-109 | 62, 63 |
| b. Reset Controls For ARO | 86 | 110 | 63 |
| c. ARO Circuits | 87 | 111, 112 | 64, 65 |
| 25. MAR: Memory Address Register | 87 | 113, 114 | 66, 67 |
| 26. Address Bus Validity Check | 88 | 115 | 68 |
| 27. Use of Invention in Other Embodiments | 89 | ---------- | -------- |
| a. Use in Large Word Binary Machines | 89 | ---------- | -------- |
| b. Use in Parallel Processors | 90 | ---------- | -------- |
| c. Double Field Boundary Adjusting | 90 | ---------- | -------- |

1. PRIOR ART IN GENERAL

*a. Memory boundaries*

It is well established in the data processing art that memory devices (such as core storage, magnetic drums, magnetic discs, etc.) must deal with a fixed word length. This is axiomatically so since a memory has certain physical characteristics, regardless of the type of storage which is utilized to implement the memory, and these characteristics limit the number of data bits which can be read out under a single control. For instance, in a drum storage device, a single reading head can read only one track, and additional control information is required in order to read an additional track; the same is true for magnetic discs. Magnetic core storage is accessed by means of control wires, and it is necessary to have any particular address cause the threading of certain discreet magnetic cores, so that if additional cores are to be read out, additional windings must be energized. Thus, all computers have a certain memory word size; that is, the memory is designed to deliver a certain number of bits at each access (without chaining of characters by means of additional controls).

If a memory word is designed to be co-extensive with a character (i.e., so each memory cycle provides one character), there is little technical difficulty. However, due to the relatively slow speed of memory accessing in comparison with processing, each memory cycle may ity of the characters (defined herein as "multiple processing"). Multiple processing may be accomplished all at herein to be "single processing") or may handle a plurality of the characters (defined herein as "multiple processing"). Multiple processing may be accomplished all at once (in parallel) or one after the other (in seriatim).

Not only is the memory access bounded by the length of the memory word, but, for the same technical reasons, the characters which can be grouped together within any memory word are fixed. That is to say, any particular character storage location will always be accessed with the same identical group of other character storage character one time, and to access that same particular character (or other data group) with the next lower character one time, and to access that same particular character with the next higher character at another time. This feature of memory devices results in the definition of memory word boundaries, said boundaries defining the fixed character (or fixed group of characters) which can be brought out of a memory at a single access, or in a single memory cycle.

*b. Variable word length address incrementing*

Only recently in the history of the data processing art has the concept of variable word length processing been fully utilized. In variable word length machines, each character may include a "word mark" bit (hereafter referred to as WM-bit), which is set to binary ONE (WM-bit) if the character associated therewith is the last character in the word, and is set to binary ZERO (NOT WM-bit) whenever the character is not the last character in the variable length word. In order to handle the variable memory field which coincides with a variable word to be processed, computers have been modified so as to provide automatic incrementing of the memory address as each character of a variable length word is retrieved from memory for processing. Thus, an instruction need only give the address of the first character to be processed, and the automatic address incrementing circuitry will supply successive addresses until a character is retrieved which bears a WM-bit.

In most computers, many instructions require two characters. For instance, an ADD operation might require adding "A" to "B," where A may comprise several characters and B may comprise a different number of characters. On the other hand, a print-out instruction may be to move the word found at the A address in memory to a particular input/output device (hereinafter referred to as *I/O* device), such as a printer. In the case of the ADD operation, the instruction must include the address of the first character of the A field and the address of the first character of the B field; in the case of the print-out instruction, the address of the first character of the field to be sent to the *I/O* device must be specified. If two fields (A and B) are involved, both addresses must be incremented.

The automatic incrementing of addresses which is necessary in order to process variable length words results in a "scanning" of memory. Depending on the particular memory design being used, the memory may be scanned from a low address toward a higher address (hereinafter referred to as PLUS SCAN) or from a high address toward a lower address (hereinafter referred to as MINUS SCAN), or it may be scanned in either direction, in dependence upon the particular operation being performed. The direction in which a memory is scanned may be dependent upon the human significance of the characters being processed. For instance, if alphabetical information (comprising ordinary English language) were involved, we normally go from left to right. Thus we may define the low order address to be the left most address of the particular alphabetic characters involved. On the other hand, adding or subtracting of numerals usually will start at the extreme right hand side and work toward the left, thereby scanning from high order addresses to low order addresses. Therefore, it can be seen that a really flexible computer would utilize both PLUS SCAN and MINUS SCAN for different operations.

Variable word length (or variable field) processing is simple so long as the memory presents one character (or byte) at a time, and the processor handles that one character during a single, related memory cycle. For instance, in the exemplary ADD operation within a single processing computer, the memory will deliver the first character of the A and B fields, and then these two characters are added together and the result is stored back in memory; then the next two characters are retrieved, added and the result is stored in memory. This operation is straightforward. Further, whenever a plurality of characters are retrieved from memory, and there is a capability of processing only one of them (as selected by the address circuits) before the next memory cycle, the operation is also straightforward.

*c. Flexible addressing*

Variable word length (or variable field length) has less than maximum utility if the various portions of a word are limited by other than character (or byte) boundaries. For instance, if a variable field is to be made up by chaining together any number of four-character words, a single character field or a five character field would each waste three character spaces in memory, which spaces would be blank. Similarly, if the memory is incapable of addressing less than five characters (or bytes), for instance, then all of the variable fields must begin with addresses of 00000, 00005, 00010, etc.

This defeats the main purpose of a variable word length computer which is: to pack all the various groups of information, adjacent to one another, in as little memory space as possible.

Fully flexible addressing is defined to be that which permits every storage location (which holds a useful quantity of data bits, such as a character or a byte) to be addressed, whether or not other locations are automatically read out concurrently. Thus, when utilizing a boundary-oriented memory which is capable of delivering a plurality of characters—said characters always bearing a fixed relationship (i.e., addresses "5" through "9" always being retrieved together)—in a computer wherein processing may take place on a fully flexible-addressed/variable-word-length basis, it is necessary for the memory to be able to recognize any address as valid, even if it falls *between* memory boundaries (i.e., address "8") rather than *on* a boundary (i.e., address "5"). Therefore, the computer must be able to select the correct character out of those that are presented. This form of address/memory relationship is provided in current, variable-field-length data processing systems which are really variable.

*d. Multiple processing.—Serial vs. parallel*

Whenever a data processing system is being designed, choices must be made as to how many bits, characters, or words are to be processed at a particular time, and what the basis of this particular time will be. In accordance with the preceding discussions, it is of course advantageous to base the processing operation upon a time which is related in some useful fashion to the operation of the memory unit. The number of bits or bit groups (characters or bytes) which may be processed in relation to a particular memory accessing pattern is defined herein as the processing capacity of the computer. Multiple processing involves a capacity in excess of the smallest addressable memory data group, such as a character or byte. When multiple processing is involved, a series machine is usually thought of as one which will process several characters, (or bytes), one after the other, between a pair of memory access cycles; contrary-wise, a parallel machine is thought to be one which will process, all at one time, a plurality of characters (or bytes) between a pair of memory access times. Of course, processing a single character is in fact parallel processing of the bits contained therein, but whenever the character is coextensive with a numerical value in a particular radix, the bits themselves have no independent value, but obtain a value only in combination. Such a computer has a processing capacity of one group, and may be defined as a single character machine. Thus, in a data processing system designed for commercial utilization, decimal values are significant, and therefore useful processing of bits is not generally achieved with the less than four binary bits at one time, said four bits comprising a character in the well known binary coded decimal form. In scientific data processing applications, large binary words may be processed, either all at once (in parallel) or one byte at a time, where a byte may comprise six or eight binary bits. Also alpha-numeric information is normally not handled with less than six bits at a time since five binary bits will yield only thirty-two combinations, which is not adequate to account for twenty-six alphabetical characters, ten decimal values, and certain special characters (such as $, ?, etc.).

Normally, processing information in parallel is relatively simple in terms of technological complexities, but requires more hardware and therefore greater expense. On the other hand, serial processing is cheaper, but requires the solution of more technical problems in order to achieve the desired results.

If subsidiary operations are to be performed in conjunction with processing of data, it is easily understood that a serial machine allows more time (during the processing of a particular number of characters), in which such subsidiary operations may be accomplished, than a parallel machine. Thus, subsidiary operations may be performed with less complexity in a serial machine than in a parallel machine, due to the time factor involved.

*e. Additional characteristics of memory devices*

The type of storage most commonly used for main memories within a central processing unit is the well known magnetic core storage. In addition to the unavoidable boundary situation which affects all storage devices (as described hereinbefore), magnetic core memory devices have certain other characteristics which must be taken into account in designing a data processing system or computer.

The most practical magnetic core device is one within which each storage stage comprises only a single core; that is, storage of a binary one or zero in a particular position is achieved by having saturation flux in first or second direction, respectively, in a single piece of saturable magnetic material, such as the well known toroidal core.

One of the characteristics of a simple magnetic core storage is called "destructive readout." This characteristic describes the fact that sensing of the information in the cores is achieved by forcing all the cores to assume the direction of flux which defines a binary ZERO; each core which was previously set to binary ONE must therefore reverse the condition of its flux, and the change of flux during this reversal will generate an electrical signal (that is used as the output of the storage device) which indicates that a binary ONE was stored in the core. After driving the cores to the ZERO state, they all read ZERO, and the information which was previously obtained in the cores has therefore been destroyed by the process of sensing the information in the cores.

If one is willing to utilize more than one magnetic core per bit, or to employ fancy, complex circuitry at an excessive cost, this characteristic can be avoided. However, since many hundreds of thousands of magnetic cores must be utilized in a typical magnetic core storage, it is not feasible to overcome destructive readout by means of additional circuits nor by using more than one core per bit.

The usual way to overcome the destructive readout attendant to magnetic core storage is to regenerate the stored information each time that it is read out unless it is desired to change the information therein. In this manner, the destructive reading out of data serves as a reset of the cores and permits writing new data; thus, so long as every read cycle of a memory is followed by either a regeneration cycle or a load cycle, destructive readout poses no problem.

In the design of a data processing system, the timing of the various processing cycles, that is the choice of the time within which some number of bits will actually be processed, is adjusted to the memory read/write cycles described above. If a memory is quite slow, processing may be done between a single read/write cycle. On the other hand, if the memory is fast, and the processing will take a relatively long time, then a read/regenerate cycle will be taken at the start of processing time to provide characters to be processed, followed by a reset/write cycle at the end of processing time so that the result may be stored. Thus, the read portion of the read/regenerate cycle is actually related to the write portion of the reset/write cycle, in effect causing the memory to have an effective read/write cycle with a time gap in between, which permits use of the memory for other purposes while processing proceeds.

In the processing of two fields, such as the A field and the B field in the exemplary ADD operation discussed hereinbefore, the memory must take a read cycle to get one or more characters from the A field followed by a read cycle to get one or more characters from the B field. If a single memory is utilized, the read cycle for the A field must be a complete cycle, including regeneration, followed by a complete read and regenerate cycle of the B field; but if the memory can be held inoperative while a result is achieved, it is possible to write the result instead of regenerating the B field.

Thus it can be seen that the design of the data processing system utilizing magnetic core storage must also take into account the needs of the magnetic cores in providing sufficient time of regeneration cycles and/or load cycles so that proper operation of the core storage may be achieved as described hereinbefore.

In connection with multiprocessing, if a single fast memory is utilized and serial processing is to occur, it can be seen that a read/write cycle for the A field, a read/write cycle for the B field, several processing cycles, and a read/write cycle for storing the result may comprise the order of events required for optimum processing of data. On the other hand, if more than one independent core storage were available, the read/write cycles used to access the A field and the B field might occur simultaneously in the two distinct storage devices. Similarly, if parallel processing is to be used, it is likely that the read/write cycle for storing the result will be combined with the read/write cycle used to access one of the operands, with the parallel processing of all of the data taking place between the read and the load portions of this cycle.

As described above, it is necessary that the memory have available a set of devices capable of storing information read out from the cores, so as to be able to control regeneration of the information back into the same cores. This may be achieved in a variety of ways, including the provision of a set of registers or delay lines; or, as achieved recently in the data processing art, the sense amplifiers per se may be provided with a self-latching ability. Thus, regardless of the number of characters actually utilized by a processing unit, a memory unit must have some form of latching means for each one of a plurality of cores which may be read out at the same time. Since a destructive memory is not a memory at all unless it includes regeneration of data as necessary, the latches necessary for regeneration are considered to be a part of the memory; similarly, the external, or central processing section of a computer has absolutely no control over the regenerative latching devices, and for this reason such devices are considered to be a part of a memory. Thus, whenever a memory is read out, and the information may need to be regenerated, it is impossible to read out additional information from the same memory without first regenerating the information previously read out. This is true, because, of course, the latches used to hold the information until the regeneration occurs cannot again be used until the information therein has been returned to the cores.

Therefore, while planning the relationship between memories and processing cycles in a data processing system including a memory which is comprised of a destructive-read-out type of storage (such as magnetic cores) regeneration of each read out cycle must be accounted for before the next read out cycle, unless it is known that none of the information read out in the first memory cycle will need to be regenerated. Therefore a read cycle cannot be followed by a processing cycle and then by a write cycle if some of the writing must include regeneration, even though the writing into some of the cores may be of new information. In the above example, this means that one could not take an A cycle to acquire A data, take a B cycle to acquire B data, take a further A cycle to acquire additional A data, and then store the results in memory without regenerating the first and second A fields and the B field immediately upon reading them out. If this sequence were to occur, there would have to be a read A, regenerate A; a read B, regenerate B; a read A, regenerate A; and a destructive or reset reading of the B field and a writing into the B field to accomplish the total desired result.

2. VARIABLE WORD, FLEXIBLE ADDRESS MULTIPLE PROCESSING

*a. Prior art*

In the prior art, a few variable word length computers have been developed which provide various ways to compensate for memory boundaries, and provide unbounded processing words which may comprise a portion of a memory word or a field containing a plurality of memory words.

In one current variable word length data processing system, an ADD operation might be performed by utilizing a number of memory cycles, interleafed with a greater number of processing cycles. Thus, five A characters and five B characters might be removed from memory in two successive memory retrieval operations, but since the five characters are related in accordance with memory boundary rules (as discussed hereinbefore), and since the characters may have any address (due to the definition of variable word lengths), it is possible that less than all of the characters retrieved may belong to the words which are to be processed. In this case, it is necessary to keep track of how many useful characters can be processed, and to access the memory for more useful characters as necessary, in successive memory cycles.

In said current system, two different memory devices are employed: one contains words in the A fields, and the other contains words in the B fields. As each memory group of five characters is retrieved from either memory, the five characters are stored in a related output register, thereafter corresponding A and B characters are processed together, and the result is returned to the source of the original B characters. Successive processing steps handle one pair of characters (one A and one B) in each process time until either the A characters or the B characters are exhausted. Then, the appropriate memory will deliver more new characters so that processing may continue. Thus, of the five A characters and the five B characters delivered by the memory, if there were one useful A character and four useful B characters, the operation would proceed as folows:

(1) Take an A cycle and store five characters in the A register;

(2) Take a B cycle and store five characters in the B register;

(3) Process A1 and B1 and store sum 1 in the B register;

(4) Take an A cycle and store five new A characters in the A register;

(5) Process A2 and B2 and store sum 2 in the B register;

(6) Process A3 and B3 and store sum 3 in the B register;

(7) Process A4 and B4 and store sum 4 in the B register;

(8) Store the sums now in the B register;

(9) Take a B cycle and store five new B characters in the B register;

(10) Process A5 and B5 and store sum 5 in the B register . . . and so forth.

Steps 1 and 2 may be simultaneous and step 4 may overlap with step 3.

The above operation would continue until the end of either the A field or the B field is indicated by the presence of a WM-bit in one of the characters. Thus, the operation proceeds very well even though the A field and the B field are out of step with the memory.

Said current system is able to compensate for the difference between the A field boundary and the B field boundary because:

(a) A separate storage device is provided for each of the A field and B field; and (b) Since serial processing is utilized, there is usually sufficient time to access either one of the storage devices while processing of previously accessed characters is underway.

Thus, memory boundary compensation has been achieved in the prior art by providing a separate memory device for each of the operands, in a computer which has a total processing time that is some number of times greater than the time required for either one of the storage devices to present new characters of the related operand for processing.

It should be noticed that a memory cycle was required in the above example after processing only one A character. Since processing speeds exceed memory cycle speeds, this results in the loss of valuable processing time. Although the A field could be accessed for a new set of five A characters, concurrently with processing of the already available A characters, these new characters being inserted in the A field register at the moment when needed, this would not be beneficial in the above example where only one character is available and where the memory cannot be accessed in as little as one processing time.

Thus, presenting five characters for variable word-length multiple processing may fail to utilize the five characters advantageously when starting on a field, therefore being less beneficial when handling small fields.

Further, it is to be noted that the above type of operation cannot be achieved without a number of fixed registers external to the memory for storing in parallel the various characters which are delivered by the memory, and additionally, for storing in parallel the results which are subsequently to be returned to the memory. Furthermore, complex gating arrangements are required in order to store and retrieve the correct characters in the A and B registers as the sequence of processing cycles advances.

Having separate memories, separate addressing means are used for each, and fixed address modificaiton (decrementing all addresses by one for each processing step) is used.

Another current type of computer has a fixed word of 36 or 72 bits, and can achieve a certain amount of variable word length operation by special controls which chain words together into groups. This type of computer also may achieve flexible addressing by accessing two words in memory and selecting a composite word containing portions of both memory words. Two memory cycles must be taken to bring out the two separate words, for *each* composite word to be processed. Thus, processing is always delayed by extra memory accessing, resulting in less than optimum use of the central processing section.

*b. Objects*

A primary object of this invention is to provide a high speed parallel memory multiple processing computer with a fully flexible address and variable word length, which may operate with only one memory unit.

Another object is to provide a high speed parallel memory multiple processing computer, with a fully flexible address and variable word length, which operates with a processing time that is small with respect to memory access time.

Other objects include the provision of a variable word length parallel memory multiple processing computer having any one or more of the following characteristics:

capable of utilizing a variable length instruction word;
capable of utilizing a flexible address instruction word;
capable of processing data either while scanning from a low address toward a higher address or while scanning from a high address toward a lower address;

capable of selectively scanning memory in either a positive or negative direction with fully flexible addressing in all cases;
capable of serial processing with a minimum of external registers, external field storage and external storage of results;
having a minimum of external registers;
which does not require external storage of both fields supplied by the memory while processing proceeds;
which can formulate a result and return the same to memory without storage in an external register;
having an optimum balance of cost and speed;
capable of utilizing the regenerative loop to assist in processing as heretofore achieved only in single processing systems;
capable of utilizing a prolonged memory cycle, wherein writing is delayed until processing is complete, thereby avoiding regeneration followed by a reset-only read operation.

*c. Brief description of invention*

This invention is predicated on the concept that variable word length multiple processing may be enhanced by adjusting the boundaries of the operands to the boundary of the processing circuits, or by adjusting the boundaries of one operand to be processed so that it is co-extensive with the memory boundary of the other operand to be processed.

In accordance with the present invention, the memory means will deliver a plurality of characters in related memory access cycles, there being characters from one or more fields which are to be handled in some fashion by the central processing unit. Whenever two fields are to be combined (such as being added together) the memory means will provide a plurality of characters from each field and process all or some of these characters between the time the memory means accesses the characters and the time when the result is stored.

In order to provide boundary adjusting in accordance with the present invention, an auxiliary storage register is provided to permit accessing the first field of characters twice before processing begins, when necessary, thus insuring that there is always sufficient characters from the first field for processing with the number of available characters from the second field. In the previous exemplary ADD operation, a computer in accordance with the present invention would take a first A cycle and store a plurality of A field characters in a first register, take a second A cycle and store an equal number of subsequent A field characters in a second or auxiliary register, and thereafter take a B cycle to supply characters of the B field, following which all useful B characters would be processed before the next memory storage or access cycle. To guarantee processing a maximum number of characters in the first cycle, the B field may also be adjusted to the processing boundary by means of an external register and dual initial access.

This invention is particularly useful when processing time is small with respect to memory access time. It is therefore best suited to serial processing, where only a few characters are handled in each cycle, and to parallel processing of any size. Since parallel processing is technically simple, details are embodied herein in a small serial processing machine, thereby illustrating a complete, complex embodiment.

In accordance with a serial processing embodiment of the present invention, there is provided a memory capable of delivering a pair of characters from each of two fields to a primary channel, the primary channel handling one character after the other, in seriatim; a secondary channel responsive to said primary channel capable of receiving a pair of characters therefrom in more than one memory cycle, said secondary channel handling one or both of said characters in such a fashion as to process them in a known relationship to the bounded pair of characters delivered by said memory; and a return channel responsive to the internal processing portion of said computer for carrying a pair of characters back to said memory for storage therein. The internal processing section of said computer (for instance, the arithmetic circuitry) will handle a first character from said primary channel and a first character from said secondary channel and store the first result temporarily; will thereafter handle a second character from each of said channels and the second result will proceed immediately, together with the first result, to be stored in memory. Whenever only a single character is available for processing, said character may be processed without any storage of the result whatsoever.

This invention eliminates the need for a plurality of external registers for storing operands from a second field and for storing results, which have heretofore been utilized in parallel read out multiple process variable word length computers. Furthermore, due to the lack of unnecessary registers, the main data flow is simplified, and a great deal of input and output gating is avoided. With a minimum of external registers and gating, the circuit response time is necessarily also kept at a minimum, allowing serial processing of two characters in as little time as possible within each memory cycle.

3. VARIOUS HIGH SPEED COMPUTER COMPONENTS

*a. Speed considerations—General*

It is well known that any computer must have its memory speed, its processing speed, and the speed of its relationships with the various *I/O* devices all coordinated so as to utilize the various components of the computer in an economical manner.

If a computer is capable of handling internal processing operations at a very high speed and is coupled to very slow *I/O* devices, then it is readily apparent that the computer will be idle during a great proportion of the time. Similarly, if the internal processing section of the computer is capable of operating at relatively high speeds, and the memory which services the internal processing section is relatively slow, then the internal processing circuitry of the computer will be idle due to the necessity of frequent service by the memory.

Thus, it is essential to balance the relative speeds of certain main portions of a computer. As previously discussed, a slower memory may service a faster internal processing section of a computer by providing several characters during each memory cycle, the several characters all being processed within the same memory cycle. If extremely fast processing circuits are available, the several characters provided by the memory may be processed one after the other, in seriatim, during each memory cycle. In a serial machine, if the memory is nearly as fast as the internal processing portion of the computer, the computer may only be able to process a single pair of characters (such as one A character added to one B character) during a memory cycle, and yet have a certain amount of time left over which is wasted. The exact speed relationship between the memory and the computer is therefore critical. For instance, 40% of the central processing section time might be wasted handling a single character when the processing equipment is not exactly twice (200%) as fast, but only 190% as fast as the memory. Therefore, slight reductions in the time required for processing multiple characters within one memory cycle can be very significant.

Many subsidiary computer operations must be considered when handling plural character memory cycles or when decreasing normal cycle time. These include such functions as instruction read-out, indexing of addresses (incrementing by determinable amounts), instruction decoding, recognizing terminating conditions, etc. It is advantageous to design a variable word length, multiple processing computer which can utilize its optimum characteristics in handling these functions. To do so, many normally available component circuits must be modified and adjusted.

Accordingly, the advantages of the boundary-adjusted multiple processor described hereinbefore are enhanced by improvements in computer technology in accordance with further aspects of this invention as set forth below.

*b. Address modification—Objects*

Further objects include the provision of an improved memory scanning address modification means having any one or more of the following characteristics:

able to modify all necessary addresses with a single set of address control circuitry;

modification of no more than one address being required during any one character-processing time;

capable of correcting prematurely modified addresses;

capable of correcting addresses by modifying the address in increments having the same sense or polarity as the direction of memory scanning.

*c. Brief description of address modification*

In accordance with further characteristics of the present invention, a single address modification means is utilized to modify addresses for both fields which may be retrieved from the single memory of an exemplary embodiment. This being so, it is necessary to modify only one address at a time, the time required for modification being roughly coextensive with the time required for processing a pair of characters in the internal processing section (such as arithmetic circuits) of the computer. In order to achieve this, address modification is performed automatically for each field (e.g., A and B fields) in such a fashion that either one or the other of two required addresses is modified correctly, as such modification being correct for both of them in certain cases. Whenever the presumed address requirements do not coincide with the ultimate facts which are determined after examination of the characters presented, only one of the addresses need be remodified. Furthermore, remodification, or correction, of modified addresses is accomplished in such a way as to eliminate the necessity of reversing the direction of modification in order to achieve the correction. Specifically, modification of the A address is always equal to or less than that which will be required, so that additional modification is always in the same direction as the original modification. On the other hand, modification of the B address may exceed that which ultimately is proven to be correct, but the original B address is remodified by a smaller amount rather than decrementing the first-modified B address.

The improved address modification circuitry in accordance with the present invention permits utilization of less address modification circuitry than otherwise would be required, and limits remodification to not more than one of the two addresses during any one process time within a memory cycle. It operates to increment or decrement an address in direct dependence only on the direction of scan required for the operation being performed.

The present invention also provides for a completely flexible scanning direction, and a completely flexible word length, with the attendant advantage of having every address in the memory valid both for data and for instructions. This permits use of fully flexible instructions and data fields throughout the memory with no loss in processing time resulting from the necessity of modifying pairs of addresses with a single address modification means.

Since only two addresses are used in any multiple processing computer, this aspect of the present invention is valid in any computer system.

*d. Indexing objects*

Additional objects include provision of a parallel read-out serial process variable word length computer:

wherein addresses may be indexed in the same fashion realized for processing of data, including parallel-readout, multiple-handling of the addresses to be indexed;

wherein multiple indexing may be achieved seriatim without decreasing the frequency of memory cycles below that which is used for regular processing of data.

*e. Brief description of indexing*

In further accord with the present invention, the two character gating capability of the return channel (which returns processed data to the memory) is utilized to facilitate buffering between first and second indexed addresses so as to permit indexing of two addresses in an overlapped fashion. That is, the indexing of a second address may begin prior to the time that the result of indexing the first address is stored in an address register. Since there may be great number of address registers in a modern computer, an address entry channel (which permits loading of address registers from the internal processing section of the computer) is preferably serial in nature; that is, is preferably capable of handling only as much as the internal processor will deliver to it at any one time. This being so, the addressing circuits do not have the advantage of a parallel return channel of the type that a memory may utilize. In view of this, there are not two distinct routes for successive indexed addresses to take while the indexed addresses are being returned to their normal storage place.

This invention facilitates high speed seriatim indexing of a plurality of addresses without the necessity of a parallel return channel to handle the indexed addresses.

*f. Boundary adjusting register objects*

Still further objects of the invention include provision of a parallel readout variable word length computer:

in which a plurality of characters related by memory boundaries are adjusted so as to coincide with the character boundaries of the processing means;

in which boundary adjusting may be accomplished together with deserializing and serializing means;

in which boundary adjusting and/or deserializing-serializing is accomplished with a minimum amount of circuit operation time;

in which input and output gating controls are kept at a minimum.

*g. Brief description of boundary adjusting registers*

In accordance with another aspect of the present invention, there is provided an improved means for adjusting one of the fields to be processed so that each segment of it coincides, in successive memory cycles, with the normal memory boundary of respective segments of another field with which it is to be processed. Additionally, boundary adjusting is accomplished in a most simple manner by recognizing the order in which bit groups are to be currently handled, in accordance with the direction of scan as the memory proceeds through successive address locations in presenting characters to the internal processing section of the computer. Further, the boundary adjusting means eliminates unnecessary circuit time loss and unnecessary handling of the data by keeping the data path as short as possible; eliminates complicated input/output gating; and entirely eliminates the need for shifting register operations.

*h. Clock ring objects*

Still other objects of the invention include provision of an improved clocking ring or counter:

wherein the relationship between the various stages of the ring are so oriented as to minimize special control thereover; or capable of taking two distinct steps of the same increment, said steps not being symmetrically related to their relative positions within said ring or counter.

*j. Brief description of clock ring*

In further accord with the present invention there is provided a clock ring which counts to a number (such as five) by turning on successive bistable stages (such as latches), then turns on a special stage and repeats the previous count so as to double the length of the counter (such as counting from five to ten), and then counts additional times with the special stage on followed by additional times with the special stage off.

This allows skipping from 1 to 3 and from 5 to 8 with a single control, since the 3 latch control and the 8 latch control are the same, the difference in value being signified by the special latch. Of course, the circuit is thus simplified, saving both control time and money.

*k. Miscellaneous*

In order to obtain various desirable characteristics, another object is to provide improved clock controls, gates, and other logic circuits for use in a modern, high speed computer.

4. DESCRIPTION OF THE FIGURES

FIG. 1 is a simplified block diagram of the main data flow portion of one embodiment of a computer in accordance with the present invention.

The following figures are schematic block diagrams of various portions of the embodiment of the present invention which is shown in FIG. 1, as identified below, or are illustrative drawings when so designated:

| Figures | | Sheet No. |
|---|---|---|
| 2 | Memory Character Selection | 2 |
| 3 | Memory Character Selection Details (Odd Character). | 3 |
| 4 | Primary Channel Gate | 4 |
| 5 | Primary Channel Gate Details | 5 |
| 6 | Secondary Channel Registers | 6 |
| 7 | Z Register Details | 6 |
| 8 | Secondary Register Controls | 7 |
| 9-14 | Illustrative Examples of Operation of the Circuits shown in FIGS. 6-18. | 8-10 |
| 15 | Secondary Channel Gate | 11 |
| 16 | Generation of Secondary Character Gates 1 and 2. | 11 |
| 17 | Return Channel 2d Character Gate | 12 |
| 18 | Return Channel 1st Character Registers and Gate. | 13 |
| 19 | Memory Input Odd/Even Controls | 14 |
| 20 | Illustration of Alternative Form of FIG. 19 | 14 |
| 21 | Memory Input Load Character Controls | 15 |
| 22 | Memory Input Regenerate Character Controls. | 15 |
| 23 | Memory Regenerate and Load | 16 |
| 24 | Memory Regenerate and Load Details (Character 0). | 17 |
| 25 | Basic Timing Chart | 18 |
| 26 | Oscillator | 18 |
| 27 | Binary Gate for Clock | 19 |
| 28 | Binary Gate 2 Generation Chart | 19 |
| 39 | Simplified Binary Gate 2 Generation Chart | 19 |
| 30 | Clock Pulses | 20 |
| 31 | Main Cycle Clock Illustration | 20 |
| 32 | Main Cycle Clock | 21 |
| 33 | Timing Nomenclature Examples | 21 |
| 34 | Basic Read Timing | 22 |
| 35-36 | Charts of Machine Cycles | 22 |
| 37-38 | Basic Write Timing | 23 |
| 39 | Reset and Other Switches | 24 |
| 40 | Computer Stop | 24 |
| 41 | Error Stop | 25 |
| 42 | Check Test | 25 |
| 43 | Instruction Circuits | 26 |
| 44 | Instruction Register | 26 |
| 45 | Instruction Decoder | 27 |
| 46 | Instruction Grouping Encoder | 27 |
| 47 | Operation Modifier Control | 28 |
| 48 | Operation Modifier Register | 28 |
| 49 | Operation Modifier Decode | 28 |
| 50 | Chart Illustrating 2 Out of 5 Code | 29 |
| 51 | MAR Odd/Even | 29 |
| 52 | DAR Odd/Even | 29 |
| 53 | CG1 and CG2 Controls | 29 |
| 54 | Overlap Boundary | 30 |
| 55 | Use Single B | 30 |
| 56 | Serial Scan | 30 |
| 57 | Match Circuits | 31 |
| 58 | Process 2d Character Controls | 31 |
| 59 | I Cycle | 32 |
| 60 | Next Cycle is I Cycle | 32 |
| 61 | I Ring Start | 33 |

| Figures | | Sheet No. |
|---|---|---|
| 62 | I OP Control | p3 |
| 63 | Control Latch/Set Reset | 33 |
| 64 | I Ring Set | 33 |
| 65 | I Ring Reset | 33 |
| 66 | I Ring Control Latches | 34 |
| 67 | I Ring | 35 |
| 68 | Chart Illustrating I Ring Operation | 36 |
| 69 | Last I Cycle | 37 |
| 70 | A Cycle Latch | 38 |
| 71 | B Cycle Latch | 38 |
| 72 | C Cycle and D Cycle Latches | 39 |
| 73 | X Cycle Latch | 39 |
| 74 | X Ring Control | 40 |
| 75 | X Ring | 41 |
| 76 | Last Execute Cycle | 42 |
| 77 | *t* Last | 42 |
| 78 | ENT of "A" Field | 43 |
| 79 | 1st A Cycle | 43 |
| 80 | Address Circuits | 44 |
| 81a | Index Tag Registers | 45 |
| 81b | Index Required/Not Index | 45 |
| 82 | Address Generator Tens Position | 46 |
| 83 | Address Generator Unit Position | 47 |
| 84 | Address Generator, H, TH, TT Positions | 47 |
| 85 | MOD by 0 | 48 |
| 86 | Plus/Minus Scan | 48 |
| 87 | MOD by 1 | 49 |
| 88 | MOD by 2 | 50 |
| 89 | Address MOD Units 1 | 51 |
| 90 | Address MOD Units 2 | 52 |
| 91 | Address MOD Units 3 | 53 |
| 92 | Address MOD Tens | 53 |
| 93 | Address MOD H, TH, TT | 54 |
| 94 | Illustrative of Address Modification | 55 |
| 95 | Address Entry Chan. Decode and Gate | 56 |
| 96 | Serial Set | 57 |
| 97 | AAR/DAR MOD Set/Reset | 57 |
| 98 | Serial Select | 58 |
| 99 | Serial Address Position Selection | 58 |
| 100 | Serial Reset | 59 |
| 101 | IAR MOD Set/Reset | 59 |
| 102 | A Address Register (AAR) | 60 |
| 103 | AAR Units Position (Details) | 61 |
| 104 | Gate AAR to ARO | 62 |
| 105 | Gate BAR to ARO | 62 |
| 106 | Gate CAR | 63 |
| 107 | Gate DAR | 63 |
| 108 | Gate IAR | 63 |
| 109 | Gate Address GEN | 63 |
| 110 | Reset ARO | 63 |
| 111 | Address Register Output (ARO) | 64 |
| 112 | ARO (Details) | 65 |
| 113 | Memory Address Register (MAR) | 66 |
| 114 | MAR TT Pairs | 67 |
| 115 | Address Bus Validity Check | 68 |

5. CHART OF OUTPUTS OF FIGURES

| On Fig. | Line Name | Line Goes to Fig. |
|---|---|---|
| 2 | All | 4. |
| 3 | All | 5. |
| | WM | 69. |
| 4 | All | 6, 17, 43. |
| 5 | All- | 44. |
| | All except $\overline{WM}$ | 7, 48, 80, 95. |
| | WM | 58, 60, 69, 76, 85, 88, 101. |
| | $\overline{WM}$ | 60, 70, 71, 73, 101. |
| 6 | All | 15. |
| 7 | All | 6. |
| 8 | All | |
| 9-14 | All | 15. |
| 15 | Secondary Channel Error | 41. |
| | All others | 15, 71, 76, 78. |
| 16 | All | 15. |
| 17 | All | 18, 23, 24, 95. |
| 18 | All | 23, 24, 95. |
| 19 | All | 21, 22. |
| 21 | All | 23, 24. |
| 22 | All | 23, 24. |
| 23 | None | |
| 24 | do | |
| 25 | do | |
| 26 | Machine is Stopped | None. |
| | OSC | 30. |
| | OSC DLYD | 27. |
| | RAW OSC | 40. |
| 27 | All | 30. |
| 28 | None | |
| 29 | do | |
| 30 | All | 26, 32. |
| 31 | None | |
| 32 | All | (Timing: go to most Figs.) |
| 33 | All | (Timing examples.) |
| 34 | Read MEM | 19. |
| | Reset MAR | 113. |
| | Start MEM CL. | Not shown. |
| | Set MAR | 113. |
| 35 | None | |
| 36 | do | |
| 37 | do | |
| 38 | All | 19. |

5. CHART OF OUTPUTS OF FIGURES

| On Fig. | Line Name | Line Goes to Fig. |
|---|---|---|
| 39 | Reset ADDR. REGS | 97, 101. |
| | Not PROG. RESET | 31, 32. |
| | Program Reset | 8, 18, 19, 27, 31, 32, 40, 41, 53, 54, 56, 57, 59, 61, 63, 65, 74, 75, 78, 79, 82, 84, 85, 87, 88. |
| | Start | 40. |
| | Compress Mode | 66. |
| | Not COMP Mode | 60, 73. |
| | OPER. Stop | 40, 41. |
| 40 | All | 26. |
| 41 | CK. Reset Fault | 26, 27. |
| | Any Error | 40, 42, 58. |
| | Stop | 26. |
| 42 | Not CK. RST Fault | 31. |
| | CK. Reset Fault | 26, 32. |
| | CK. Set Fault | 40. |
| 43 | None | |
| 44 | All | 45. |
| 45 | Add | 17, 38, 69, 71, 76, 86, 104, 105. |
| | No OP | 58, 60, 62, 63, 65, 38. |
| | Move Data | 17, 47, 69, 76, 86, 104, 105. |
| | Not Move Data | 78. |
| | All | 46. |
| 46 | A CY First | 70. |
| | Load MEM B CY | 56. |
| | ADDR Type | 60. |
| | 2 ADDR Type | 60. |
| | STND A Cycle | 15, 71, 78. |
| 47 | Not OP MOD Time | 95, 96. |
| | OP MOD Time | 48, 60. |
| 48 | All except Error | 49. |
| 49 | Move Plus All | 70, 76. |
| 50 | None | |
| 51 | MAR Odd | 53, 57. |
| | MAR even | 53, 57, 69. |
| 52 | All | 57. |
| 53 | CG1, CG2 | 4, 5, 8, 16, 19, 54. |
| | Not CG2 | 58. |
| 54 | OVLP BNDRY | 70, 85, 87, 88. |
| | Not OVLP BNDRY | 55, 87. |
| 55 | Use Single B | 54, 87, 97, 104, 110. |
| | Not Use Single B | 88, 97. |
| 56 | Serial Scan | 8, 54, 58. |
| | Not Serial Scan | 54, 55. |
| 57 | All | 8, 54, 55. |
| 58 | PROC. 2d CHAR | 53, 64, 65, 69, 74, 87, 88, 97, 101, 104, 110. |
| | Not PROC 2d | 87, 95, 97, 101. |
| 59 | Set I Cycle | 65, 108. |
| | I Cycle | 15, 17, 27, 58, 60, 62, 63, 64, 69, 73, 77, 85, 86, 87, 88, 95, 96, 98, 100, 101. |
| | Not I Cycle | 58. |
| 60 | All | 59. |
| 61 | All | 62, 63, 65. |
| 62 | All | 67. |
| 63 | All | 66. |
| 64 | All | 67. |
| 65 | All | 67. |
| 66 | All | 67. |
| 67 | Various | 44, 47, 54, 56, 57, 58, 60, 66, 69, 72, 73, 78, 80, 85, 88, 95, 97, 98, 99, 100, 101, 106, 107. |
| 68 | None | |
| 69 | All | 70, 79. |
| 70 | Not Extra A CY | 71. |
| | Set A Cycle | 78, 79, 85, 87, 104. |
| | A Cycle | 8, 15, 17, 54, 77, 97, 104, 105, 110. |
| | Not A Cycle | 79. |
| 71 | Set B Cycle | 88, 105. |
| | B Cycle | 15, 17, 38, 55, 70, 76, 77, 78, 79, 87, 88, 97, 104, 110. |
| 72 | C Cycle | 60, 77. |
| | D Cycle | 77. |
| 73 | Set X Cycle | 88, 109. |
| | X Cycle | 15, 17, 58, 72, 74, 75, 77, 82, 86, 95, 96, 98, 106, 107, 109, 110. |
| 74 | All | 75. |
| 75 | Various | 58, 72, 73, 83, 97, 99, 100. |
| 76 | Last Execute | 58, 59, 61, 78, 87. |
| | Not Last Execute | 55, 88. |
| 77 | Stop At TH, TF | 37. |
| | *t* Last | 31, 32, 59, 61, 72, 79. |
| 78 | End Of "A" | 87. |
| | Not End of "A" | 16, 88, 97. |
| 79 | 1st "A" Cycle | 54, 56, 57, 70, 104, 105, 110. |
| 80 | MAR Units | 51. |
| | BAR Units | 52. |
| | ADDR Exit CHAN | 15. |
| 81a | All | 81, 82, 83. |
| 81b | Index REQ'D | 73, 100. |
| | Not Index | 60. |
| 82-84 | All | 111, 112 |
| 85 | | 87, 88, 90. |
| 86 | Plus/Minus Scan | 4, 5, 19, 24, 53. |
| | MOD BY'S | 90. |
| 87 | | 85, 88, 90. |
| 88 | | 85, 87, 90. |
| 89 | All | 90. |
| 90 | Units Decode | 91. |
| | Carry/Borrow | 92. |
| 91-93 | All | 80, 102, 103. |
| 94 | None | |
| 95 | All | 80, 102, 103. |
| 96 | All | 102, 103. |
| 97 | All | 102, 103. |

5. CHART OF OUTPUTS OF FIGURES

| On Fig. | Line Name | Line Goes to Fig. |
|---|---|---|
| 98 | All | 102, 103. |
| 99 | All | 103. |
| 100 | Reset AAR | 102, 103. |
| 101 | All | 80. |
| 102, 103 | All | 111, 112. |
| 104-110 | All | 112. |
| 111 | All | 89, 92, 93, 103. |
| 112 | Bus | 103. |
| | Units | 89. |
| | Tens | 92. |
| | H. T, TT | 93. |
| 113 | Units | 51. |
| | TT | 114. |
| 114 | All | 2, 3, 21, 22. |
| 115 | Error | 41, 42, 56. |
| | Not Error | 56. |

6. BRIEF DESCRIPTION OF ILLUSTRATIVE EMBODIMENT

This embodiment is described in terms of the basic group of bits hereinbefore defined as a "character." However, any useful group of binary bits (a byte) is equally suited to the purposes of the invention, as described hereinafter. Also, "field" is arbitrarily used interchangeably with "word."

The circuit of FIG. 1 represents a block diagram of a data flow which will handle a fully flexible-addressed, variable-word-length, multiple-processing computer which is serviced by a parallel-readout, bounded memory. Referring to the upper central portion of FIG. 1, a MEMORY 201 (not shown elsewhere) comprises the focal point of the computer in terms of the problems presented by memory boundaries as discussed in the introduction hereinbefore. The illustrative embodiment herein handles two characters serially, the memory presenting pairs of characters to the processor during each memory cycle. Specifically, in the particular embodiment shown, the MEMORY 201 will present ten characters of eight bits each over a trunk of eighty lines 202 to MEMORY CHARACTER SELECT circuit 204. The MEMORY CHARACTER SELECT circuit will pick two of the ten characters and transmit them over an EVEN eight bit bus 206 and an ODD eight bit bus 208 to a PRIMARY CHANNEL GATE 210. It is to be noticed that a five bit bus 212 causes the ADDRESSING CIRCUITS 214 to exercise control over the MEMORY CHARACTER SELECT circuit 204.

The PRIMARY CHANNEL GATE selects either or both (one after the other) of the EVEN character (206) and ODD character (208) and make these available to a PRIMARY CHANNEL 216. The PRIMARY CHANNEL 216 is identified due to the fact that any characters to be processed must pass onto the PRIMARY CHANNEL once they are selected from the MEMORY by the circuitry just described. The PRIMARY CHANNEL in turn supplies characters to SECONDARY CHANNEL REGISTERS 218 which provide boundary adjusting (in dependence upon SECONDARY REGISTER CONTROLS 219) and makes a pair of characters available (via a sixteen bit bus 220) to a SECONDARY CHANNEL GATE 222. When the SECONDARY CHANNEL GATE 222 is operated in such a fashion as to select one of the inputs thereto, such as one of the character sets presented on the sixteen bit bus 220, it will gate information onto the SECONDARY CHANNEL 224.

Both the SECONDARY CHANNEL 224 and the PRIMARY CHANNEL 216 feed ARITHMETIC & LOGIC CIRCUITS 226, as well as a number of other circuits which will be discussed hereinafter. The ARITHMETIC & LOGIC CIRCUITS 226 are connected by an eighth bit bus 228 to a RETURN CHANNEL 2ND CHARACTER GATE 230 which (in the same fashion as the secondary channel gate 222) will select from among its inputs to apply a character onto an eight bit 2ND CHARACTER portion 232 of a RETURN CHANNEL.

The 2ND CHARACTER portion 232 of the RETURN CHANNEL feeds a RETURN CHANNEL 1ST CHARACTER REGISTER & GATE 234 which in turn will supply data to a 1ST CHARACTER portion 236 of the RETURN CHANNEL. The RETURN CHANNEL is a two-character parallel channel which returns data from the internal processing section of the computer to the MEMORY, via MEMORY REGENERATE & LOAD CIRCUITS 238. The MEMORY REGENERATE & LOAD circuits also receive information on an eighty bit REGENERATION bus 240, and select data from either the RETURN CHANNEL or the REGENERATION bus, as necessary, to cause the effective regeneration of old data and/or writing of new data into the MEMORY over an EIGHTY bit bus 242.

The ADDRESSING CIRCUITS 214 applying address information to the MEMORY 201 over a bus of twenty-five lines 252. The ADDRESSING CIRCUITS also supply information (the same as is on the five bits bus 212) to MEMORY INPUT CONTROLS 254 over a five bit bus 256. The MEMORY INPUT CONTROLS control the regeneration and loading of information into the memory via a ten bit bus 258.

Briefly, in a normal two-character processing cycle, the MEMORY will deliver ten characters (including two characters from the A field) to the MEMORY CHARACTER SELECT circuit 204, which will present two of these characters to the PRIMARY CHANNEL GATE 210. During an A cycle, the first of these characters will be carried into the SECONDARY CHANNEL REGISTERS 218, and pass through a Z register 244 to an X register 246; the second of the characters will be selected by the PRIMARY CHANNEL GATE for presentation to a Y register 248. Thereafter, the MEMORY will present ten more characters (including two characters from the B field) and the MEMORY CHARACTER SELECT circuits 204 will present two of these to the PRIMARY CHANNEL GATE 210. The first of these will be gated onto the PRIMARY CHANNEL 216 at the same time that the SECONDARY CHANNEL GATE 222 will pass the character out of the X register 246 onto the SECONDARY CHANNEL 224. Thus, a pair of characters one A and one B, will be represented to the ARITHMETIC & LOGIC CIRCUITS 226 for processing and the answer will immediately pass over the eight bit bus 228 through the RETURN CHANNEL 2ND CHARACTER GATE 230 into the RETURN CHANNEL 1ST CHARTCTER REGISTER & GATE 234. Then, the PRIMARY CHANNEL GATE 210 will gate the second one of the two B characters out onto the PRIMARY CHANNEL 216 concurrently with the SECONDARY CHANNEL GATE 222 gating the character out of the Y register 248 onto the SECONDARY CHANNEL 224; these will be processed by the ARITHMETIC & LOGIC CIRCUITS 226. As soon as the answer is available on the eight bit bus 228, the RETURN CHANNEL 2ND CHARACTER GATE 230 will pass the second result onto the 2ND CHARACTER portion 232 of the RETURN CHANNEL, and, simultaneously, the RETURN CHANNEL 1ST CHARACTER REGISTER & GATE 234 will pass the first result onto the 1ST CHARACTER portion 236 of the RETURN CHANNEL. The RETURN CHANNEL presents both of these results to the MEMORY REGENERATE & LOAD circuits 238 and causes these results to be written into MEMORY 201. All the remainder of the characters (those not selected initially by the MEMORY CHARACTER SELECT circuit 204) will be regenerated by means of the REGENERATION bus 240 and the MEMORY REGENERATE & LOAD circuits, which recognize that only two of the characters have new results to be written into them, and the remainder must be regenerated.

The above brief example (which is explained in greater detail hereinafter) illustrates a simple case that occurs when the memory boundaries coincide with the data to be processed; that is, of the pair of characters delivered to the PRIMARY CHANNEL GATE by the MEMORY, both characters in each pair are processible. An equally simple case arises when only one character each of the A field and B field may be processed. In such a case one character of the first pair (from the A field) is selected by the primary channel gate and will be applied to the Y register 248; thereafter a second pair of characters will be present to the PRIMARY CHANNEL GATE (from the B field), and the GATE will deliver one of them to the PRIMARY CHANNEL 216 concurrently with the SECONDARY CHANNEL GATE selecting the character from register Y for application to the SECONDARY CHANNEL 224. Thus, a single character from each field might be processed in a memory cycle under appropriate circumstances.

A more difficult situation may arise when two useful secondary characters are provided but only one useful primary character. Thus during an A cycle, the PRIMARY CHANNEL GATE will deliver a first character to the Y register 248 and then a second character to the Z register 244. Then, there will be a B cycle within which the PRIMARY CHANNEL GATE will deliver to the PRIMARY CHANNEL 216 only one character, which will be processed with the character in the Y register 248. Thereafter the character which was in the Z register 244 will be advanced to X register 246 and another A cycle will cause the first of a new pair of characters to be stored in the Y register 248, and will cause the second of these characters to be stored in the Z register 244. On the next B cycle, the PRIMARY CHANNEL GATE will select a first character for processing with the character in the X register 246 and will later select a second character for processing with the A field character stored in the Y register 248. Again, the character left in the Z register 244 will be advanced to the X register 246, and subsequent memory cycles can be taken, processing two characters for each group of A and B field pairs.

A second problematical situation may arise whenever only one useful A field character is available, and, by examining the B field address it can be determined that the subsequent B cycle will provide two useful primary characters from the B field. In this case, the PRIMARY CHANNEL GATE will select the first useful character during a first A cycle, and pass this character through the Z register into the X register 246. Thereafter, the second A cycle is taken, and an additional pair of secondary characters is presented to the PRIMARY CHANNEL GATE 210. The first of these characters will be selected by the PRIMARY CHANNEL GATE and stored in the Y register 248; the second of these characters will be stored in the Z register 244. Thereafter, when a B cycle is taken, the first B field character will be processed with the character stored in the X register, and the second one will be processed with the character stored in the Y register. Thereafter, the character stored in the Z register is advanced to the X register and an additional A cycle is taken so as to supply two new characters to the Y and Z registers, respectively.

Thus there has been briefly described a method for adjusting the boundaries of a multiple processing operation to coincide with the fixed memory boundary of one of the operands involved. This method may be characterized by the principal philosophy involved, which is, if there are enough secondary characters to process the primary characters which will be presented by the MEMORY for processing, then these are processed; if not, an additional memory cycle is taken so as to insure that there are sufficient secondary characters to handle those primary characters which will be presented for processing therewith. Thereafter, a full memory boundary width of characters may be processed each time that the memory fetches primary and secondary characters until one or the other field (the A field or the B field) is exhausted.

After processing has proceeded for some time, the end of either field of MEMORY may be sensed in either the first or second character of the A field or in the first or second character of the B field. In an ADD operation (for instance), the A field is added to the B field and the result is placed in the B field, character by character, as processing proceeds. If the end of the A field is sensed the operation is stopped by preventing the SECONDARY CHANNEL GATE 222 from responding to the X and Y registers 246, 248. This has the effect of returning the primary character to the B field, though permitting a carry into it (perhaps) from the last actual addition operation. Thereafter, the control circuits (not shown in FIG. 1) will cause only B cycles to be taken (in order to insure propagation of the carry during an ADD operation, for instance).

If the end of the B field is sensed during the first of two B field characters, this will inhibit the processing of the second A and B field characters. This must be so (even in an ADD operation where there may be a carry from the addition of the A and B characters) because the end of the B field having been reached, there is no place in which to store an answer.

Whenever the end of the B field is sensed, a LAST EXECUTE CYCLE condition is recognized, which causes the machine to read out the next instruction on the following cycle rather than to continue to process the present A and B fields.

Thus there is little difficulty in ending multiple processing operations when implemented in accordance with the present invention.

Briefly, the remainder of FIG. 1 illustrates how the present invention might relate to an entire data processing system and includes further details of the main data flow of a computer in accordance with the present invention. For instance, the SECONDARY CHANNEL GATE 222 may receive data from *I/O* devices over a bus 244, from the operators console over a bus 246, or from the addressing circuits 214 over a bus 248. Similarly, the PRIMARY CHANNEL 216 may supply information to the ADDRESSING CIRCUITS 214 and to certain MISCELLANEOUS CONTROLS 250 (shown here for illustrative purposes only). Also it is to be noted that the PRIMARY CHANNEL 216 and the SECONDARY CHANNEL 224 may be applied directly to the RETURN CHANNEL 2ND CHARACTER GATE 230. Similarly both the PRIMARY CHANNEL and the SECONDARY CHANNEL may supply information to the operators console as illustrated at the bottom right hand side of FIG. 1.

Additionally, the left hand side of FIG. 1 illustrates the fact that the return channel may supply data to the operators console and to *I/O* devices, neither of which is shown elsewhere herein.

7. MEMORY OUTPUT CIRCUITS

*a. Memory character selection*

The MEMORY 201 (FIG. 1) is not disclosed in detail herein since the choice of a suitable memory may be left to one skilled in the art, taking into account the particular performance requirements and the sign criteria involved in any given utilization of the present invention. However, an exemplary memory system may be found in U.S. Patent 3,049,295, Multiplying Computer, W. H. Rhodes, et al., issued August 14, 1962. The memory of the Rhodes patent is suitable for supplying for instance, a 20,000 character storage capability to the present invention; by stacking five of said memories in a manner well known to the art, a storage capacity of 100,000 characters would result. Said memory presents during each memory cycle an even and an odd character.

The even and odd character would be selected in this embodiment by a determination of whether the highest order memory addressing bits were even or odd, and both would be selected if two characters are to be processed. Thus, five even characters and five odd characters could be presented at one time by a stack of five memories of the type shown in the Rhodes patent.

Figure 2:
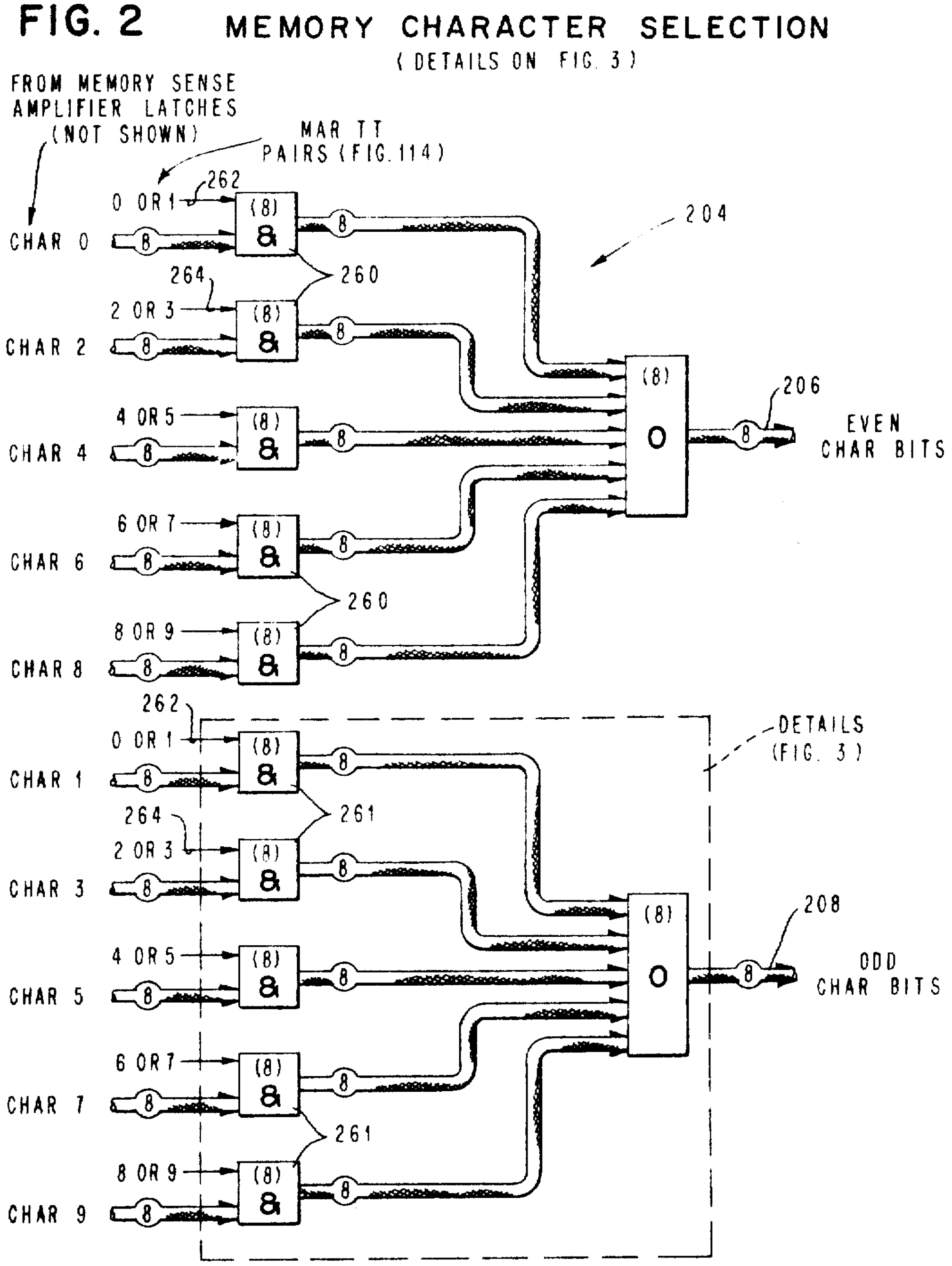

Referring to FIG. 2, the characters presented by such a memory are identified as CHARACTER 0, CHARACTER 1 . . . CHARACTER 9. Each of these characters comprise eight bits in the present embodiment and is selected by an eight-way gate 260, 261 which is responsive to a corresponding MAR TT PAIRS signal (which is generated in FIG. 114, as will be described in detail hereinafter). It suffices at this point that the OOR 1 line 262 will be energized if the MEMORY ADDRESS REGISTER has, in its highest order (ten thousands position), either the value ZERO or the value ONE. In other words, if the address is anywhere from 00000 to 19,999, this line will be energized. Similarly, if the MEMORY ADDRESS REGISTER has a value between 20,000 and 39,999, the 2 or 3 line 264 will be energized. Thus, it is seen that the entire memory selection of FIG. 2 may be considered to be in five blocks of 20,000 characters each, there being one even character and one odd character supplied from each block. The even characters are gated by the circuit at the top of FIG. 2, and the odd characters are gated by the circuit at the bottom of FIG. 2. It is to be noted that the even and odd character from each block are adjacent characters in memory: that is, CHARACTER 0 which will be selected by the operation of the 0 OR 1 line 262 on the eight way gate 260 will be adjacent to CHARACTER 1 which is selected by the operation of the 0 OR 1 line 262 on the eight way gate 261. The selected characters pass through related eight way OR circuits 266, 267 to the EVEN CHARACTER bus 206 and to the ODD CHARACTER bus 208, respectively.

Figure 3:
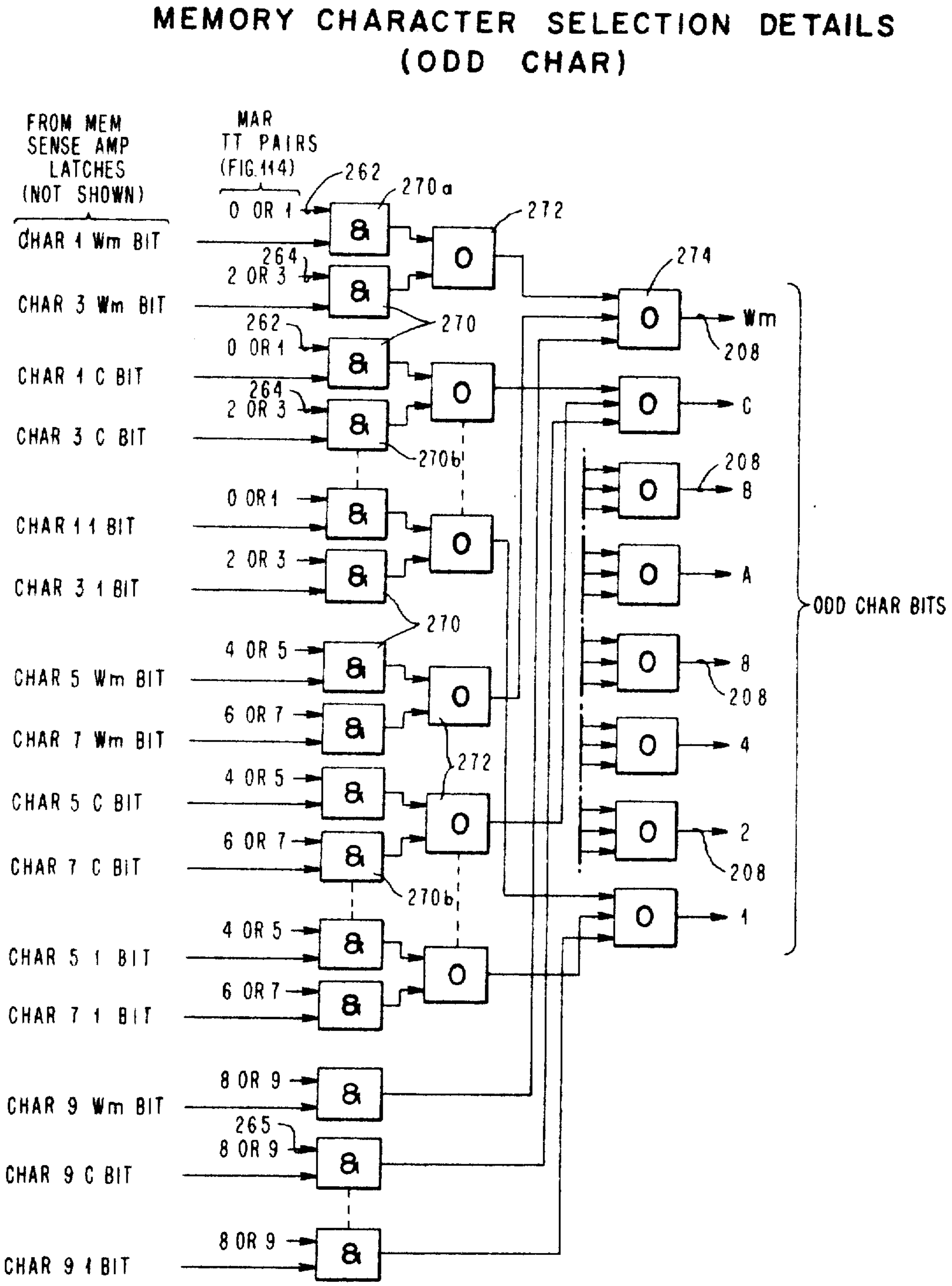
Figure 72:
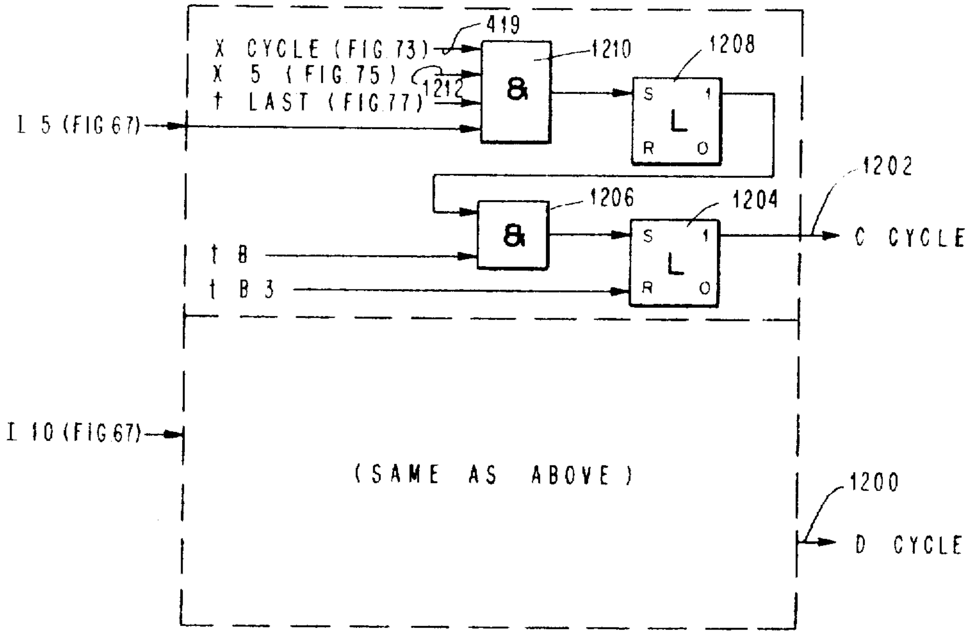

The details of the MEMORY CHARACTER SELECTION circuits 204 are shown in FIG. 3, using the ODD CHARACTER BITS selection as an example. In FIG. 72, there are a plurality of AND circuits 270, one for each bit of each character, which will pass the corresponding bit provided the related MAR TT PAIRS signal is present. For instance, the CHARACTER 1 WM bit will be gated through AND circuit 270*a* provided that the MAR TT pair 0 OR 1 is present on line 262. Similarly, the CHARACTER 3C bit will be gated if the AND 270*b* has presented thereto the MAR TT PAIRS 2 OR 3 on line 264. Each of the AND circuits 270, 270*a*, 270*b* feeds a corresponding OR circuit 272 which is in turn connected to an OR circuit 274. The purpose of the OR circuits 272, 274 is merely to collect a full character from the respective AND circuits 270. For instance, in FIG. 3, if CHARACTER 5 is selected by the MAR TT PAIRS 4 OR 5, it would supply all of the bits, WM, C, B . . . 1 to the OR circuits 274. Otherwise, whichever character were selected by a MAR TT PAIRS signal would supply a full set of bits to the OR circuits 274.

It should be understood that the coded manifestation of a character is accomplished by the presence or absence of a signal on any one of the lines WM, C, B . . . 2. Thus for the letter "A," the bits B, A, and 1 will be present, and if the letter "A" is the last character of a field, the WM bit will also be present. The other bits (C, 8, 4, 2) would not be present in the letter "A." The presence or absence of the bit may be manifested any way suitable, but for purposes of illustration, it is assumed that a signal, or a positive potential on an appropriate line, signifies a bit, and a minus potential, or lack of a signal, signifies the absence of a bit on a corresponding line. Furthermore, it should be understood that the absence of the bit may be affirmatively represented by a signal on a "NOT bit" line, if useful.

In summation, the circuit of FIG. 2 (which is shown in detail partially broken away in FIG. 3) will select a pair of characters, which are adjacent to each other in the MEMORY, from any of ten characters presented by the MEMORY. It should be understood that a simpler system may be utilized if the memory shown in the Rhodes patent were used essentially without modification. The Rhodes device will present two characters, even and odd, which are related to each other by being adjacent in terms of the low order address. Thus, if the memory of the Rhodes patent were used to present only the two related even and odd characters, circuits of FIGS. 2 and 3 would not be necessary. However, in a large system wherein many thousands of characters may be stored, it is usually found desirable to address the memory partially in terms of the internal address which causes reading out of the various characters, and partially in terms of selecting from among those read out, by means of external, address-controlled gating circuits of the kind shown in FIGS. 2 and 3. It is to be understood that the choice in the memory, and in the readout selection from memory (such as shown in FIGS. 2 and 3) bear absolutely no relationship to the present invention, so long as a plurality of bounded characters, related by the inherent memory boundary, are made available to the processor, and more specifically to the PRIMARY CHANNEL GATE 210 (FIG. 1) the details of which are shown in FIGS. 4 and 5.

*b. Primary channel gate*

Figure 4:
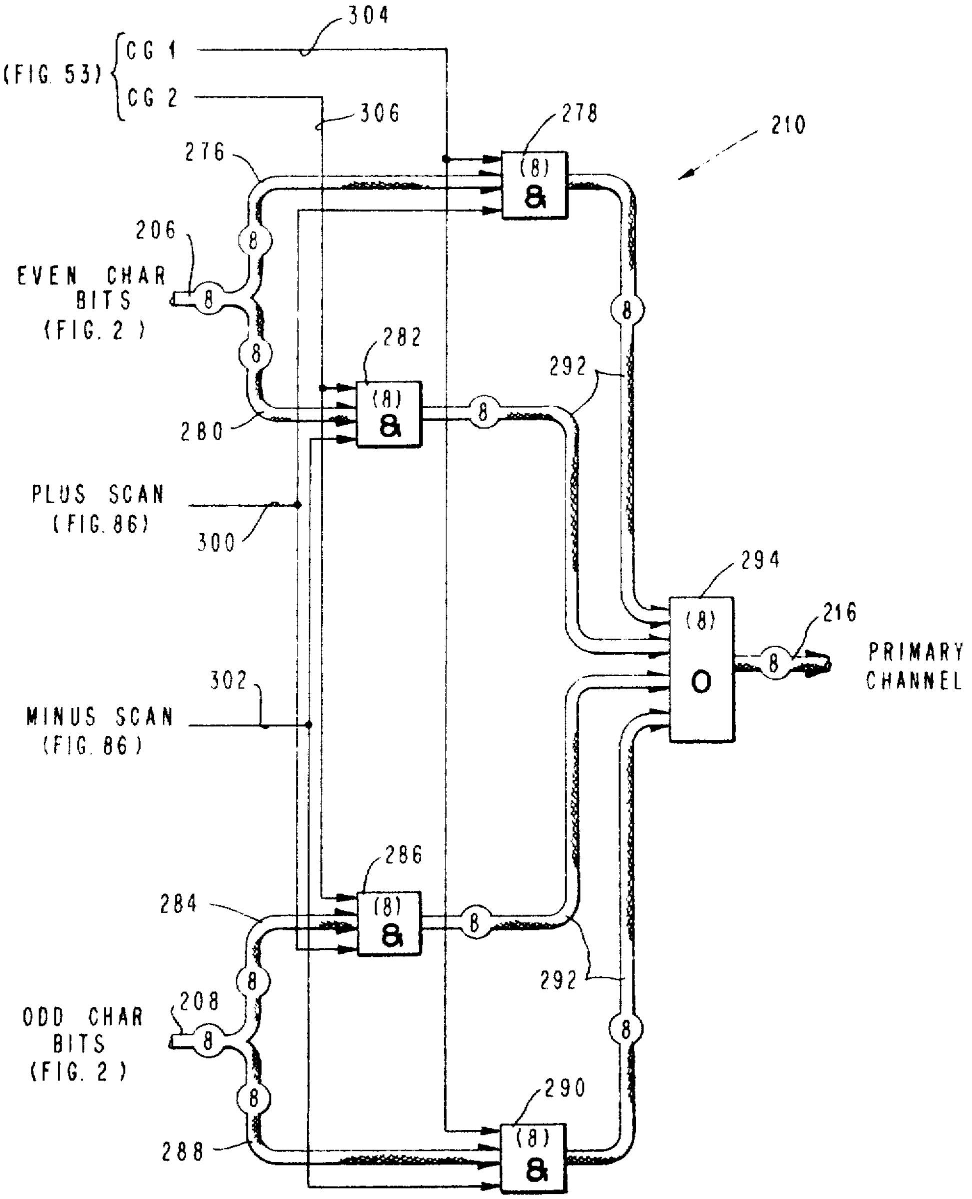
Figure 5:
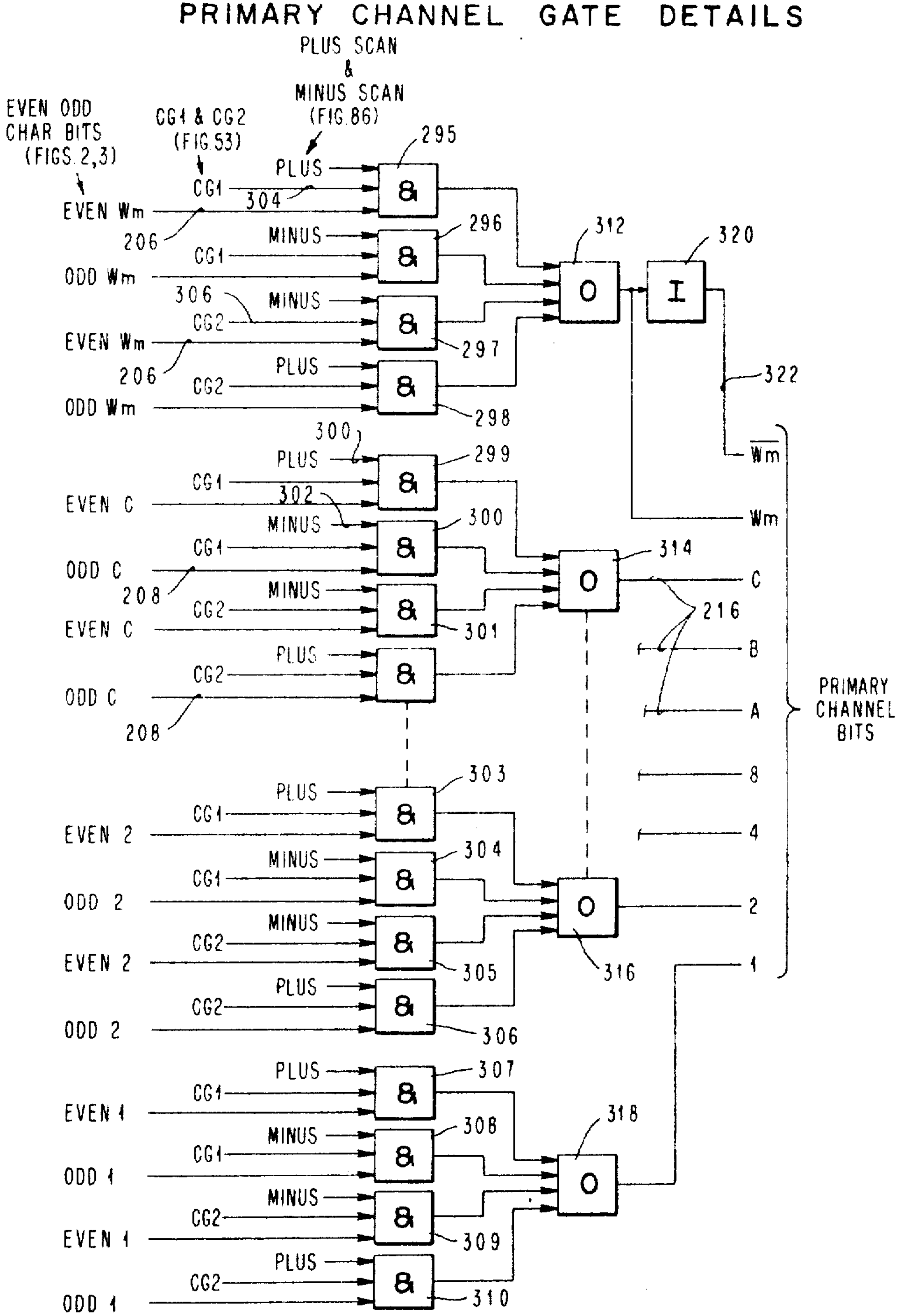

The PRIMARY CHANNEL GATE 210 (FIG. 1) is shown generally in FIG. 4, and in detail in FIG. 5. The PRIMARY CHANNEL GATE 210, as shown in FIG. 4, comprises two pairs of eight way gates, and a group of collecting OR circuits. The EVEN CHARACTER BITS (206) from FIG. 2 are applied over an eight bit bus 276 to an eight way gate 278, and are also applied over an eight bit bus 280 to an eight way gate 282. Similarly, the ODD CHARACTER BITS (208) from FIG. 2 are applied over an eight bit bus 284 to an eight way gate 286, and are also applied over an eight bit bus 288 to an eight way gate 290. The output of each of the gates 278, 282, 286, 290 are each applied over respective eight bit buses 292 to an eight way collecting OR circuit 294. The purpose of the PRIMARY CHANNEL GATE is to select first one character from either the EVEN CHARACTER BITS or the ODD CHARACTER BITS and at a later time to select the remaining character (if useful). This selection results in the PRIMARY CHANNEL BITS on an eight bit bus 216 (which is, of course, the PRIMARY CHANNEL).

Figure 35:
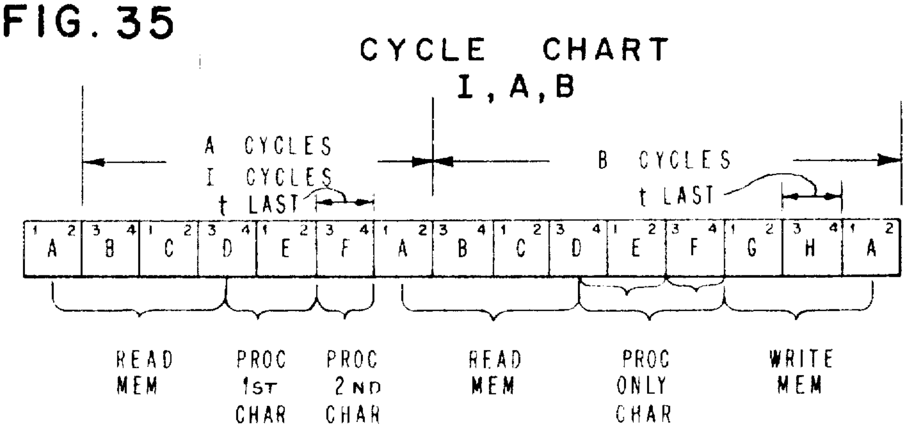
Figure 36:
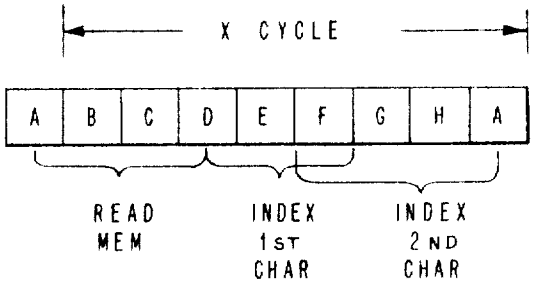

The choice of which character is to be selected is dependent upon the direction in which processing is proceeding through memory storage locations, whether both of these are characters within the current field, and whether it is first processing time or second processing time within a memory cycle. For instance, assuming that the memory is scanning from a low address toward a higher address, there will be a signal on the PLUS SCAN LINE 300 (which signal is generated in FIG. 86 and will be described in detail hereinafter, Section 14*a*). All this signal indicates is that memory is being repetitively accessed in successively higher address locations. With the signal on the PLUS SCAN line 300, there will be no signal on a corresponding MINUS SCAN line 302. The PLUS SCAN signal is applied to the eight way gate 278 and to the eight way gate 286. Assuming that both characters are within the current field being accessed (that is, both characters are useful and may be processed), a CG1 ("character gate 1," Section 14*c*) signal will be present on a line 304 during first processing time, and thereafter a CG2 ("character gate 2") signal will be present on a line 306 during second processing time. (The processing times involved are shown in FIGS. 35 and 36, sheet 22, and described in detail hereinafter.) In a positive scan, the very first memory location is address 00000, and the second location is address 00001. Similarly, all addresses in the memory are so related in pairs, that is, an even, lower-address character is always accessed with the next higher, odd-address character, adjacent thereto.

Assuming that a positive scan is involved, it is obvious that the even character should be gated out onto the primary channel first, and that the odd character should be gated onto the primary channel second, if both characters are to be utilized. On the other hand, if the address 00001 were given, it is obvious that even in a plus scan the first (and only) character to be gated out would be the odd character (that which is in address 00001). However, since address 00001 is actually the second character reached in the positive scanning of the memory, CG2 would be used to gate it out, it appearing earlier than it would following CG1.

CG1 and CG2 are signals which indicate "handle the first character reached in the direction of scan" and "handle the second character reached in the direction of scan," respectively. Thus, without regard to odd and even character situations, the first character that the memory would reach in scanning positively or negatively, as the case may be, is considered the first character to be processed and is picked by CG1; the second character which the memory would reachin a particular direction of scan is selected by CG2. Thus, in a PLUS SCAN, the even character is handled by CG1 and the odd character is handled by CG2. Contrarywise, in a MINUS SCAN, the odd character is handled by CG1 and the even character is handled by CG2.

A situation may exist when only one character is to be utilized: for instance, if characters 00002 were addressed in a minus scan, it is obvious that only one character will be usable of the pair delivered by the memory, because the field begins with address 00002 and goes to lower addresses; thus address 00003 which was accessed therewith is in another field, and is not useful. However, since the character to be utilized is the second character reached in scanning from high to low address (MINUS SCAN) CG2 is utilized. In this case, CG2 comes up during first process time, and CG1 never appears.

In a related situation, if 00002 were addressed in a PLUS SCAN, but had a word mark over it (indicating the end of the field), CG1 would come up and handle 00002 during first process time but CG2 would never appear, thereby not utilizing the information from address 00003.

Returning now to the operation of the primary character gate 210 as shown in FIG. 4 in a plus scan, the first character reached is the EVEN character, and this is gated through the eight way gate 278 by the CG1 signal on line 304. At a later time, the ODD character may be passed through the eight way gate 286 by means of the CG2 signal on line 306. Thus the EVEN character will pass through the eight way OR circuit 294 onto the primary channel 216 at a first time, and the ODD character will pass to the primary channel at a second time.

In the case of a MINUS scan, the ODD character is the first one that is accessed and this is passed through the eight way gate 290 by the CG1 signal on line 304, and thereafter the EVEN character is passed through the eight way gate 282 by the CG2 signal on line 306.

The details of the PRIMARY CHANNEL gate are illustrated in FIG. 5 which includes a plurality of AND circuits 295–310 which gate out respective bits of the EVEN and ODD character. For instance, the eight way gate 278 in FIG. 4 actually comprises eight AND circuits including AND circuit 295, 299 . . . 303, and 307. Thus, the eight way gate 274 includes one AND circuit for each of the bits of a character. The eight way gate 282 includes AND circuits 297, 301 . . . 305, and 309. The eight way gate 286 includes AND circuits 298, 302 . . . 306 and 310. The eight way gate 290 includes AND circuits 296, 300 . . . 304 and 308. Similarly, the eight way OR circuit 294 includes one OR circuit 312, 314 . . . 316, 318, there being one for each bit of the character.

In FIG. 5, the OR circuit 312 which generates the PRIMARY CHANNEL WM bit feeds an inverter 320 which causes a $\overline{WM}$ bit (NOT WM bit) on a line 322 for use as hereinafter described. It should be noticed that in any instance where the presence of the bit (such as the WM bit in FIG. 5) is illustrated, it is left to one skilled in the art to supply the complementary bit (such as $\overline{WM}$ bit in FIG. 5) if such a bit is necessary or desirable. It is obvious that this may be done as desired and need not necessarily be illustrated in every case.

8. SECONDARY CHANNEL REGISTER

*a. The register*

Figure 6:
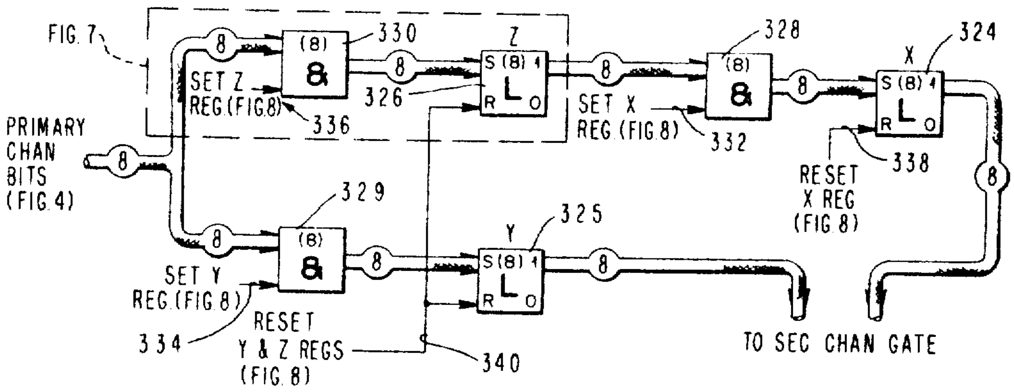

In FIGS. 1 and 6, the SECONDARY CHANNEL REGISTER is shown to consist primarily of three registers X (246), Y (248), and Z (244), each register comprising eight latches 324–326, each having a related gate 328–330. (An example of a suitable latch is shown in FIG. 20, discussed in Section 10*b* hereinafter.) The SECONDARY CHANNEL REGISTER provides buffering between the primary channel and the secondary channel in a manner which will be described in detail hereinafter (this Section). The X register is set by a SET X REGISTER signal on a line 332, and the Y and Z registers are set by similar respective SET signals on lines 334 and 336 respectively. The X register is reset by a RESET X REGISTER signal on a line 338 and the Y and Z registers are reset by a RESET Y & Z register signal on a line 340. A development of these SET and RESET signals appears hereinafter with respect to the secondary register controls 219 shown in FIG. 8, Section 8*b*.

Figure 7:
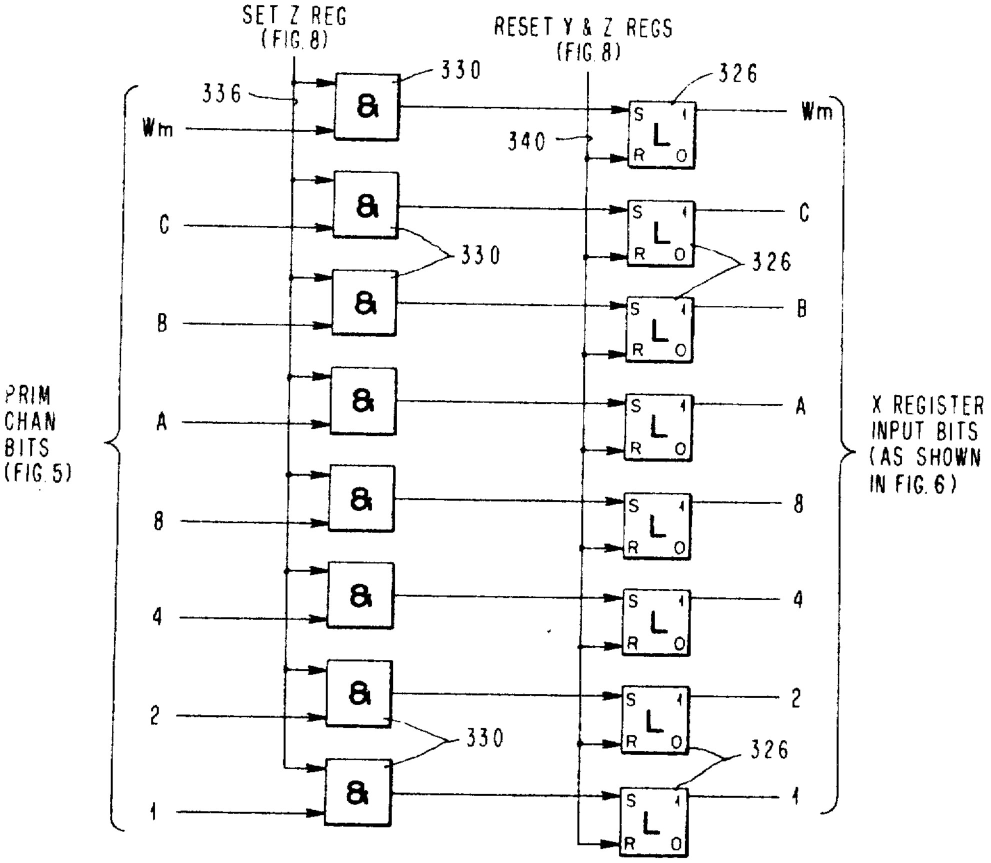

The details of the Z register are set forth by way of example in FIG. 7. The eight latches 326 are shown each being controlled by a corresponding AND circuit of the eight way gate 330, each of which respond to one of the PRIMARY CHANNEL bits WM, C . . . 1. The AND circuits 330 will pass the related bit (if it is present) upon the occurrence of the SET Z REGISTER signal on the line 336. The output of the AND circuits 330 set the latches 326 in dependence upon the presence of the related bit, and these latches will therefore make these bits available to the X register input until such time as the latches 326 are reset by the RESET Y & Z REGISTERS signal on line 340.

The X register and Y register are similar to the Z register, and therefore are not shown in detail.

*b. Introduction to secondary register control*

Figure 8:
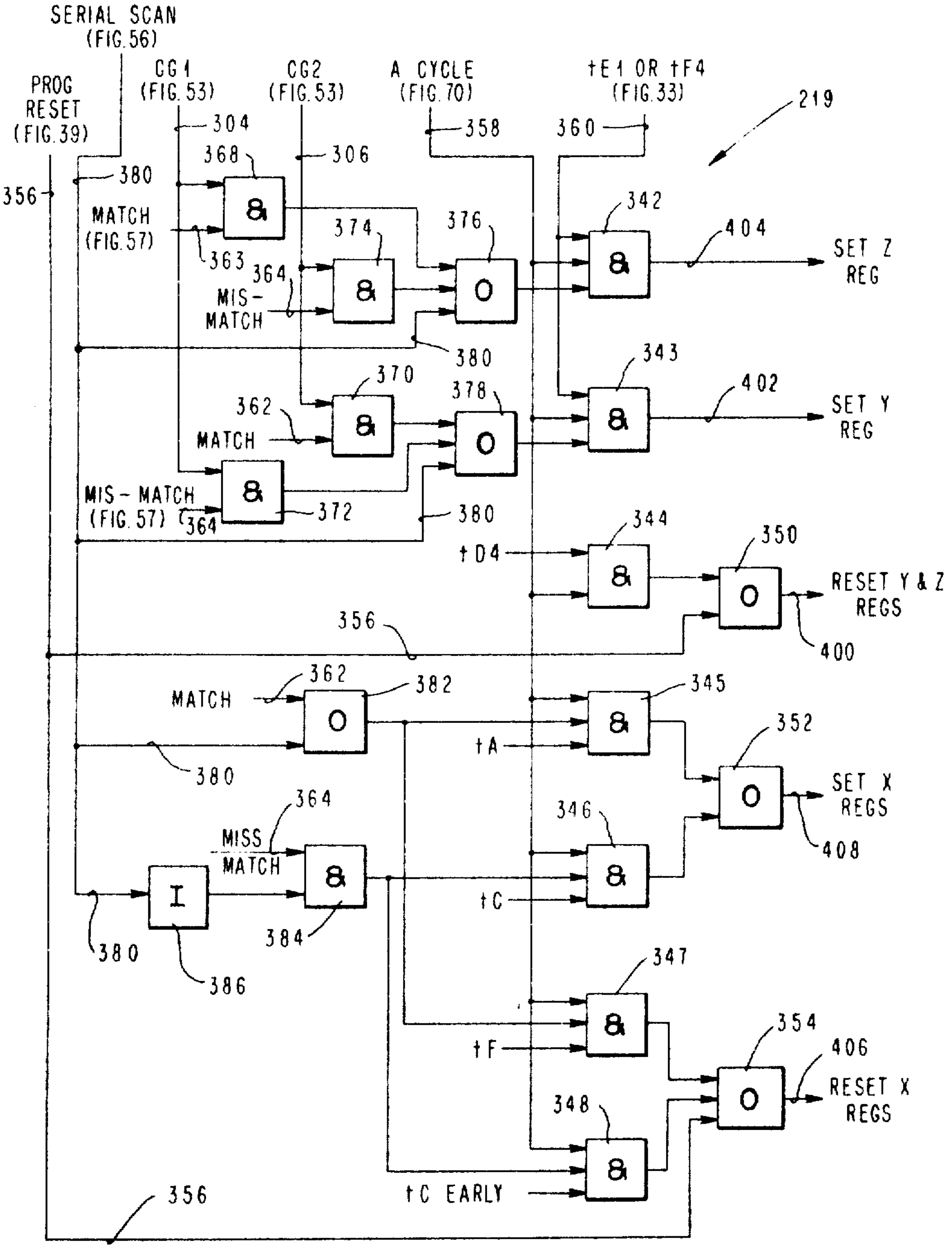

The SECONDARY REGISTER CONTROLS 219, as shown in FIG. 8, generate the SET and RESET signals for the X, Y and Z registers as discussed in the preceding section. The determination of which register is to be set, and when, depends upon the boundary conditions and the address desired, as discussed hereinbefore in Section 6. For instance, in a straight-forward application wherein two characters are accessed and both will be processed, the CG1 signal will cause the first character to pass through the Z register into the X register, and the CG2 signal will cause the second character to pass directly into the Y register. On the other hand, if only one character is presented but only one is needed, the CG2 signal will pass that character directly into the Y register.

The two other situations, where one is presented but two are needed, or where two are presented but only one can be used, are handled in a more complex way.

In order to consider the SECONDARY REGISTER CONTROLS 219, it is necessary to introduce MATCH and MISMATCH control, the details of which appear hereinafter, in Section 14*d*. It is enough for the purposes of this particular description to consider the fact that a MATCH condition exists when the address of the A field is like the address in the B field in that it is either even or odd in the same fashion as the B field. For instance, in a PLUS SCAN, the first character reached is the EVEN character; this is true both for the A field and the B field. Thus, if an even address is specified for the A field and an even address is specified for the B field, then there is a MATCH condition; this means that two characters will be processed unless a terminating condition is reached. Similarly, in a MINUS SCAN, if both addresses are odd, two characters can be processed. Also, if the address is even in a MINUS SCAN or odd in a PLUS SCAN for both the A field and the B field, than a single character process MATCH condition exists.

The MISMATCH condition exists whenever one A and two B's, or two A's and one B will be presented. Thus in a PLUS SCAN, if the A address is odd, this means that only one character will be available, and if the B address is even, there will be two B characters available; thus, a MISMATCH condition exists.

In the brief description of data flow (Section 6 hereinbefore), the utilization of the X, Y, Z registers was briefly described. The important purposes of these registers include the fact that the Z register is an input register which is used in order to reach the X register, and it must be used (along with the X register), whenever a secondary character has to be saved for processing in a following cycle. The Y register may be used any time a single character is brought out and will be processed. The Y register is also used for the second of two characters, when the first of the two characters is involved in a storage situation (i.e., was saved from before, or will be saved for later).

Consider first the condition where there is a MATCH. If both characters can be processed, there will be a CG1 signal followed by a CG2 signal. On the other hand, if there is a MATCH and only one character of each field can be processed, then there will be no CG1 signal, but a CG2 signal will be used (this is so since, if only the second character that is reached in the direction of scan is useful, the first character is obviously not useful). Thus, whenever there is a match condition, and CG1 appears, this means that CG2 probably will follow it for handling the second character, and in this situation, the first character will be put in the Z register and later advance to the X register. The second character will be put in the Y register under the control of a CG2 signal.

Consider, however, the opposite situation. When a MISMATCH signal appears, it either means that there is one A and two B's available with a current pair of addresses, or that there will be two A's and one B available with these addresses. Assuming first that there are two A's and one B available, the first A character will be processed during this cycle with the first B character. The second one of the two available A characters must be saved until the following cycle for processing with B characters which have not yet been addressed. Therefore, it is necessary to put the second character into the Z register so that it can be saved until the following cycle. This being so, a MISMATCH condition will respond to a CG1 signal to place the first character in the Y register (for immediate processing), and will respond to a CG2 signal to cause the second character to be put in the Z register to be saved for the following cycle.

In a situation where only one A character is available and two B characters will be available, a second A cycle will have to be taken in order to achieve enough A characters to handle the available B characters. Therefore, the second A cycle will present two characters, only one of which will be able to be processed with the character which was derived during the first A cycle; the second A character of the second A cycle will have to be saved until a second B cycle acquires more B characters. Since this is so, a MISMATCH condition (wherein only one A character but two B characters are available) will respond to a CG2 signal (CG1 never comes up since only one character is available, it being the second character in the direction of scan) to put the sole A character into the Z register, for later advancement into the X register. Thereafter, a following A cycle will be taken and CG1 will, in combination with MISMATCH, cause the first of these to go into the Y register and the second of these to go into the Z register. The second character (just now put into the Z register) will be saved for the following cycle, and the single character out of the first A cycle will be applied by the X register to the secondary channel followed by the first character of the second A cycle being applied by the Y register to the secondary channel.

The manner in which the character gates CG1 and CG2 and the MATCH and MISMATCH signals cause the proper operation of the X, Y and Z registers is quite straightforward.

Consider briefly the cycle chart shown in FIG. 35 (Sheet 22). A plurality of logic times A–F and A–H are shown in two successive cycles. The first cycle shown is illustrative of an A cycle (wherein the memory is accessed and presents A characters to the secondary channel registers), and I cycles (which are instruction cycles, discussed in detail hereinafter, Sections 13 and 17*b*). In either of these cycles it is not necessary to write new data into MEMORY. All that will occur, is that the MEMORY will be read, and then regenerated immediately after reading. This regeneration will take place within the E, F and first half of A time which is roughly co-extensive with the processing time involved. The second half of the chart illustrates a B cycle which is slightly longer, including times G and H which are now shown in the first half of the chart. These times are necessary because the answer derived from processing will be written into the MEMORY during these times.

In view of the great number of timing signals used throughout the specification, the timing has been indicated by a small "*t*" together with a letter symbol designating the particular time involved. In some instances, the time is an "early" time, that is where half of it is co-extensive with half of the preceding time and the remainder of it is co-extensive with the first half of the time during that same letter designation. For instance, the time *t*C early includes the first half of C time and the last half of B time. These times are applied by lines which are not given reference numerals since it is believed unnecessary to identify them in such great detail. The times involved, and their generation, are in Section 11, hereinafter.

Examining the operation of the X, Y and Z registers in connection with the timing involved, the memory is read (as discussed in detail hereinafter, Section 11*f*) during the second half of A time (*t*A2) through the first half of D time (*t*D3), and a first character can be moved into the secondary registers during first character time followed by a second one being moved to the registers during second character time. In a case where two characters are presented, and one is put into Z register and the other in the Y register, the one put in the Z register would be advanced into the X register during the end of the current A cycle (time A). Thus, if the first character is put into the Z register during time E1, it will thereafter be advanced into the X register during the following A time or C time (in the current or following A cycle, respectively). If a MATCH condition exists, the Z register character may be used for processing without first processing some character now in the X register: thus, the Z register character may be set in the X register at A time at the end of a current cycle. With a MISMATCH, the X register must be read out first so the Z register is gated to X during a later C time, in the following A cycle. Thus, in considering the timings of the secondary register controls, it is well to bear in mind that the times A, B . . . H are co-extensive with the memory cycles involved and that a particular A time might be one following a particular D time, for instance,

*c. Secondary register control circuits*

Returning now to FIG. 8 and the secondary register control 219, there are a plurality of AND circuits 342–348 which control the timing of the SET and RESET signals. Of these timing gates, the AND circuit 344 feeds an OR circuit 350, the AND circuits 345 and 346 feed an OR circuit 352, and the AND circuits 347 and 348 feed an OR circuit 354. It is to be noticed that the OR circuits 350 and 354 which generate RESET signals may be operated by a PROGRAM RESET SIGNAL on a line 356. Otherwise, the SET and RESET signals are generated in dependence upon the conditions and timings shown in FIG. 8. Each of the timing gates 342–348 is operative only during an A cycle (the cycle during which characters are taken from the A field and placed into the SECONDARY CHANNEL REGISTER), due to application of an A CYCLE signal on a line 358 (which is described in detail hereinafter, Section 17*a*). It will be seen that the AND circuits 342, 343 respond at either time E1 or time F4, due to a signal on a line 360. The determination of which of these times will be involved is dependent only on whether it is CG1 on line 304 or CG2 on line 306 which has caused the AND circuit to respond. This is so because CG1 appears during E time and CG2 appears during F time. Either of the AND circuits 342, 343 can respond to CG1 during E time or may respond to CG2 during F time as determined by the MATCH signal being present on line 362 or the MISMATCH signal being present on line 364, in the manner described hereinbefore. Thus, in a MATCH situation, the presence of a MATCH signal on line 363 will cause the AND circuit 368 to respond to the CG1 signal on line 364, and will cause an AND circuit 370 to respond at F time to a CG2 signal on line 368. Similarly, the presence of a MISMATCH signal on line 364 will cause an AND circuit 372 to respond to a CG1 signal on line 304, and an AND circuit 374 to respond to a CG2 signal on line 306. The AND circuits 368, 374 feed an OR circuit 376 which feeds the AND circuit 342. AND circuits 370, 372 feed an OR circuit 378 which feeds in turn the AND circuit 343. It is to be noticed that each of the OR circuits 376, 378 is also responsive to a SERIAL SCAN signal on a line 380. This in effect operates both the Y and Z registers at both time E1 and time F4, but in fact only one of these registers will be handling the work in dependence upon the gating out of only the first or the second character by CG1 or CG2, respectively, within the PRIMARY CHANNEL GATE 210 as described in preceding Section 7*b*. The details of a SERIAL SCAN operation will be considered in Section 14*e*.

Resetting of the Y and Z registers by the OR circuit 350 will either be in response to the PROGRAM RESET signal on line 356 or will be in response to time D4 during every A cycle. This in effect is a reset just preceding a set. That is, the Y and Z registers will be reset at D time which is just prior to E1 and F4 times, and will then be set; the next reset will be in a subsequent A cycle. This insures that the data set into the Y and Z registers will remain therein throughout the following B cycle.

The X register may be set by either the AND circuit 345 or the AND circuit 346. The AND circuit 345 will respond at time A due to an OR circuit 382 if there is a SERIAL SCAN condition as indicated by a signal on line 380, or if there is a MATCH condition as indicated by a signal on line 362. Whenever the X register is to be set at time A, it is reset at time F by the AND circuit 347. This is a resetting at a time just preceding the set time, as in the case of the Y and Z registers.

The X registers may also be set by AND circuit 346 at time C in response to an AND circuit 384 which will generate a signal whenever there is no SERIAL SCAN on line 380, as developed by an inverter 386, concurrently with a MISMATCH signal on the line 364. The AND circuit 384 also causes resetting of the X register at time C early due to the operation of AND circuit 348.

The overall operation and reasoning behind the circuitry of FIG. 8 has been discussed briefly, but it is believed to be clarified only when considered in the light of the conditions under which it may operate as applied to the X, Y, Z registers themselves. For that reason, the details of the SECONDARY REGISTER CONTROLS 219, together with a discussion of the SECONDARY REGISTER 210 is set forth in accordance with four different conditions which may exist in the succeeding four subsections.

*d. Exemplary operation of secondary registers—Case 1.—Two useful secondary (A) characters, one useful primary (B) character*

Figure 9:
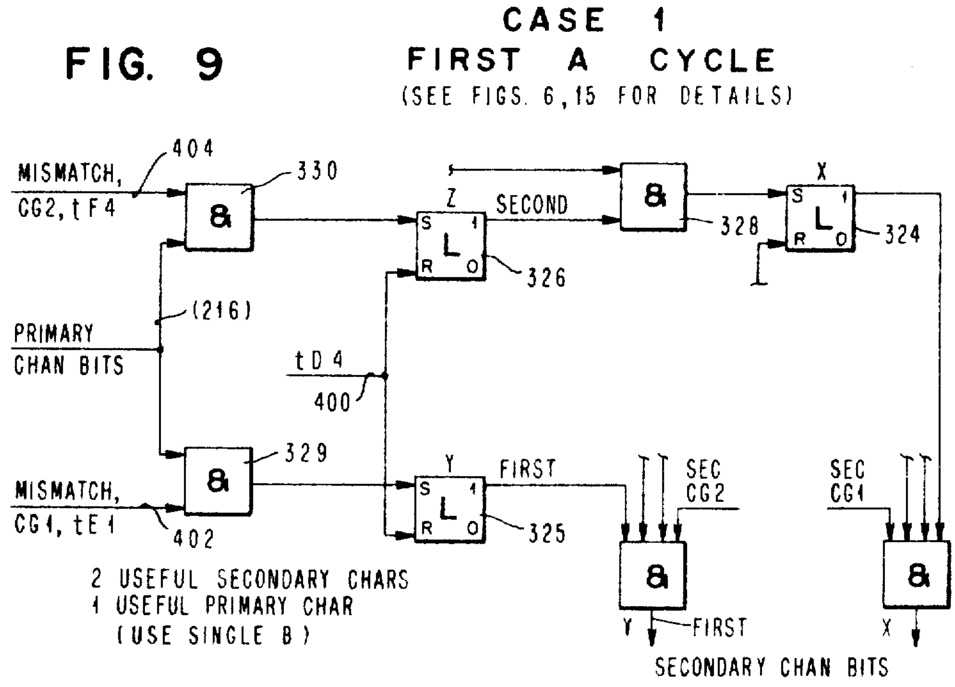
Figure 10:
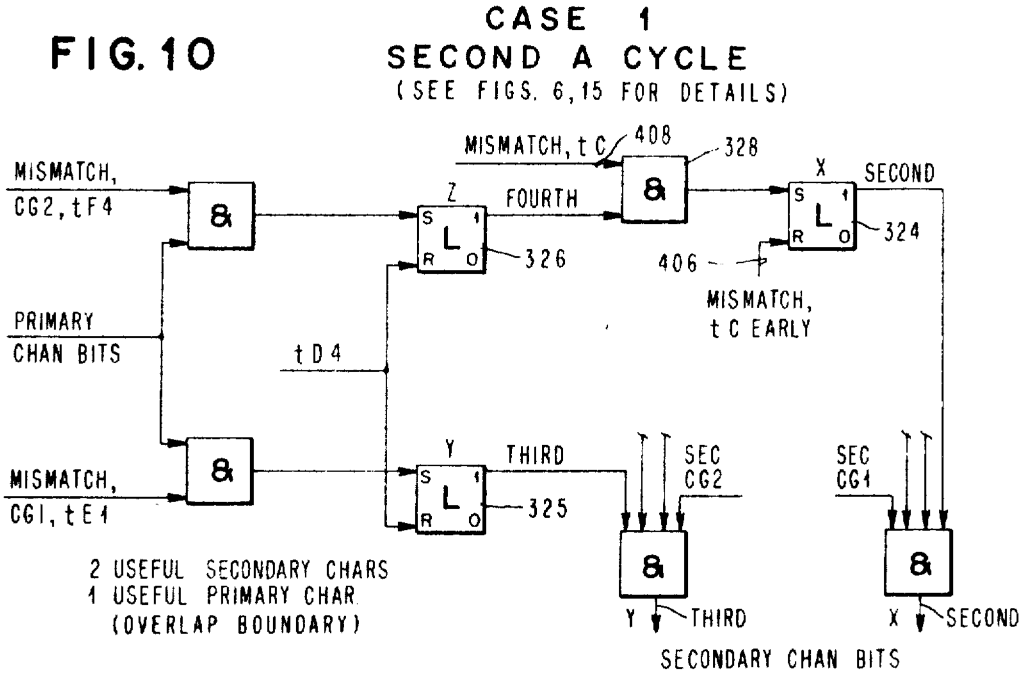

FIGS. 9 and 10 illustrate the operation of the SECONDARY REGISTER and SECONDARY REGISTER CONTROLS when the addresses specified will produce two useful characters form the A field on the SECONDARY CHANNEL, but will only produce one useful character from the B field on the PRIMARY CHANNEL. This is obviously a MISMATCH condition since there is not the same number of A field and B field characters available. The first A cycle in this case is illustrated in FIG. 9, wherein the Y and Z registers will be reset at time D4; referring back to FIG. 8, it will be seen that the AND circuit 344 will cause OR circuit 350 to generate a RESET Y & Z REGISTERS signal on a line 400 during every A cycle at time D4. Thereafter the first character of the two A field characters will be passed by the gate 329 to set the latch 325 of the Y register in response to the MISMATCH signal at time E1 and the first character gate CG1, due to the SET Y REGISTER signal on a line 402. Referring back to FIG. 8, the AND circuit 372 responds to the MISMATCH signal on line 364 and the CG1 signal on line 304 to cause the OR circuit 378 to permit the AND circuit 343 to pass a signal at time E1 or F4; since time E1 coincides in part with CG1, it will be at time E1 that the AND circuit 343 will present the SET Y REGISTER signal on line 402.

Next, the gate 330 (FIG. 9) will pass the second one of the two A field characters from the primary channel to the Z register latches 326. This is done in response to MISMATCH and CG2, at time F4, under control of the SET Z REGISTER signal on line 404. Referring back to FIG. 8, it will be seen that the AND circuit 374 will respond to a MISMATCH signal on line 364 and to a CG2 signal on line 308 to cause OR circuit 376 to condition the AND circuit 342 so that the time F4 (which coincides in part with CG2) will cause the SET Z REGISTER signal to appear on line 404.

Thus, the first character is available at the in-phase output of the latches 325 (FIG. 9), and the second character is available at the in-phase output of the latches 326.

Note that the X register latches 324 and gate 328 have been shown without any input signals; this is due to the fact that the X register is not involved during a first A cycle of a one primary, two secondary situation. Thus during the first A cycle, both of the useful A characters are received by the SECONDARY REGISTER but only the first character is available (at the output of the Y register latches 325); the second character, now in the Z register latches 326, will not be made available to the X register until the following A cycle since the set and reset signals for the X, Y, Z registers become available only during A cycles, and it is too late in the present A cycle to accommodate the X register at time C. In a B cycle (not illustrated), following the first A cycle shown in FIG. 9, the first character stored in the Y register latches 325 will be gated out onto the SECONDARY CHANNEL in a manner described hereinafter (Section 9*a*). Thus, at the end of the first B cycle, the second character remains in the Z register latches 326, and the X and Y register latches are empty.

A second A cycle of the example under discussion is shown in FIG. 10. During the second A cycle the first thing that happens is the resetting of the X register latches 324 at time C early due to the RESET X REGISTER signal on a line 406 (MISMATCH, *t*C early) which is generated (in FIG. 8) by the combination of AND circuit 384 and 348. Thereafter, the X register gates 328 will respond to a SET X REGISTER signal on a line 408 (MISMATCH, *t*C) and cause the second character, which was remaining in the Z register latches 326 at the end of the first A cycle (FIG. 9), to be gated into the X register latches 324. The SET X REGISTER signal on line 408 is generated (FIG. 8), in this instance, by the combined operations of the AND circuits 384 and 346. The time (*t*C) wherein the data is shifted from the Z register into the X register, just now described, coincides with the time wherein the memory is being accessed for new characters, as shown in the cycle chart of FIG. 35 (Sheet 22). Once the new characters are available, the operation proceeds as described with reference to FIG. 9, but in this case, the third character is put into the Y register latches 325, and the fourth character is placed in the Z register latches 326. At the end of the second A cycle, the second character is available at the output of the X register latches 324, and the third character is available at the output of the Y register latches 325. In the following B cycle, two useful B field characters will be obtained (due to address considerations which are specifically created to cause that to happen, as described hereinafter, Section 15*c*) and the second and third characters will be presented to the SECONDARY CHANNEL, in turn, for processing with the following pair of B characters.

*e. Exemplary operation of secondary registers—Case 2.—One useful secondary character, two useful primary characters*

Figure 11:
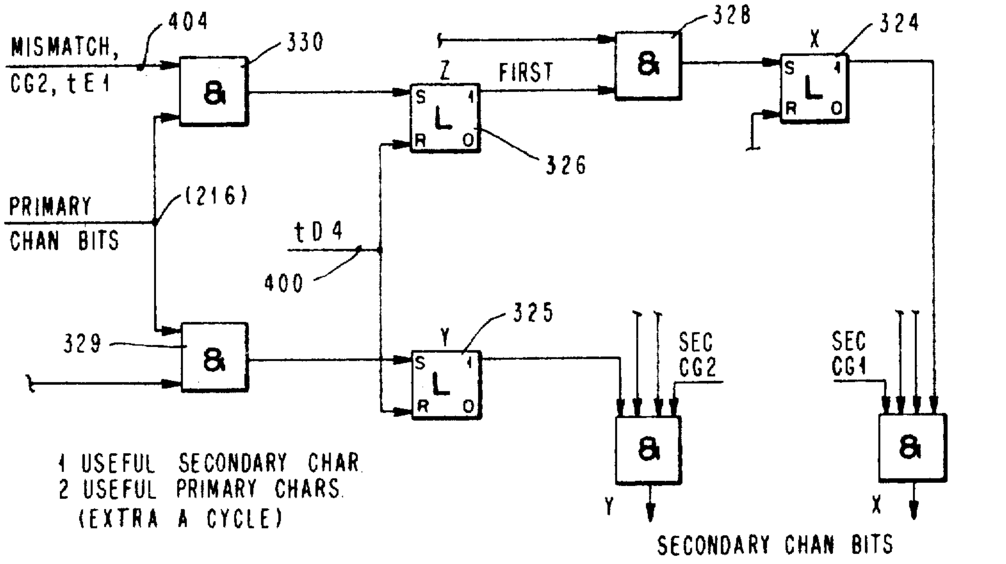

In FIG. 11 is shown the situation which can exist when the address relations are such that the first A cycle can produce only one useful secondary character but the first B cycle will produce two useful B characters. In this case, an extra A cycle is taken so as to have enough A characters for processing with the B characters.

During the first A cycle, the Z register latches 326 will be reset by the RESET Y & Z REGISTERS signal (*t*D4) on line 400 due to the operation (in FIG. 8) of the AND circuit 344.

Thereafter, at time E1, CG2 will cause the SET Z REGISTER signal (MISMATCH, CG2, *t*E1) to appear on line 404 in response (FIG. 8) to the AND circuit 374 and 342. This causes the Z register gates 330 to pass the first character from the PRIMARY CHANNEL 216 into the Z register latches 326. No inputs are shown on the X and Y latches or gates because these latches are not operated during the first A cycle in this case.

Since only one useful secondary character was provided by the A field, it is necessary to take a second A cycle and thereby acquire additional secondary characters before a B cycle can be taken, within which there will be two useful characters available to the PRIMARY CHANNEL.

Figure 12:
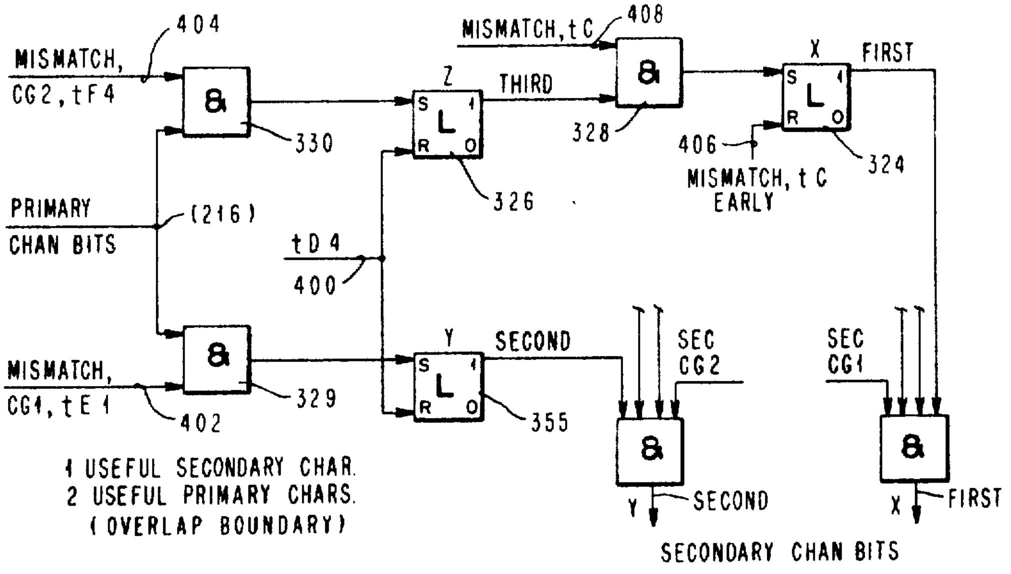

The second A cycle is illustrated in FIG. 12, wherein the first occurrence is the resetting of the X register latches 324 by the RESET X REGISTER signal (MISMATCH, *t*C early) on the line 406, which is generated (FIG. 8) by AND circuits 384 and 348. Thereafter, the first character which is now stored in the Z register latches 326 (FIG. 11) is passed through the X register gates 328 by a SET X REGISTER signal (MISMATCH, *t*C) on line 408, which signal is generated (FIG. 8) by the AND circuits 384 and 346. This transferral from the Z register to the X register takes place during the memory access time of the second A cycle, and is completed before new characters from the A field are available on the PRIMARY CHANNEL.

When memory accessing is complete, the Y and Z registers are both reset by the RESET Y & Z REGISTERS signal (*t*D4) on line 400 which is generated (FIG. 8) by the AND circuit 344. Thereafter, the second A field character (the first of the two now being presented) will be passed to the Y register latches 325 by the Y register gates 329 in response to a SET Y REGISTER signal (MISMATCH, CG1, *t*E1) on line 402; this is achieved (FIG. 8) by the AND circuits 372 and 343.

Next, the Z register gates 330 will pass the third character (the second character of the current A cycle) to the Z register latches 326 in response to the SET Z REGISTER signal (MISMATCH, CG2, *t*F4) on the line 404 which is generated (FIG. 8) by the AND circuits 374 and 342.

Thus, during the second A cycle of the situation where there are two primary characters and one secondary character addressed by a particular instruction, a first A character (presented by the first A cycle) is moved into the X register latch and the second and third A characters are placed in the Y and Z register latches respectively. Thus there is available to the SECONDARY CHANNEL, for processing with a first pair of characters, a first A character from a first A cycle and a second A character from a second A cycle.

It is to be noted that this is a particular example where boundary adjusting has been accomplished by accessing the memory twice for A characters, and having a pair of B characters (which are not related to the A characters in the memory) oriented together for processing during related processing times. Therefore, it can be seen that the X and Y and Z registers and their controls have adjusted the relationship of a first operand (A characters) to coincide with the boundary of a secondary operand (B characters).

*f. Exemplary operation of secondary registers—Case 3.—One useful secondary character, one useful primary character*

Figure 13:
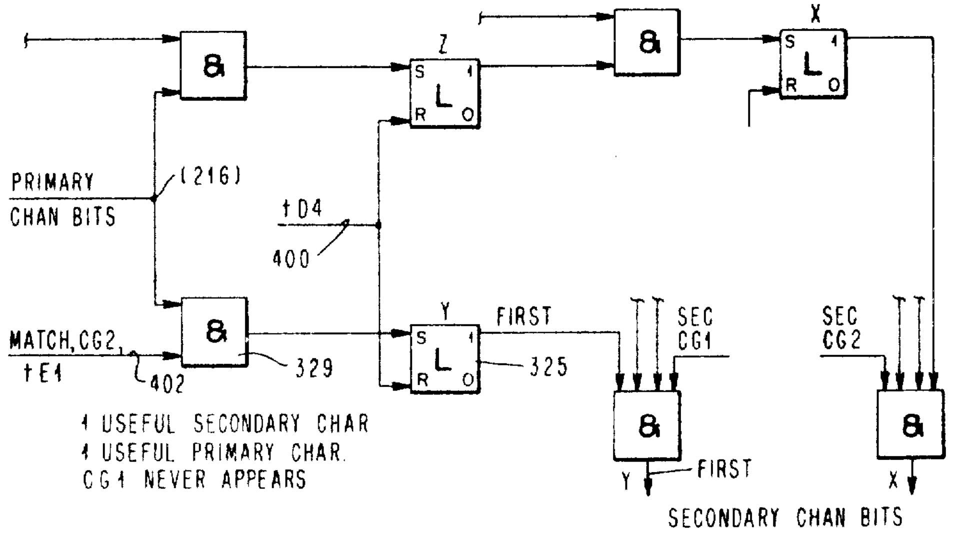

A simpler situation exists when there is only one character available from both the A field and the B field (a MATCH situation) for processing on the PRIMARY and SECONDARY CHANNELS. This case is illustrated in FIG. 13, wherein the first A field character is gated from the PRIMARY CHANNEL into the Y register latches through the gates 329 in response to a SET Y REGISTER signal (MATCH, CG2, *t*E1) on line 402, which signal is generated (FIG. 8) by AND circuit 370 and 343. Thus, the first A field character is made available to the SECONDARY CHANNEL for processing by the Y register latches 325.

The following B cycle will present the single character from the B field which may be processed, and thereafter, two characters will be processed from each field as is illustrated below, case 4.

*g. Exemplary operation of secondary registers—Case 4.—Two useful secondary characters, two useful primary characters*

The simplest and most straightforward situation exists when both fields will present two characters. This is a MATCH situation, so that both of the A characters will be processed during the first B cycle along with the two useful primary characters from the B field.

Figure 14:
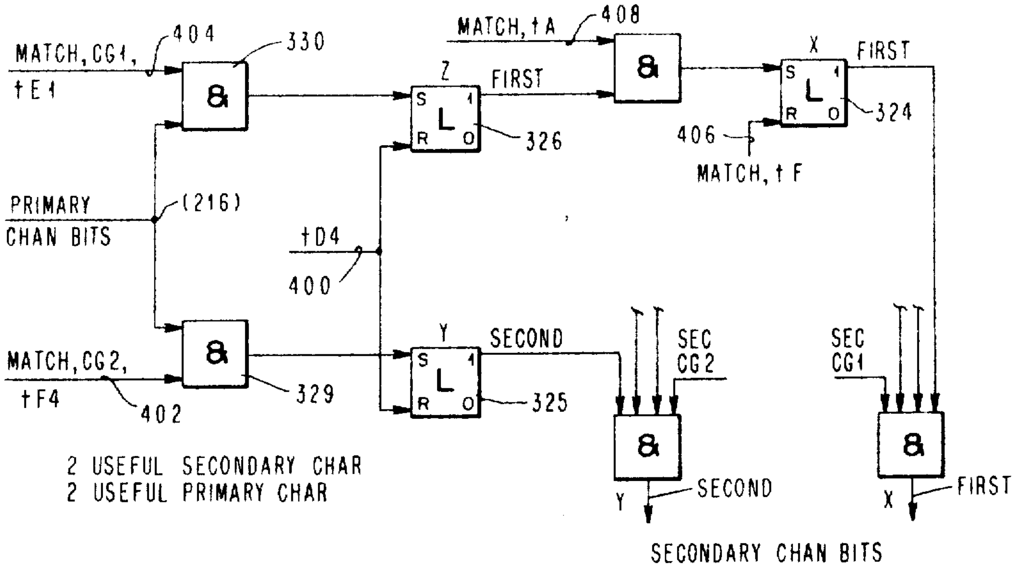

The first occurrence in this case, as illustrated in FIG. 14, is the appearance of the RESET Y & Z REGISTER signal (*t*D4) on line 400. Thereafter, the Z register gate 330 will pass the first character from the PRIMARY CHANNEL 216 into the Z register latches 326, in response to the SET Z REGISTERS signal (MATCH, CG1, *t*E1) on line 404 which is generated (FIG. 8) in response to the AND circuits 368 and 342.

Thereafter, the second character in the A field is gated in the primary channel 216 through the Y register gates 329 into the Y register latches 325, in response to the SET Y REGISTER signal (MATCH, CG2, $tF4$) on line 402 which is generated (FIG. 8) by AND circuits 370 and 343.

Toward the end of the A cycle, as shown in FIG. 35 (Sheet 22) a RESET X REGISTER signal (MATCH, $tF$) will be generated on a line 406 by circuits (FIG. 8) which include OR circuit 382 and AND circuit 347.

At time A then, a SET X REGISTER signal (MATCH, $tA$) on line 408 is generated by OR circuit 382 and AND circuit 345. This will cause the first character to be transferred from the Z register latches 326 into the X register latches 324.

*h. Summation of secondary registers*

From the foregoing circuit descriptions and examples of operation, it can be seen that the X, Y and Z registers, which comprise the SECONDARY CHANNEL REGISTER, accomplish reserializing and serializing as well as boundary adjusting of the A field to accommodate the B field. It should be understood that in the above examples, only the first or possibly the first and second A cycles were described; all of the cases resolve into a situation wherein two characters are processed each time, but may include the fact that one A field character is saved from the next preceding time for use at a later time with the first one of a successive pair of A field characters. This accounts for the fact that the A field characters boundary may be adjusted so as to coincide with the memory boundary of the B field characters which are to be processed with the A field characters. The boundary adjusting is required in all MISMATCH cases, and results in an OVERLAP BOUNDARY condition descriped in CASE 1 and CASE 2 above, and in Section 15*b* hereinafter.

9. SECONDARY AND RETURN CHANNELS

*a. Secondary channel gate*

Figure 15:
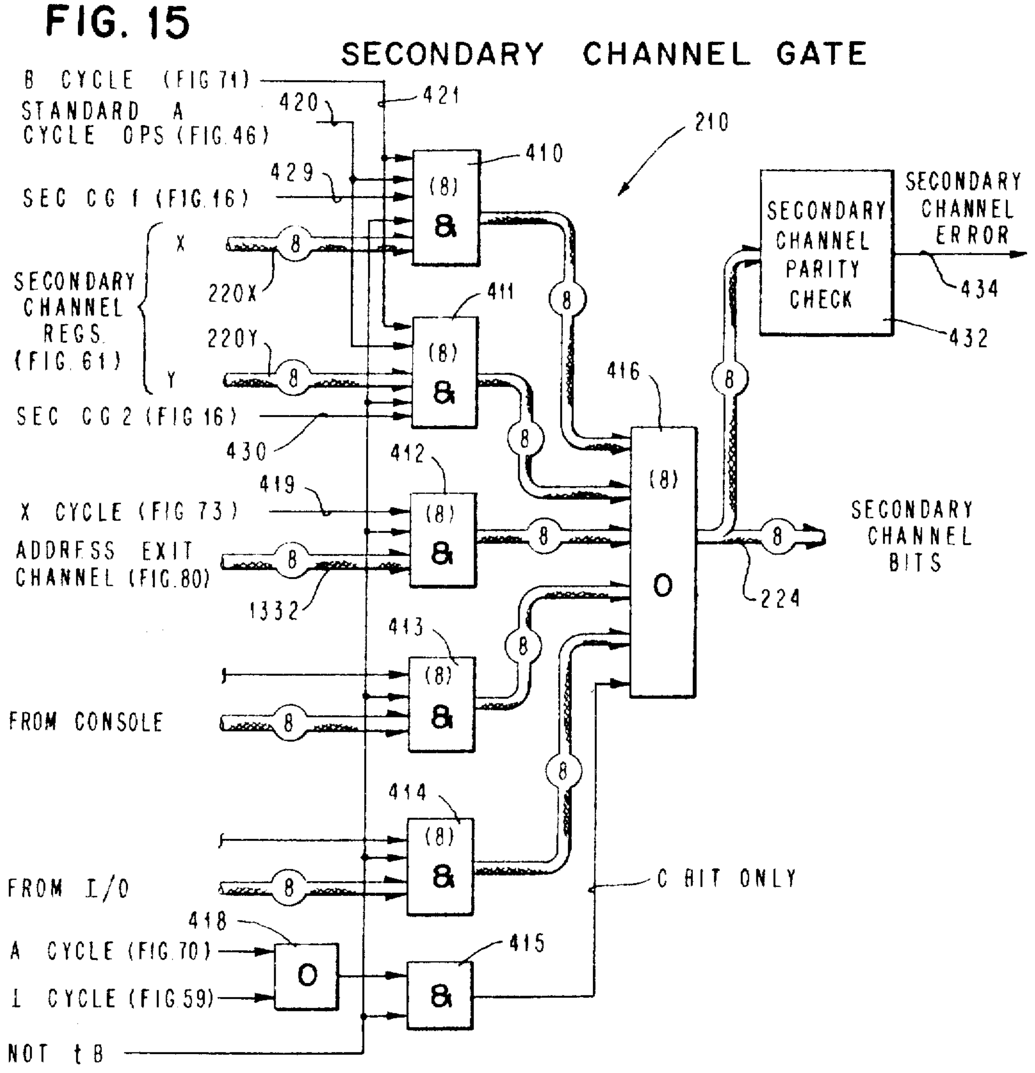

The secondary channel gate 222 (FIG. 1) is shown schematically in FIG. 15.

The SECONDARY CHANNEL GATE is actually a plurality of eight way gates 410–414 (FIG. 15) which feed an eight way OR circuit 416. Of these, the gates 413 and 414 are illustrative only to show that *I/O* devices and/or a console may be connected into the system, and if so, the data would most likely be received by the SECONDARY CHANNEL at this point.

Another gate 415 is provided in order to create proper parity on the SECONARY CHANNEL at times when there is no data actually transferred to the SECONDARY CHANNEL. Thus during an A cycle (450) when A fields are accessed and put into the A registers, and during an I cycle (452), (as described hereinafter, Section 17), no data is transferred to the SECONDARY CHANNEL. To prevent the appearance of error during this time, a parity bit (C bit) is caused to go on the CHANNEL by means of a gate 415 together with an OR circuit 418. Details of this particular function are described in a later section (12*c*) in connection with error checking in general.

Another gate 412, is used to permit address information o be presented to the SECONDARY CHANNEL durng X CYCLES (419), which are utilized whenever one address is to be added to another to get a new address; his operation is called "indexing" and is described in deail hereinafter (Sections 16*d*; 17*e*,*f*; 20).

Thus the two main inputs to the SECONDARY CHANNEL GATE in accordance with the present description are applied to the gate 410 and 411 which receive information from the X and Y registers over respective eight bit bus portions 220X and 220Y of the eight bit bus 220. The function of these gates is to recognize the times when the A field and the B field are to be combined by the ARITHMETIC & LOGIC unit, as described hereinbefore. These times are recognized by decoding of the instructions which cause the machine to function properly, which decoding will present a STANDARD A CYCLE OPS signal on a line 420 as described in detail in Section 13, hereinafter. The signal on line 420 will be present in all the situations where the A field read from memory is to be applied to the SECONDARY CHANNEL; this generally includes situations (in the particular simplified embodiment being disclosed herein) where A field characters are to be combined with B field characters in the ARITHMETIC & LOGIC CIRCUITS, as described hereinbefore.

Figure 16:
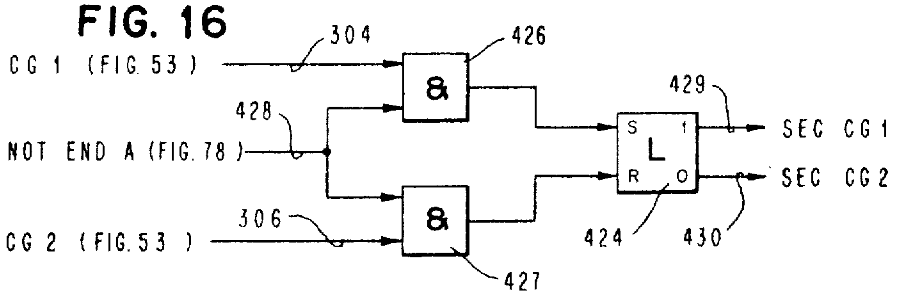

The SECONDARY CHANNEL GATE 210 as shown in FIG. 15 is controlled by a pair of signals, SECONDARY CG1 and SECONDARY CG2 which are generated by a latch 424 in FIG. 16. During an A cycle, the A characters are put into the SECONDARY CHANNEL REGISTER under the control of CG1 and/or CG2 signals. During the following B cycle, the CG1 and CG2 signals are again generated so as to handle the B field characters (in the manner described hereinafter). It is necessary to recognize when the END OF "A" FIELD has been reached, because the B field will continue to be processed all by itself, as described hereinbefore, but it is necessary to prevent the A field from being included in the processing since it does not contain information within the proper field. The circuit of FIG. 16 permits SECONDARY CG1 and SECONDARY CG2 to follow, respectively, CG1 and CG2, during *all* cycles, including B cycles, until the END OF "A" FIELD condition is reached. Thereafter, the last character gate which was set will remain; that is, whichever side of the latch 424 was energized before reaching the END OF "A" FIELD will continue to be present despite changes of CG1 and CG2 at the input to the circuit of FIG. 16.

As shown in FIG. 16, this is accomplished simply by a pair of AND circuits 426, 427 which cause the CG1 signal on line 304 to set the latch 424 and the CG2 signal on the line 306 to reset the latch 424. However, if the END OF "A" FIELD appears, the NOT END A signal on line 428 will disappear, thereby blocking the AND circuits 426, 427. The NOT END A signal is discussed in detail in Section 18*c* hereinafter.

Returning to FIG. 15, the gate 410, 411 will respond to the SECONDARY CG1 and SECONDARY CG2 signals on lines 429, 430 respectively, as appropriate. For instance, if two A characters are to be processed with two B characters, SECONDARY CG1 will cause the first A character (on line 220X) to pass through the gate 410 and the OR circuit 416 onto the SECONDARY CHANNEL. Thereafter, the SECONDARY CG2 signal on line 430 will cause the second A character (on line 220Y) to pass through the gate 411 and the OR circuit 416 onto the SECONDARY CHANNEL, for processing with the second B field character. The only thing that will inhibit the gates 410–415 in the presence of time B, which blocking is accomplished by the disappearance of a NOT $tB$ signal. This signal is generated by taking the complement of the time B signal, possibly by means of an inverter (not shown), all as is within the skill in the art (see Section 11*e*, FIG. 33, infra).

The output of the SECONDARY CHANNEL GATE 210, as shown in FIG. 15, comprises the SECONDARY CHANNEL 224, which includes one bit for each of the bits in a character.

Attached to the SECONDARY CHANNEL is a SECONDARY CHANNEL PARITY CHECK circuit 432 which generates a SECONDARY CHANNEL ERROR on the line 434 whenever there is other than an odd number of bits on the SECONDARY CHANNEL. The SECONDARY CHANNEL PARITY CHECK circuit 432 can be any parity checking circuit well known in the art, the details of which are not important here. This circuit is described in connection with the remaining error checking circuity of the disclosed embodiment, in Section 12*c*, hereinafter.

*b. Return channel 2nd character gate*

Figure 17:
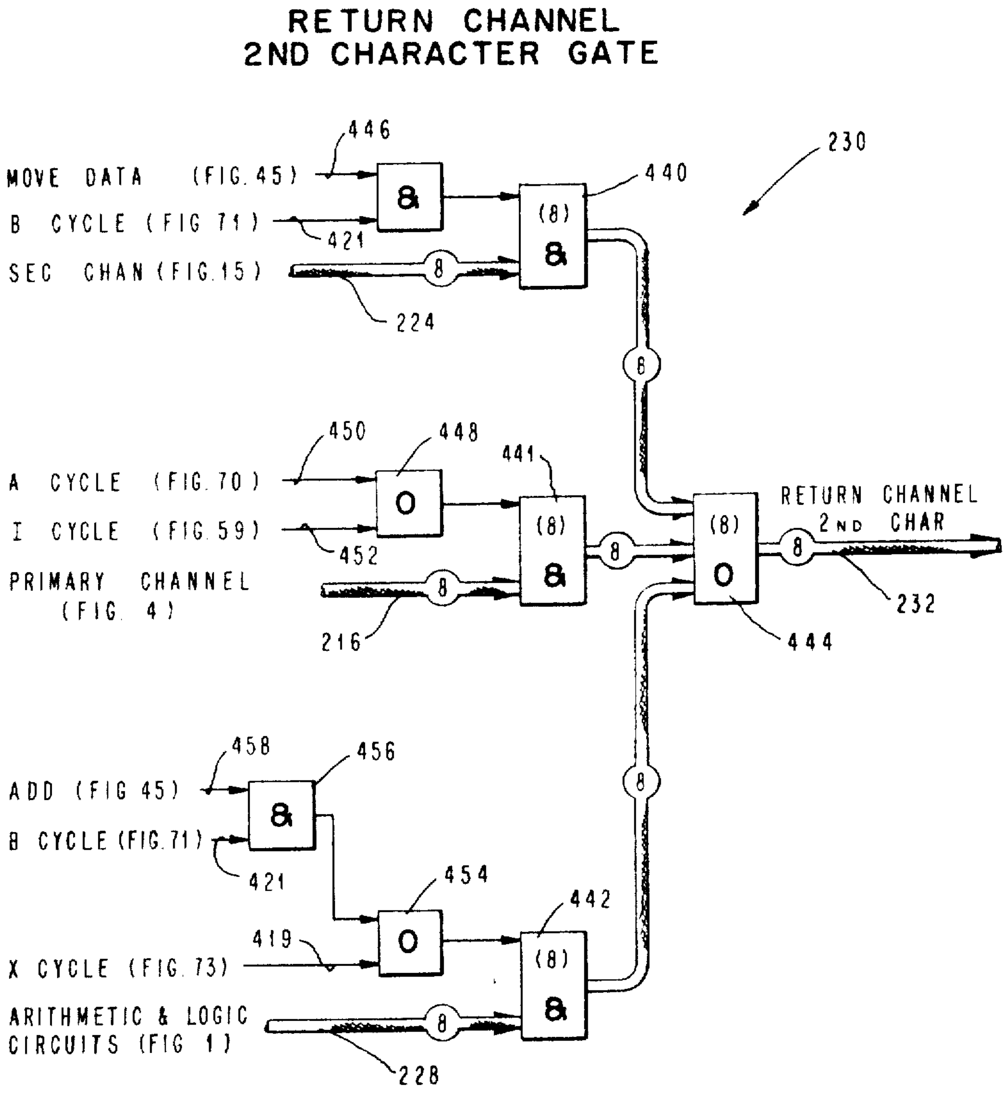

The RETURN CHANNEL 2ND CHARACTER GATE 230 is shown in FIG. 17. In FIG. 17, there are shown three eight way gates 440–442 each of which feeds an eight way OR circuit 444, the output of which is the RETURN CHANNEL 2ND CHARACTER portion 232. The eight way gate 440 is utilized to pass characters from the SECONDARY CHANNEL 224 through to the RETURN CHANNEL 2ND CHARACTER portion 232. In the present embodiment, the only time that this will be done is when there is an instruction to MOVE DATA (446), and it is currently a B cycle (321). The reasoning behind this will be described hereinafter; it suffices here that the MOVE DATA instruction causes data to be moved from the A address into locations at the B address. Thus data moved out of the MEMORY on an A cycle will be placed into the SECONDARY CHANNEL REGISTER, and during the B cycle, when the MEMORY is receptive at the B address, the characters in the SECONDARY REGISTER will be put on the RETURN CHANNEL so that they may be stored in the B field location.

The gates 441 will gate the primary channel 216 to the RETURN CHANNEL 2ND CHARACTER portion 232 during either an I CYCLE or an A CYCLE. This is accomplished by an OR circuit 448 in response to an A CYCLE signal on line 454 and I CYCLE signal on line 452. The reason that the PRIMARY CHANNEL is gated into the RETURN CHANNEL during an A CYCLE is to permit the movement of data from MEMORY either to the console or to the *I/O* (as illustrated in the left hand side of FIG. 1). The reason for gating the PRIMARY CHANNEL onto the RETURN CHANNEL during I cycles is to maintain parity of the RETURN CHANNEL, for instance. It is important to note that the internal operation described in this preferred embodiment does not require the eight way gate 441, which is therefore shown for illustrative purposes to complete the relationship of the present embodiment with its environment. In some machines, this gate (441) might be used to gate valid data onto the RETURN CHANNEL so as to prevent an error indication.

The eightway gate 442 passes results achieved in the ARITHMETIC & LOGIC CIRCUITS from an eight bit bus 228 through to the RETURN CHANNEL in response to an OR circuit 454 which is operated during X cycles by an X CYCLE signal or by the X CYCLE signal 419, or by an AND circuit 456. The AND circuit 456 responds to an ADD signal on line 458 whenever a B CYCLE is indicated by the signal on line 421. Thus, during a B CYCLE, the results available from the ARITHMETIC & LOGIC CIRCUITS are automatically passed through the RETURN CHANNEL 2ND CHARACTER gate as soon as they are formulated. Similarly, during an X CYCLE, indexing of an address is accomplished by adding an increment to an address within the ARITHMETIC & LOGIC CIRCUITS; thus the gate 442 permits indexed addresses to flow directly out of the ARITHMETIC & LOGIC CIRCUITS into the RETURN CHANNEL 2ND CHARACTER portion 232.

Although the eight way gates 440–442 are shown only schematically, it should be understood that these represent one AND circuit for each of the bits of a character, in the same fashion as is illustrated with respect to the Z register gates in FIG. 7, which is described in Section 8*a* hereinbefore. Therefore further details are believed to be unnecessary at this point in the description.

*c. Return channel 1st character register & gate*

Figure 18:
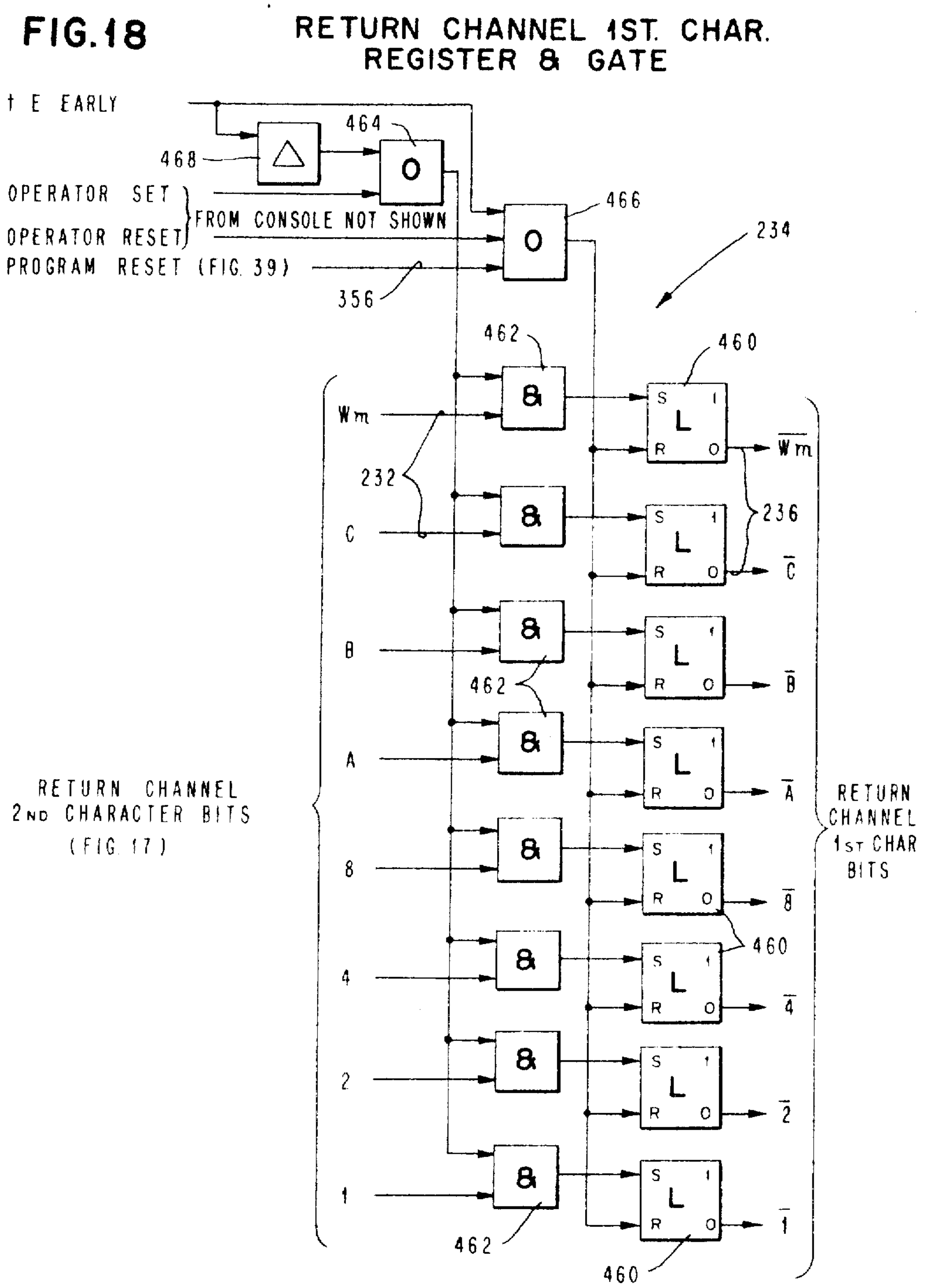

The RETURN CHANNEL 1ST CHARACTER REGISTER & GATE (FIG. 18) comprises a plurality of registering latches 460, each being set by a corresponding AND circuit 462, there being one latch and AND circuit for each of the bits in a character. The RETURN CHANNEL 1ST CHARACTER gates (AND circuits 462) may be operated by either of two inputs to an OR circuit 464. The first of these is a timing signal which is delayed from time E early, the delay being just enough so as to permit time E early to reset the latches 460 via another OR circuit 466 following which this delay signal through OR circuit 464 will cause the setting of the latches. In a machine of this speed, which is discussed in terms of timing diagrams, in Section 11, hereinafter, this delay may be generated by a delay circuit 468 which could have a delay of 50 or 100 nanoseconds, a nanosecond being ten to the minus ninth seconds. The other input to the OR circuit 464 is an OPERATOR SET signal which could be applied from an operator's console (not shown), and is shown in FIG. 18 for illustrative purposes only. A resetting of the latches 460 under control of the OR circuit 466 may likewise be achieved by an OPERATOR RESET signal, and otherwise may be achieved by the PROGRAM RESET signal on line 356. Thus it can be seen that the basic operation of the RETURN CHANNEL 1ST CHARACTER REGISTER & GATE is to open up at every time E early and respond to whatever is presented on the RETURN CHANNEL 2ND CHARACTER bus 232. Additionally, it may be caused to do so by an operator, if desired, in the particular embodiment of the present invention.

Although only a single character is processed as a result of a CG2, and this in fact will be returned to MEMORY via the RETURN CHANNEL 2ND CHARACTOR bus 232, nonetheless it is easier to open the RETURN CHANNEL 1ST CHARACTER gates 462 during *every* cycle because there is no harm in doing so even though the data store therein will not be utilized directly from the RETURN CHANNEL 1ST CHARACTER bus 236. In other words, the RETURN CHANNEL 1ST CHARACTER bus will have data on it any time it is necessary, and additionally will sometimes have the data anyway, even if it isn't necessary, simply because this permits the simplest possible form of circuitry as shown in FIG. 18. Similarly, the 2ND CHARACTER bus 232 will respond, passively, to characters actually handled by the 1ST CHARACTER bus 236, due to a CG1 signal.

The outputs of the latches 460, which comprises the RETURN CHANNEL 1ST CHARACTER bits, are shown as complement signals; i.e., as $\overline{WM}$, $\overline{C}$ . . . $\overline{1}$. This is due to the fact that core storage writing circuits usually operate to write ONE's throughout the cores unless inhibited due to the absence of a bit. Thus, the lack of a bit out of FIG. 19 will cause a complement signal, which in turn generates a corresponding inhibit signal. However, this need not necessarily be so; it is within the skill in the art to provide either true or complement bits as necessary. The RETURN CHANNEL 1ST CHARACTER bus 232 (FIG. 17) is shown as having true bits. Thus, either or both may be used as necessary in any particular implementation.

10. MEMORY REGENERATE & LOAD

*a. In general*

Figure 23:
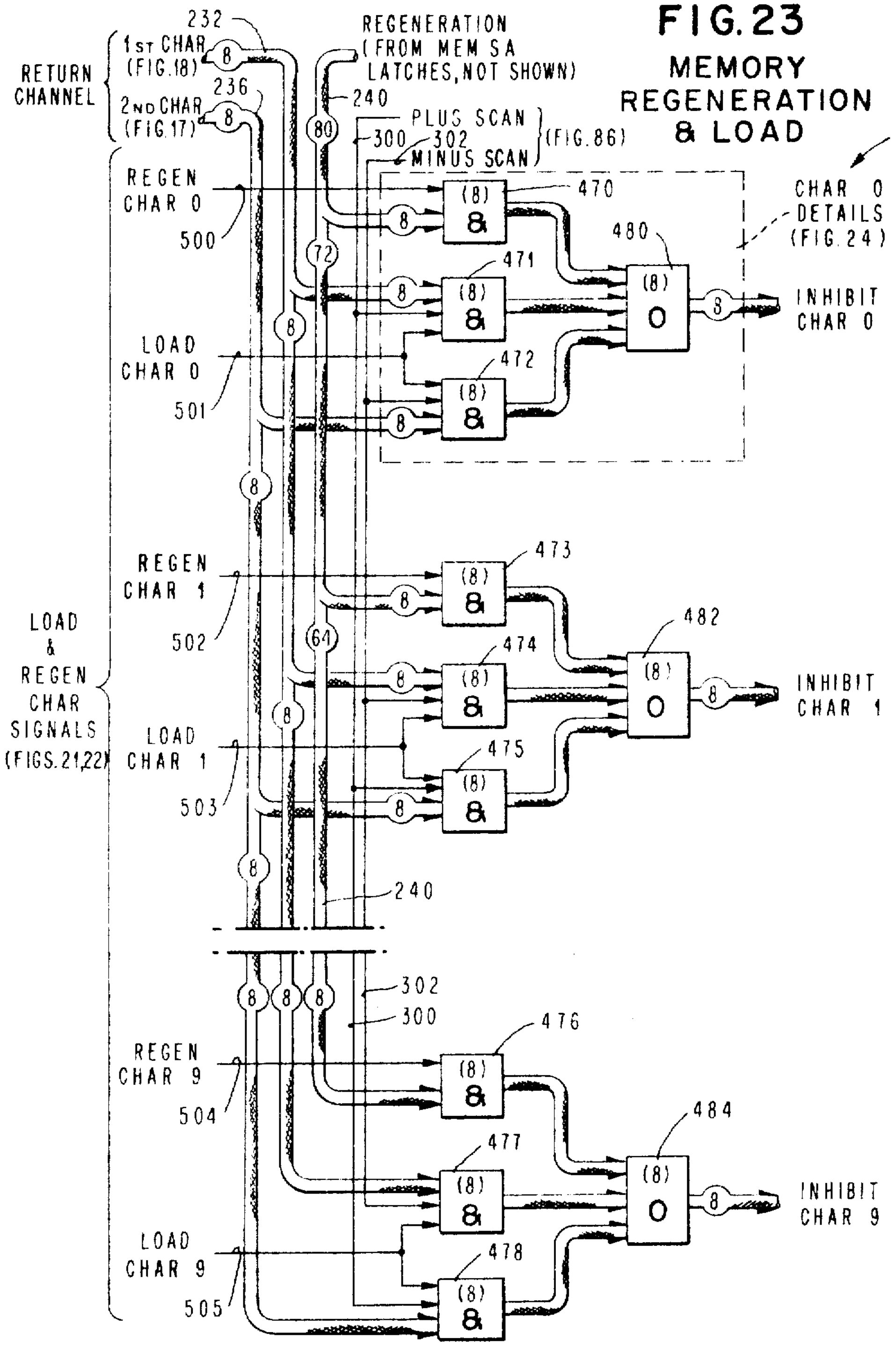

Referring briefly to FIG. 23 (Sheet 16), the MEMORY REGENERATE & LOAD circuits 238 are designed to either load or regenerate each of the ten characters (CHARACTER 0 through CHARACTER 9) which are read out of MEMORY at one time. If the character was one which is selected by the ADDRESSING CIRCUITS 214 and the MEMORY CHARACTER SELECT circuit 204 (FIG. 1), and if additionally, the character was selected by the PRIMARY CHANNEL GATE 210, then the character will be *loaded* with new information by the MEMORY REGENERATE & LOAD circuits whenever a B cycle is involved. This is so since in ADD operations and MOVE DATA operations, the result of the operation is stored in the B field. During A cycles and I cycles, no information is loaded because these fields are by definition *regenerated* and saved for further use, unless a special instruction is utilized (not disclosed herein) for changing the information in the A or I field.

Any character which is not selected by the ADDRESSING CIRCUITS, but is in the same group as the selected characters, as described in Section 7, supra, will be regenerated automatically. In FIG. 23, the MEMORY REGENERATE & LOAD circuits 238 control a selective regeneration or writing as necessary of all the characters which were originally read out of MEMORY. In order to achieve this, there is provided a plurality of eight way gates 470–478, one for each source of memory data for each of the characters. Thus, the gates 470–472 control the writing into CHARACTER 0 through a common eight way OR circuit 480; the gates 473–475 and an eight way OR circuit 482 control CHARACTER 1; the gates 476–478 control writing into CHARACTER 9 through an eight way OR circuit 484.

Gates 470, 473 . . . 476 pass information from the REGENERATION bus to the respective characters; gates 471, 474 . . . 477 pass information from the RETURN CHANNEL 1ST CHARACTER bus 432 to the respective characters; and gates 472, 475 . . . 478 pass information from the RETURN CHANNEL 2ND CHARACTER bus 436 to the respective characters.

The choice of which gates 470–478 will be operative is dependent upon whether or not this is the type of cycle (such as a B cycle) wherein loading of new information can occur; except for those characters into which new information is to be loaded, all other characters are regenerated (this includes all characters during A cycle and during I cycles).

Figure 24:
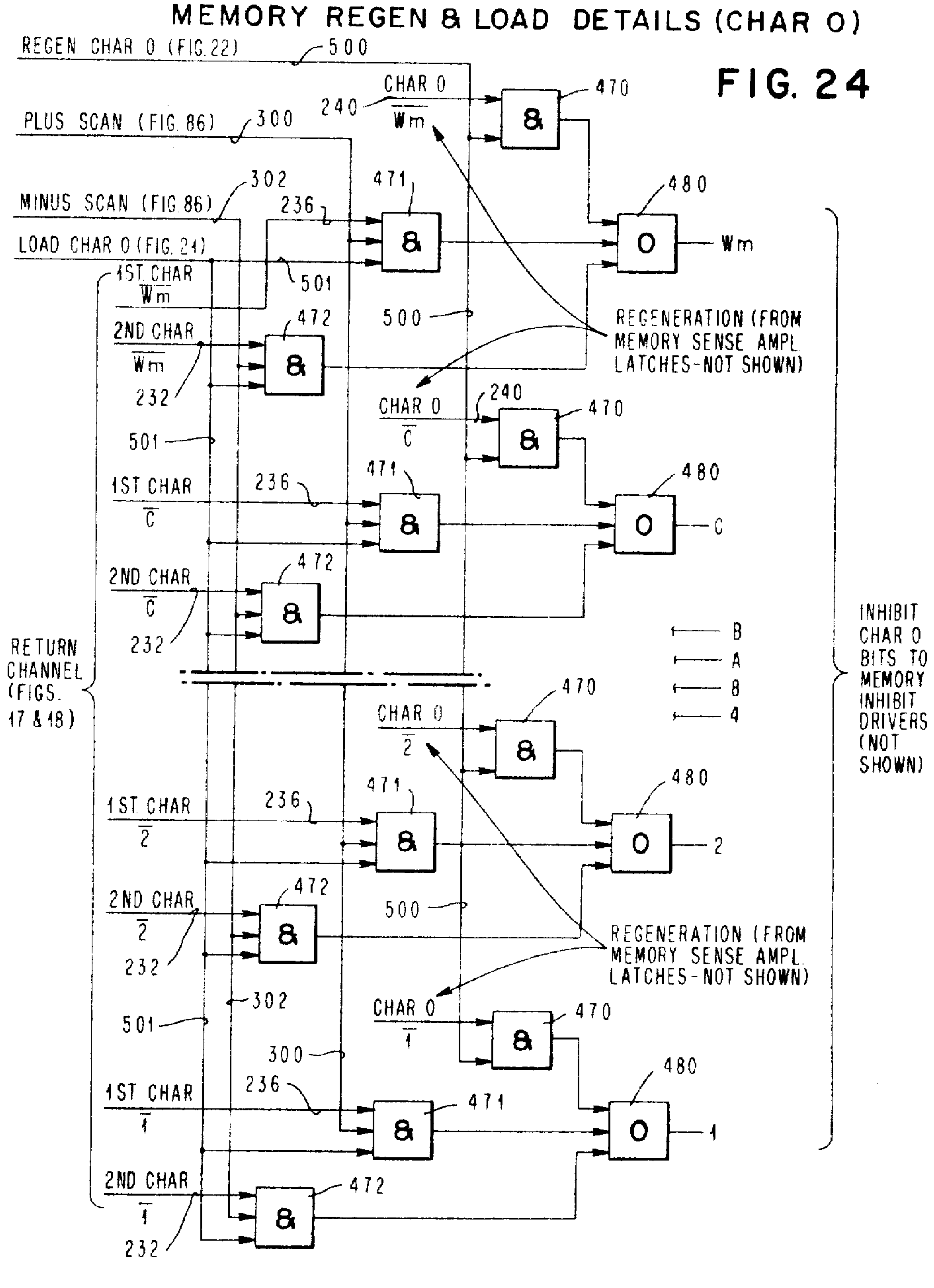

The manner in which the memory REGENERATE & LOAD circuits 238 operate is discussed in detail with respect to FIGS. 19–22 and 24. However, in order to understand what is being done in the description of those figures, it is well to recognize that the gates 470–478 respond to LOAD and REGENERATE CHARACTER signals on a plurality of lines 500–505, and the gate 471, 472, 474, 475, 477 and 478 additionally respond to PLUS SCAN and MINUS SCAN signals on lines 300, 302 in an alternating fashion. Thus, PLUS SCAN will gate the RETURN CHANNEL 1ST CHARACTER into CHARACTER 0, and MINUS SCAN will gate the RETURN CHANNEL 2ND CHARACTER into CHARACTER 0; similarly, PLUS SCAN will gate the RETURN CHANNEL 2ND CHARACTER into CHARACTER 1 and MINUS SCAN will gate the RETURN CHANNEL 1ST CHARACTER into CHARACTER 1. This is due to the fact that if scanning positively, (PLUS SCAN), the first character you reach is an even character, such as CHARACTER 0; the second character reached when scanning positively is an odd character such as CHARACTER 1. Thus, for any one scan (such as PLUS SCAN), the first character goes into CHARACTER 0, and the second character goes into CHARACTER 1. This will be for any pair of characters such as 2 and 3, or 4 and 5, etc. On the other hand, during a MINUS SCAN the first character reached is the odd character; therefore on a MINUS SCAN the first character is gated into CHARACTER 1 and the second character is gated into CHARACTER 0. This would be true as well for the first character being gated into CHARACTER 3 and second character gated into CHARACTER 2, etc. FIGS. 19–22 show the generation of the LOAD and REGEN CHARACTER signals, and FIG. 24 shows the details of the CHARACTER 0 circuitry of FIG. 23.

*b. Memory input odd/even controls*

Referring to FIG. 19, the first step in generating the LOAD and REGENERATE CHARACTER signals is to generate memory input odd/even controls. A pair of latches 510, 511 control the loading and regeneration of even and odd characters respectively. This is another circuit which uses the PLUS SCAN and MINUS SCAN signals and the character gates CG1 and CG2 to keep track of the characters processed. For instance, assume that the MEMORY is being scanned positively, and that there is therefore a PLUS SCAN signal on a line 300. During the first character time, the CG1 signal will be on line 304 which will cause an AND circuit 512 to pass a signal through an OR circuit 514 to set the latch 510. At second character time, the CG2 signal on the line 306 will cause an AND circuit 516 to pass the signal through an OR signal 518 to set the latch 511. It should be noted that either CG1 or CG2 could appear alone, in a single character process situation. Thus the latch 510 will generate a LOAD EVEN CHARACTERS signal on a line 520 in order to store the first results of a two result cycle, and the latch 511 will generate a LOAD ODD CHARACTERS signal on a line 522 in order to store the second character of a two process cycle. If there is a MINUS SCAN, the first character is of course odd and will be controlled by the latch 511 and the second character is even and will be controlled by latch 510, due to AND circuits 524, 526, respectively. Thus it is possible to have either or both of the latches 510, 511 set in order to control loading of data during a memory cycle within which a result is obtained (such as a B cycle). Each of the AND circuits 512, 524, 516, 526 is also controlled by a LOAD MEMORY signal on a line 528; as developed in detail in Section 11*f*, infra, the LOAD MEMORY SIGNAL is present on the line 528 in any cycle wherein a result must be written into memory.

The latches 510, 511, are reset in response to the output of an OR circuit 530 due to either a REGEN MEMORY signal on a line 532, the PROGRAM RESET signal on line 356, or a READ MEMORY signal on a line 534 (see Section 11*f*, infra). Thus, it is not possible to have a LOAD signal out of either of the latches 510, 511 whenever the memory is to be regenerated, or read, immediately following a PROGRAM RESET.

The out-of-phase outputs of the latches 510, 511 comprise (the complements to the in-phase outputs) a REGEN EVEN CHARACTERS signal on a line 536, a REGEN ODD CHARACTERS signal on a line 538, respectively. The LOAD signals on line 520, 522 are applied to the circuit of FIG. 21, and the REGEN signals on line 536, 538 are applied to FIG. 22. The net result is the LOAD and REGEN CHARACTERS signals, which were discussed with respect to FIG. 23, hereinbefore.

An ALTERNATIVE FORM OF FIG. 19 is shown in FIG. 20. FIG. 20 is identical to the circuit of FIG. 19 with the exception of the fact that the latches 510, 511 (FIG. 19) and their corresponding OR circuits, are combined in an OR/AND circuit combination as shown in FIG. 20. The output of the OR circuit is fed back to the input of an AND circuit, and, provided that one of the resetting signals is not present, the AND circuit will cause the OR circuit to continue to have an output. Thus, the AND and the OR become latched and will remain so until a PROGRAM RESET or a READ MEMORY SIGNAL appears, thereby causing the disappearance of the NOT PROGRAM RESET or NOT READ MEMORY signal; said disappearance causing the AND circuit to be blocked, thereby preventing an input to the OR circuit which in turn cuts off the feedback input to the AND circuit. All of this is well within the skill of the art, and represents only one of a plurality of well known latches which may be utilized in the present embodiment.

*c. Memory input load/regen controls*

The MEMORY INPUT LOAD CHARACTER CONTROLS are illustrated in FIG. 21. In FIG. 21, there is one AND circuit 550–559 for each of the characters. The even numbered AND circuits 550–558 respond to the LOAD EVEN CHARACTERS signal on line 520, and the odd numbered AND circuits 551–559 respond to the LOAD ODD CHARACTERS signal on line 522. Each of the AND circuits respond to a corresponding one of the MAR TT PAIRS signals on line 262, 264 . . . 265. It will be recalled that the same MAR TT PAIRS were used in the MEMORY CHARACTER SELECTION circuit 204, as shown in FIG. 3 (Section 7*a*), to select proper characters from the MEMORY in response to the high order (or 10,000 order) of the MEMORY address. The same PAIRS are used in FIG. 21 to recognize the characters which were selected, thereby enabling these same characters to be written into, in any case where writing is desired. Thus, if a LOAD EVEN CHARACTERS signal appears on lines 520, and there is a 0 or 1 MAR TT PAIRS signal on line 262, the AND circuit 550 will generate a LOAD CHARACTER signal for CHARACTER 0 on line 501; if the LOAD ODD CHARACTERS signal were also present (on line 522) then the AND circuit 501 would also produce a LOAD CHARACTER signal for CHARACTER 1 on line 503. Thus, as described with reference to FIG. 19, if one character is actually selected for processing during a memory write type of cycle (such as B cycle), either the LOAD EVEN CHARACTERS signal on line 520 or the LOAD ODD CHARACTERS signal on line 522 will be present and either one of these will generate a LOAD CHARACTER signal for an even CHARACTER (i.e., 0) or for an odd CHARACTER (i.e., 1) respectively. If two characters are selected for processing during a memory write type of cycle, then both the signals on line 520, 522 will be present, and the circuit of FIG. 21 will generate a LOAD CHARACTER signal for an adjacent odd/even pair (such as CHARACTER 0 and CHARACTER 1, as was just described).

FIG. 22 illustrates the MEMORY INPUT REGENERATE CHARACTERS controls wherein there is provided one OR circuit 560–569 for each of the MEMORY CHARACTERS. Each of the OR circuits responds to either a REGEN CHARACTER signal on one of the lines 536, 538 to the lack of one of the corresponding MAR TT PAIRS signal on the lines 262, 264 . . . 265 (FIG. 21). In FIG. 22 these lines are identified as the complements of the MAR TT PAIRS lines shown in FIG. 21. As described hereinbefore, in the interest of simplicity, the complement signals for the MAR TT PAIRS are not all shown in FIG. 114, the NOT 0 *or 1* on line 1688 being exemplary. It is obvious that any circuits having complementary outputs could generate them, or they could be generated from the MAR TT PAIRS lines 262, 264 . . . 265 by means of ordinary inverter circuits (1686) as is well known in the art.

The effect of FIG. 22 is to guarantee that any character not selected by the addressing means will be regenerated; it also guarantees that even if a character is selected by the addressing means, if the load even characters latch or the load odd characters latch 510, 511 in FIG. 19 is not set for the corresponding character, then the out-of-phase output of that latch on lines 536, 538 will guarantee regeneration of a character. Thus, not only need the character be selected, but the character must also be definitely scheduled for loading of new information in order to prevent regeneration of the existing information. This is a sort of fail-safe circuit which guarantees that information stored in a destructive read out type of core storage will not be inadvertently lost for any reason.

The output of FIG. 22 is manifested in various REGENERATE CHARACTER signals on lines 500, 502 . . . 504 for application to the MEMORY REGENERATE & LOAD circuit 238 previously described in FIG. 23.

*d. Memory regen & load details*

To illustrate in detail the operation of the MEMORY REGENERATE & LOAD circuits 238, the details of the CHARACTER 0 portion thereof are shown in FIG. 24. In FIG. 24, four stages of an eight way OR circuit 480 are shown on the left hand side of FIG. 24. Each of these OR circuits will generate an inhibit signal for one bit of CHARACTER 0 if it is activated by corresponding gates, due to complement input signals (i.e., $\overline{\text{WM}}$ bit). Four AND circuits of the regeneration eight way gate 470 are shown, four AND circuits of the eight way 1ST CHARACTER gate 471 are shown, and four AND circuits of the eight way 2ND CHARACTER gate 472 are shown. As described before, if there is a REGENERATE 0 signal on line 500, only the regenerate gates 470 will be operative, and the CHARACTER 0 inhibit signals will depend upon the characters which have been read out of MEMORY as presented to the gates 470 by the REGENERATION bus 240. If there is a LOAD CHARACTER 0 signal on line 501, then the 1ST CHARACTER signals will be selected by the gates 471 in response to PLUS SCAN, and the 2ND CHARACTER gates 472 will be energized in response to a MINUS SCAN. The output of FIG. 24 comprises INHIBIT CHARACTER 0 bits which are applied to MEMORY inhibit drivers (not shown) of a well known type, which will cause the writing current to be selectively inhibited, as necessary, in order to store proper coded information into the eight cores which comprise the particular CHARACTER 0 here being considered.

11. BASIC TIMING CONTROL

*a. Basic timing*

The cycle timing of the machine is illustrated in FIGS. 35 and 36, introduced in Section 8*b*, hereinbefore.

Figure 25:
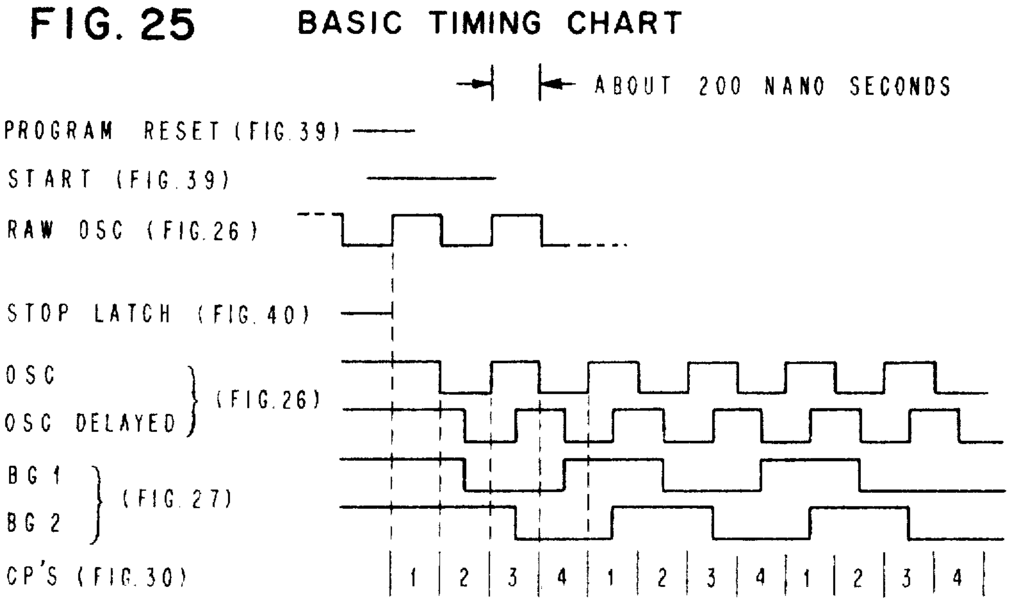

In FIG. 25 is shown a basic timing chart which illustrates the relationship of various signals utilized in generating a sequence of four clock pulses. At the bottom of FIG. 25 is shown the clock pulses (CP's). It will be seen that clock pulses are identified as being 1, 2, 3, 4, 1, 2, 3, 4, etc. These clock pulses are generated by combinations of signals: CP2 is generated in response to negative OSCILLATOR and positive binary gate (BG2); CP3 is generated in response to positive OSCILLATOR and negative BG1; CP4 is generated in response to negative OSCILLATOR and negative BG2; and CP1 is generated in response to positive OSCILLATOR and positive BG1. The circuits which actually develop the OSCILLATOR and binary gate signals, and combine these so as to generate the clock pulses are discussed in the immediately following sections. The remainder of the timing chart of FIG. 25 illustrates the manner in which the basic timing signals resume operation in a known phase relationship following a program reset and restarting of the system. This will be described in detail along with the circuits in a later section (12*d*).

Figure 26:
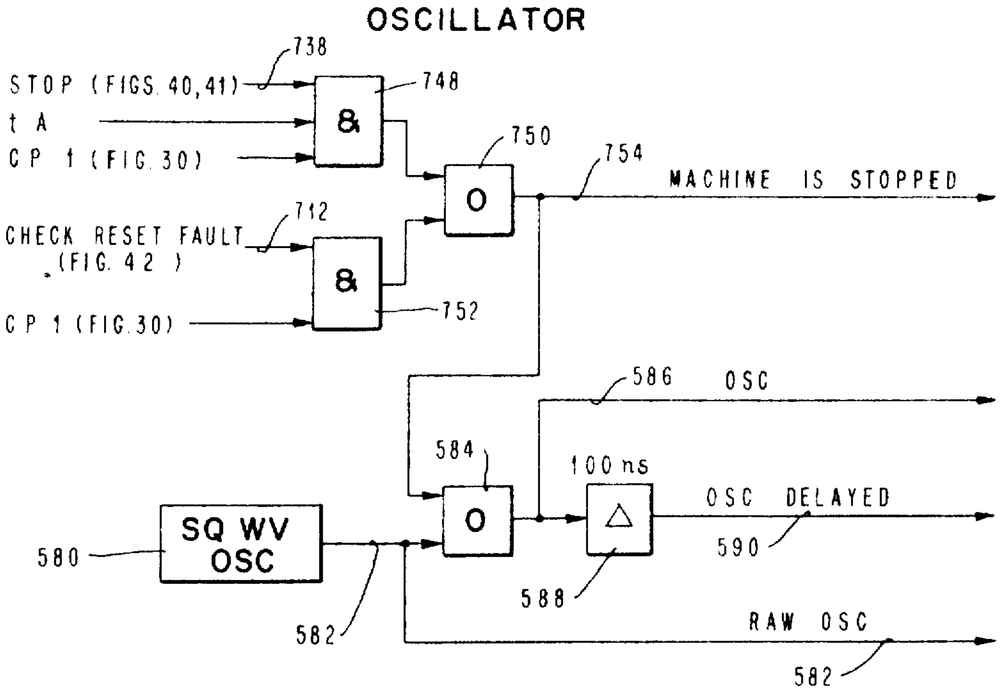

The basic oscillator control circuits are shown in FIG. 26. At the bottom left hand side of FIG. 26 is shown a SQUARE WAVE OSCILLATOR 580 which may be any well known type having a period of approximately 400 nanoseconds; this will give a positive portion followed by a negative portion each of about 200 nanoseconds, as illustrated in the top of the BASIC TIMING CHART in FIG. 25. The details of the SQUARE WAVE OSCILLATOR are not shown because any square wave oscillator known to the prior art, capable of operating at that frequency, is suitable.

The output of the SQUARE WAVE OSCILLATOR 580 on a line 582 comprises a RAW OSCILLATOR signal on a line 582. This RAW OSCILLATOR signal is also fed to an OR circuit 584, the output of which comprises an OSCILLATOR signal on line 586 which is led to certain other circuitry and to a delay circuit 588; the delay circuit 588 supplies approximately a 100 nanosecond delay and generates thereby an OSCILLATOR DELAYED signal on a line 590. The remainder of the circuits in FIG. 26 are described hereinafter with respect to the stop, start and error circuitry (Section 12*d*).

*b. Clock gates*

The oscillator delayed signal on line 590 is fed to the BINARY GATES FOR CLOCK generating circuit which is illustrated in FIG. 27. This circuit also responds to the PROGRAM RESET signal on line 356. The purpose of the circuit is to generate BINARY GATE 1 (BG1) and BINARY GATE 2 (BG2) signals as shown in the BASIC TIMING CHART of FIG. 25.

Figure 42:
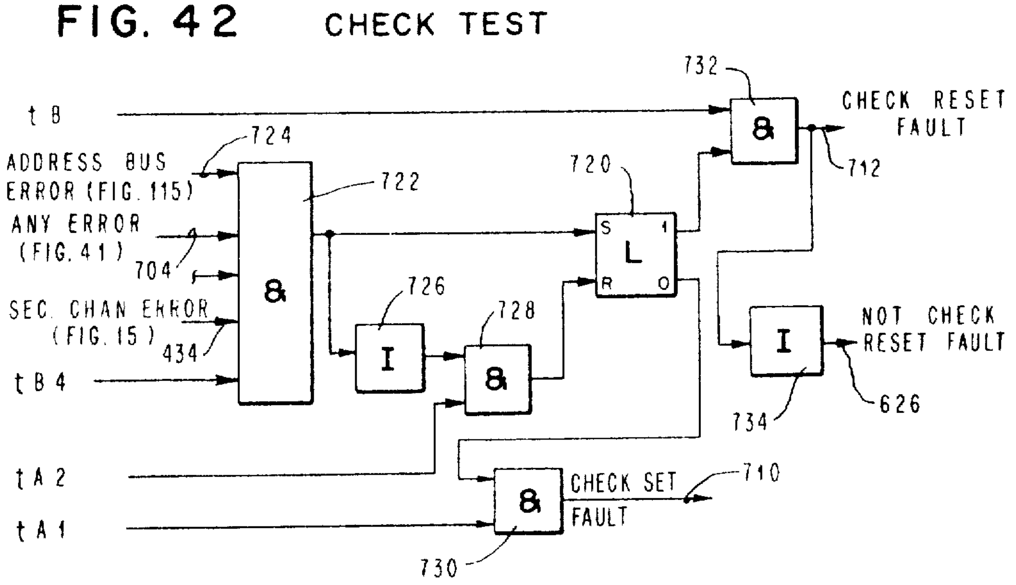

In FIG. 27, the OSCILLATOR DELAYED signal (590) is applied to an AND circuit 603 which permits passing of the OSCILLATOR DELAYED signal only when there is a NOT CHECK RESET FAULT signal on line 626 (from FIG. 42, Section 12*c*). The OSCILLATOR DELAYED signal on line 590 also feeds an inverter 610 which causes the negative of OSCILLATOR DELAYED to drive the BG1 circuit 604. The operation of the circuit of FIG. 27 is described in detail in subsequent paragraphs of this section; it suffices here to understand that the circuit is a frequency divider which is phase-locked with the oscillator in such a fashion that there will be a positive BG1 and a positive BG2 at the time that the computer begins to run following an error stop. The effect of the AND circuit 603 is to block the OSCILLATOR DELAYED signal, thereby preventing a change in BG2 whenever there is a CHECK RESET FAULT, due to the disappearance of the NOT CHECK RESET FAULT signal on line 626. It is assumed in the following paragraphs that the NOT CHECK RESET FAULT signal is present at all times. The effect of a RESET FAULT is discussed in Section 12*e*, hereinafter.

FIG. 27 contains six AND circuits, &1–&6, each of which has an inverted output so that with all the inputs on AND circuit positive, the output of the AND circuit will be negative. Logically, these and AND/INVERT circuits. The particular circuit shown is designed to create phase-locking of the clocking system following any shutting down of the system; for instance, if an error causes the system to stop, and the system is thereafter restarted, the clocking system is all phased-related in known manner so that the circuitry will operate in a proper fashion without any noise signals or other circuit complications. In operation, assume that the PROGRAM RESET line has been negative for some time. This will also mean that the AND circuits &1, &3, &5 do not have three positive inputs and therefore do have positive outputs during this time. In this condition the circuits are automatically forced into a situation where the output of &3 is positive and the output of &6 is negative. The combination of AND circuit &3, &6 may be considered to be an OUTPUT latch, the AND circuits &4, &5 and INTERMEDIATE latch, and the AND circuits &1, &2 and INPUT latch. The operating conditions with the REST line negative is illustrated in lines 1 and 2 of the BINARY GATE 2 GENERATION CHART shown in FIG. 28. With the output of &3 positive and &6 negative, the OUTPUT latch is considered to be OFF. In this condition, &4 is minus and &5 has a positive output, and the INTERMEDIATE latch may be considered OFF as well. The AND circuit &1 has a positive output and as shown in the first two lines of FIG. 28, the output of &2 will go positive and negative in response to the OSCILLATOR DELAYED signal on line 590 With the PROGRAM RESET line 356 minus however, the oscillating of the output of &2 has no effect. Assume that the OSCILLATOR DELAYED signal, line 590, is positive at the precise moment that the PROGRAM RESET line 356 goes positive. The output of &2 will now be negative since all of the input signals are positive. This has no effect on &1, since &1 is still blocked by the positive output from &3. Also, &2 being negative has no effect on &3, since &3 still has a negative signal from &6. Further, &2 has no effect on &5, since &5 still has a minus input being applied to it from &4, is responding to a plus signal on program reset line 356, and to a plus OSCILLATOR DELAYED signal on line 590. Therefore, no significant change has occurred in the circuitry as a result of the RESET line 356 going positive at a moment when the OSCILLATOR DELAYED line 590 is positive. This is illustrated in line 3 of the BINARY GATE 2 GENERATION CHART FIG. 28. The next time that the oscillator goes negative, the output of &2 will again go positive causing all three inputs to &1 to become positive, thereby changing the output of &1 to negative. This causes &1 and &2 (the INPUT latch) to become latched OFF with the output of &1 negative and the output of &2 positive. This is the first step in causing the output of this circuit to change, and this step has occurred during the first negative oscillator following the application of a positive signal on the PROGRAM RESET line 356. This situation (INPUT latch ON) is illustrated in line 4 of FIG. 28.

The next time that the oscillator goes positive, &5 will have four positive inputs and its output will change to negative, which in turn is applied to &4. The negative output from &5 is also applied to &6 and will cause the output of &6 to go positive. This supplies the third positive input to &3, so that the output of &3 will swing negative at this time. With the &3 output negative, there are two negative inputs to &6 causing &3 and &6 (the OUTPUT latch) to switch to the opposite conditions from that which was assumed while reset was applied. Thus, the OUTPUT latch now turned ON, causing the first shift in the output of the circuit as a result of the first positive oscillator following the first negative oscillator following removal of the negative RESET potential on line 356. The fact that there has been a shift in the OUTPUT is registered by the negative output of &3 being coupled back to the input of &1, thus causing the output of &1 to shift positive. This in turn provides positive inputs to &2 and &4. In summation, when the PROGRAM RESET line 356 went positive, at the same time that the oscillator was positive, the OSCILLATOR DELAYED signal on line 590 was positive, nothing really happened: &2 merely continued to follow the oscillator delayed signal. However, when the OSCILLATOR DELAYED signal on line 590 went negative, the INPUT latch (comprising &1 and &2) became latched OFF and the INTERMEDIATE latch (comprising &4 and &5) became unlatched. Thereafter, the next time that the OSCILLATOR DELAYED signal on line 590 went positive, &4 and &5 became latched ON and in turn caused the OUTPUT latch (&3, &6) to turn from OFF to ON.

The next time that the OSCILLATOR DELAYED signal (590) goes negative, it has no effect on &2, since &2 already has a negative signal applied to it from &5. However, the output of &5 now shifts from minus to plus, causing an additional input to &4 to become positive, and the output of &4 will now shift to negative. Thus, the INTERMEDIATE latch (&4, &5) becomes latched OFF, and the newly positive output from &5 is fed back to &2, but since the oscillator is negative, this has no effect on &2. The output from &5 is also fed to &6, but since the other input to &6 (from &3) is negative, this will have no effect on &6 at this time. The net result during this negative swing is to cause the INTERMEDIATE latch (&4, &5) to become latched OFF, so that when the OSCILLATOR DELAYED signal on line 590 again goes positive, &2 will be able to have a negative output (since &1 and &5 are also feeding positive inputs to &2).

When the OSCILLATOR DELAYED signal on line 590 goes positive another time, &2 output becomes negative, causing one input of &3 to be negative, which in turn forces the output of &3 to be positive. Thus, &6 thereby receives positive signals from &5 and &3 and its output swings negative; the OUTPUT latch (&3, &6) turns OFF and has resumed the condition which was assumed to be in effect at the start of this operation. From here on, the operation repeats itself: during a subsequent positive following the next negative the output will reverse itself, and following still another negative and positive OSCILLATOR signal, the output will return to the point where it is now (OFF).

Referring now to FIG. 29, a chart (which illustrates roughly the operation of the circuit in FIG. 29) considers that a 0 is an unlatched condition and a 1 is a latched ON condition, of the various latches. In the first positive OSCILLATOR, all latches are OFF. Thereafter the following negative OSCILLATOR signal causes the INPUT and INTERMEDIATE latches to turn ON, but the output latch is still OFF. The third positive input signal causes the OUTPUT latch to go ON, and the second negative signal (line 4) turns OFF the INTERMEDIATE latch. With the INTERMEDIATE latch OFF, the third positive signal (line 5) turns the INPUT and OUTPUT latches OFF, thus restoring the circuit to its original condition.

The object of the circuit is to provide gates which are one half the frequency of the oscillator, and which will be phase-locked with the oscillator in such a fashion that the output of this circuit switches on positive swings of the oscillator in response to positive signals on the OSCILLATOR DELAYED line 590. It also is phase-locked, therefore, with the starting of the system any time that the system has been shut down.

The circuit just described generates the BINARY GATE 2 (BG2) signal on line 600 and a NOT BINARY GATE 2 signal on line 602. Another circuit 604, shown at the top of FIG. 27 (identical to the circuit described), will generate a BINARY GATE 1 (BG1) signal on a line 606 and a NOT BG1 signal on a line 608. The only difference between the two circuits is that the BG1 circuit is fed by the inverse of the OSCILLATOR DELAYED signal due to the effect of an inverter 610. Thus BG1 signals will be slightly in advance of the BG2 signals due to the use of the inverse OSCILLATOR DELAYED input thereto, this time relationship being shown in FIG. 25.

*c. Clock pulses*

Figure 30:
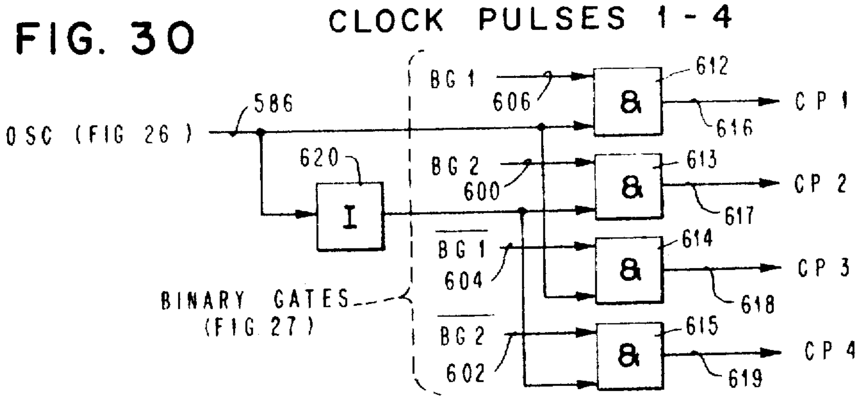

The OSCILLATOR signal on line 586 (from FIG. 26) and the BINARY GATE signals on lines 600, 602, 606, 608 (from FIG. 27) are combined in FIG. 30 so as to generate four clock pulses. The circuit comprises four AND circuits 612–615, each of which generates one of the clock pulses on corresponding lines 616–619. This circuit operates in a straightforward manner, the AND circuits 612 and 614 combining OSCILLATOR signals from line 586 with BINARY GATE 1 and not BINARY GATE 1 signals on line 606, 604 respectively. The OSCILLATOR signal on line 586 is also applied to an inverter 620 for controlling the AND circuit 613 and 615, which combines the inverted OSCILLATOR signals with BINARY GATE 2 and NOT BINARY GATE 2 signals one lines 600, 602 respectively. This operates in accordance with the timing diagram shown in FIG. 25 so as to provide a modulo four train of clock pulses.

*d. Main cycle clock*

The MAIN CYCLE CLOCK causes the division of actual operating cycles into logic times, so that the various steps may proceed in an orderly manner. The cycle runs from a time A to a time F unless the memory is to be loaded, in which case it runs from time A to time H. Running through the cycle clock is considered to be either an instruction cycle (I cycle) or an execution cycle (A, B, or X cycles); the execution cycles can be either of the memory loading type (such as a B cycle within which a result must be written into memory) or an A cycle wherein there is no loading of memory required (the memory is regenerated as the characters are handled in preparation for a following B cycle).

Figure 31:
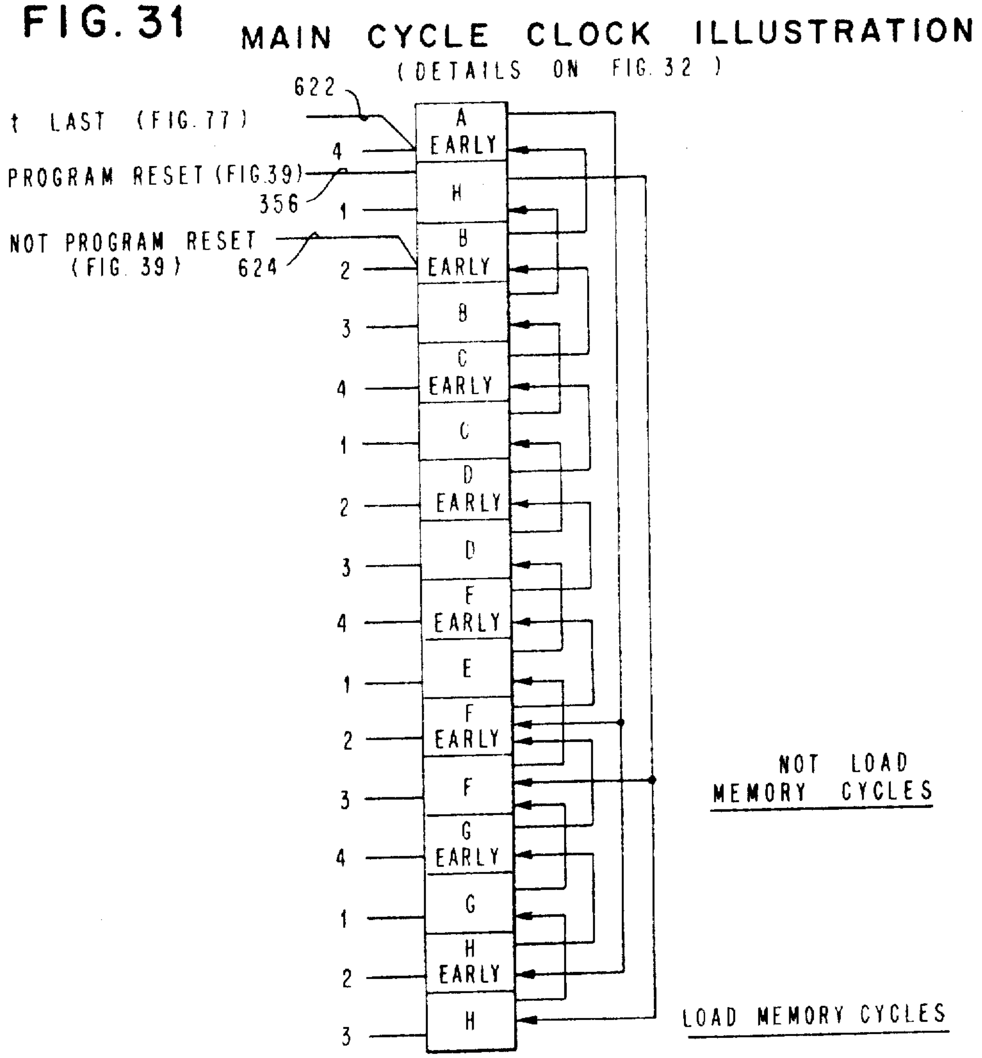

FIG. 31 is a brief illustration of the MAIN CYCLE CLOCK which generates a series of early times and including times designated from A through H, and corresponding times EARLY A through EARLY H. The circuit shown in FIG. 31 is essentially a ring circuit wherein one stage goes on and permits the next stage to go on at a subsequent clock pulse time, and as a stage goes on it resets an earlier stage. For instance, consider stage B which is turned on by CP3; this will reset stage A. Similarly, stage B EARLY will reset stage A EARLY.

Setting of stage B, for instance, is effected by the combination of B EARLY having been set and CP3 being applied. The mere fact that B comes on automatically turns off A.

Certain of the stages have more complicated setting conditions; for instance setting time A EARLY is accomplished by the combination of *t* LAST (which is generated in a detailed description in later Section 18*b*) on a line 622, and CP4. Time A may be set either by a PROGRAM RESET SIGNAL on line 356 or by CP1 following time A EARLY. The PROGRAM RESET input on line 356 will force time A to be set, without regard to time A EARLY, but CP1 can set time A only following time A EARLY. Time B EARLY may be set only by the combination of CP2 and a NOT PROGRAM RESET signal on a line 624, which signal is the complement of the PROGRAM RESET SIGNAL on line 356. This is generated in circuitry to be described hereinafter (Section 12*a*).

The remainder of the stages in the MAIN CYCLE CLOCK are set by each preceding stage and a corresponding clock pulse. This progresses down to either stage F or stage H in dependence upon whether or not the MEMORY is to be loaded following processing, as illustrated in the CYCLE CHART of FIG. 35. For instance in FIG. 35, the A and I cycles do not require new information to be loaded into the MEMORY, so that regeneration of the MEMORY can occur during logic times D, E, F and the first half of logic time A. On the other hand, during a B cycle, the results obtained from processing must be written into the MEMORY, and therefore the additional times G and H are required in order to permit this to occur. Thus, in an A or I cycle, for instance, logic gate F will cause the setting of *t* LAST which in turn will set time A EARLY; on a B cycle, wherein the MEMORY must be loaded, *t* LAST will be set by time H and this in turn will cause A EARLY to be set. It is to be noticed that time A will reset time F or time H, and time A EARLY will reset time F EARLY and time H EARLY.

The details of the MAIN CYCLE CLOCK are shown in FIG. 32 wherein each of the stages of FIG. 31 comprises a latch 630 with appropriate input gating. Thus, the latch which corresponds to time A EARLY may be set by an AND circuit 632 which responds to the *t* LAST signal on line 622 and to CP4. It will also be noticed that each latch resets the latch of the preceding time, and each early latch resets the preceding early latch. For instance, a latch 630 associated with time C EARLY will reset the latch just above it, which corresponds to time B EARLY.

The remaining circuitry operates in accordance with the general description given with respect to FIG. 31. The outputs of the circuit of FIG. 32 comprise the time signals *t*A, *t*D . . . *t*H, and the early time signals *t*A EARLY, *t*B EARLY . . . *t*H EARLY, as labeled on the right hand side of FIG. 32. Inasmuch as these timing signals are used throughout the application, they are not given references nor will further reference be made to FIG. 32 in order to simplify the preceding and ensuing description.

*e. Timing nomenclature examples*

In order to further simplify the description, the timing signals are combined in such a way as to specify an exact time, as illustrated in FIG. 33. For instance, if an occurrence is to be permitted at all times *except* during a particular time, it might be indicated as, for instance, NOT *t*F; it is to be understood that such a time may be generated by taking the out-of-phase output of any one of the latches shown in FIG. 32, or by passing the timing signal, such as *t*F, through an inverter, such as the inverter 636 in FIG. 33. Similarly, any clock pulse may be combined with any logic time so as to generate a signal as *t*A EARLY 1 by means of an AND circuit 638. Also, the timing signal *t* LAST which will be described hereinafter, (Section 18*b*), also may be combined with clock pulses so as to specify a particular portion of *t* LAST; this may be achieved by an AND circuit such as AND circuit 640 which generates *t* LAST 3. A further example of timing nomenclature includes the fact that timing signals may be ORed (as shown by the OR circuit 642) so as to create such signals as *t*E1 OR *t*F4. It should be understood that any combinations of signals, or the complements of the signals, may be made throughout the embodiment and the generation of these signals is, in most cases, left to the skill of the art.

The CYCLE CHART of FIG. 35 illustrates the logic timing as described hereinbefore. The CYCLE CHART of FIG. 36 illustrates a special cycle, called an X cycle, wherein indexing of addresses (the changing of one address by adding a known increment to it, so as to generate a new address) is achieved. The interesting thing about the X cycle is that the indexing of a first character includes time F and the indexing of the second character includes time F as well, plus the times G and H normally reserved for writing into memory. Thus, a longer execution cycle, which does not require writing into memory, has been achieved by using the logic timing of a cycle (such as a B cycle in FIG. 35) wherein writing into memory is achieved. This will be described in greater detail with respect to the indexing functions in later sections; 16*d*; 17*e*, *f*; 20.

*f. Read/write timings*

Figure 34:
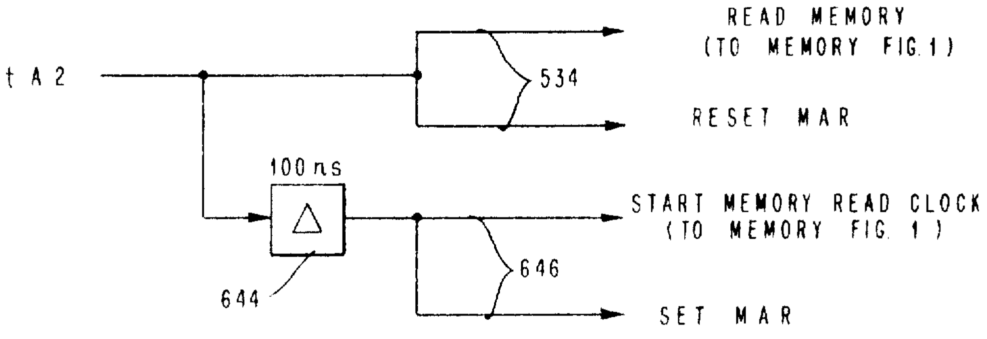
Figure 37:
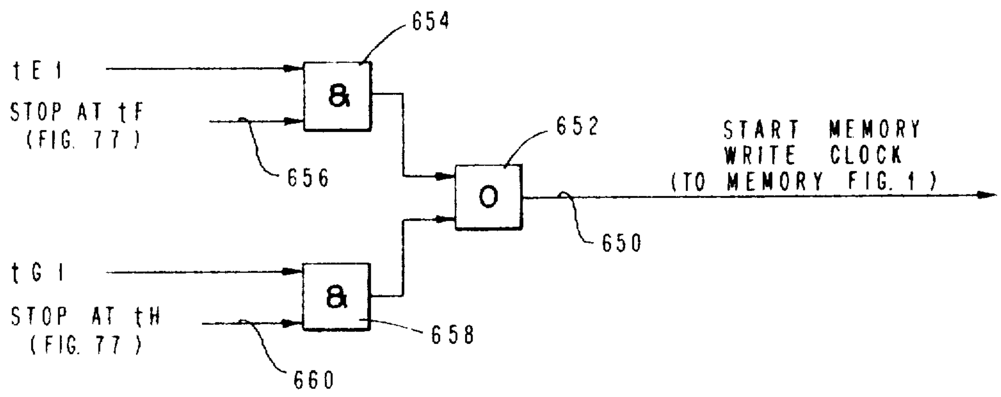
Figure 38:
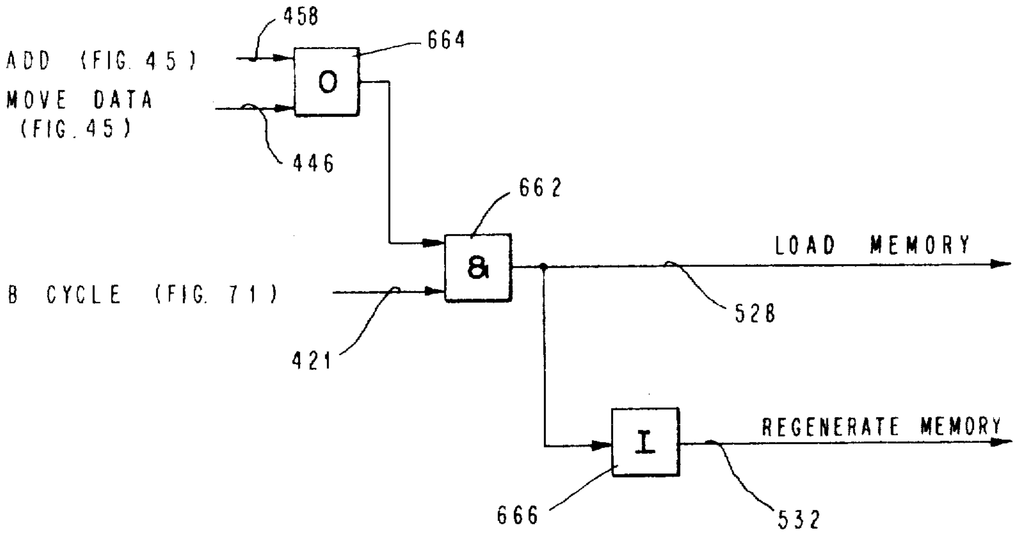

Basic timings of the system include the BASIC READ TIMING circuit of FIG. 34, and the BASIC WRITE TIMING circuits of FIGS. 37 and 38. FIG. 34 illustrates the fact that at time A2, a plurality of functions are commenced. Thus, time A2 comprises the READ MEMORY SIGNAL on line 534, and time A2 is delayed approximately 100 nanoseconds by a delay circuit 644 and comprises a START MEMORY READ CLOCK signal on a line 648, which signal is applied to the internal MEMORY circuits which are not shown in any detail herein. The time A2 signal is also utilized to first RESET and thereafter SET the MAR (memory address register), as described in detail in FIG. 113, Section 25, via the lines 534 and 646, respectively.

Basic write timing shown in FIGS. 37 and 38 includes a signal which will START the MEMORY WRITE CLOCK on a line 650, a LOAD MEMORY signal on line 528, and a REGEN MEMORY signal on line 532, which were utilized hereinbefore in the circuit of FIG. 19 described in Section 10. The START MEMORY WRITE CLOCK signal 650 is generated by an OR circuit 652 in response to AND circuit 654 at time E1, whenever there is a STOP AT tF signal on a line 656. Otherwise, the OR circuit 652 responds to an AND circuit 658 at time G1, whenever there is a STOP AT *t*H signal on a line 660. These signals will be developed in detail in Section 18*b* hereinafter; they relate to the difference in cycle which is utilized for A and I cycles and that which is utilized for B and X cycles, as described with reference to the cycle chart of FIG. 35 and FIG. 36, supra.

The LOAD MEMORY signal in FIG. 38 is generated by an AND circuit 662 in response to an OR circuit 664 during any ADD or MOVE DATA operation as indicated by the ADD signal on line 458 or the MOVE DATA signal on line 446; the AND circuit 662 however responds only during a B cycle as indicated by the signal on line 421. The LOAD MEMORY SIGNAL on line 528 is passed through an inverter 666 so as to generate the REGEN MEMORY SIGNAL on line 532. Thus, this is automatic, in that whenever a load operation is not to occur there will automatically be a regeneration of all signals into the memory.

12. START, STOP AND ERROR CIRCUITS

*a. Reset and other switches*

The CHECK TEST circuit, stop circuits and blocking of the computer clocking circuits are all disclosed and claimed in a commonly owned co-pending application of William McGovern, Patent No. 3,257,546 entitled "Computer Check Test," filed on even date herewith.

Figures 39, 40:
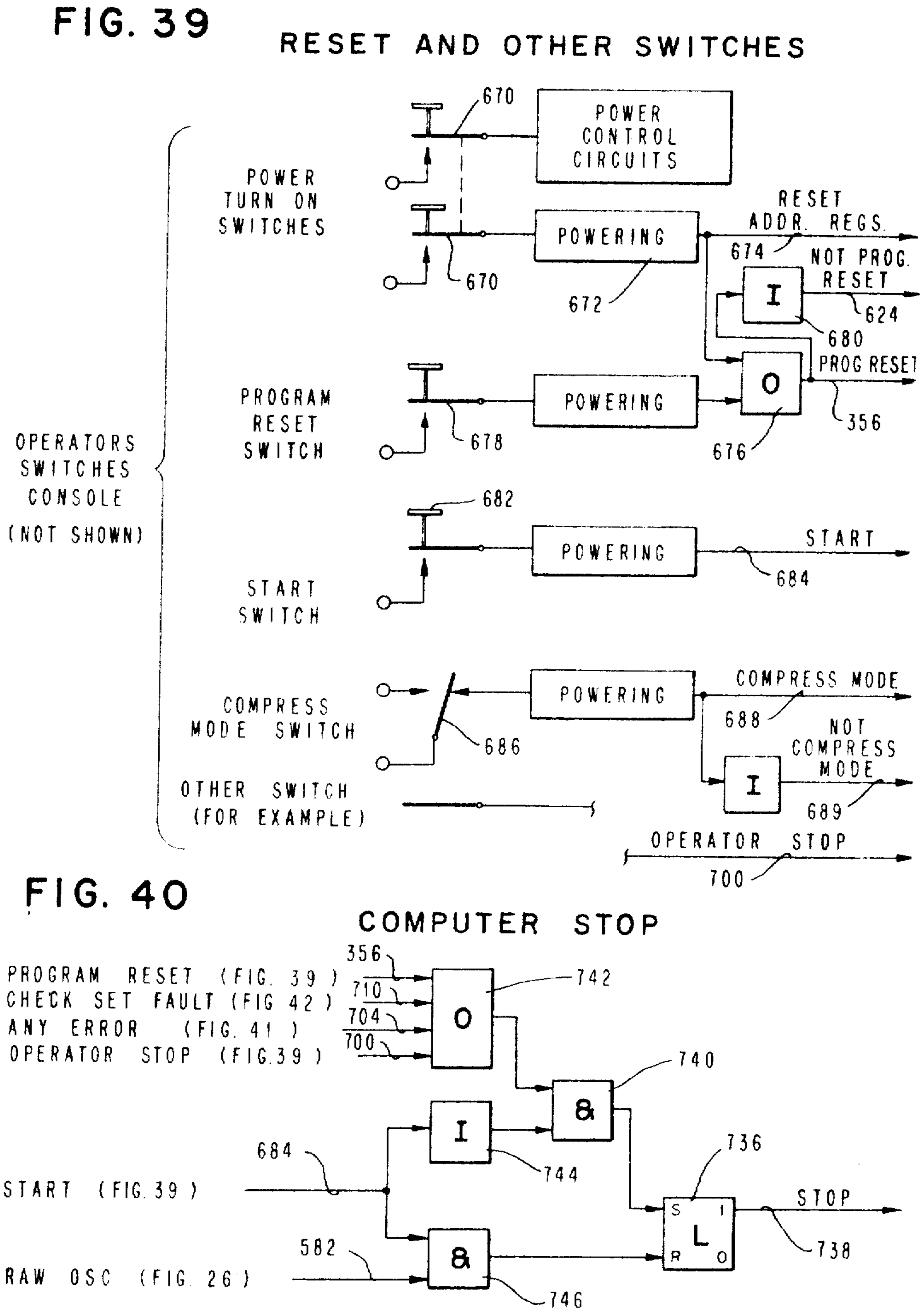

FIG. 39 shows some basic switches which may be placed on an operator's console (not shown). For instance, a multiple POWER TURN ON SWITCH 670 may be used to turn on the power, and after powering by circuitry 672 (not shown in detail), comprises a RESET ADDRESS REGISTERS signal on a line 674. This signal is also fed to an OR circuit 676 and will generate the PROGRAM RESET signal on line 356. The OR circuit 676 will also respond to a powered input from a PROGRAM RESET switch 678 on the operator's console. The PROGRAM RESET line 356 is also fed to an inverter 680 so as to generate the NOT PROGRAM RESET signal on line 624. A start switch 682 generates a start signal on a line 684.

Other switches may be provided as necessary, and as an example, a COMPRESS MODE switch 686 is shown generating both a COMPRESSED MODE signal on a line 688 and a NOT COMPRESS MODE signal on a line 689. This may be utilized to cause the computer to operate in a different fashion, for instance. Also indicated is the fact that switches and circuits might be provided to generate an OPERATOR STOP signal on a line 700. It should be understood that any number of switches which could cause computer response may be provided for by those skilled in the art, and the circuit of FIG. 39 is merely illustrative thereof.

*b. Error stop*

Figure 41:
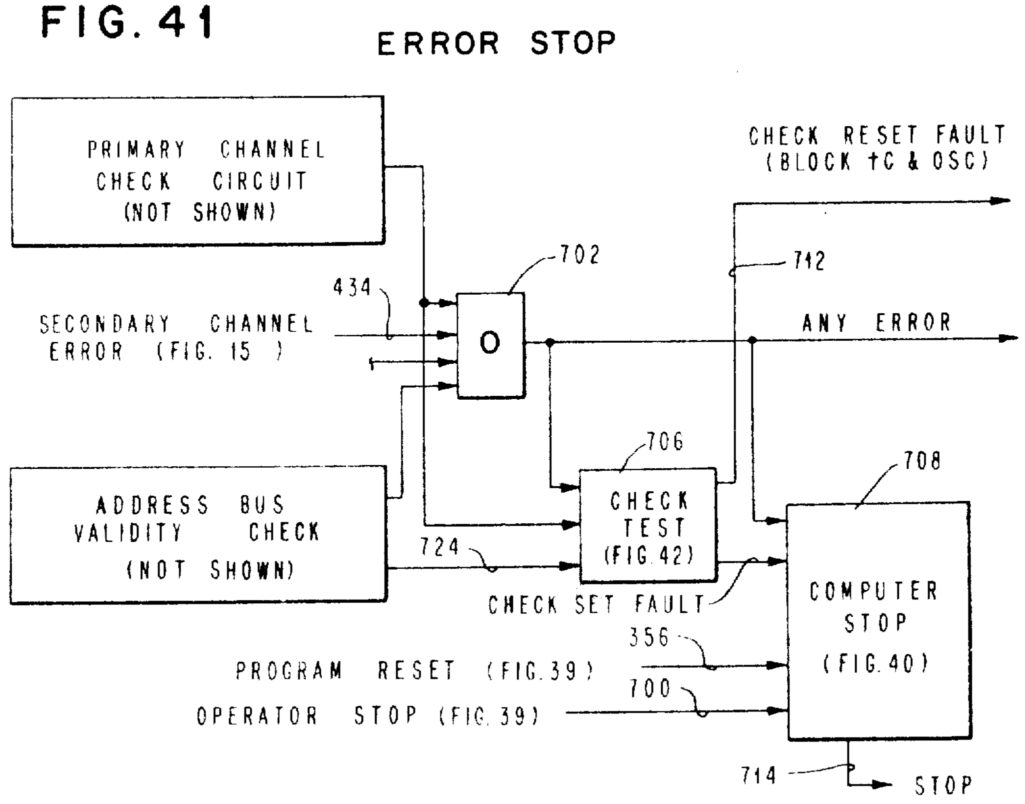

Referring briefly to FIG. 41, Sheet 25, a block diagram of an error stop circuit suitable for use in the present embodiment is shown. Therein, an OR circuit 702 may respond to a plurality of circuits to generate an ANY ERROR signal on a line 704. For instance, the OR circuit 702 may respond to PRIMARY CHANNEL ERROR circuits (not shown elsewhere herein) or to ADDRESS BUS VALIDITY CHECK circuits shown in FIG. 115, or to the SECONDARY CHANNEL ERROR signal on line 434, which is generated in FIG. 15. The ANY ERROR signal on line 704 is applied to a CHECK TEST circuit 706 and to a COMPUTER STOP circuit 708. These circuits will be described in successive paragraphs. The CHECK TEST circuit 706 also responds to the ADDRESS BUS VALIDITY CHECK circuits of FIG. 115 and the SECONDARY CHANNEL ERROR signal on line 434, and operates to generate a CHECK SET FAULT signal on a line 710 and a CHECK RESET FAULT signal on a line 712 (which is symbolic also of the NOT CHECK RESET FAULT signal on line 626, as shown in FIG. 42). The COMPUTER STOP CIRCUIT 708 responds to the ANY ERROR SIGNAL on line 704, the CHECK SET FAULT signal on line 710, the PROGRAM RESET signal on line 356, and the OPERATOR STOP signal on line 700. The COMPUTER STOP circuit 708 generates a STOP signal on line 714.

*c. Check test*

The CHECK TEST circuit 706 is shown in FIG. 42. The object of this circuit is to insure that the ordinary validity and error checking circuitry, throughout the system, is operating correctly; that is, to insure that lack of an error signal means that there has been no errors and that the lack of an error signal cannot mean that perhaps one of the error checking circuits is itself disabled.

The CHECK TEST circuit of FIG. 42 comprises essentially a latch 720 which is set by an AND circuit 722 in response to the ADDRESS BUS ERROR signal on line 724, the SECONDARY CHANNEL ERROR signal on line 434, the ANY ERROR signal on line 704, and time B4. Thus, the concurrent presence of ANY ERROR, ADDRESS BUS ERROR, SECONDARY CHANNEL ERROR (and any other errors as may be provided in a particular embodiment), causes the AND circuit 722 to set the CHECK TEST latch 720. It is to be noted that this AND circuit (722) operates only at time B4; at a later time, when the time B4 input is no longer present, the AND circuit 722 must be disactivated, thereby providing *no* input to an inverter 726, so that there *will* be an input to an AND circuit 728. At a following time A2, the AND circuit 728 will reset the latch 720.

Thus, the check test latch 720 must be set during time B4 due to the concurrent presence of all errors, and must be reset at time A2 due to the lack of an error indication of the AND circuit 722. The reason for this is that all of the checking circuits have errors forced into them during time B4, to be sure that the error checking circuitry can recognize the errors therein. For instance, in FIG. 15 (Sheet 11), the AND circuit 415 will be blocked at time B, so that there will be no bits at all on the SECONDARY CHANNEL; thus, there will be a SECONDARY CHANNEL ERROR on line 434. In order to insure that the AND circuit 722 has not been disabled or frozen, in the ON condition, it is required that the lack of a signal out of the AND circuit 722 will reset the latch, at time A2, by the inverter 726 and the AND circuit 728. An AND circuit 730 is provided to test the out-of-phase output of the latch 720 at time A1; if the latch is not set, there will be an output from said out-of-phase output, and the AND circuit 730 will then generate the CHECK SET FAULT signal on line 710. However, if all circuits are operating properly, then the check test latch 720 will be set at time A1 (it having been set at the previous time time B4). Immediately following the testing of the latch to see if it is properly set (at time A1), the AND circuit 728 will respond to the time A2 signal to reset the latch. Thereafter at time B in the following cycle, AND circuit 732 will test the latch to be sure it is reset. If the latch is not reset at time B (which just precedes a second time B4), then the AND circuit 732 will generate a CHECK RESET FAULT signal on line 712.

In summation, when errors are forced into the circuit at time B4, the latch should be set if everything is operating properly. At the following time A1, the AND circuit 730 tests the latch and will generate a CHECK SET FAULT signal on line 710 if the latch did *not* set properly. Immediately thereafter, the latch should be reset by AND circuit 728, and this is tested by AND circuit 732 which will generate a CHECK RESET FAULT signal on line 712 if the latch is not properly reset at time B. The CHECK RESET FAULT signal on line 712 is passed to an inverter 734 which generates the NOT CHECK RESET FAULT signal on line 626.

*d. Computer stop*

A STOP signal on a line 738 is generated in FIG. 40 by a latch 736 which is set by an AND circuit 740 in response to an OR circuit 742 and an inverter 744. The OR circuit 742 responds to any one of the following: PROGRAM RESET on line 356; CHECK SET FAULT on line 710; ANY ERROR on line 704; and OPERATOR STOP on line 700. The inverter 744 responds to the START signal on line 684. Thus, the latch 736 will be set any time that the START signal is not present, whenever there is any one of the four inputs to the OR circuit 742. The latch 736 is reset by an AND circuit 746 in response to the START signal and the RAW OSCILLATOR signal on line 582. The purpose of the AND circuit 746 is to guarantee that a start condition can be initiated only during the positive portion of RAW OSCILLATOR; this insures phase-locking of the circuitry as described hereinbefore, so that CP1 will be the first clock pulse to be generated once the computer is started by the resetting of the stop signal latch 736.

Returning now to the oscillator circuit of FIG. 26 (Sheet 18) the STOP signal on line 738 is applied to an AND circuit 748 together with time A and CP1. Thus, the AND circuit will deliver a signal to an OR circuit 750 at time A1 whenever the STOP signal appears on line 738. The OR circuit 750 can also respond to an AND circuit 752 due to the concurrent presence of the CHECK RESET FAULT signal on line 712 and CP1. The output of the AND circuit 750 comprises a MACHINE IS STOPPED signal on line 754, which is applied to the OR circuit 584, described hereinbefore (Section 11*a*). The purpose of applying the MACHINE IS STOPPED signal to the OR circuit 584 is to cause the OSCILLATOR to be apparently frozen in the positive oscillator condition whenever the machine is, in fact, stopped. Thus, starting of the machine always takes place with positive OSCILLATOR on line 586 and positive OSCILLATOR DELAYED on line 590. Notice that RAW OSCILLATOR on line 582 continues to follow the SQUARE WAVE OSCILLATOR circuit 580 so as to provide proper gating for the START signal on line 684 (FIG. 40) in order to permit it to reset the stop latch. It is the disappearance of the STOP signal on line 738 (FIG. 40) which actually causes the machine to begin running again. The MACHINE IS STOPPED signal on line 754 may be utilized as necessary throughout the system to indicate the fact that no computation may be achieved due to the stopping of the oscillator itself, which stopping of the oscillator is actually accomplished by forcing the OSCILLATOR and OSCILLATOR DELAYED signals positive, by means of the OR circuit 584.

*e. Summation of error stop*

Referring briefly to the cycle chart of FIG. 35, consider that the CHECK TEST latch is to be reset at time A2 at the end of a first cycle. At the next time, B3, the AND circuit 732 (FIG. 42) is gated by a *t*B signal, and, assuming that the latch has not been reset (due to a fault in the check test circuit), there will be a CHECK RESET FAULT signal on line 712. This will cause the inverter 734 to cease generating the NOT CHECK RESET FAULT signal on line 626. At the start of time B3 (FIG. 25), BG1 is negative and BG2 is positive. Referring to FIG. 27, since the OSCILLATOR DELAYED signal is applied directly to the inverter 610, BG1, can change, but BG2 can no longer change. Thus, the circuit of FIG. 27 will continue to provide the BG2 signal throughout time B, due to the operation of the CHECK TEST circuit in FIG. 42. The CHECK RESET FAULT signal is also applied to the OSCILLATOR circuit of FIG. 26. This signal will cause the MACHINE IS STOPPED signal on line 754, and cause the OR circuit 584 to force the OSCILLATOR and OSCILLATOR DELAYED signals into a steady positive condition. However, the CHECK RESET FAULT will not operate the AND circuit 752 until clock pulse 1 (CP1). Referring to the BASIC TIMING CHART of FIG. 25, and to the CLOCK PULSES 1–4 circuit of FIG. 30, it will be seen that when BG1 is frozen positive at time 3, the next negative swing of the OSCILLATOR (which looks like it will occur at time 4) will actually cause the generation of clock pulse 2 (CP2), due to the fact that positive BG2 and negative OSCILLATOR causes an AND circuit 613 (FIG. 30) to generate CP2. The next thing that will occur is that BG1 and the oscillator both go poistive, thus causing CP1 to be generated. As soon as CP1 is available to the AND circuit 752 (FIG. 26) the OR circuit 750 causes the OR circuit 584 to force the OSCILLATOR signals positive. Therefore, the machine is shut down, with BG1 ON, BG2 ON (FIG. 27), and CP1 being generated, due to the fact that the OSCILLATOR is forced positive by the OR circuit 584.

Thus there has been described a combination of timing signals and start/stop signals together with the CHECK TEST CIRCUITRY of FIG. 42 which controls the starting, stopping, checking and running of the machine, and which keeps all of these functions phased-locked in such a fashion that whenever the machine is started, CP1 will be the first clock pulse to be generated, as shown in the basic timing chart of FIG. 25. This in turn guarantees that time A will be set whenever the machine is restarted, as was illustrated in the MAIN CYCLE CLOCK ILLUSTRATION, FIG. 21 (Section 11*d*).

13. INSTRUCTION CIRCUITS

*a. Brief description*

FIG. 43 briefly illustrates the INSTRUCTION CIRCUITS which receive information from the PRIMARY CHANNEL 216 and store it in an INSTRUCTION REGISTER 760. The INSTRUCTION REGISTER is capable of receiving all of the eight bits of a character, including the word mark bit, but will pass along only seven of these bits to an INSTRUCTION DECODER 762 by means of a seven bit bus 764. The output of the instruction decoder 762 may comprise any number of instructions which can be decoded from six bits of data and a parity bit (C bit), and this has been exemplified in the 29 bit bus 766. However, for purposes of illustration, and in order to keep the overall description of this embodiment sufficiently simple so as to be comprehensible, only three instructions have been shown. These are the ADD instruction on line 458, the MOVE DATA instruction on line 446, and a NO-OP instruction on a line 768. All of the instructions may feed an INSTRUCTION GROUPING ENCODER 770 which group certain instructions for common purposes: for instance, the STANDARD A CYCLE OP signal on line 420 was utilized to gate A characters onto the SECONDARY CHANNEL in circuit of FIG. 15 as described in Section 9*a* hereinbefore. The output of the INSTRUCTION GROUPING ENCODER 770 may be applied throughout the system to cause various necessary functions to be performed, as illustrated by the buses 772 which include such instruction grouping lines as the STANDARD A CYCLE OP line 420 described hereinbefore.

*b. Instruction register*

The instruction register 760 is shown in detail in FIG. 44. The INSTRUCTION REGISTER comprises a plurality of latches 774, there being one latch for each of the seven bits of a character (exclusive of the WM bit). Each of the latches may be reset by a reset signal on a line 776 which is generated by an AND circuit 778. The AND circuit 778 is responsive only if a WM bit is present as the character approaches the register on the PRIMARY CHANNEL 216. This is so because all instructions are defined to include a WM bit in the first character which character contains the OP (or operation portion) of the instruction. If there is no WM bit at this time, a companion AND circuit 780 will generate an ERROR signal on a line 782, which error may be utilized in any well known way within the system. In the present embodiment for instance, it might be applied to the AND circuit 702 (FIG. 41) to comprise one of the inputs to the ANY ERROR SIGNAL on line 74 (FIG. 41). A $\overline{C}$ bit is used to correct for the removal of the WM bit, so that parity is maintained; the ERROR signal (AND 782) may be used to block the decoding of instruction, if desired (not shown herein).

The AND circuits 778, 780 both respond to another AND circuit 784 which will have an output only during I OP portion of an I CYCLE, at time E EARLY, due to the respective signals on line 786, 788, respectively. Thus, during an instruction cycle, as designated by an I CYCLE signal on line 788, the first portion of the I CYCLE (which is determined by an I RING clocking circuit to be described in Section 16, infra) will be indicated by an I OP signal on a line 786. This means that the operational part of the instruction should appear on the primary channel, and if there is a WM bit accompanying the other bits of the first character, this is recognized as an instruction by the AND circuit 778. If there is no WM bit, this is taken to be an error, as described above. The reset signal on line 776 therefore will reset the INSTRUCTION REGISTER latches 774 only when a valid instruction is about to enter the register. The reset signal on line 776 is also applied to a delay circuit 790 to generate a set signal on a line 792; this is applied to a plurality of AND circuits 794 each of which corresponds to one of the bits of the incoming character on the PRIMARY CHANNEL. Thus, the first instruction time will receive characters from the PRIMARY CHANNEL, the latches will be reset and these signals will be passed through the AND circuit 794 so as to set corresponding latches 774. The output of the latches 774 comprise INSTRUCTION REGISTER bits 796, which are applied to the INSTRUCTION DECODER 762.

*c. Instruction decoder/encoder*

Figure 45:
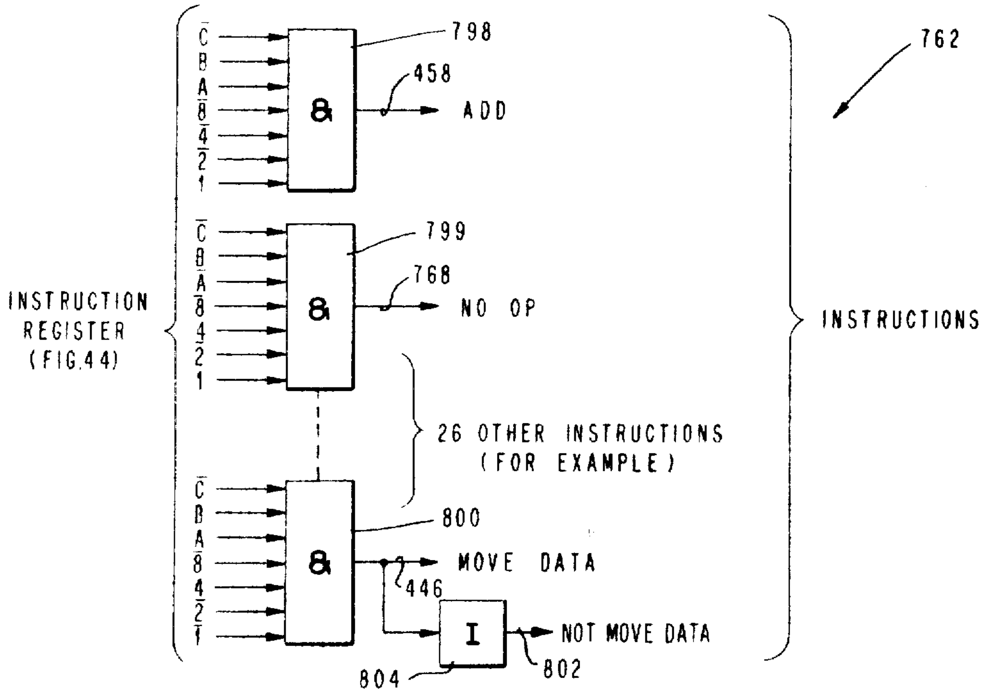

The INSTRUCTION DECODER 762 is shown in FIG. 45 to comprise essentially a plurality of AND circuits 798–800. The AND circuit 798 responds to the B-bit, A-bit and 1-bit, to generate an ADD instruction, the AND circuit 799 responds to the B-bit, 4-bit and 1-bit to generate a NO OP instruction, and the AND circuit 800 responds to the B-bit, A-bit, and 4-bit to generate a MOVE DATA instruction. Other instructions can be decoded as necessary to perform whatever instructions the computer designer desires. However, in order to illustrate an embodiment of the invention herein, only the ADD, MOVE DATA, and NO OP instructions will be utilized. The output of the INSTRUCTION DECODER 762 can be inverted so as to provide signals which are complementary to the instruction signals, as illustrated by the NOT MOVE DATA signal on a line 802, which is generated by an inverter 804 in response to the MOVE DATA signal on line 446.

Figure 46:
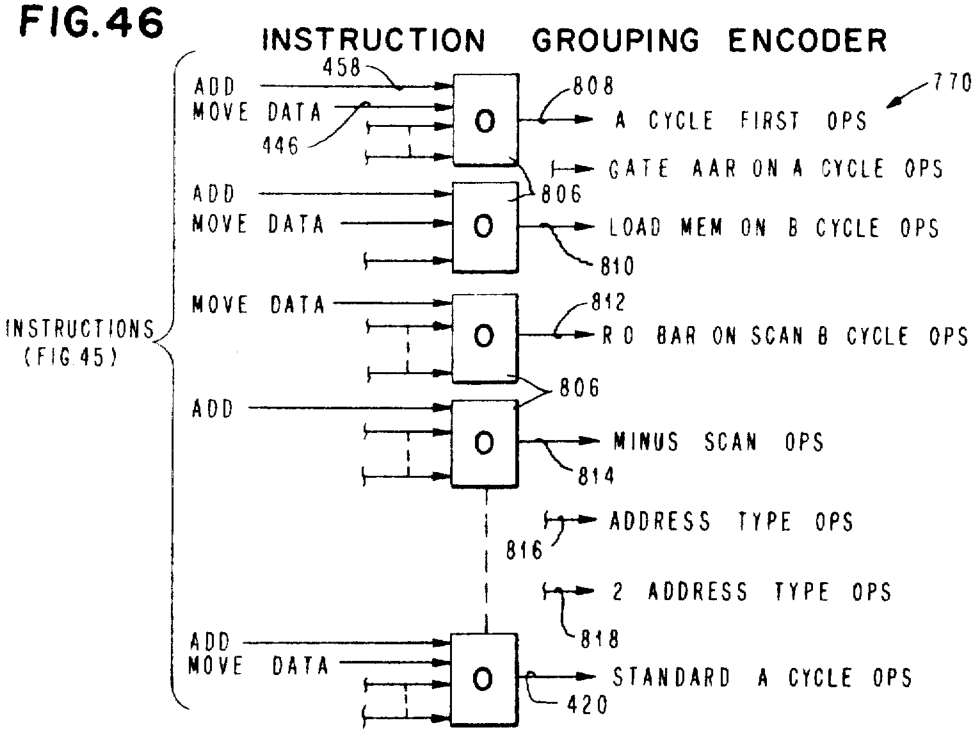

The instruction grouping encoder is illustrated in FIG. 46, and comprises a plurality of OR circuits 806 each of which may respond to any number of instructions to generate a signal to be utilized for causing a particular response in the system whenever any one of the input instructions is present. For instance, the OR circuit 806 which is shown at the top of FIG. 46, responds at least to the ADD and MOVE DATA signals to generate an A CYCLE FIRST OPS signal on a line 808. Other combinations may generate a LOAD MEMORY on B CYCLE OPS signal on line 810, a READOUT B ADDRESS REGISTER ON SCAN B CYCLE OPS signal on line 812, a MINUS SCAN OPS signal on a line 814, ADDRESS TYPE OPS on a line 816, TWO ADDRESS TYPE OPS on a line 818, as well as the STANDARD A CYCLE OPS signal on line 420. The instruction grouping signals shown as outputs in FIG. 46 are illustrative only, and it should be apparent to persons skilled in the art that any combination of instructions might be generated with an appropriate OR circuit so as to generate a common response to suit any particular embodiment of a computer employing the present invention.

d. OP modification circuits

Each instruction includes an operational portion as just described, and many include one or two addresses (standard operations such as ADD and MOVE DATA will each contain a pair of addresses), and may also have an operation modifier which is useful to further define the instruction to be performed. The operation modifier, if used is the last character of a multi-character instruction read out of memory. In order to determine the operation modifier, it is necessary to sense the appropriate time when an operation modifier might be received, to store it in a register, and to decode it. As an example, an operation modifier attached to a MOVE DATA instruction can determine whether all of the bits of the characters are to be moved, or just the numerical portions (8, 4, 2, 1) or just the zone portions (A, B), and so forth.

Figure 47:
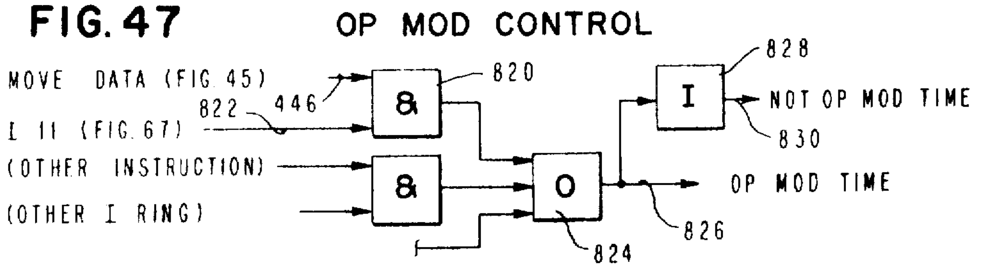

The recognition of the operation modifier portion of an instruction is accomplished by the OP MOD CONTROL circuit of FIG. 47. Therein, an AND circuit 820 will respond to a MOVE DATA signal on a line 446 and an instruction timing signal I11 on a line 822 to pass the signal through an OR circuit 824, which generates an OP MOD TIME signal on a line 826. The OP MOD TIME signal on line 826 passes through an inverter 828 to generate a NOT OP MOD TIME signal on a line 830. The OR circuit 824 can respond to a variety of other instructions and timings as required. A determination of the inputs to any particular AND circuit such as AND circuit 820 shown in FIG. 47, is based on the normal length of an instruction: for instance a MOVE DATA instruction includes the OP portion (which is a first character defining the type of instruction), followed by a five character A address and a five character B address. Thereafter, the operational modifier character will appear. The timing of this is determined by the I RING (to be described hereinafter), the I RING having stages called I OP, I1, I2 . . . I11 and I12. Since I OP time takes care of the instruction portion and I1 through I10 takes care of the 10 address characters, it is obvious that the OP MODIFIER must appear concurrently with I11, and, therefore, this determines the time in a MOVE DATA instruction when a modifier will appear.

Figure 48:
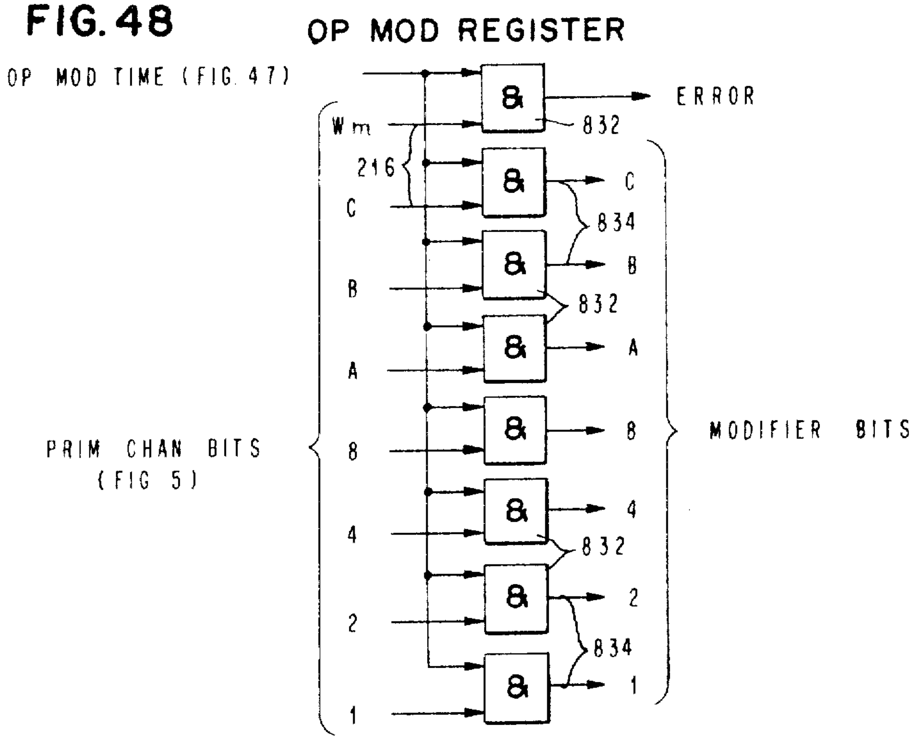

The OP MOD TIME signal on line 826 is utilized in the OP MOD REGISTER, FIG. 48, to gate the various bits from the PRIMARY CHANNEL 216 through a plurality of AND circuits 832, there being one AND circuit for each of the bits which can be utilized in an operation modifier character. Notice however, that the WM bit will generate an error if it appears, since no word mark should appear during OP MOD TIME; this is true because instructions are separated from each other by the WM bit which appears over the operational part, and the OP MODIFIER part should have no WM bit in its character. The remainder of the AND circuits 832 generate MODIFIER BITS on a seven bit bus 834.

Figure 49:
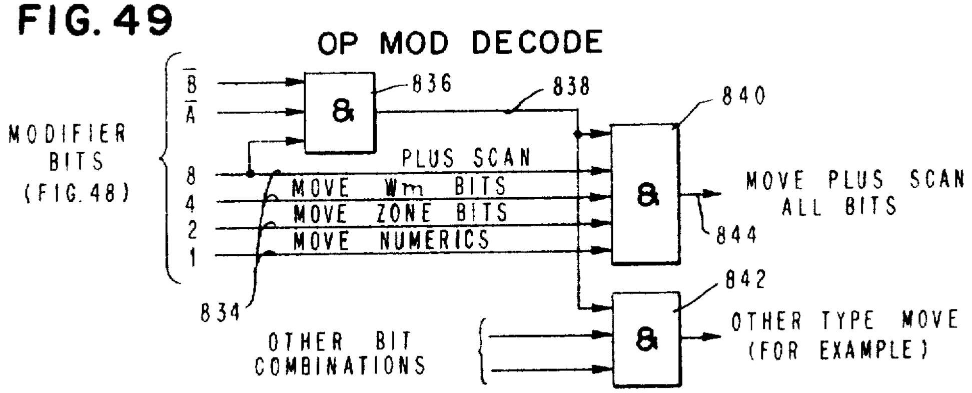

The MODIFIER BITS on the bus 834 are applied to a plurality of OP MOD decode circuits, as shown in FIG. 49. FIG. 49 is merely illustrative, but shows that the modifier bits can be decoded in the same fashion as instructions are decoded (FIG. 45, hereinbefore) so as to create any modification signal which may be desirable. In FIG. 49, an AND circuit 836 responds to NOT A, NOT B and 8 to generate a signal which is roughly equivalent to a MOVE DATA signal on a line 838, this line being applied to the AND circuits 840 and 842. The AND circuit 840 responds to the 8, 4, 2 and 1 bits (of the modifier bits on line 834) and generates a MOVE PLUS SCAN ALL BITS signal on a line 844. The AND circuit 842 may respond, for example, to any other bit combination as necessary.

e. Summation of instruction circuits

In summation, the instruction circuits recognize the operational portion of an instruction, and if the instruction is the type which may have a modifier bit, permits receiving a character indicative of a modification to the instruction, and generates signals as necessary to accomplish the instruction in the manner determined by the modifier. Only three instructions, and one modifier are shown in the present example, but there is no limit to the number of instructions, and modifications thereto, which may be developed within the bit capacity of a character. An explanation of the various instructions and how they are performed follows in later sections herein.

14. SPECIAL ADDRESSING CONTROLS a. Plus/minus scan

Figure 86:
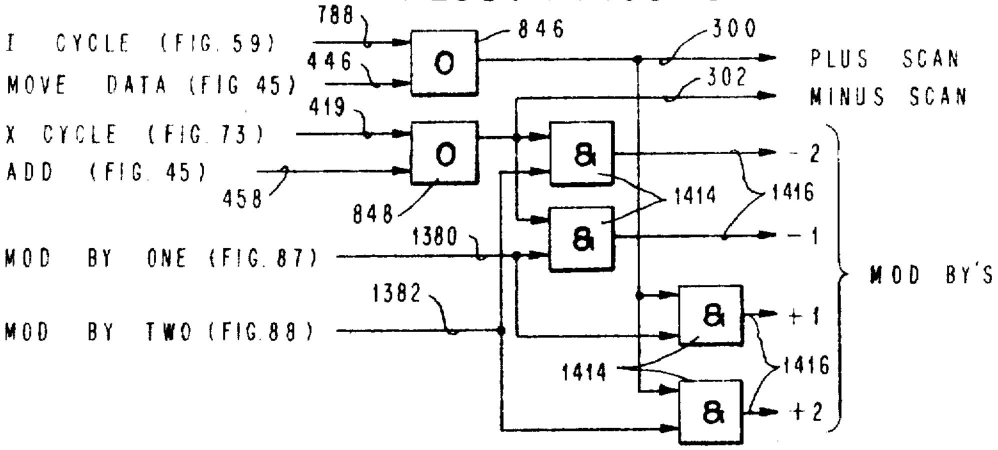

Referring briefly to FIG. 86 (Sheet 48), the PLUS SCAN and MINUS SCAN signals on lines 300 and 302, respectively, are generated by corresponding OR circuits 846, 848. The PLUS SCAN signal on line 300 is generated whenever there is an I CYCLE (788), or whenever a MOVE DATA instruction (446) is to be performed (an OP modifier could be generated to cause MOVE DATA instruction to be executed in MINUS SCAN, if desired). On the other hand, the MINUS SCAN signal on line 302 is generated whenever there is an X CYCLE (419) or whenever an ADD operation (458) is to be performed. The ADD operation requires scanning the memory from high address to low address (minus scan) in order to take the right-most characters first and work toward the left, as is done in ordinary arithmetic problems. Since an X CYCLE takes place only during indexing and since indexing requires the adding together of two address components, the X CYCLE must be performed by scannning memory in a minus direction also. On the other hand, in this embodiment, instruction read out and moving of data is done from low address to high address much in the way that human language sentences are read going from left to right. Therefore, the OR circuit 846 will generate the PLUS SCAN signal on line 300 whereas the OR circuit 848 generates the MINUS SCAN signal on line 302 to acquire the necessary flexibility in reading MEMORY in this embodiment.

b. Mar odd/even

FIG. 50 (Sheet 29) is a chart showing the well known two-out-of-five code (sometimes referred to herein as "2/5 code") in comparison with decimal values. Thus a decimal ZERO is generated by a 2-bit and an 8-bit, decimal ONE equals a 0-bit and a 1-bit, decimal TWO equals a 2-bit and a 0-bit, decimal THREE equals a 2-bit and a 1-bit, and so forth. In other words, the two-out-of-five code is a BCD code utilizing the 0-bit whenever only a single bit would be used, utilizing 8 and 2 to generate a demical ZERO, and utilizing 8 and 4 to generate decimal SEVEN. This code is chosen in many cases because it permits absolute error checking, it being impossible to have a correct code if more than two bits or less than two bits are present within it.

Figure 102:
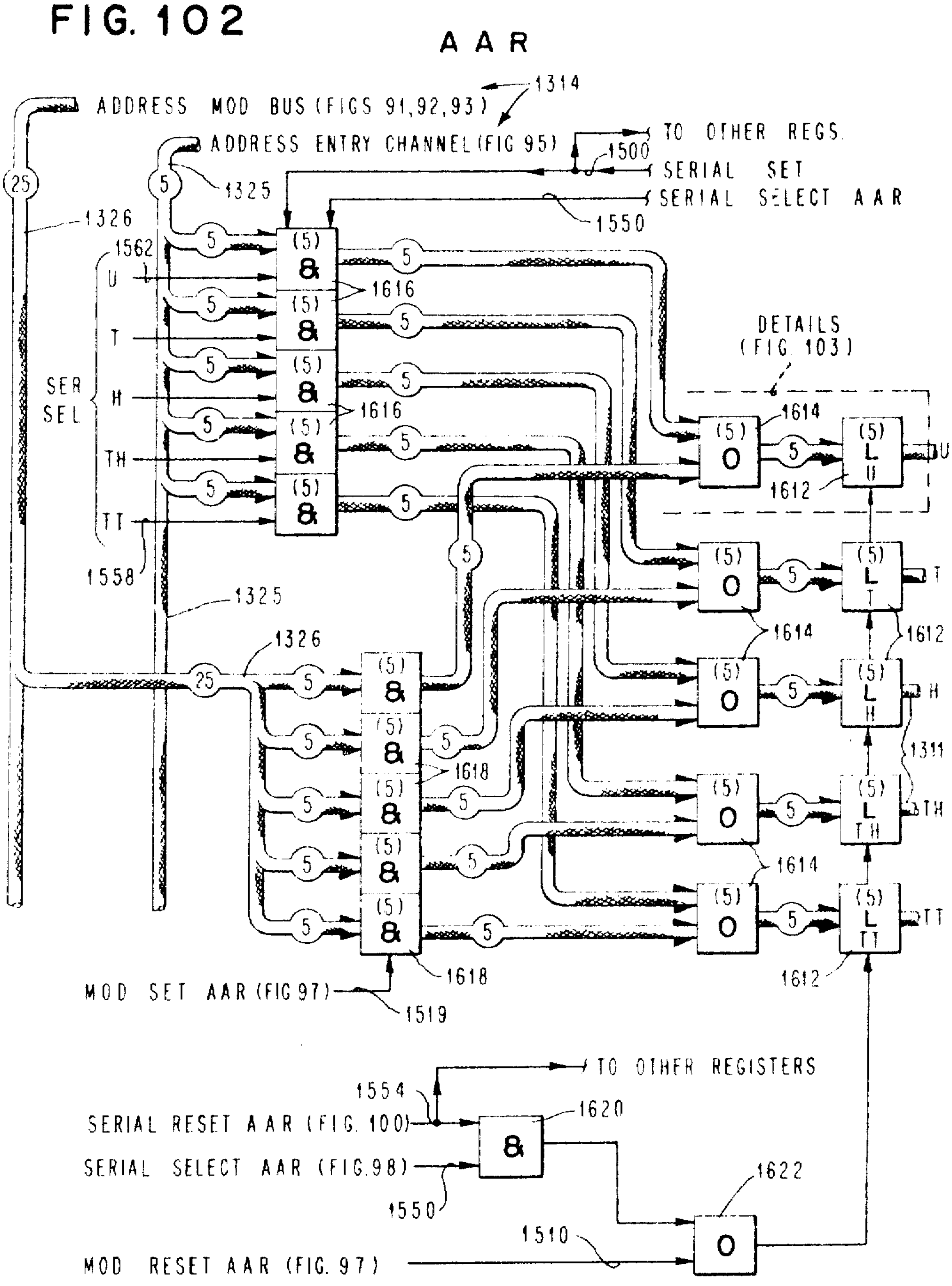
Figure 103:
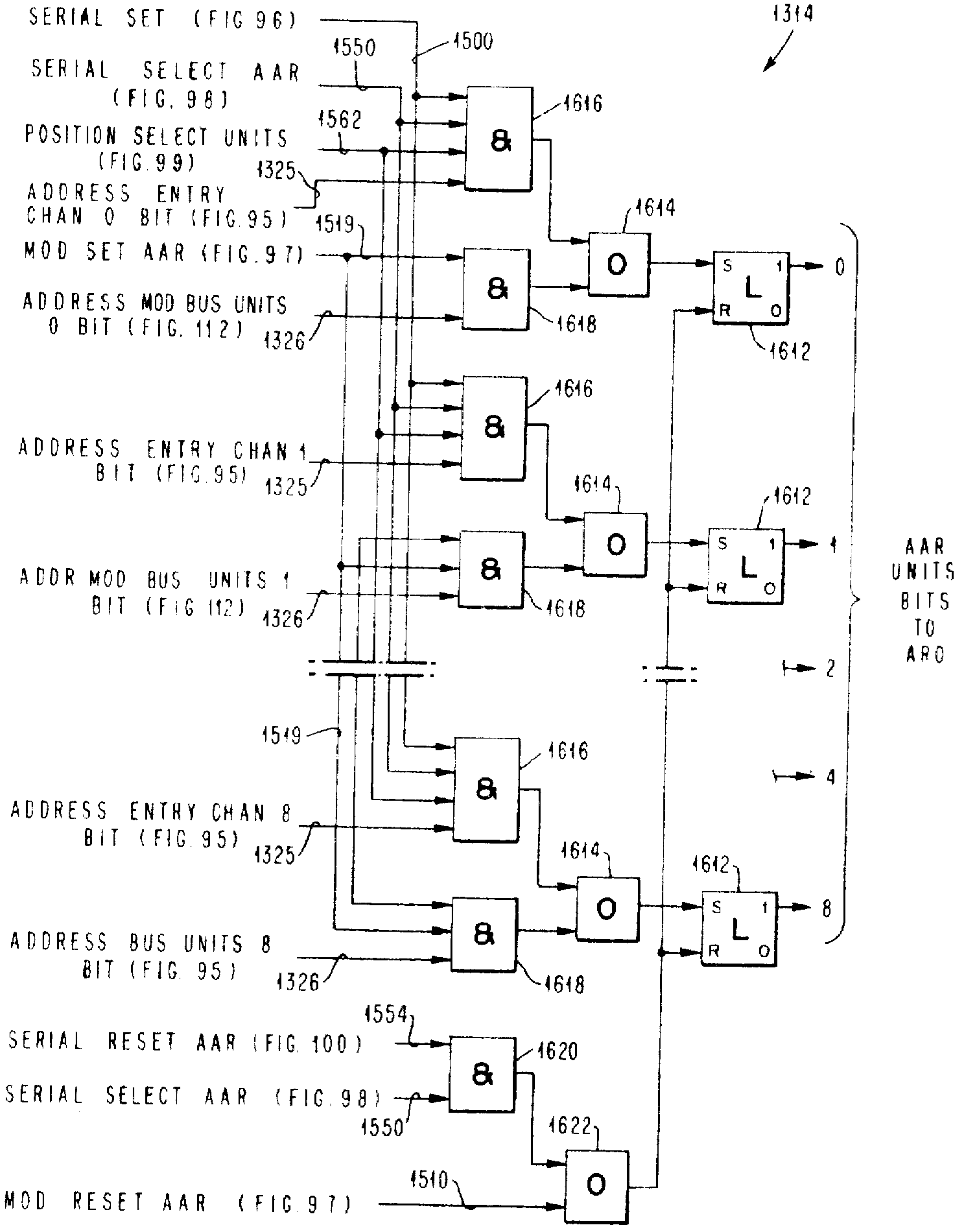

FIG. 51 illustrates the MAR ODD/EVEN circuit which generates the MAR ODD/EVEN signals on lines 850 and 852 respectively. The output from the MAR (MEMORY ADDRESS REGISTER) units position (shown in FIG. 113 and described in detail in Section 25, hereinafter) are applied by a 5-bit bus 854 to an AND circuit 856 thereby to recognize a SEVEN in AND circuit 856 and to recognize all other odd characters by the 1-bit applied to the OR circuit 858, in accordance with the two-out-of-five code as shown in FIG. 50. Thus, the OR circuit 858 recognizes all the ODD values of the memory address register units position, to generate the MAR ODD signal on line 850; this signal is applied to an inverter 860 which will generate the MAR EVEN signal on line 852 whenever there is no ODD signal on line 850. FIG. 52 illustrates that the BAR (B ADDRESS REGISTER which controls addressing of the B field) is monitored in the same fashion as the MAR to generate a BAR EVEN signal on a line 862 and BAR ODD signal on a line 864 in response to a 3-bit bus 865. The B address register is not shown in detail, but is illustrated in FIG. 300, and is similar to the A address register (AAR), the details of which are shown in FIGS. 102 and 103 to be described in Section 23*d*, hereinafter. It suffices at this point to understand that it is easy to determine whether the address in the memory address register is odd or even, and to likewise determine whether the address stored in the B address register is odd or even as illustrated in FIGS. 51 and 52, in view of the chart shown in FIG. 50.

*c. CG1 and CG2 controls*

The CHARACTER GATE signals CG1 and CG2 on lines 304 and 306 are generated and the circuit of FIG. 53 which comprises essentially a pair of latches 862, 864, respectively. As described briefly hereinbefore, if two characters are to be processed, CG1 will appear first followed by CG2. If only one character can be used, and it is the first character approached in the direction of scan, then only CG1 will appear; if the single character to be processed is the second character approached in the direction of scan, then the only signal to appear will be CG2. The circuit of FIG. 53 accomplishes this result.

The latch 862 which generates the CG1 signal on line 304 may be set by an OR circuit 866 in response to either an AND circuit 868 or an AND circuit 870. The AND circuit 868 responds to a PLUS SCAN (300) when the MAR address is EVEN (852) and the AND circuit 870 responds to a MINUS SCAN (302) when the MAR address is ODD (850). This accomplishes the result of generating a CG1 signal when the first character reached is to be processed. If the MAR is EVEN, and scanning is from low address to high address (PLUS SCAN), the even character is the first character reached. On the other hand, if scanning is from high address to low address (MINUS SCAN), then the odd character of the pair is the first to be reached.

The latch 864 which generates the CG2 signal on line 306 is set by an OR circuit 872 which may respond to any one of three AND circuits 874–876. The AND circuit 874 responds to PLUS SCAN when the MAR is ODD and the AND circuit 875 responds to MINUS SCAN when the MAR is EVEN. The AND circuit 876 may respond to a PROCESS 2ND CHARACTER signal on a line 878 at time F3. The PROCESS 2ND CHARACTER signal on line 878 is generated in a circuit shown in FIG. 58, to be described in Section 14*f*, hereinafter. This signal will appear whenever two characters can be processed, and the AND circuit 876 therefore sets the latch 864 in order to account for the situation when both characters are to be processed. Thus, CG2 can be generated for single character processing whenever only the second character of the two accessed by memory may be utilized, or CG2 can appear when both characters are to be processed.

Each of the AND circuits 868, 870, 874, 875 are gated at time C. The AND CIRCUIT 876 also supplies a signal to an OR circuit 880 which will reset the CG1 latch 862 whenever a CG2 signal is to be generated. Thus, in a two character processing situation, CG1 will come up first, and then CG1 is reset and CG2 is brought up; these latter two functions are accomplished by the AND Circuit 876. The OR circuit 880 will cause the latch 862 to be reset at time B, or if the PROGRAM RESET signal is applied on the line 356.

The CG2 latch 864 is reset by an OR circuit 882 at every time B, or in response to the PROGRAM RESET signal on line 356. Thus, both character gate latches are reset by PROGRAM RESET, are reset every cycle by time B, and the CG1 latch 862 is reset whenever the PROCESS 2ND CHARACTER signal appears on line 878.

*d. Match circuits*

Figure 57:
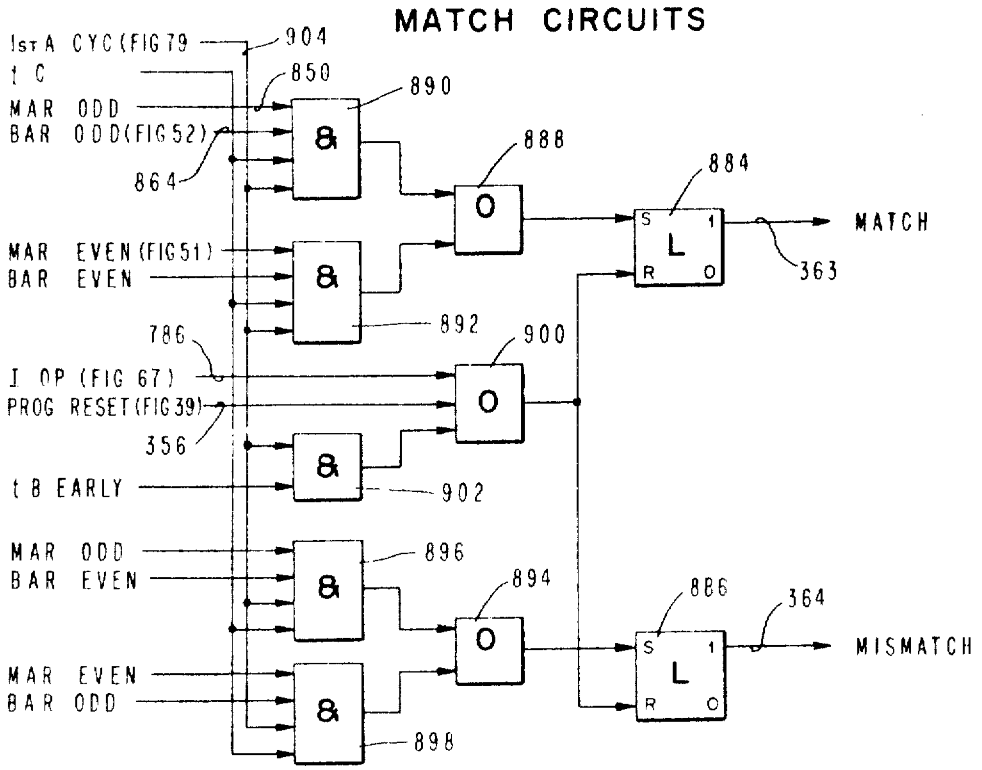

Turning ahead now to FIG. 57 (Sheet 31) the match circuits comprise essentially a pair of latches 884, 886 which generate the MATCH signal on line 363 and the MISMATCH signal on line 364 respectively. The MATCH latch 884 is set by an OR circuit 888 in response to either of two AND circuits 890, 892. Similarly, the latch 886 may be set by an OR circuit 894 in response to either of two AND circuits 896, 898. Both of the latches 884, 886 are reset by an OR circuit 900 in response to the I OP signal on line 76, the PROGRAM RESET signal on line 356, or an AND circuit 902. Each of the AND circuits 890, 892, 902, 896, 898 are gated only during the first A cycle of an operation as determined by a 1ST A CYCLE signal on a line 904 (which is generated in FIG. 79, described in Section 17*b* hereinafter). Likewise, the AND circuits 890, 892, 896 and 898 are gated only at time C; the AND circuit 902 is gated at time B early. Thus, the latches 884, 886 are reset in a 1ST A CYCLE at time B early and may thereafter be set as determined by the conditions of the inputs of the four other AND circuits in FIG. 57. The setting of the MATCH latch 884 in response to the AND circuit 890 will occur in response to AND circuit 890 whenever both the MAR and the BAR are ODD, and will occur in response to AND circuit 892 whenever the MAR and BAR are both EVEN. Similarly, the MISMATCH latch 886 will be set by the AND circuit 896 whenever the MAR is ODD and the BAR is EVEN or it may be set by the AND circuit 898 if the MAR is EVEN and the BAR is ODD. Thus, the MATCH signal on line 363 means that both MAR and BAR are ODD, or both are EVEN; the MISMATCH signal on line 364 means that one of them is ODD and the other one is EVEN. These signals are utilized in various circuits throughout the embodiment, but most particularly, in the remaining boundary adjusting circuits which are described in succeeding paragraphs.

*e. Process 2nd character controls*

Figure 58:
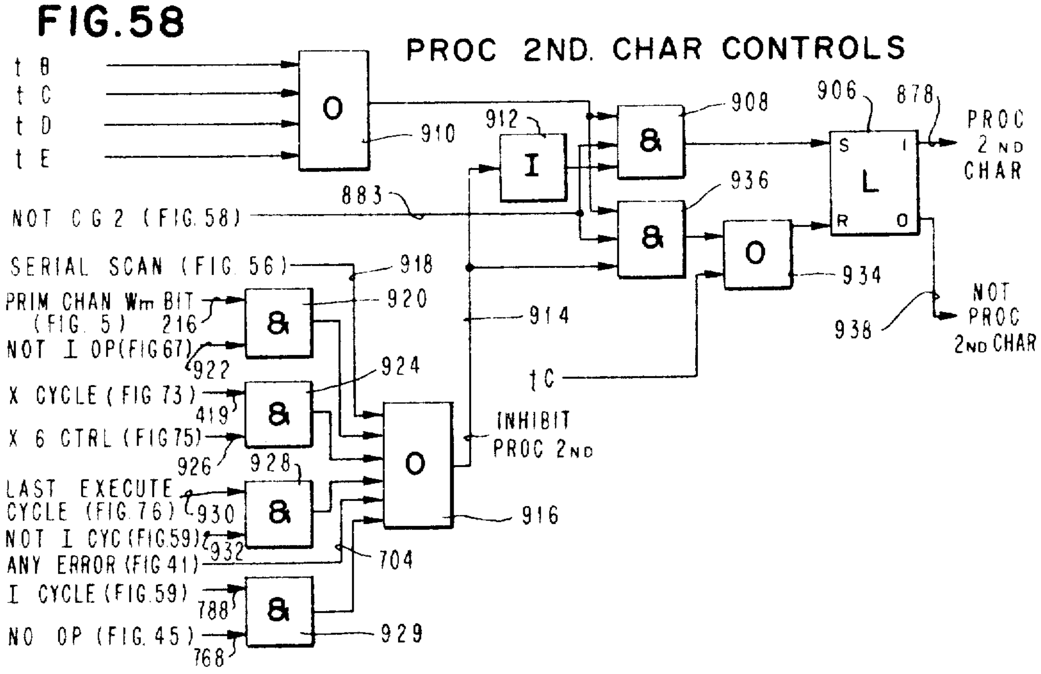

The PROCESS 2ND CHARACTER signal on line 878 is generated in FIG. 58 by a latch 906 which is set by an AND circuit 908 in response to any of the times B–E due to an OR circuit 910, whenever the NOT CG2 signal is on line 883, and there is no output from an inverter 912 which responds to an INHIBIT PROCESS 2ND CHARACTER signal on a line 914. Thus, the latch will be set unless PROCESS 2ND CHARACTER is to be inhibited (912) during any of the times in the first half of a cycle, if CG2 is *not* present.

The latch may be reset by an OR circuit 934 at time C or in response to an AND circuit 936 due to the INHIBIT PROCESS 2ND CHARACTER signal on line 914. The signal on line 914 is generated by an OR circuit 916 in response to the SERIAL SCAN signal on line 918, the ANY ERROR signal on line 704, or due to any one of four AND circuits 920, 924, 928, 929.

The AND circuit 920 recognizes the end of any field due to a PRIMARY CHANNEL WM bit on line 216, at other than first instruction read out time due to the NOT I OP signal on line 922. The AND circuit 924 prevents processing a second character during the last part (X6 CONTROL, line 926) of an X CYCLE (410). The AND circuit 928 is operative during the LAST EXECUTE CYCLE (930), before the I CYCLE latch is set (932) to inhibit processing of a second character. The AND circuit 929 is operative during any I CYCLE (788) wherein a NO OP instruction (768) has been recognized; this permits taking single character accesses through NO OPS so as to recognize as the first character being processed, the first part of a valid instruction following a sequence of NO OPS (which are used merely as fillers or blank within the program). Thus, process 2ND character may be set during the first half of any cycle unless the INHIBIT line (914) is activated. This will be activated at the termination of an execution, instruction, or index cycle; due to a NO OP; as the result of error; or by SERIAL SCAN.

*f. Serial scan*

Referring now to FIG. 56 (Sheet 30) the SERIAL SCAN signal on line 918 is generated by a latch 940 which may be set by an OR circuit 942 in response to an AND circuit 944. The object of the latch 940 is to recognize any conditions wherein only one character should be processed during each cycle, without regard to the number of useful characters which may be presented by either field. The key inputs on this circuit are a NOT ADDRESS BUS ERROR signal on a line 946 and an ADDRESS BUS ERROR signal on a line 948. These signals are generated in FIG. 115 (sheet 68) by an ADDRESS BUS VALIDITY CHECK circuit which is described in Section 26, hereinafter. Briefly, a SERIAL SCAN operation is characterized, in the present embodiment, by the B field address being one increment away from the A field address; that is, in a positive scan, the B address is one greater than the A address at the start of an operation. In order to recognize this condition, on the first A cycle of every execution time, the A address is modified by ONE, and it is then compared with the B address. If after modification, the A address is equal to the B address, then it is obvious that the A address was one increment away from the B address prior to modification. In order to compare the two addresses, they are simultaneously applied to a single bus which has a validity checking circuit on it. The addresses in this embodiment (as described in detail hereinafter) are manifested in the two-out-of-five code which is shown in FIG. 50 (Sheet 29), described in sub-section *b* above. The validity checker on the address bus will therefore indicate an error if there are any more or less than two of the five possible bits present at one time. With the modified A address and the B address on the address bus simultaneously, it is obvious that the validity checker will indicate an error unless the two addresses are identical (that is, comprising exactly the same two bits). In the SERIAL SCAN circuit of FIG. 56, the identity of the two addresses is manifested in the NOT ADDRESS BUS ERROR signal on line 946.

A typical example of a SERIAL SCAN operation is the case where a field is to be loaded with blanks for some particular reason. An easy way to perform this task is to have a blank stored in some field with an A address specified in a DATA MOVE instruction. The B address would be the next location in that same field. The MOVE DATA instruction tells the computer to take whatever is found in the A address and move it into the B address. Thus, the blank may be moved from the first address of the field into the second address of the field. Thereafter, since the A address is incremented by one, it will specify the place where this blank was just stored, and the B address having been incremented by one will specify the next adjacent address in turn. Thus the blank can be rippled through all of the locations of a field until the terminating WM bit is sensed. However, if two characters were handled at one time, the blank will be read out of the first A address and some character will be read out of the second A address. Thereafter, the blank will be returned to the first B address (which equals the second A address) and the character taken from the second A address would be put into the second B address. Thereafter the A address would be modified by two and it would withdraw the character just described, together with a further character and move these into the next pair of B addresses. The net effect of this operation would be to move the blank from the first character into the second character, and to displace all other characters by one address position only. Thus, the field would look like a slightly displaced version of the original field rather than being filled with blanks. A SERIAL SCAN operation is therefore concerned in the present embodiment only with operations wherein the memory may be loaded during B cycles, a fact which is manifested in the SERIAL SCAN circuit of FIG. 56 by the LOAD MEMORY ON B CYCLE OPS signal on line 810 (which is an instruction grouping signal generated in FIG. 46, as described hereinbefore). Thus, during a B cycle where the memory may be loaded (810), within the 1ST A CYCLE (904), at time D, the AND circuit 944 will cause the OR circuit 942 to set the SERIAL SCAN latch 940 if the modified A address equals the B address as indicated by the NOT ADDRESS BUS ERROR signal on line 946.

The OR circuit 942 may also respond to outputs indicating SERIAL SCAN is required by *I/O* devices (either instruction read out or execution cycles) or that SERIAL SCAN may be required for a compress mode of operation; this is shown in FIG. 56 for illustrative purposes only, to clarify the fact that SERIAL SCAN may result from many different types of operations, only one of which is in the present embodiment.

The SERIAL SCAN latch 940 is reset by an OR circuit 950 in response to an AND circuit 952. The AND circuit 952 has all of the inputs of the AND circuit 944 except that the ADDRESS BUS ERROR signal on line 948 is substituted for the NOT ADDRESS BUS ERROR signal on line 946. In other words, if the address bus validity check circuit does indicate an error, this means that the modified A address is not equal to the B address which is equivalent to the fact that the original A and B addresses are not one increment apart. This is of course the opposite condition from that which was described above. The OR circuit 950 may also respond to an AND circuit 954 which causes the automatic resetting of the serial scan latch 940 at the early part (time C early) of the 1ST A CYCLE of any operation. The OR circuit 950 will reset the SERIAL SCAN latch 940 during the first part of each instruction read out, which is I OP time, as designated by the I OP signal on line 786. Similarly, the OR circuit 950 will reset the latch 940 in response to the PROGRAM RESET signal on line 356.

The use of the address bus validity checking circuit as a comparing circuit, as just described, is included in the subject matter of a co-pending application of the same inventors (in the name of the same assignee) Serial No. 332,727, filed on even date herewith, entitled "Means for Comparing Digital Values."

15. SPECIAL BOUNDARY CONTROLS OVERLAP BOUNDARY: USE SINGLE B

*a. General*

Special address situations result from two character processing in cases of MISMATCH, that is where one B and two A's, or two B's and one A characters are available from the respective fields during the first processing cycle. As described briefly hereinbefore, if there will be two B field characters available to the PRIMARY CHANNEL, but only one A field character available to the SECONDARY CHANNEL, a second A cycle is taken before the first B cycle so as to provide sufficient A field characters to process all of the B field characters. This results in a special address situation wherein the A field is always somewhat ahead of the B field, hereinafter referred to as OVERLAP BOUNDARY.

An address condition of another sort exists when the initial addresses of a pair of fields will result in two A field characters for the SECONDARY CHANNEL but only one B field character for the PRIMARY CHANNEL. In this situation (as described briefly hereinbefore) the one B field character which will be available is processed with one of the A field characters. This is referred to hereinafter as USE SINGLE B. Following this, the next A cycle will supply two more A field characters for the SECONDARY CHANNEL; the first of these is used with the second A character, which was left over from the preceding cycle in processing the next pair of B field characters. Thus this address condition eventually results in the same special address situation as exists in the case described in the preceding paragraph; that is, OVERLAP BOUNDARY wherein the A field will always be one character ahead of the B field. In fact, the only difference between this situation and the one in the preceding paragraph is that, in the preceding paragraph, a preliminary extra A cycle is taken so as to achieve sufficient A characters.

*b. Overlap boundary*

In FIG. 54, an OVERLAP BOUNDARY latch 958 is set by an OR circuit 960 in response to either one of two AND circuits 962, 964. The AND circuit 962 recognizes the case where only one B field character will be available on the PRIMARY CHANNEL, and there are however two A field characters which will be available to the SECONDARY CHANNEL during the first cycle. This is the situation where first the single B character is utilized, and thereafter, the A characters are one step ahead of the B characters in the overlap boundary situation. Thus, the OVERLAP BOUNDARY latch 958 must be set at the end of the cycle wherein the USE SINGLE B SIGNAL appears on a line 966. (This line is generated in FIG. 55, which is described in a succeeding paragraph.) The AND circuit 962 is gated at time A1, which is the end of a current cycle.

The AND circuit 964 is responsive jointly to an A cycle signal on a line 968 and to the 1ST A CYCLE signal on line 904. The reason for this is that the 1ST A CYCLE signal can appear somewat before an A CYCLE, and it is not intended to be used until the actual start of an A CYCLE. Another input to the AND circuit 964 is the NOT SERIAL SCAN signal on line 956; the reason is obvious, no special overlapping situations can exist when only one character is to be processed. The MISMATCH signal on line 364 causes the circuit to work only when there is a difference in the number of A and B characters which will be retrieved. The CG2 signal on line 306 in combination with time E early shows that this is a situation where only one character would normally be processed, due to the fact that CHARACTER GATE 2 is present at time E early. This is the last part of time D and the first part of time E, shown in FIG. 35 as within the time when a first or only character would normally be processed.

Thus, the AND circuit 964 will set the OVERLAP BOUNDARY latch 958 only during the 1ST A CYCLE of other than SERIAL SCAN operation, when there is a difference between the number of A and B characters, and it is known that there is only one A character which will be available. On the other hand, the OVERLAP BOUNDARY latch 958 may be set by the AND circuit 962 in other than a 1ST A CYCLE as a result of first having generated the USE SINGLE B signal on line 966.

The OVERLAP BOUNDARY latch 958 is reset by an OR circuit 970 in response to the SERIAL SCAN signal on line 918, the I OP signal on line 786, the PROGRAM RESET signal on line 356, or at the start of a 1ST A CYCLE as indicated by the signal on line 968. Thus, the OVERLAP BOUNDARY latch 958 is guaranteed to be reset at the start of every 1ST A CYCLE, whenever SERIAL SCAN operations are being performed and the latch is therefore not necessary, at the start of an instruction, or as the result of a general reset situation. When reset, the latch 958 generates a NOT OVERLAP BOUNDARY signal on a line 971.

*c. Use single B*

In FIG. 55, a USE SINGLE B latch 972 is set by an AND circuit 974 in response to the concurrent presence of a B CYCLE sinal on line 421, the NOT OVERLAP BOUNDARY signal on a line 971, the NOT SERIAL SCAN signal on line 956, the MISMATCH signal on line 364, and a NOT LAST EXECUTE CYCLE signal on a line 976. The NOT LAST EXECUTE CYCLE signal on line 976 is generated in FIG. 76 (Sheet 42) in the LAST EXECUTE CYCLE circuits which are described in a later section, 18*a*. For present purposes, this signal indicates the fact that even though only one B character is available and two A characters are available, the LAST EXECUTE CYCLE has been set, which means that only a single character can be processed anyway. In an ADD operation, this signal appears as a result of being in B cycle and recognizing that there is a WM bit on the PRIMARY CHANNEL, which WM bit is signifying the end of the B field. In a normal DATA MOVE operation, the last execute cycle will be set during a B cycle when a WM bit MARK is sensed in either the SECONDARY CHANNEL signifying the end of the A field or in the PRIMARY CHANNEL signifying the end of the B field. In any of the LAST EXECUTE CYCLE situations, only a single B field character need be processed so there is no need to go into the USE SINGLE B followed by the OVERLAP BOUNDARY situations. The USE SINGLE B latch 972 is reset at every time B early and, when reset, generates a NOT USE SINGLE B signal on a line 978.

It should be noted that the USE SINGLE B situation can occur only in a B cycle wherein SERIAL SCAN operations are not being performed and there is a MISMATCH in the addresses, and it cannot occur after the OVERLAP BOUNDARY latch has been set; similarly, the USE SINGLE B situation will not occur whenever only a single B character can be used as a result of terminating the operation by a LAST EXECUTE CYCLE signal.

*d. Summation of special boundary controls*

Thus there has been described in this section the generation of MAR ODD/EVEN, BAR ODD/EVEN, MATCH AND MISMATCH; CG1 and CG2, SERIAL SCAN, PROCESS 2ND CHARACTER, OVERLAP BOUNDARY, and USE SINGLE B signals. These are the special controls which handle those characteristics of a computer which must be modified in order to provide boundary adjusting as compared to the same computer with multiple processing. In the ultimate sections of this specification, the manner in which these particular signals may be modified in order to handle the simpler case of a flexible address, variable word length, *parallel* processing computer is analyzed.

16. INSTRUCTION READOUT CIRCUITS

*a. General*

Instruction readout comprises a plurality of I cycles, the number of actual I cycles involved depending upon the particular instruction. Thus, an ADD instruction has one character which specifies the ADD operation, followed by five A address characters and then five B address characters. A MOVE DATA instruction would be the same, and also includes a further character which is the OP MODIFIER, discussed hereinbefore. Additionally, in complete computers having more instructions than those shown in this exemplary embodiment, it is possible to have instructions specifying only the operation: for instance, an ADD operation can be performed using the next addresses (following the last ones used in the ADD operation) merely by specifying the ADD operation only. Thus it is possible in a computer of this type to have instructions of variable lengths. For each instruction, therefore, some number of I CYCLES must be taken, an I CYCLE being one trip through the MAIN CYCLE CLOCK, which will be described in succeeding paragraphs. The instruction readout takes as many I CYCLES as necessary to facilitate each stage utilized of an I RING clock, as described below.

Throughout the description of the instruction readout circuits, it should be borne in mind that the completion of any execution cycle normally causes the reading out of the next instruction. Thus the instruction readout circuits become operative in response to the terminating condition of the execution of a previous instruction.

*b. I cycle*

Figure 59:
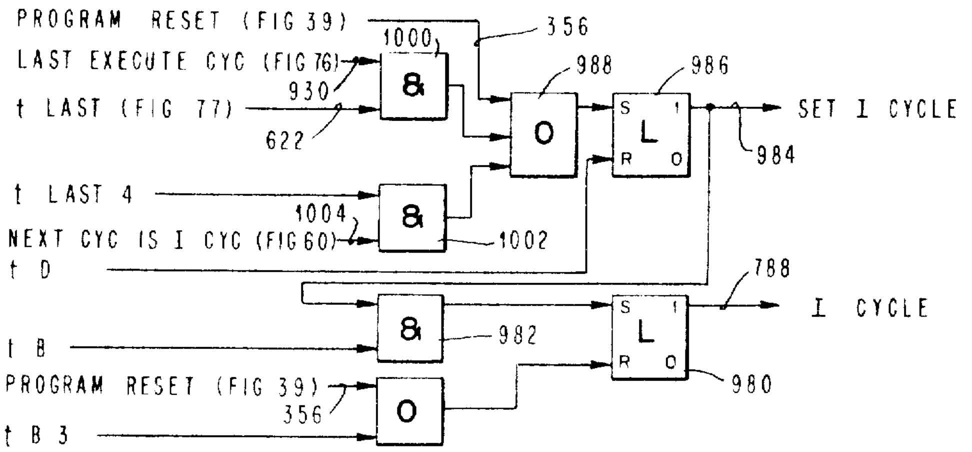

In FIG. 59, the I CYCLE signal on line 788 is generated by an I CYCLE latch 980, which is set by an AND circuit 982 at time B, provided that there is a SET I CYCLE signal on a line 984. This signal is generated by a latch 986 which is set by an OR circuit 988 in response to the PROGRAM RESET signal on line 356, or in response to either of two AND circuits 1000, 1002. The AND circuit 1000 responds to the LAST EXECUTE CYCLE signal on line 930 and the *t* LAST signal on line 622; this then indicates the end of an execution cycle and signifies that it is time to start the process of reading out the next instruction. The AND circuit 1002 responds to *t* LAST 4 in combination with a NEXT CYCLE IS I CYCLE signal on a line 1004; this AND circuit thereby again sets the I CYCLE latch for a further I CYCLE following a previous I CYCLE. Thus, in a multicharacter instruction (such as the ADD instruction which includes the ADD operand plus ten characters of A and B address) the AND circuit 1000 would set the latch 986 in a first instance, and the AND circuit 1002 would set the latch 986 a number of successive times, so that the complete instruction readout time may be accomplished. The PROGRAM RESET signal on line 356 is used to set the latch 986 so that the first step in restarting the machine will be the reading out of a new instruction.

The latch 986 is reset at every time D; this immediately follows the time B wherein the AND circuit 982 will cause the latch 986 to set the I CYCLE latch 980. The latch 980 is either reset by PROGRAM RESET (356), or at time B3, which is really the first half of the same time B within which the latch will be set if at all (see the CYCLE CHART of FIG. 35, Sheet 22, for an illustration of this timing relationship).

Thus, the I CYCLE latch is reset by a PROGRAM RESET, and the set I CYCLE latch is set by a PROGRAM RESET; this means that during a reset situation, it is not I CYCLE time, but the SET I CYCLE latch has prepared the machine so that when the clock begins to run again, time B will cause the I CYCLE latch to be set, and operation will then proceed in a perfectly safe relationship.

Figure 60:
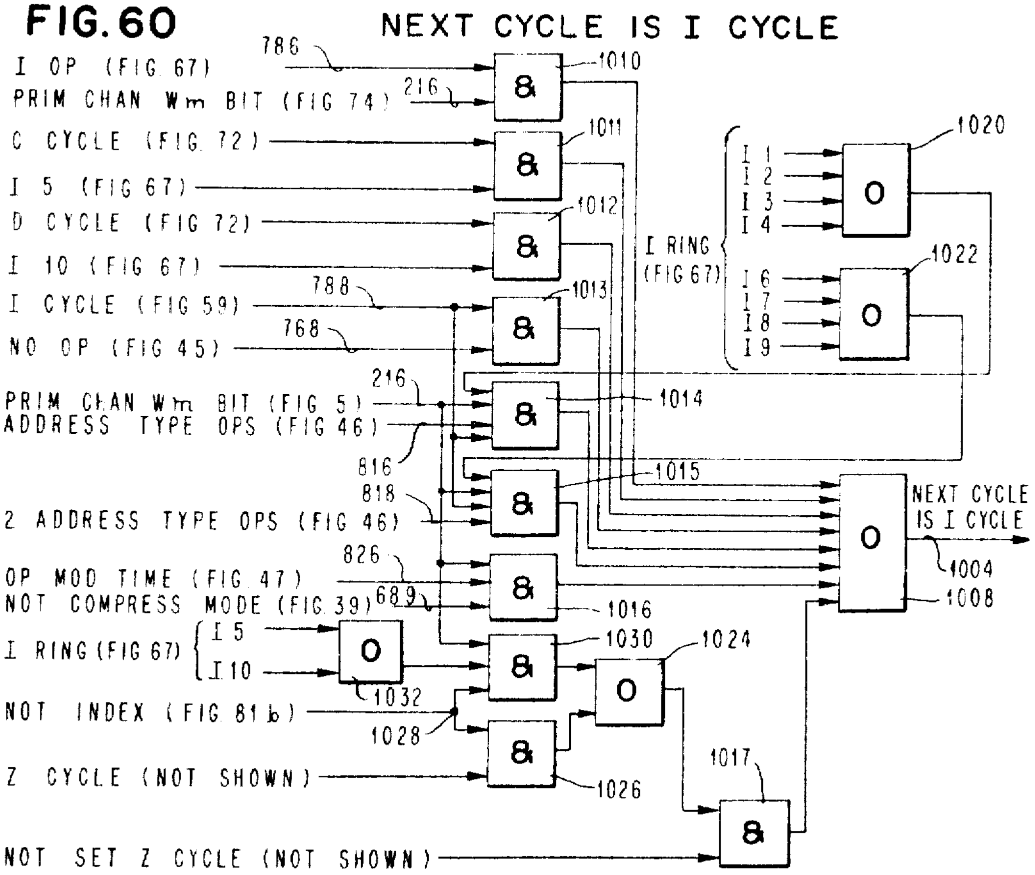

The repetitive setting of the latch 986 by the AND circuit 1002 is under the control of the next CYCLE IS I CYCLE signal 1004. This is generated in FIG. 60 by an OR circuit 1008 in response to a plurality of AND circuits 1010–1017. Each of these AND circuits recognizes a condition where the next machine cycle is to be an I CYCLE. The first circuit, 1010, recognizes that the first step of instruction readout is being performed, due to the concurrent presence of the I OP signal on line 786 and the PRIMARY CHANNEL WM bit; it will be recalled that I OP signifies the time when the operational part of the instruction (such as ADD) is read out, and that this is valid only if it includes a WM bit in the character. Thus, AND circuit 1010 recognizes that a valid operation part is being read out, and that the next cycle will therefore be another I CYCLE. The next pair of AND circuits 1011, 1012 will be described hereinafter inasmuch as they deal with indexing.

The AND circuit 1013 recognizes a NO OP instruction during an I cycle which, it will be recalled, merely causes a machine to try again to get a valid instruction. In other words, since NO OP operates something like a blank, or a space, within the instruction set, every NO OP requires a further I CYCLE until a valid, operative instruction is read out.

The AND circuits 1014 and 1015 are utilized to recognize the length of the current instruction word, and therefore how many I cycles are to be taken. For instance, the AND circuit 1014 responds to an OR circuit 1020 (to the right in FIG. 60) to recognize the readings of the first, second, third and fourth characters of a first address (i.e. the address of the starting location of an A field for an ADD operation). The AND circuit 1014 also is responsive to the lack of a PRIMARY CHANNEL WM bit and to the fact that this is a type of instruction which must have at least one address, as indicated by the ADDRESS TYPE OPS signal on line 816. Thus the AND circuit 1014 is operative during an I CYCLE to recognize that one of the first four characters of a first address portion of the instruction is being read out, and that therefore at least one more I CYCLE (or one more character in a two character processing cycle) is necessary to complete the address. The AND circuit 1015 is identical to that of 1014 except for the fact that it responds to an OR circuit 1022 which indicates the sixth, seventh, eighth and ninth stages of the I RING and the TWO ADDRESS TYPE OPS signals on a line 818; this AND circuit therefore recognizes in each I CYCLE that two addresses are to be read out and that at least one more I CYCLE is necessary to complete the second address.

The AND circuit 1016 recognizes OP MOD time (826), which is the end of an instruction of the type having an operational modifier, except in a situation where the machine is operating in some other mode, such as a compress mode (under control of a NOT COMPRESS MODE signal on line 689) provided there is no WM bit on the PRIMARY CHANNEL. The AND circuit 1016 causes a further I CYCLE to be taken in order to determine whether or not the instruction was of a correct length; in other words, following OP MOD time, the character read out should have a WM bit in it, indicating that this is the start of the *next* instruction; if this is not so, then the machine will be hung up due to the fact that none of the cycle latches (I, A, B, etc.) are set. How this is achieved is discussed in more detail with respect to the LAST INSTRUCTION READOUT circuits of FIG. 69, Section 16*e* hereinafter. The AND circuit 1017 is operative only when a Z cycle (for instance) is not being started. This Z cycle is not pertinent to the present embodiment, but is shown for illustrative purposes only, and may relate to the exemplary compress mode. The AND circuit 1017, therefore, normally responds to an OR circuit 1024 which in turn may be operated by an AND circuit 1026 in response to the exemplary Z cycle so long as an indexing operation were not being performed, as indicated by a NOT INDEX signal on a line 1028. The NOT INDEX signal on line 1028 is generated in a circuit shown in FIG. 81*b* and described in Section 17*e* hereinafter. For the present purposes it suffices that whenever an address is *not* to be added to some increment (so as to generate a new address), then this signal will be present. In the present embodiment, the OR circuit 1024 normally responds to an AND circuit 1030 which in turn is operative during all times except when indexing may be required, provided there is no WM mark bit on the PRIMARY CHANNEL; the AND circuit will respond to an OR circuit 1032 which recognizes I RING times I5 and I10. Whether this is the end of the instruction due to the fifth address or the tenth address (of a one or two address instruction, respectively), or whether there may be an OP MODIFIER to follow, in either event another I CYCLE has to be taken either to get the OP MODIFIER, or to check for a valid length of the instruction. Thus, the AND circuit 1010 causes the second I CYCLE to be taken, the AND circuits 1014 and 1015 account for the causes the first through fifth and the seventh through tenth address-accessing I CYCLES; or I subcycles, to be taken, respectively, and the AND circuits 1016 and 1030 will cause the final I CYCLE to be taken in various cases; also, the final I CYCLE is always (in a sense) *one too many*, in order to check that the instruction was of a valid length, as determined by the fact that the extra I CYCLE causes sensing of the WM bit over the first portion (I OP portion) of the next instruction.

In a multiple processing machine, more than one character, or byte, of an instruction may be read out of memory at one time. In this embodiment, either one or two characters of an instruction can be readout in each instruction-read-out memory cycle, in dependence upon the initial address, the direction of scan and the special conditions which exist at the end of the instruction field. Thus, in one I CYCLE, if an even address is specified, two characters may be read out in a single cycle. This will result in two effective I sub-cycles, though only one I CYCLE is used.

The NEXT CYCLE IS I CYCLE signal on line 1004 is not a latched signal, being generated by AND's and OR's only. Therefore, the signal will be present only during the conditions described above. This signal is utilized only at time LAST 4, by the AND circuit 1002 in FIG. 59. Thus, the SET I CYCLE latch 986 will be turned ON only if another I CYCLE is needed at the *end* of the current I CYCLE. Two character instruction readout or single character instruction readout are both accommodated thereby.

*c. I ring and I ring controls*

Figure 65:
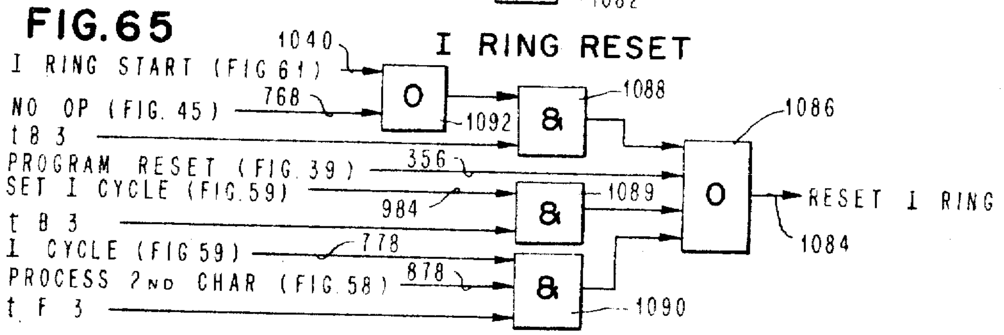
Figure 66:
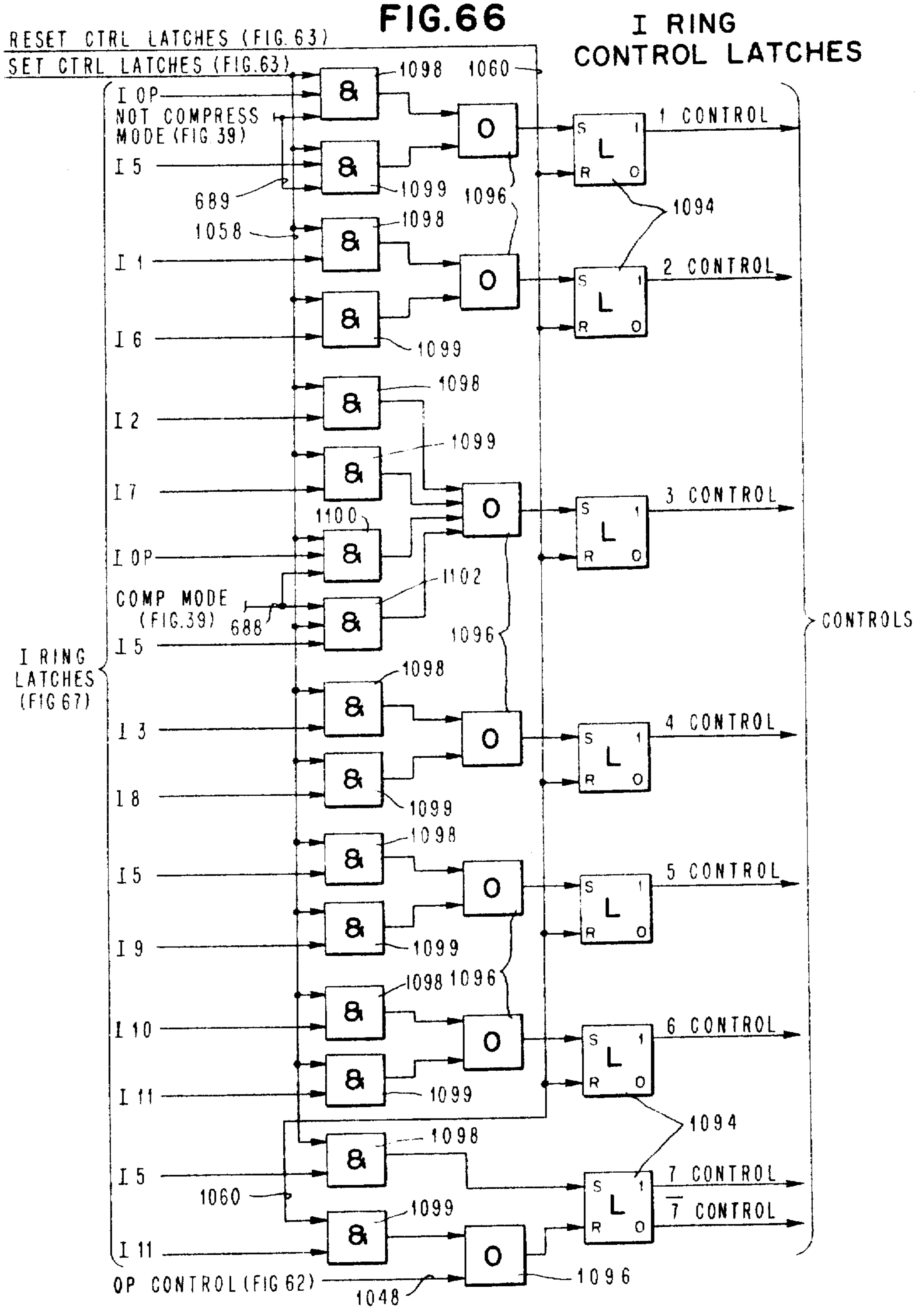
Figure 67:
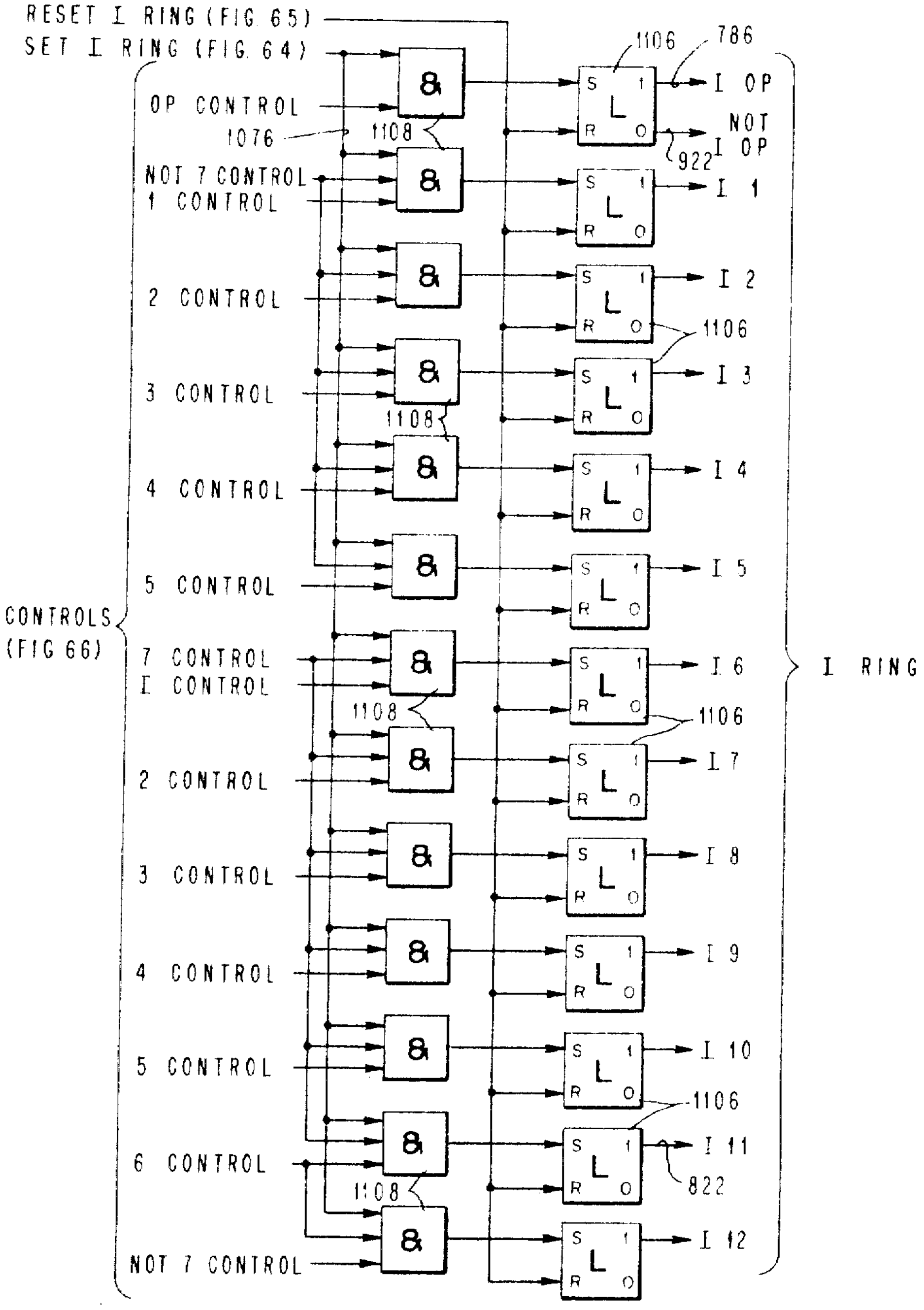

The circuits of FIGS. 61–67 show the I RING and its controls. The I ring is actually composed of a series of control latches (FIG. 66) and a series of I RING latches (FIG. 67). In operation, it is necessary to start the operation of the ring, to generate the first step thereof, and thereafter the I ring operates in a manner similar to the main cycle clock, which was described in Section 11*d* hereinbefore with respect to FIGS. 31 and 32. Briefly, the entire I RING operation is started by the I RING START circuit of FIG. 61, and the first stage thereof is set by the I OP CONTROL of FIG. 62. The combination of these two cause the first stage of the I RING in FIG. 67 (called I OP) to be set. This being so, the 1 CONTROL latch in FIG. 66 will be set; this in turn will set the I1 stage of the I RING, which will cause the 2 CONTROL stage of the I RING control latches to be set, etc.

Figure 61:
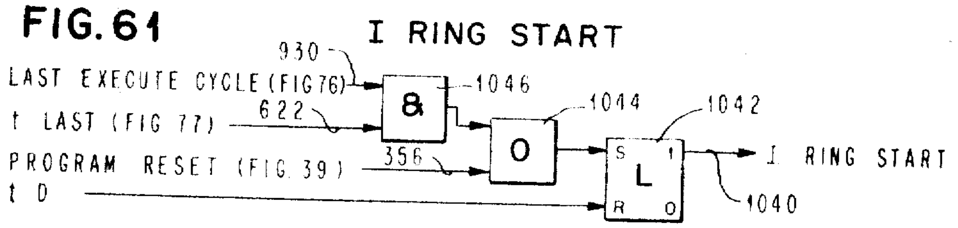

The I RING start circuit in FIG. 61 generates an I RING START signal on a line 1040 in response to a latch 1042 being set by an OR circuit 1044. The OR circuit 1044 may be activated by the PROGRAM RESET line 356 or by an AND circuit 1046 which responds to the combination of the LAST EXECUTE CYCLE signal on line 930 and *t* LAST signal on line 622. The latch 1042 is automatically reset at time D. Thus, whenever the program is interrupted by the PROGRAM RESET line 356, the I RING START latch is set so as to have the machine ready to take an I CYCLE, when operations are resumed. Otherwise, whenever one instruction has been executed, as indicated by LAST EXECUTE CYCLE and *t* LAST, the AND circuit 1046 will set the latch 1042 so as to generate the I RING START signal in preparation of reading out the next instruction.

Figure 62:
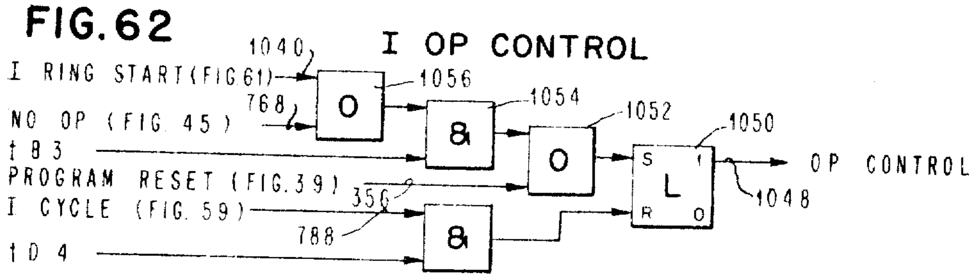
Figure 63:
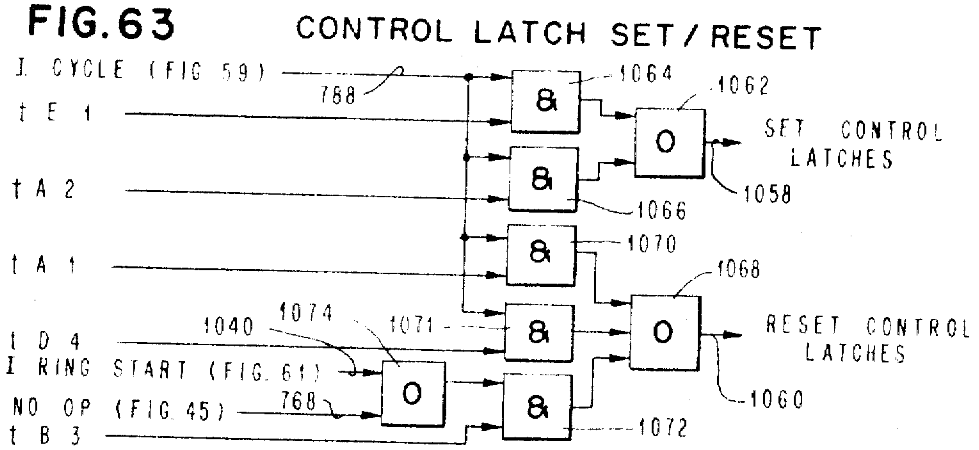

An OP CONTROL signal on line 1048 is generated in FIG. 62 by a latch 1050 which may be set by an OR circuit 1052 in response to an AND circuit 1054. The AND circuit will respond at time B3 to on AND circuit 1056 which in turn is responsive to either a NO OP instruction on line 768 or to the I RING START signal on line 1040. The OP CONTROL latch 1050 may be reset may also be set by the PROGRAM RESET SIGNAL on line 356. Thus, in shifting from an execute cycle into an instruction readout cycle, the OR circuit 1056 will respond to the I RING START signal on line 1040; however, whenever an instruction readout must take place because the last instruction readout only recognized a NO OP (blank instruction), then the line 768 will cause the latch 1050 to be set. On the other hand, any time PROGRAM RESET occurs, this will set the latch as well. The latch 1050 is reset during each I CYCLE by time D4.

The CONTROL latches are operated in response to a SET CONTROL LATCHES signal on a line 1058 and a RESET CONTROL LATCHES signal on a line 1060. The line 1058 is energized by an OR circuit 1062 in response to either of two AND circuits 1064, 1066, and the line 1060 is energized by an OR circuit 1068 in response to one of three AND circuits 1070–1072. Each of the AND circuits 1064, 1066, 1070 and 1071 are operative only during an I CYCLE. Otherwise these AND circuits respond, respectively to time E1, A2, A1, and D4. AND circuit 1072 is operative at time B3 in response to an OR circuit 1074 which responds to the combination of the I RING START signal on line 1040 and the NO OP signal on line 768. Thus, the CONTROL latches may be set by the OR circuit 1058 at time E1 or at time A2; similarly the CONTROL latches may be reset by circuit 1068 at times A1 or time D4; thus, a reset occurs at time D4 just prior to the setting at time E1 and a reset occurs at time A1 just prior to the setting at time A2. The control latches are also reset any time B3 where a NO OP has been sensed (meaning that this particular instruction is a dummy or blank instruction) or whenever the I RING START line comes up, indicating that a new instruction read out is commencing.

Figure 64:
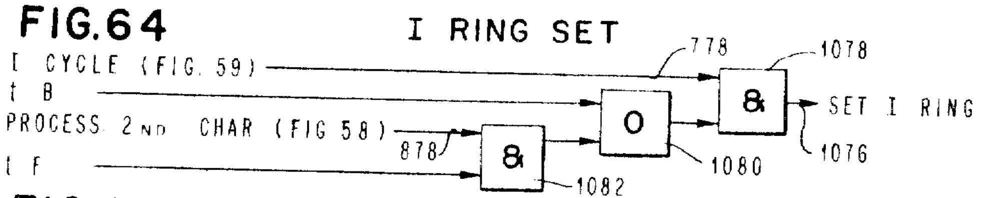

In FIG. 64, an I RING SET signal on a line 1076 is generated by an AND circuit 1078 in response to the concurrent presence of the I CYCLE signal on line 788, and the output of an OR circuit at 1080 which in turn responds either to time B, or may respond at time F to an AND circuit 1082, if there is a PROCESS 2ND CHARACTER signal on a line 878. Thus the I RING latches may be SET only during I CYCLES, and will be set at every time B, or if two characters can actually be handled during a particular I CYCLE the I RING will again be SET at time F, due to the presence of the PROCESS 2ND CHARACTER signal.

In FIG. 65, a RESET I RING signal on line 1084 will be generated by an OR circuit 1086 in response to any one of three AND circuits 1088–1090, or as a result of the PROGRAM RESET signal on line 356. The AND circuit 1088 is operative at time B3 whenever there is a NO OP signal on line 768 or an I RING START signal on line 1040. Thus, the OR circuit 1092 will reset the I RING at time B3 in the same fashion that the OR circuit 1074 resets the CONTROL latches at time B3 (in FIG. 63). The AND circuit 1089 is operative at time B3 whenever there is a SET I CYCLE signal on the line 984. This insures resetting of the I RING at the start of each instruction readout time. The AND circuit 1090 is operative at time F3 whenever a second character can be handled during a particular I CYCLE, due to the concurrence of the I CYCLE signal on line 778 and the PROCESS 2ND CHARACTER signal on line 878. Thus, the I RING will be RESET by the OR circuit 1086 at time B3 when I CYCLE is being set (AND circuit 1089) or in response to I RING START or the sensing of a NO OP (AND circuit 1088); additionally they may be RESET so as to take into account an additional character being processed in a single I CYCLE, at time F3 (AND circuit 1090); further, PROGRAM RESET causes the resetting of the I RING.

Before discussing the details of the I RING CONTROL latches, it is best to consider the operation of the total I ring (including the CONTROL latches of FIG. 66 and the I RING latches of FIG. 67), which is to count to five, and then raise the 7 CONTROL latch and count to five again. The second counting comprising counts six through ten. Then an additional step is counted with the 7 CONTROL ON and a last step is counted with the 7 CONTROL OFF. This is different than the straightforward approach, which would be to count to six, and then turn on a special latch and count to six again, which secondary count would amount to counts seven through twelve. The purpose of splitting the count in this fashion is to permit skipping both I1 and I2 and I6 and I7 with a minimum of circuitry.

In FIG. 66, a plurality of I RING CONTROL LATCHES 1094 may each be set by a corresponding OR circuit 1096 in response to a related AND circuit in a first set 1098 or in response to a corresponding AND circuit in a second set 1099. Additionally, the OR circuits 1096 which sets the 3 CONTROL latch (in the middle of FIG. 66) may respond to additional AND circuits 110–1102 which are described in a succeeding paragraph.

Each of the AND circuits 1098, 1099, 1100, 1102 have as one input the SET CONTROL LATCHES signal on line 1058. Thus, any of the control latches in FIG. 66 will be set only when the SET CONTROL LATCH signal is present on line 1058.

The 1 CONTROL latch may be set only if there is a NOT COMPRESS MODE signal on line 689, for reasons which are discussed in a subsequent paragraph. As long as compress mode is not indicated, the 1 CONTROL latch will be set at 1 OP time, and will again be set at I5 time. A 2 CONTROL latch will be set by I1 and I6. The 3 CONTROL latch is set by I2 and I7, and additionally, may be set by I OP and I5 if there is a COMPRESS MODE signal on a line 688; if there is a COMPRESS MODE signal, the NOT COMPRESS MODE signal on line 689 is missing, so that the 1 CONTROL latch will not be set, but the 3 CONTROL latch will be set a I OP or I5 time due to the presence of the COMPRESS MODE signal on line 688. The reason for this is that in a certain mode of computer operations (COMPRESS MODE being taken here merely as an example, including certain *I/O* operations), a shorter instruction may be used, and the parts of the instruction which are not used correspond directly to the parts of a full size instruction normally identified by I1 and I2, and I6 and I7. Thus, a simple way of skipping I1 and I2 and skipping I5 and I6, has been created due to I1 and I5 and I2 and I6 being set by 1 CONTROL and 2 CONTROL, respectively. The 4 CONTROL can be set by I3 or by I8; the 5 CONTROL can be set by I5 or I9; the 6 CONTROL can be set by I10 or I11; and the 7 CONTROL is set by I5.

In FIG. 67, a plurality of latches 1106 are provided for each stage of the I RING. Each of the latches is set by a corresponding AND circuit 1108 whenever the SET I RING signal is present on line 1076. The I OP latch is set directly by OP CONTROL, the I RING latches 1 through 5 being set by 1 CONTROL, 5 CONTROL concurrent with NOT 7 CONTROL, and I RING latches 6 through 10 being set by corresponding latches 1 CONTROL through 5 CONTROL in combination with 7 CONTROL. I RING 11 is set by 7 CONTROL and 6 CONTROL, and I RING I2 is set by 6 CONTROL and NOT 7 CONTROL. Thus it is easily seen that the I RING first generates the I OP stage, and then it counts through 5 (without 7 CONTROL). It then counts to 5 again (from I6 to I10) with 7 CONTROL; after that 6 CONTROL causes I11 to come on and then 7 CONTROL disappears causing I12 to come on. This means that I1 and I6 respond to 1 CONTROL, I2 and I7 respond to 2 CONTROL, and I3 and I8 respond to 3 CONTROL. Thus it is possible to jump from I OP to I3 and to jump from I5 to I8 merely by blocking the 1 CONTROL and 2 CONTROL latches.

In overall operation therefore, FIG. 62 generates an OP CONTROL signal on line 1048 in response to the starting of an instruction operation; this in turn sets the I OP latch in FIG. 67. I OP sets 1 CONTROL in FIG. 66 which turns on I1 in FIG. 67. I1 turns on 2 CONTROL in FIG. 66, which causes I2 to turn on in FIG. 67, etc. The only deviation from this plan occurs due to the prevention of setting 1 CONTROL whenever there is a COMPRESS MODE, and setting 3 CONTROL instead. Since 1 CONTROL is not set, I1 is never set in FIG. 67, and therefore 2 CONTROL cannot be set in FIG. 66. The handling of 1 CONTROL, 2 CONTROL, and 3 CONTROL is the same for I5, I6, and I7 as it is for I OP, I1 and I2.

Thus there has been provided an I RING which permits operation of certain stages (I1, I2, I3; I6, I7, I8) under common control, even though these stages are *not symmetrical* in terms of length of the ring. It may be noticed that this is achieved by having the 6 CONTROL come on *after 10* rather than *following 5*. This is in contradistinction to the normal way of operating, which would have been to have I5 turn on 6 CONTROL, 6 CONTROL turn on I6, I6 turn on 7 CONTROL, which would turn on I7, etc. This then illustrates one embodiment of a novel clock in accordance with the present invention (see Sections 3*h* and 3*j*).

Although the special handling of the CONTROL latches in FIG. 66 has been discussed only in terms of COMPRESS MODE, it should be understood that any other variation in instruction readout length may be handled by proper control of the latches of FIG. 66.

In FIG. 66, each of the control latches is reset by the RESET CONTROL LATCHES signal on FIG. 1060. Additionally, 7 CONTROL is not reset automatically, but only after I11 comes on. The 7 CONTROL latch may additionally be reset by the OP CONTROL signal on line 1048. The 7 CONTROL latch needs a special reset due to the fact that it will come ON *after I5* and remain ON *until I11*, at which time 7 CONTROL turns OFF, so that, in combination with 6 CONTROL, the I12 latch will be set in FIG. 67.

*d. Illustration*

Figure 68:
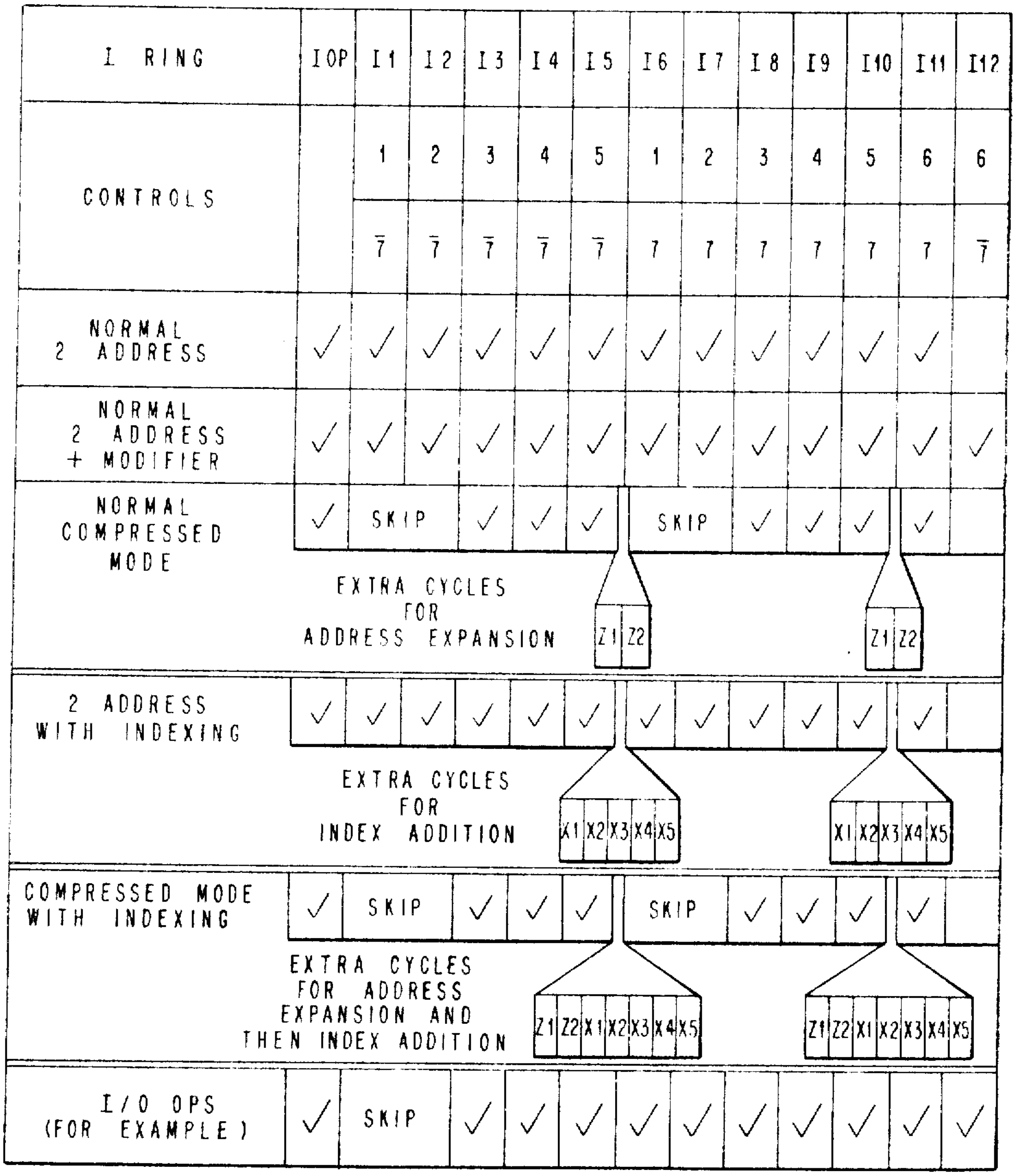

A chart illustrating I RING operation is shown in FIG. 68 wherein the first line designates the various stages that an I RING may assume. It is readily seen that I RING positions 1 thru 5 are generated by CONTROLS 1 thru 5, together with NOT 7 CONTROL; and 6 through 10 are again generated by 1 thru 5, but with the presence of 7 CONTROL. I11 is a combination of 7 CONTROL and 6 CONTROL, and I12 is a combination of NOT 7 CONTROL and 6 CONTROL. This clearly illustrates the unorthodox manner of using the special CONTROL latch (7 CONTROL) to cause a twelve-stage ring to exercise a common control over the first (I1) and sixth (I6) positions rather than the first and seventh positions which would normally be achieved by a straightforward application of well known technology. The total I RING is of course thirteen stages long, but the combination of 7 CONTROL with the other CONTROL latches is effected in only twelve of the positions, I OP being accounted for independently. Therefore, the present teaching is of a twelve-stage ring effected by six CONTROL latches, wherein the count is first to five, and then the count is repeated, followed by the 6 CONTROL latch coming on and finally the special latch 7 CONTROL going off.

In the third section of the chart, a normal two-address instruction is indicated as having the first twelve I RING positions (which are I OP, I1 . . . I11). Below that, a normal two-address-plus-modifier type of instruction is shown as having all thirteen I ring positions (which include I OP, I1 . . . I12).

In the middle of FIG. 68 is shown a situation wherein a short instruction (such as for a compress mode) is used. It is apparent that the I1, I2, I6 and I7 ring positions are skipped, and, in the example given, extra cycles called Z cycles might be inserted in order to expand the three digit addresses which are accessed in I3, I4 and I5 time and again in I8, I9 and I10 time. An example of extra cycle insertion without skipping is shown in the next block wherein a two-address instruction has to be modified, by indexing the address portions of the instruction. Thus, extra cycles X1 through X5 are inserted between I5 and I6, and between I10 and I11. The purposes of this insertion, and the manner in which the extra operations X1–X5 are performed, are described in later sections (17*e*, *f*; 20) herein.

In the next section of the chart, compress mode with indexing is shown to include the skipping of I1, I2, I6 and I7, the extra cycles for expanding an address, and additional extra cycles for indexing the expanded address. Again the extra positions Z1 and Z2 are exemplary only, indicating a condition which may occur in a computer, and the extra times X1 and X5 are described hereinafter. As a further illustration of the necessity for an instruction ring which can skip certain stages readily, is in the final portion of the chart of FIG. 68 wherein *I/O* OP's (for example) are shown skipping from I OP to I3 and thereafter having the remainder of the I RING times I3–I12 being used. This particular operation could be achieved by applying a NOT *I/O* MODE signal to the upper AND circuit of FIG. 66, which would prevent 1 CONTROL from being set after I OP, and applying an *I/O* MODE signal to the AND circuit 1100 (in the center of FIG. 66) so as to set 3 CONTROL instead. There would be no application of these signals to the AND circuit 1099 (second from the top of FIG. 66) nor to the AND circuit 1102 (in the center of FIG. 66).

*e. Last I cycle*

Figure 69:
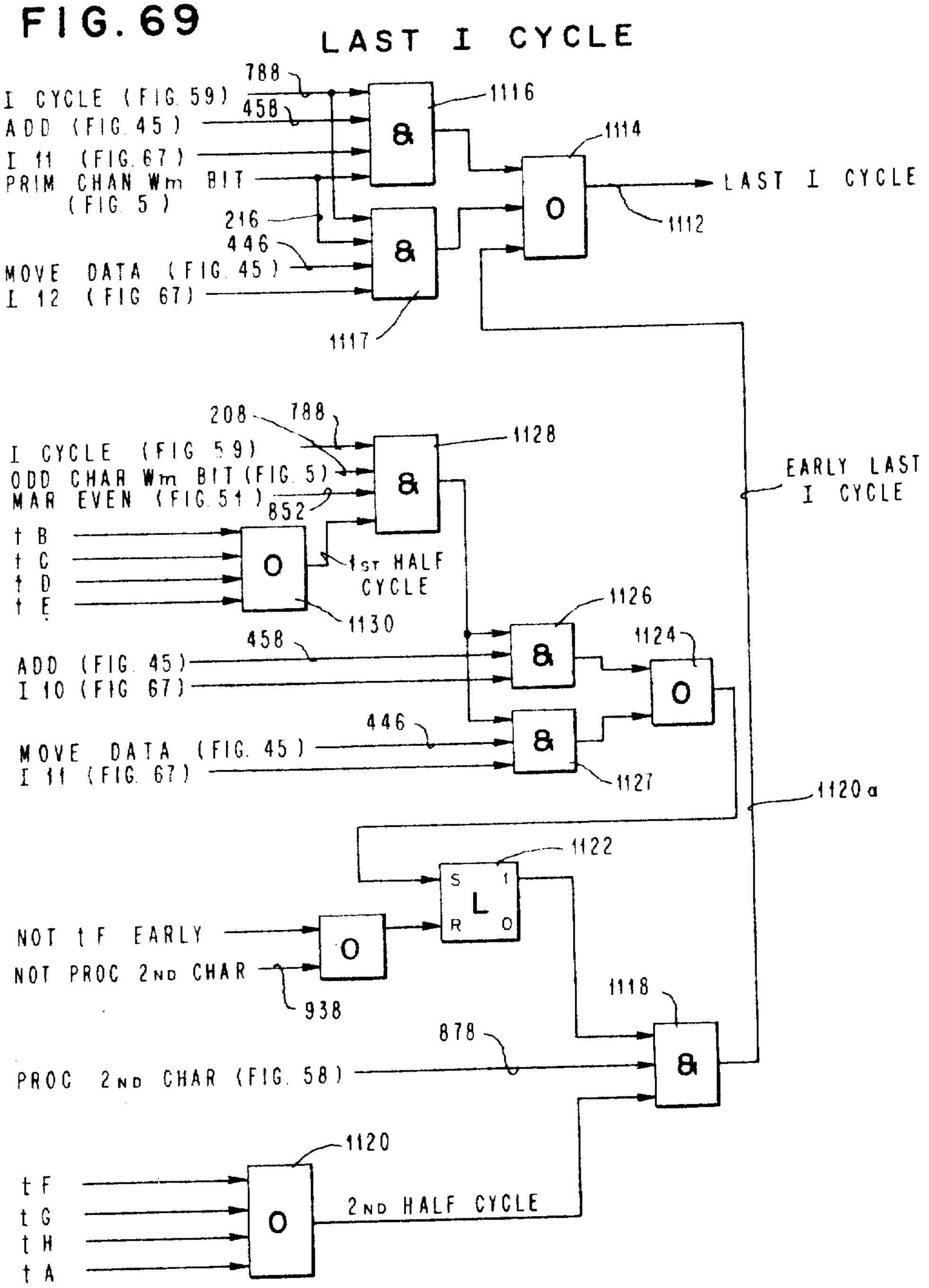

The end of instruction readout time is recognized by the LAST I CYCLE circuit shown in FIG. 69. A LAST I CYCLE signal is generated on a line 1112 by an OR circuit 1114 in response to any one of three AND circuits 1116–1118. The AND circuit 1118 develops an EARLY LAST I CYCLE signal on a line 1120. The AND circuits 1116 and 1117 are operative during an I CYCLE, due to the signal on line 788, to recognize a PRIMARY CHANNEL WM bit as a termination of the instruction read out time. This is accomplished during an ADD operation (458) at I11 time by the AND circuit 1116, and is recognized in a MOVE DATA operation (446) at I12 time. As described hereinbefore, an ADD operation includes the ADD OP plus ten address characters; a total of eleven characters. Since the I RING first reads I OP, then I1 . . . I10 in order to read out the eleven necessary characters, it is obvious that I11 is an *extra* instruction cycle, during an ADD instruction; similarly I12 is an *extra* instruction cycle during the reading-out of a MOVE DATA instruction. These extra I ring steps (I sub-cycles) are taken in order to sense the WM bit (as in the AND circuits 1116 and 1117); if a WM bit isn't sensed, the LAST I CYCLE signal will not appear, and the machine will hang up, having completed its instruction, but not being able to get into an execution cycle (as will be described hereinafter). If desired, the CYCLE circuits for I, A–D, and X cycles could be monitored, and if no cycle is set, a signal could be sent to the ANY ERROR circuits, described in Section 12*a* hereinbefore. If the WM bit *is* sensed by the AND circuit 1116 or 1117, then the LAST I CYCLE signal on line 1112 will cause the computer to begin executing the instruction which has just been read out. This being so, the address will be left at the point where it found the WM bit, which is the point where the *next* instruction begins; thus the addressing is always ready to read out the next instruction after execution of the current instruction.

In multiprocessing machines, it is desirable to read out a plurality of instruction characters at one time; in the present embodiment, the memory will access two characters during an instruction read out (in the same fashion as in all other cases) and if both the characters read out are within the field of a current instruction, both will be handled. For instance, if the first character of the instruction (the operational portion, such as ADD) is at an even address, then the first character of the A field address will be read out at the same time. The operand will be placed in the instruction register, and the first character of the A address will be placed in the highest order position of the A address register during the same cycle. On the following cycle, two more address characters will be read out by the memory, the first of these will be placed in the thousands order of the A address register and then the second of these will be placed in the hundreds order of the A address register, etc. Thus, is it possible that the last character read out, which is part of a current instruction will be the first of a pair of characters read out during a single cycle, and the WM bit (indicating the start of the next instruction) will appear over the second of the two characters read out during a particular memory cycle. When this occurs, it is necessary to recognize that the second of these characters is the start of the next instruction, and to check for proper instruction length so as to terminate instruction read out and generate the LAST I CYCLE signal on line 1112. The AND circuit 1118 performs this function. In other words, the EARLY LAST I CYCLE signal on line 1120*a* will appear before the LAST I CYCLE signal on line 1112, *when* the first character of the next instruction is recognized as being the second one of two characters read out of memory.

The AND circuit 1118 responds to an OR circuit 1120 which generates a 2ND HALF CYCLE signal in response to any of the times F thru A. Also, the AND circuit 1118 requires a PROCESS 2ND CHARACTER signal on line 878; this indicates that the first character read out is not a terminating character, and that the second character may be processed: in an instruction cycle, the processing of the last character is merely a checking to be sure the instruction is of the proper length, and causes the instruction address register (IAR) to be advanced to, and left at, the place necessary to read this character out. The significant input to the AND circuit 1118 is a latch 1122 which is set by an OR circuit 1124 in response to either of two AND circuits 1126, 1127 in dependence upon the particular instruction used. In this embodiment, AND circuit 1126 will respond to an ADD operation at I10 time, and AND circuit 1127 will respond to a MOVE DATA operation at I11 time. Both of these AND circuits are gated by an AND circuit 1128 which is operative only during the first half of the cycle as a result of an OR circuit 1130 being responsive only at times B thru E. The AND circuit 1128 must also have as inputs, the I CYCLE signal on line 788, the MAR EVEN signal on line 852, and a WM bit on one of the lines of the ODD character eight-bit bus 208 (as shown in FIG. 3).

The reason for this is that instruction read out is always accomplished in PLUS SCAN, which means that the first character is EVEN and the second character is ODD. If the MAR is EVEN, that means that it is possible to get an EVEN *and* an ODD character out at one time. Whenever the ODD character has a WM bit over it, this means that the EVEN character is the last character of the *current* instruction, and the ODD character is the first character of the *next* instruction. Thus, during the first half of an instruction cycle, *if* the MAR is EVEN, and the ODD character has a WM bit in it, the AND circuit 1128 recognizes that this should be the LAST I CYCLE. Since the AND circuit 1128 responds during the first half of a cycle, the latch 1122 may be set *before* the ODD character gets onto the PRIMARY CHANNEL. In fact, since the ODD and EVEN characters are available at the output of the MEMORY at approximately C time, the latch 1122 will set at C time. The latch 1122 is reset at all times except time F EARLY (which equals the last half of time E and the first half of time F). Thus, it is only at time F EARLY that there is a static output from the latch 1122. Within time F, the ODD character (the second one being read out on the current cycle) will appear on the PRIMARY CHANNEL, and therefore either the AND circuit 1116 or the AND circuit 1117 will take over from the latch 1122, so that when the latch 1122 is reset, and the EARLY LAST I CYCLE signal disappears from line 1120, one of the AND circuits 1116, 1117 will have developed a signal so that the LAST I CYCLE signal on line 1112 will be continuous.

17. EXECUTION CYCLE CONTROL (A, B AND X CYCLES)

*a. A cycle latch*

Figure 70:
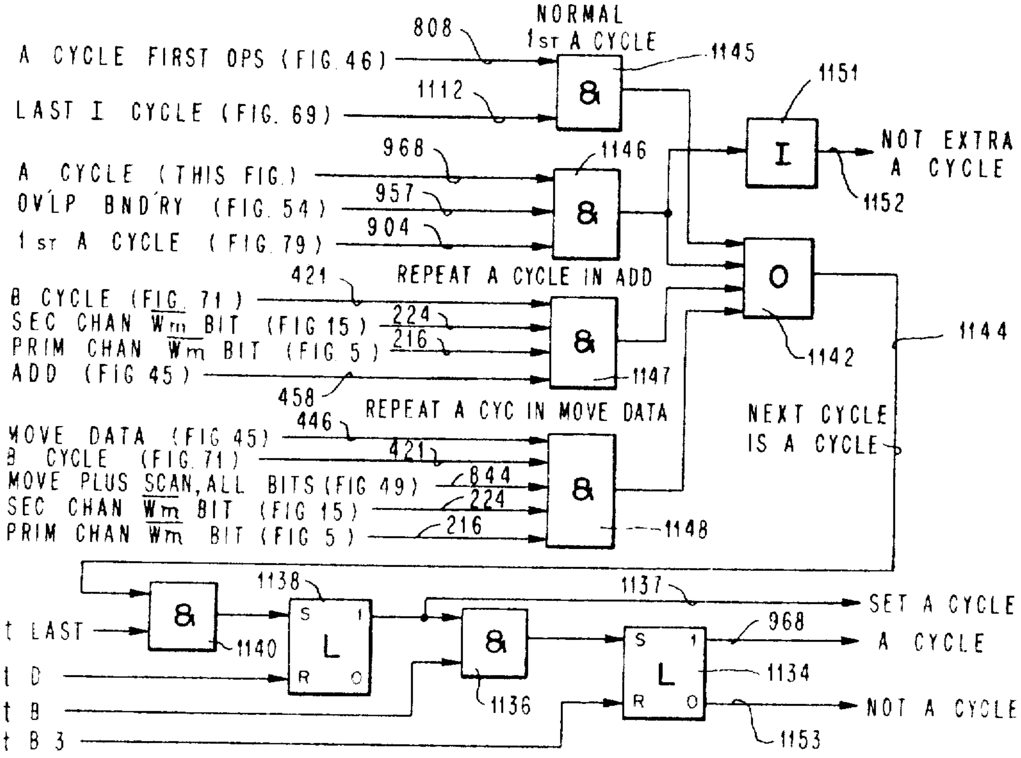

In FIG. 70 (Sheet 38), the A CYCLE signal on line 968 is generated by a latch 1134 which is set by an AND circuit 1136 at time B in response to a SET A CYCLE signal on a line 1137 from a latch 1138, which in turn is set at *t* LAST by an AND circuit 1140. The other input to the AND circuit 1140 is an OR circuit 1142 which generates a NEXT CYCLE IS A CYCLE signal on a line 1144. The OR circuit 1142 responds to any one of four AND circuits 1145–1148 in dependence upon the different occasions for which an A CYCLE may be taken. The AND circuit 1145 causes the first normal A CYCLE in response to the A CYCLE FIRST OPS signal on line 808, during the LAST I CYCLE (line 1112). The AND circuit 1146 causes the extra A CYCLE necessary to fetch additional characters whenever the first A CYCLE delivers less characters than will the first B cycle. Thus, during a 1ST A CYCLE (904, 968) if there is an OVERLAP BOUNDARY condition as indicated by a signal on line 957, the AND circuit 1146 will cause an extra A CYCLE. The AND circuit 1146 also drives an inverter 1150 which generates a NOT EXTRA A CYCLE on line 1152. This is used in FIG. 71 (below) to permit a B cycle to be taken whenever the extra A CYCLE is not utilized.

The AND circuit 1147 causes the successive A CYCLES following B cycles, during an ADD operation. Whenever an ADD operation is indicated by an ADD signal on line 458, and there is currently a B cycle (421) which is not the last B cycle (as indicated by the WM bits on either the SECONDARY CHANNEL 224 or the PRIMARY CHANNEL 216), then the AND circuit 1147 will cause an A CYCLE to follow the current B CYCLE.

The AND circuit 1148 is similar to the AND circuit 1147 but pertains to a MOVE DATA instruction, as indicated by signal on line 446. Again, in a B cycle (421), whenever the DATA MOVE is one which is terminated by WM bits (such as the MOVE PLUS SCAN ALL BITS type of data move, indicated by a signal on line 844), until the end of either the A field or the B field is indicated by the sensing of a WM bit on the SECONDARY CHANNEL 224 or PRIMARY CHANNEL 216, then the AND circuit 1148 will cause each B cycle to be followed by an A cycle. It should be understood that different modifier conditions could be indicated by a different code as discussed with respect to FIGS. 48 and 49 (Sheet 28 hereinbefore), and under different modification conditions, a DATA MOVE may pass through certain WM bits and continue until it reaches other terminating conditions. In the present embodiment however, a sensing of a WM bit in either CHANNEL is what terminates the data move; the AND circuit 1148 wil continue to cause A cycles following each B cycle until such terminating condition is reached. The latch 1134 is reset at each time B, and when reset, generates a NOT A CYCLE signal on a line 1153.

*b. 1st A cycle*

Figure 79:
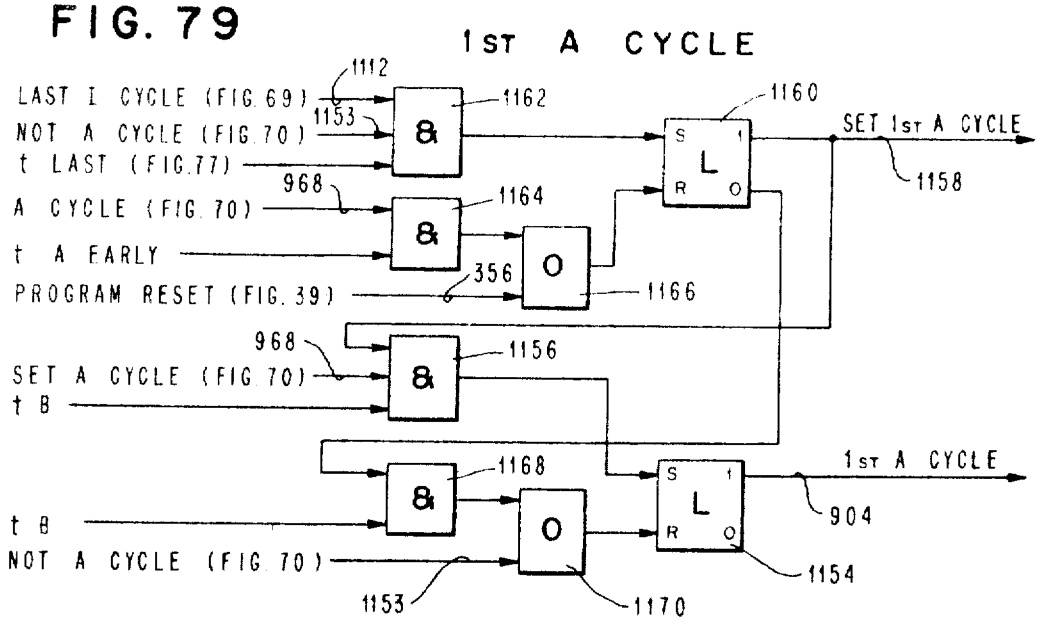

The 1ST A CYCLE signal on line 904 is generated in FIG. 79 (Sheet 43) by a latch 1154 which is set by an AND circuit 1156 at time B, within an A cycle (968) in response to a SET FIRST A CYCLE signal on a line 1158. This signal is generated by a latch 1160 which is set by an AND circuit 1162 during the last time (*t* LAST) of a LAST I CYCLE (1112), prior to the setting of the A CYCLE latch as indicated by the NOT A CYCLE signal on line 1153. Thus, during the last logic time of the LAST I CYCLE, the AND circuit 1162 will set the latch 1160, and as soon as the SET A CYCLE signal appears on line 968, the AND circuit 1156 will set the latch 1154 to generate the 1ST A CYCLE signal on line 904. Thereafter, as soon as the A CYCLE latch is set, and AND circuit 1164 will respond to an A CYCLE signal at time A EARLY so as to reset the latch 1160. The latch 1160 may also be reset by the PROGRAM RESET signal on line 356 due to the presence of an OR circuit 1166. Once the 1ST A CYCLE latch 1154 is set, it will remain set until time B following the resetting of the latch 1160, due to the operation of the AND circuit 1168 (this will be in the first cycle following the first A cycle) or it may be reset by the NOT A CYCLE signal on line 1153 due to the operation of OR circuit 1170. In all events, the 1ST A CYCLE signal on line 904 will appear as soon as the SET A CYCLE signal appears on line, 968, in the first A cycle following an I cycle, and this will remain for approximately one A cycle and will then disappear; during successive A cycles (for instance, as adding proceeds across A and B fields), the 1ST A CYCLE signal on line 904 will not appear. The purpose of this signal is primarily to cause recognition of the initial address conditions at the start of an execution operation, so as to define the type of operation in terms of MATCH and MISMATCH, OVERLAP BOUNDARY, and USE SINGLE B situations.

*c. B cycle latch*

Figure 71:
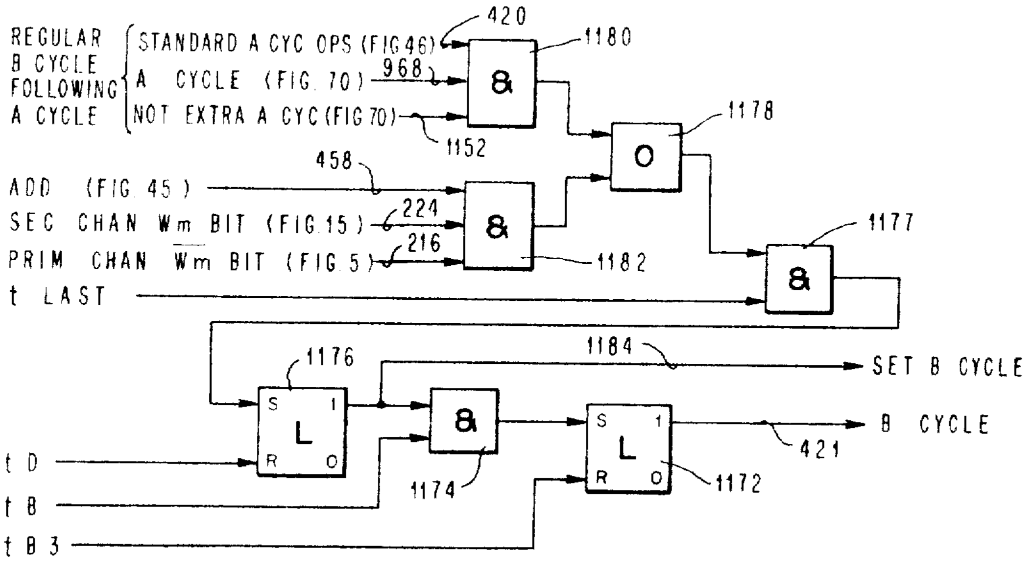

The B CYCLE signal on line 421 is generated in FIG. 71 (Sheet 38) by a latch 1172 which may be set by an AND circuit 1174 in response to a SET B CYCLE signal on a line 1184 from a latch 1176, which in turn is set by AND circuit 1177. The AND circuit 1177 is operative at *t* LAST in response to an OR circuit 1178, which in turn may respond to either of two AND circuits 1180, 1182. The AND circuit 1180 causes normal B cycles and, will be operative during an A cycle (968) within STANDARD A CYCLE OPS (420), which are the kind having B cycles following A cycles. However, if an extra A cycle is necessary because of an OVERLAP BOUNDARY situation (AND circuit 1146 in FIG. 70) then there will be *no* NOT EXTRA A CYCLE signal on line 1152 and the AND circuit 1180 will not work. However, during the extra A cycle *itself*, a further extra A cycle is not needed, so the NOT EXTRA A CYCLE signal on line 1152 will be present and the AND circuit 1180 will then respond. In other words, during the *first* A cycle, the AND circuit 1180 will not respond; but during a second, extra A cycle, the AND circuit 1180 will operate to cause the B cycle.

The AND circuit 1182 causes repetitive B cycles following the end of an A field. It will be recalled that in an ADD operation, for instance, the A field is added to the B field, and the result is stored in the B field. Thus, when there is an end of an A field, the B field must nonetheless continue to be read out to permit carries to propogate therein, and the results stored in the B field. Since no new A characters can be taken out, the computer switches from alternating A and B cycles into taking repetitive B cycles. In order to achieve these repetitive B cycles, the AND circuit 1182 responds to the ADD signal on line 458, to a SECONDARY CHANNEL WM bit which signifies the end of the A field, and to the absence of a PRIMARY CHANNEL WM bit which signifies the end of the B field has not yet been reached. This AND circuit will then take over and permit the latch 1176 to be repetitively set in successive B cycles, to cause additional B cycles, until a PRIMARY CHANNEL WM bit indicates the end of the B field.

It will be recalled from the CYCLE CHART of FIG. 35 (Sheet 22) that *t* LAST is the last logic time within a cycle, and this occurs during A cycles and I cycles coincident with time F, and is coincident with time H during B cycles. Thus the AND circuit 1177 will be turned on at *t* LAST (which is time H in a B cycle), thereby setting latch 1176 at time H and the latch 1172 at the following time B (due to AND circuit 1174). The latch 1176 is thereafter reset at time D; the latch 1172 is reset in the first half of time B, so that the remainder of time B (time B4) will allow the AND circuit 1174 to set the latch 1172. The latch 1176 generates the SET B CYCLE signal on line 1184, which is equivalent to the B cycle signal on line 941 except that it is available at an earlier time.

*d. C and D cycle latches*

C and D cycles respectfully relate to A and B cycles, and are "backup" cycles used, in this embodiment, only for completing an indexing operation, as will be described hereinafter. It is apparent that the D CYCLE signal on a line 1200 (FIG. 72) is generated in the same fashion as a C CYCLE signal on a line 1202, with the exception of the fact that D CYCLE signal is generated in response of I10, whereas the C CYCLE signal is generated in response to I5.

The C CYCLE signal on line 1202 is generated by a latch 1204 which is set by an AND circuit 1206, at time D, in response to a latch 1208, which in turn is set by an AND circuit 1210. The AND circuit 1210 is operative at *t* LAST of the fifth X cycle as determined by the signals on lines 419 and 1212. X cycles are taken in order to accommodate address indexing, which is a process whereby a first address has added to it some increment to achieve a final address. In this embodiment, as an instruction is read out, the A address is read out in five successive I RING times, followed by the B address being read out in five successive I RING cycles. If there are zone bits in certain of the A address characters, an indexing operation is indicated. When the last of the A address bits is read out at I5 time, the I RING does not advance to I6, but X cycles are taken instead, in order to increment the A field address. Five X cycles are used, one for each character of the A field address; the last of these, X5, causes the AND circuit 1210 to set the latch 1208 ultimately to set the C CYCLE latch 1204. At this time, a C CYCLE is taken so as to store the final address now in the (A address register) in the C address register, and to provide a transition back to I cycles.

A similar result is achieved for the B field address, the last of five characters of which is read out at I10 time.

All of the ramifications of indexing are described in detail hereinafter, in sub-sections *e* and *f*, below, and Section 20.

*e. X cycle latch*

Figure 73:
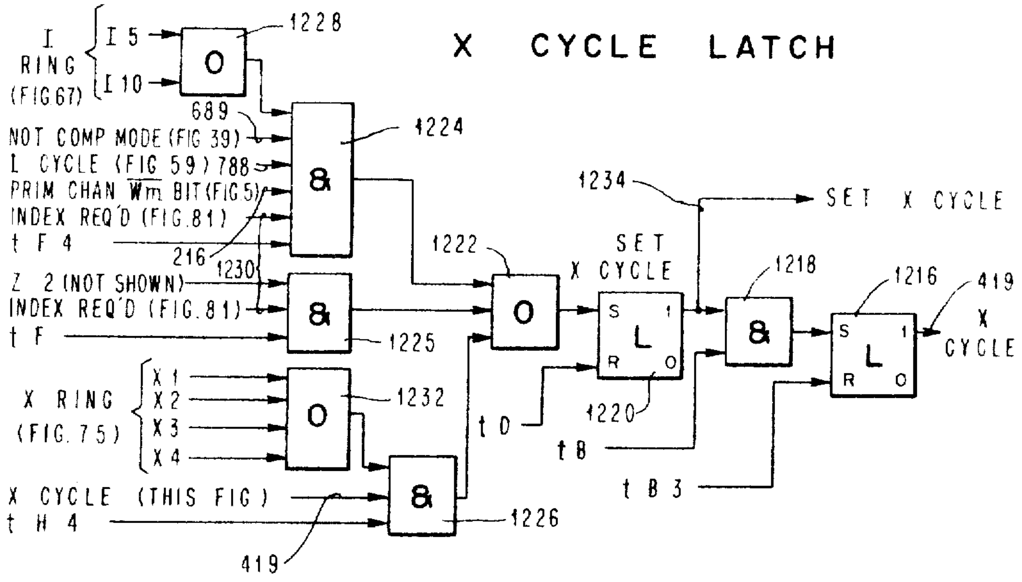

The X CYCLE signal on line 419 is generated in FIG. 73 by a latch 1216 which may be set by an AND circuit 1218 in response to a SET X CYCLE signal on a line 1234 from a latch 1220 which in turn is set by an OR circuit 1222. The OR circuit may respond to either of three AND circuits 1224–1226. The AND circuit 1224 is operative at I5 or I10 time due to an OR circuit, 1228 to start the first X CYCLE during an I CYCLE (788), which is not in compress mode (689), whenever indexing is required as indicated by an INDEX REQUIRED signal on a line 1230 (generated in FIG. 81*b*, to be described in Section 20, hereinafter). This occurs at time F4, provided that a PRIMARY CHANNEL WM bit has not terminated the instruction readout, for a wrong length instruction, as controlled by a WM bit. Thus, the AND circuit 1224 causes a first X CYCLE for a regular indexing operation at time F4 for the A field in response to I5 and for the B field address in response to I10. Time F4 is used, since that is at the end of an I cycle.

The AND circuit 1225 may operate to cause indexing following the second one of two special cycles which may be taken in order to expand a compressed address, which was shown by way of example in the I ring operation chart of FIG. 68 (Sheet 36) discussed briefly in Section 16*d*, hereinbefore. This AND circuit 1225 is shown here for illustrative purposes only, and the operation thereof is not discussed elsewhere herein.

The AND circuit 1226 causes the repetitive X cycles to follow the first, second, third and fourth X cycles due to the operation and OR circuit 1232 in combination with the X CYCLE signal on line 419; the AND circuit 1226 being gated at time H4. It should be recalled that an X CYCLE is a special cycle which does not require writing new information or results into memory, but since it requires applying a first result serially to the address registers on the same bus upon which a second result must follow, during each of two process times within an X CYCLE, the X CYCLE is caused to be as long as a memory write cycle (a B CYCLE) as illustrated in FIG. 36 (Sheet 22), and described in Section 11, hereinbefore.

The first X CYCLE, which is set during either the sixth I RING time (I5) or eleventh I RING time (I10), due to OR circuit 1228 in FIG. 73, is set at the last time period of an I cycle, *t*F4; similarly, the repetitive X cycles are set at *t*H4 by AND circuit 1226, and are therefore commenced at the last time of an X CYCLE (FIG. 36, Sheet 22).

Once a signal is available at the output of OR circuit 1222, the latch 1220 is set, and the following time B will cause the AND circuit 1218 to set the X CYCLE latch 1216. Thereafter, at time D, the latch 1220 is reset in preparation for following cycles. The latch 1216 is reset just prior to setting, during the first half of time B, so that the AND circuit 1218 is actually effective to set the latch 1216 only during the second half of time B. This is a reset immediately preceding the setting of a latch. The latch 1220 supplies the SET X CYCLE signal on line 1234, which is equivalent to the X CYCLE signal on line 419 but appears sooner; this is a sort of lookahead that allows gating within the ADDRESSING CIRCUITS (Section 19 et seq:. hereinafter) to commence just prior to the setting of the latch 1216, within the first part of an X cycle, and to similarly start the X RING so that when the X CYCLE signal appears on line 419, the X1 latch of the X RING will be set, as described in succeeding paragraphs.

*f. X ring*

Figure 74:
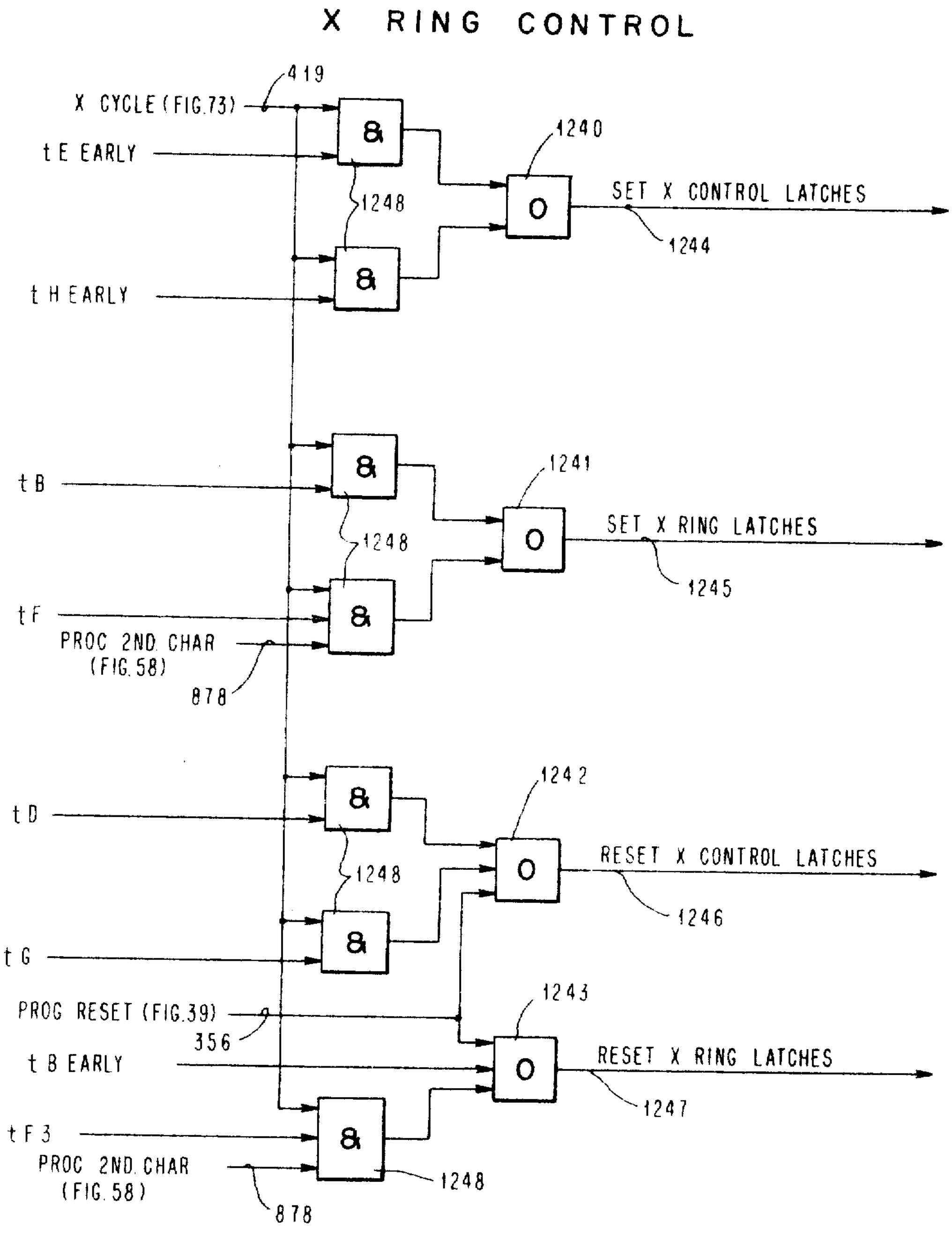
Figure 75:
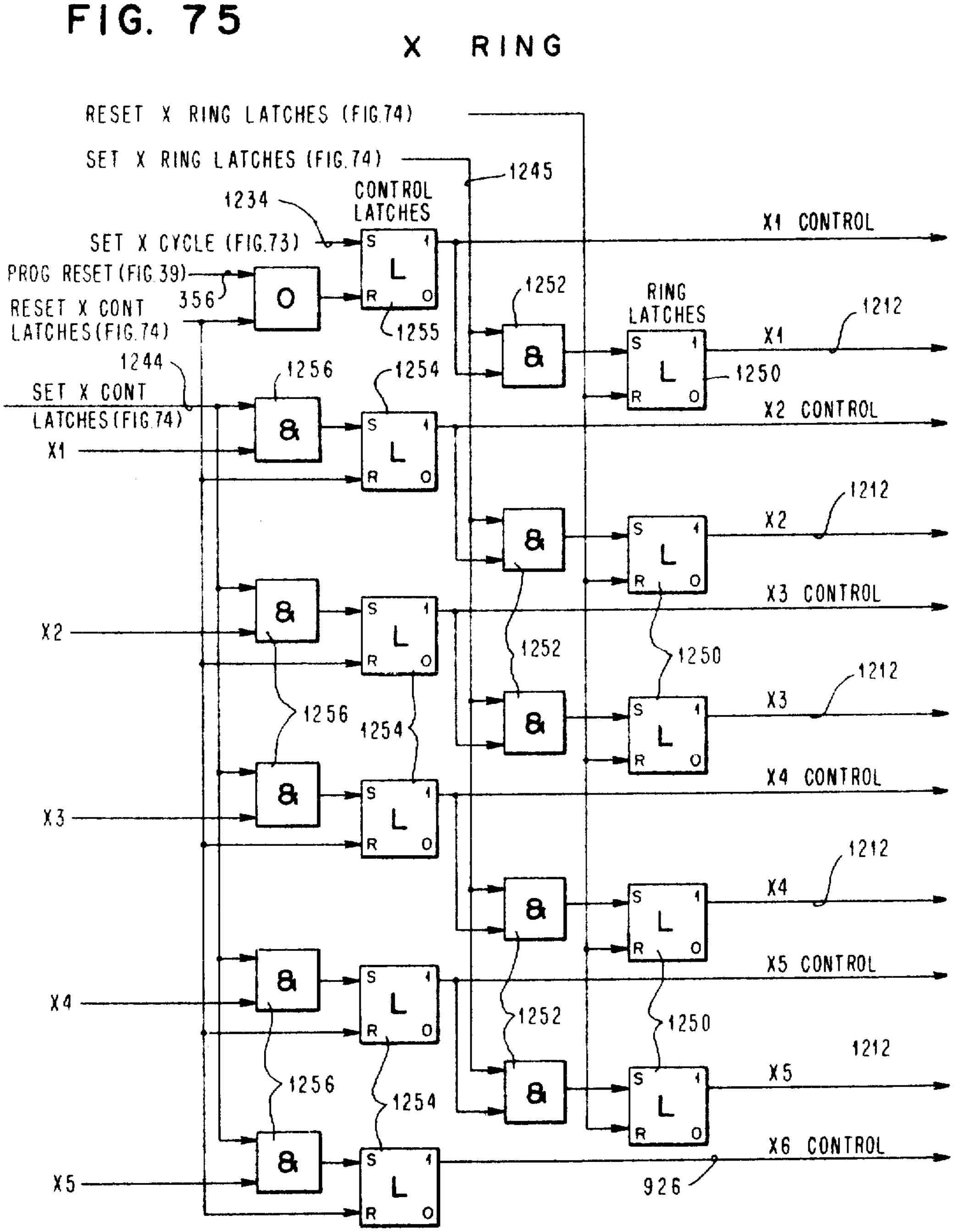

Successive X cycles are recognized by a clocking circuit called the X RING, shown in FIG. 75 (Sheet 41), which is advanced by an X RING CONTROL circuit, shown in FIG. 74 (Sheet 40). In FIG. 74, OR circuits 1240–1243 generate SET and RESET X CONTROL LATCHES and X RING LATCHES signals on lines 1244–1247. Each OR circuit 1240–1243 responds to a related AND circuit 1248 only during an X CYCLE due to the signal on line 419. The OR circuit 1240 operates at times E EARLY and H EARLY; the OR circuit 1241 operates at times B and F (provided there is a PROCESS 2ND CHARACTER signal on line 878); the OR circuit 1242 operates at times D and G; and the OR circuit 1243 operates at times B and F3 (provided there is a PROCESS 2ND CHARACTER signal on line 878). Each of the OR circuit 1242, 1243 also responds to the PROGRAM RESET signal on line 356.

In FIG. 75, a plurality of RING LATCHES 1250 are set by respective AND circuits 1252 in response to the SET X RING LATCHES signal on line 1245. A plurality of CONTROL LATCHES (X2–X6) 1254 are similarly set by respective AND circuits 1256 in response to a SET X CONTROL LATCHES signal on line 1244; a further control LATCH (X1) 1255 is set by the SET X CYCLE signal on line 1234. The X1 CONTROL LATCH 1255 is the latch which starts the entire ring operating and therefore it is set specially at the start of each X cycle. Similarly, whenever a program reset condition is indicated by the PROGRAM RESET signal on line 356, this latch must be reset so that the X RING will start by first setting the X1 CONTROL LATCH 1255.

In operation, the SET X CYCLE signal on line 1234 causes the X1 CONTROL LATCH 1255 to turn ON, and therefater the SET X RING LATCHES signal on line 1245 will cause the X1 RING LATCH 1250 to be turned ON. With the X1 RING LATCH ON, the X2 CONTROL LATCH 1254 will be set by the corresponding AND circuit 1266 when the SET X CONTROL LATCHES signal appears on line 1244; this operation proceeds down through the circuit of FIG. 75 until all of the latches in turn have been set at appropriate times.

From the CYCLE CHART of FIG. 36 (Sheet 22) and X RING CONTROL (FIG. 74), it can be seen that the X CONTROL LATCHES are reset at time D, and set at time E EARLY (last half of D and first half of E); again reset at time G and set at time H EARLY (last of G and first of E). The X RING LATCHES are reset at times B EARLY and F3 in preparation for setting at times B and F, respectively. Thus each latch is reset just before one of them will be set.

With reference again to the CYCLE CHART of FIG. 36 and the X RING CONTROL circuits of FIG. 74, it will be seen that once the X1 CONTROL LATCH is set, the X1 RING LATCH will be set by the SET X RING LATCHES signal which is generated at time B of the first X cycle. Then the RESET X CONTROL LATCHES signal at time G will cause the X1 CONTROL LATCH to be reset. Thereafter, the SET X CONTROL LATCHES signal on line 1241 will appear at time F causing the X2 CONTROL LATCH to be set; then the X1 RING LATCH will be reset at time B EARLY, and the X2 RING LATCH will be set at time B. During any one X CYCLE, the X RING may advance twice, (in the same fashion as does the I RING) provided that the PROCESS 2ND CHARACTER signal on line 878 appears to energize the AND circuits in FIG. 74.

It should be noted that the X6 CONTROL is used to signify the end of the X ring thereby inhibiting PROCESS 2ND CHARACTER in FIG. 58, and comprises a late X5, used to gate the fifth index result into the address registers as described hereinafter. The end of indexing is otherwise terminated by the NOT INDEX signal on line 1028, which is utilized in the NEXT CYCLE IS I CYCLE generation of FIG. 60; this line will become activated due to a resetting of the signals which cause it, whenever a C cycle or D cycle will be set as a result of X5 or X10 (in FIG. 72). The occurrence of the C or D cycle will cause the next cycle I CYCLE to take place as a result of the AND circuit 1011 (or 1012, in the case of D cycles) in FIG. 60. Thus, whenever indexing is utilized, once I5 is reached, the I cycle clock (I RING) stays at I5 while X cycles are taken; after five X cycles are taken (which will be accomplished in three memory cycles), a C cycle is taken to cause the information in the AAR to be read into the CAR; the C cycle occurring, together with I5, causes the next I CYCLE to occur. The same is true for the B address indexing which takes place at the end of I10 time, and the five X cycles will cause the D CYCLE to come on, which in turn causes the next I CYCLE to finish the instruction readout operation. Thus, the machine will step through successive cycles so as to proceed as necessary through a complete instruction readout.

18. TERMINATION OF EXECUTE CYCLES

*a. Last execute cycle*

Figure 76:
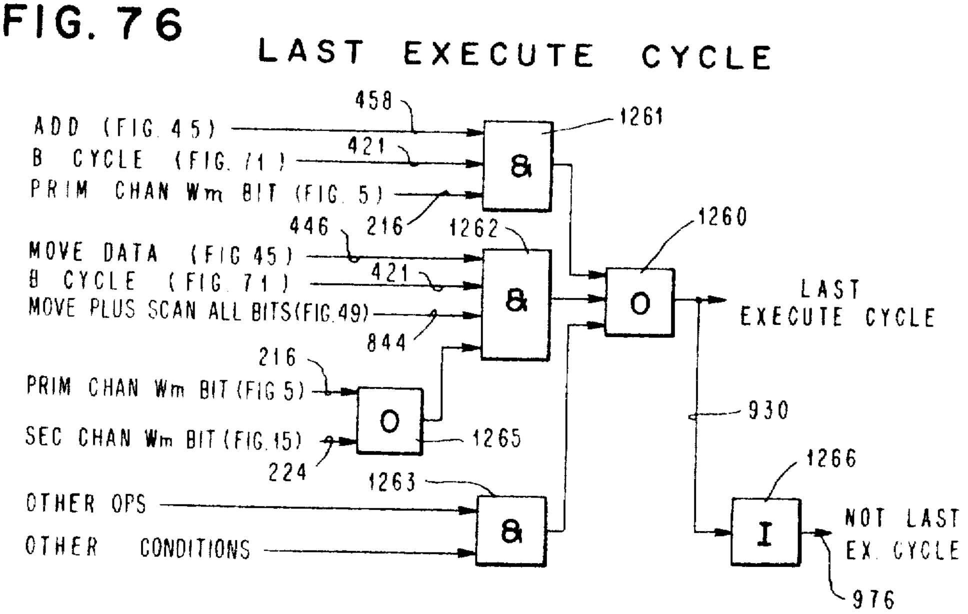

The LAST EXECUTE CYCLE signal on line 930 is generated in FIG. 76 (Sheet 42) by an OR circuit 1260 in response to any one of three AND circuits 1261–1263. The AND circuit 1261 is operative whenever there is an ADD signal on a line 458, within a B CYCLE (421), whenever a WM bit is sensed in the PRIMARY CHANNEL 216. Thus, the last cycle of an ADD operation is determined solely by a field-terminating WM bit being sensed in a B field (during a B cycle), on the PRIMARY CHANNEL. The AND circuit 1262 is equivalent to the AND circuit 1261, but relates to a MOVE DATA instruction, due to the signal on line 446. During any B cycle (421) in a DATA MOVE of the type which is a MOVE PLUS SCAN ALL BITS, as indicated by the signal on line 844, the sensing of a WM bit in either the PRIMARY CHANNEL *or* the SECONDARY CHANNEL will cause an OR circuit 1265 to gate the AND circuit 1262 thereby to establish the LAST EXECUTE CYCLE signal on line 930. The AND circuit 1263 illustrates the fact that other operations may be combined with other terminating conditions so as to cause LAST EXECUTE CYCLE to exist in any embodiment of the present invention, which encompasses additional various operations. The LAST EXECUTE CYCLE signal on line 930 is also fed to an inverter 1266, and generates the NOT LAST EXECUTE CYCLE signal on line 976.

*b. Time* (t) *last*

Figure 77:
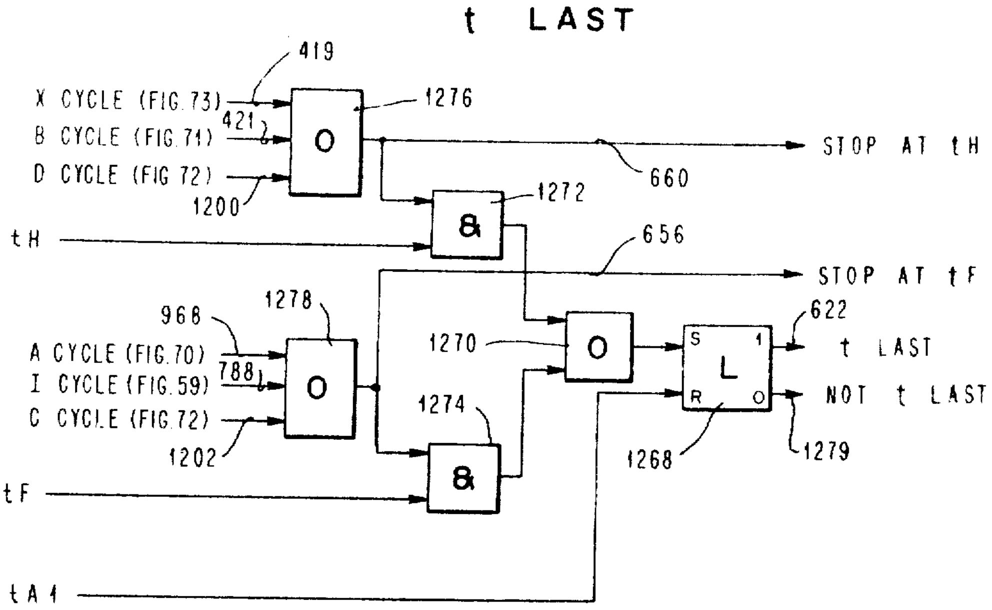

The *t* LAST signal on line 622 is generated in FIG. 77 by a latch 1268 which may be set by an OR circuit 1270 in response to either of two AND circuits 1272, 1274. The AND circuit 1272 is responsive at time H to an OR circuit 1276 which recognizes X, B or D cycles on lines 419, 421 and 1200, respectively, which generate the STOP AT *t*H signal on line 660. The AND circuit 1274 is operative at time F in response to an OR circuit 1278 during an A CYCLE, I CYCLE or C CYCLE, due to the signals on line 968, 788, and 1202, respectively, which generates the STOP AT *t*F signal on line 656. The OR circuits 1276, 1278 are therefore indicative of the length of each cycle, the A cycle (and subsidiary C cycle) together with the I cycle are short cycles, whereas the B cycle and its subsidiary D cycle are long cycles to account for the memory loading, as indicated in the CYCLE CHART of FIG. 35; the X cycle, although not a memory cycle, is a long cycle as indicated in the CYCLE CHART of FIG. 36. The latch 1278 is reset at time A1 (which is the end of each cycle) thereby being settable at the following time H or F in dependence upon the kind of cycle involved. Whenever the latch 1268 is reset, there is a NOT *t* LAST signal generated on a line 1279.

*c. End of "A" field*

Figure 78:
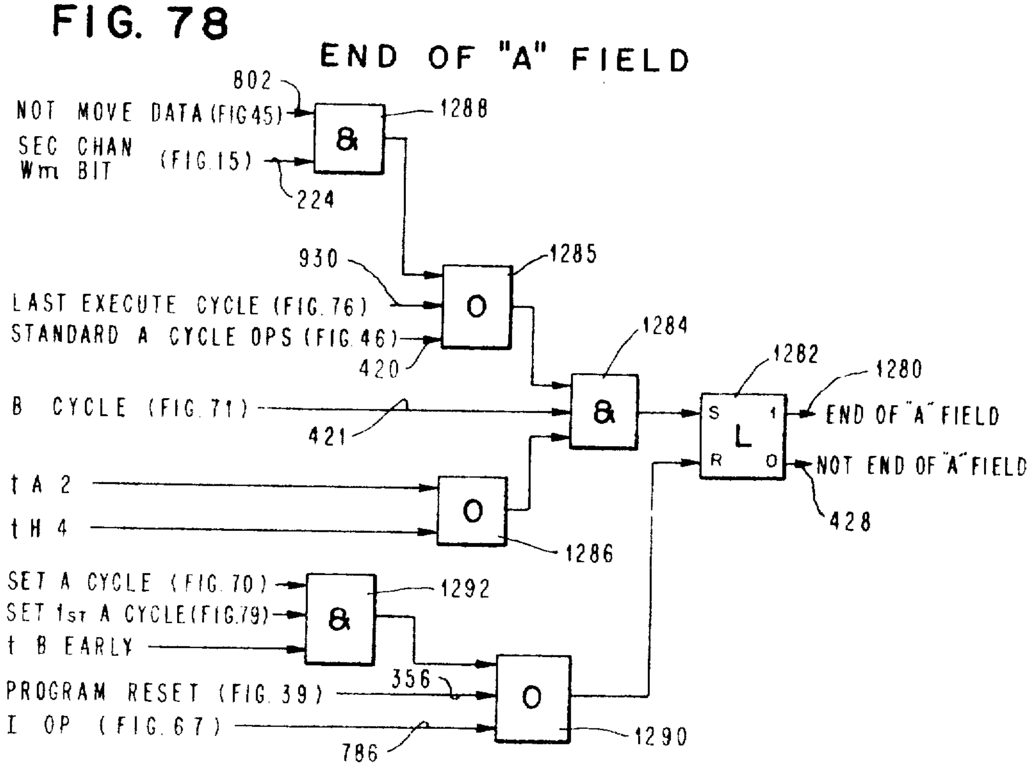

The NOT END OF "A" FIELD signal on line 428, and an END OF "A" FIELD signal on a line 1280 are generated in FIG. 78 by a latch 1282 which may be set by an AND circuit 1284 within a B CYCLE (421) due to the presence of a signal from each of two OR circuits 1285, 1286. The OR circuit 1286 is operative during either time A2 or time H4, and the OR circuit 1285 is operative during the LAST EXECUTIVE CYCLE (930) of STANDARD A CYCLE OPS (420) whenever a SECONDARY CHANNEL WM bit is sensed by an AND circuit 1288 unless there is a MOVE DATA operation being performed, as indicated by the absence of a NOT MOVE DATA signal on line 802. In the present embodiment, the only operation which is not a MOVE DATA is an ADD operation, so that whenever a SECONDARY CHANNEL WM bit is sensed, it automatically forces the END OF "A" FIELD. On the other hand, END OF "A" FIELD is set as a result of LAST EXECUTIVE CYCLE, even if the LAST EXECUTIVE CYCLE is *not* set as a result of the END OF "A" FIELD, and whenever A cycles are not going to be taken in any way, the END OF "A" FIELD signal is present on line 1280.

The latch 1282 is reset by an OR circuit 1290 during time B early of the 1ST A CYCLE in response to an AND circuit 1292 or as the result of PROGRAM RESET on line 356, or during the start of an I CYCLE as the result of the I OP signal on line 786.

19. BRIEF DESCRIPTION OF ADDRESS CIRCUITS

Figure 80:
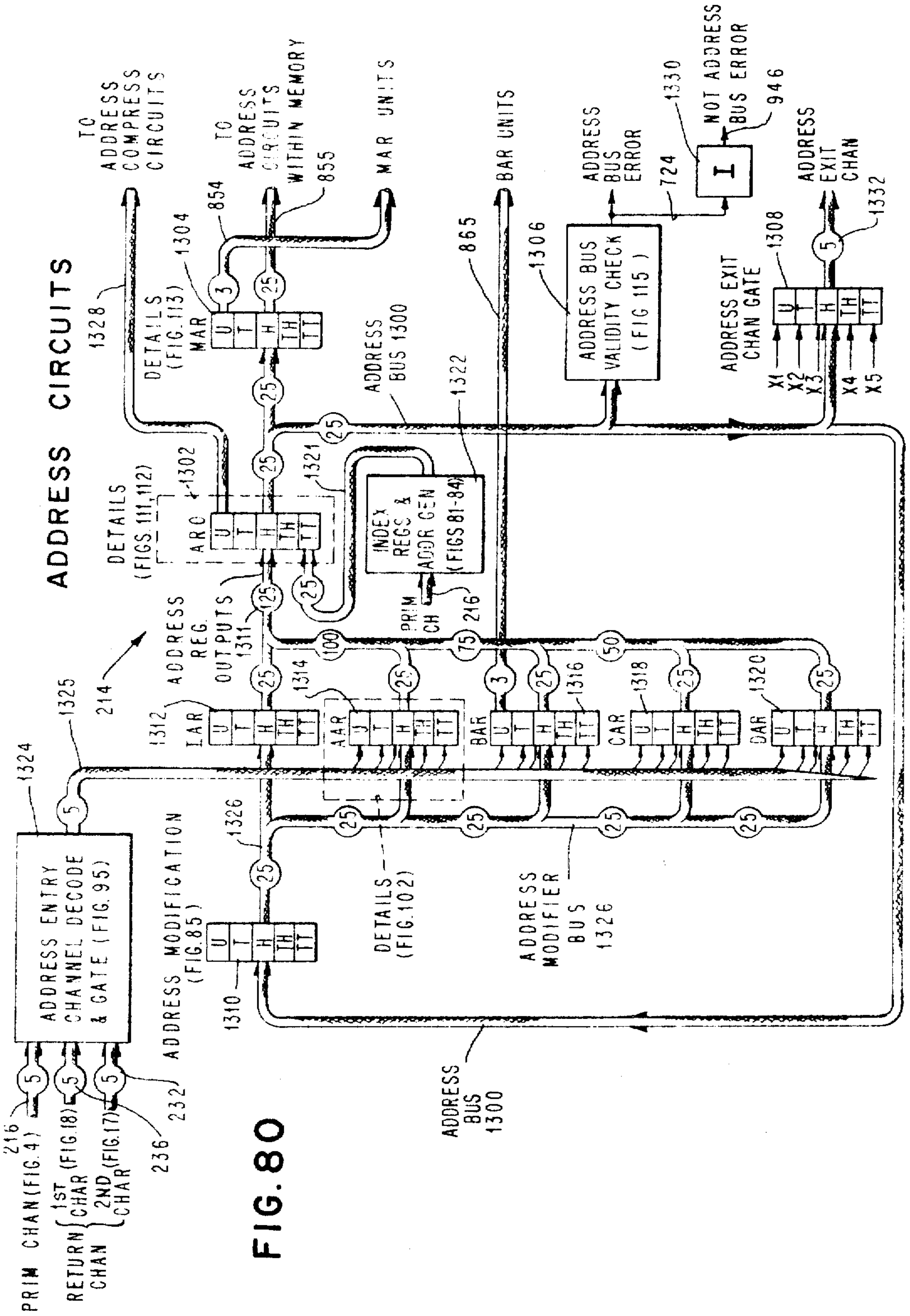

A block diagram of the ADDRESSING CIRCUITS 214 is shown in FIG. 80 (Sheet 44). The ADDRESSING CIRCUITS of FIG. 80 are all connected to an ADDRESS BUS 1300 which is capable of carrying 25 bits, there being a two-out-of-five bit code representation for each of the five positions (or character) of an address: units, tens, hundreds, thousands, ten thousands. The ADDRESS BUS derives its signals from an ADDRESS READ OUT (hereinafter referred to as ARO) 1302. The BUS 1300 may deliver signals to the MEMORY ADDRESS REGISTER (hereinafter referred to as MAR) 1304, an ADDRESS BUS VALIDITY CHECK circuit 1306, an ADDRESS EXIT CHANNEL GATE 1308, and an ADDRESS MODIFICATION CIRCUIT 1310. The ARO 1302 is in turn responsive to any one of the 25 bit outputs of five different address registers: the INSTRUCTION ADDRESS REGISTER (IAR) 1312; the A ADDRESS REGISTER (AAR) 1314; the B ADDRESS REGISTER (BAR) 1316; the C ADDRESS REGISTER (CAR) 1318; and the D ADDRESS REGISTER (DAR) 1320. The ARO 1302 is also responsive to an INDEX REGISTERS & ADDRESS GENERATOR circuit 1322, which in turn is responsive to the PRIMARY CHANNEL 216. The PRIMARY CHANNEL 216 also feeds an ADDRESS ENTRY CHANNEL DECODE & GATE circuit 1324, along with the 1ST CHARACTER BUS 236 and 2ND CHARACTER BUS 232 of the RETURN CHANNEL. The output of the ADDRESS ENTRY CHANNEL DECODE & GATE 1324 supplies inputs to the AAR, BAR, CAR AND DAR, in common, via a fine bit entry bus 1325. The output of the ADDRESS MODIFICATION circuits 1310 is fed in parallel to each of the ADDRESS REGISTERS via a 25 bit ADDRESS MODIFIER BUS 1326, there being a two-out-of-five bit code for each of five characters (or positions) of an address. The ARO may be connected TO ADDRESS COMPRESS CIRCUITS as shown by way of example by a BUS 1328.

The MAR 1304 supplies MAR UNITS bits over the three bit BUS 854 to the MAR ODD/EVEN controls of FIG. 51 (Sheet 29 discussed in Section 14*b* hereinbefore); similarly the BAR 1316 suplies BAR UNITS bits over three BUS 865 to the BAR ODD/EVEN controls shown in FIG. 52 (Sheet 29).

The ADDRESS BUS VALIDITY CHECK circuit 1306 generates the ADDRESS BUS ERROR signal on line 724 and, by means of an inverter 1330, generates the NOT ADDRESS BUS ERROR signal on line 946. The ADDRESS EXIT CHANNEL GATE 1308 supplies information to a five bit bus comprising the ADDRESS EXIT CHANNEL 1332.

Due to the repetitive nature of the circuits, not all of the circuits have been shown in any greater detail than that illustrated in FIG. 80. For instance, all of the ADDRESS REGISTERS are similar, and the AAR 1314 is shown in greater detail by way of example. The ADDRESS EXIT CHANNEL GATE 1308 is not shown in detail, due to the fact that it is a gate of the type used to gate information into the AAR 1314, as will be described in detail in Section 23*d* hereinafter; additionally, it is similar in many respects to the ARO 1302 which is discussed in greater detail in Section 24*c* hereinafter.

Before discussing the details of the address circuits, the purpose of the various portions thereof will be outlined briefly in succeeding paragraphs.

Any address information which is to enter into the ADDRESS CIRCUITS must be applied either by the PRIMARY CHANNEL 216 or by the RETURN CHANNEL 232, 236 to the ADDRESS ENTRY CHANNEL DECODE & GATE circuits 1324. This circuit selects either the PRIMARY CHANNEL, the 1ST CHARACTER bus of the RETURN CHANNEL, or the 2ND CHARACTER bus of the RETURN CHANNEL; the selected data is converted from B C D code into two-out-of-five code; and the data is gated on to the fine bit entry bus 1325 at an appropriate time. Information on the fine bit bus 1325 may be applied to any one of the ADDRESS REGISTERS A–D; the information may be reached in either direction of scan, if MINUS SCAN is used, then the UNITS (U) portion will be first and the TEN THOUSANDS (TT) portion last; if PLUS SCAN is used for any reason, the reverse order might be appropriate. In order to load the IAR 1312, the present contents of the IAR would be moved around into the BAR; information would be brought into the AAR, and the IAR would be loaded from the AAR. After the new IAR data was used, the information originally in the IAR could be returned thereto by transferring it from the BAR.

Each of the ADDRESS REGISTERS may be read out by the ARO 1302 and thence to the ADDRESS EXIT CHANNEL GATE 1308 via the ADDRESS BUS 1300. It is to be noted that the ADDRESS BUS is wide enough (25 bits) to handle an entire address of five (two-out-of-five code) characters, in parallel. Also, the ARO receives 25 bits independently from each of the ADDRESS REGISTERS on a total of 125 lines 1311.

Another way information can be brought into the ADDRESS CIRCUITS is by means of the INDEX REGISTERS & ADDRESS GENERATOR circuits 1322. There, the PRIMARY CHANNEL 216 will present certain zone bits of an address, and when the zone bits are present, this circuits recognizes that indexing must be performed. It decodes the zone bits to values of 1 through 15. These values specify certain like-numbered index registers in memory, and will generate a regular five character address on bus 1321 for application by the ARO 1302 to the MAR 1304. In this way, it is possible to specify index registers which contain data used to increment other addresses. This will be described in greater detail in the next section.

20. INDEX REGISTERS & ADDRESS GENERATOR

*a. Registers*

Figure 81B:
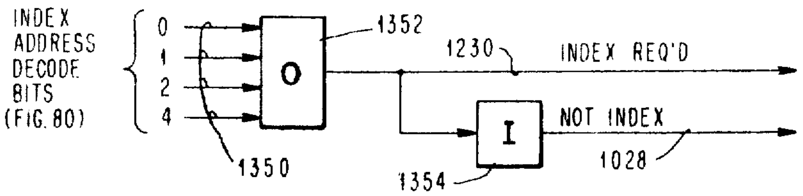
Figure 81A:
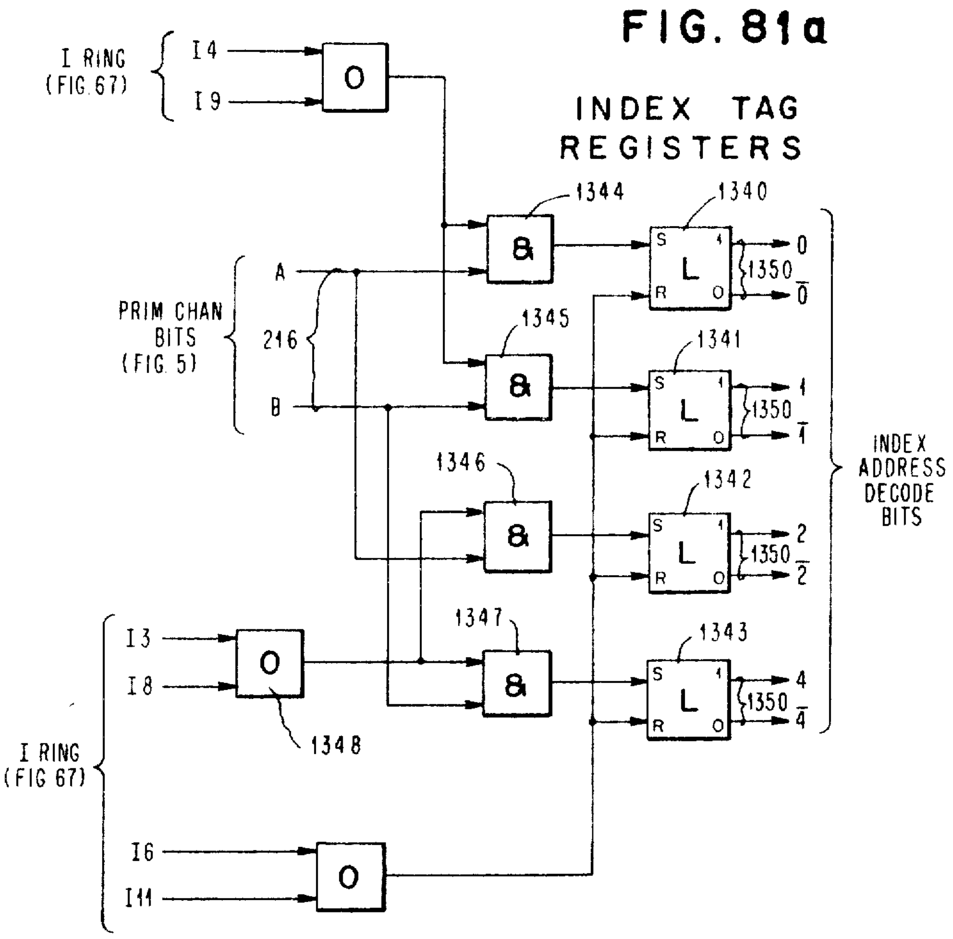

A set of INDEX TAG REGISTERS are shown in FIG. 81*a* (Sheet 45) to comprise essentially four latches 1340–1343, each of which is set by a corresponding AND circuit 1344–1347 in response to combinations of I RING times and PRIMARY CHANNEL zone bits: A bit and B bit. Whenever an instruction is being read out, there first appears on a PRIMARY CHANNEL the operational or instruction part, followed by five characters of A address and five characters of B address (in the examples given in the present embodiment). The first character read out is the highest order, or TT position, of the A address; this is read out at I1 time. Successive orders of the A address are read out at I2 through I5 time. At I3 time, the hundredths order (H) is read out, and if there are any zone bits at this time, they are set into latch 1342 and 1343 by the combination of the OR circuit 1348 and the AND circuit 1346, 1347. Thus, in the hundredths position of the A address, the A bit and B bit are assigned weights of 2 and 4, respectively. In a similar fashion, the A bit and B bit zones on the PRIMARY CHANNEL at I4 time (which coincides with the tens position (T) of the A address) are assigned values of 0 and 1, and will cause the latches 1340–1341 to be set by respective AND circuits 1344, 1345. Thus, the actual reading out of the A address in the instruction will signify that an indexing operation is required by the presence of one or more zone bits in the hundreds and tens position of the address. The latches 1340 provide corresponding true and complement output bits on a plurality of lines 1350.

If any one of these lines are energized, it will operate an OR circuit 1352 in FIG. 81*b*, the output of which comprises the INDEXED REQUIRED signal on line 1230; on the other hand, if there are no true output bits on the lines 1350, then there will be an output from an inverter 1354 which comprises the NOT INDEX signal on line 1028.

*b. Generator*

Figure 82:
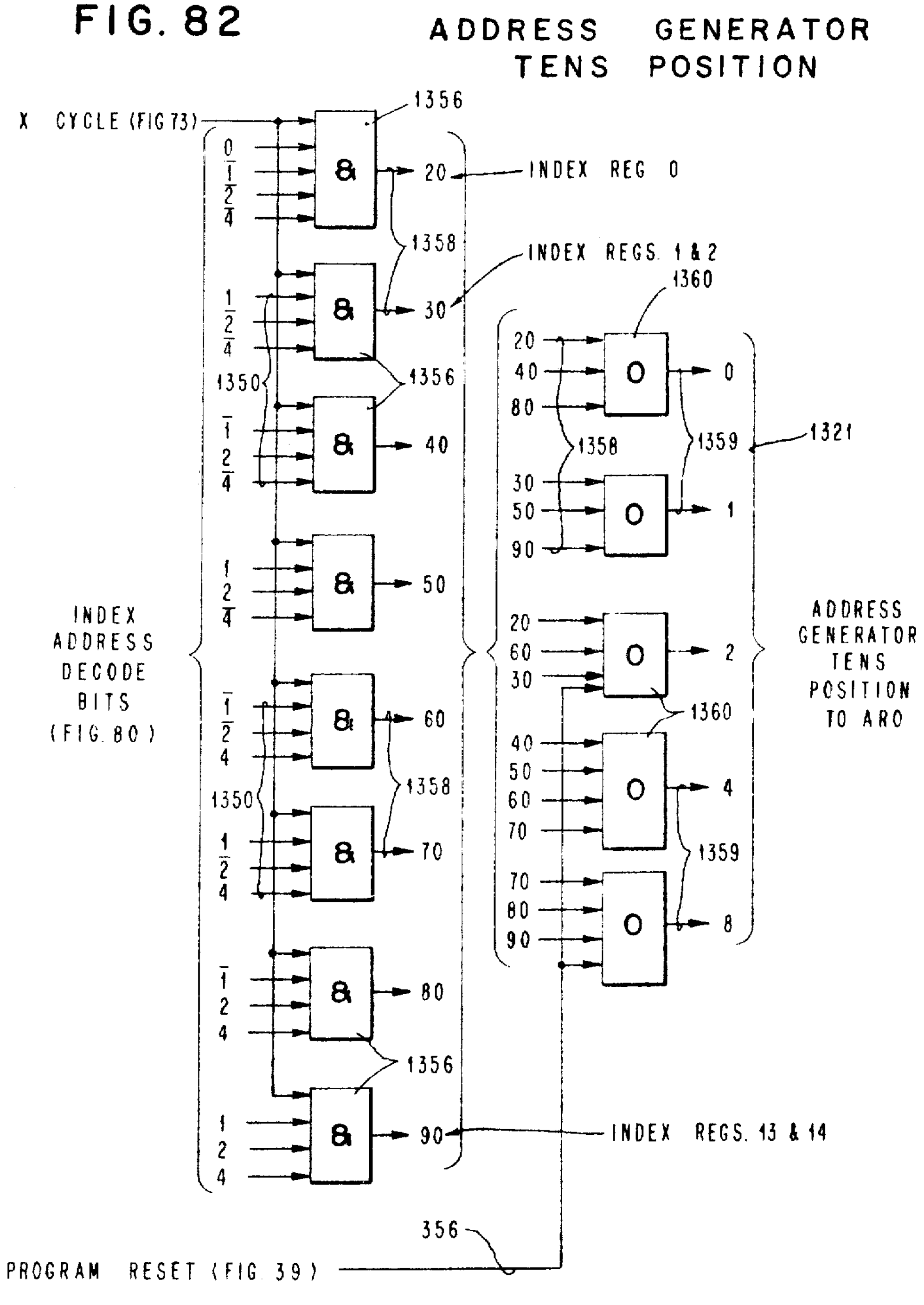
Figure 83:
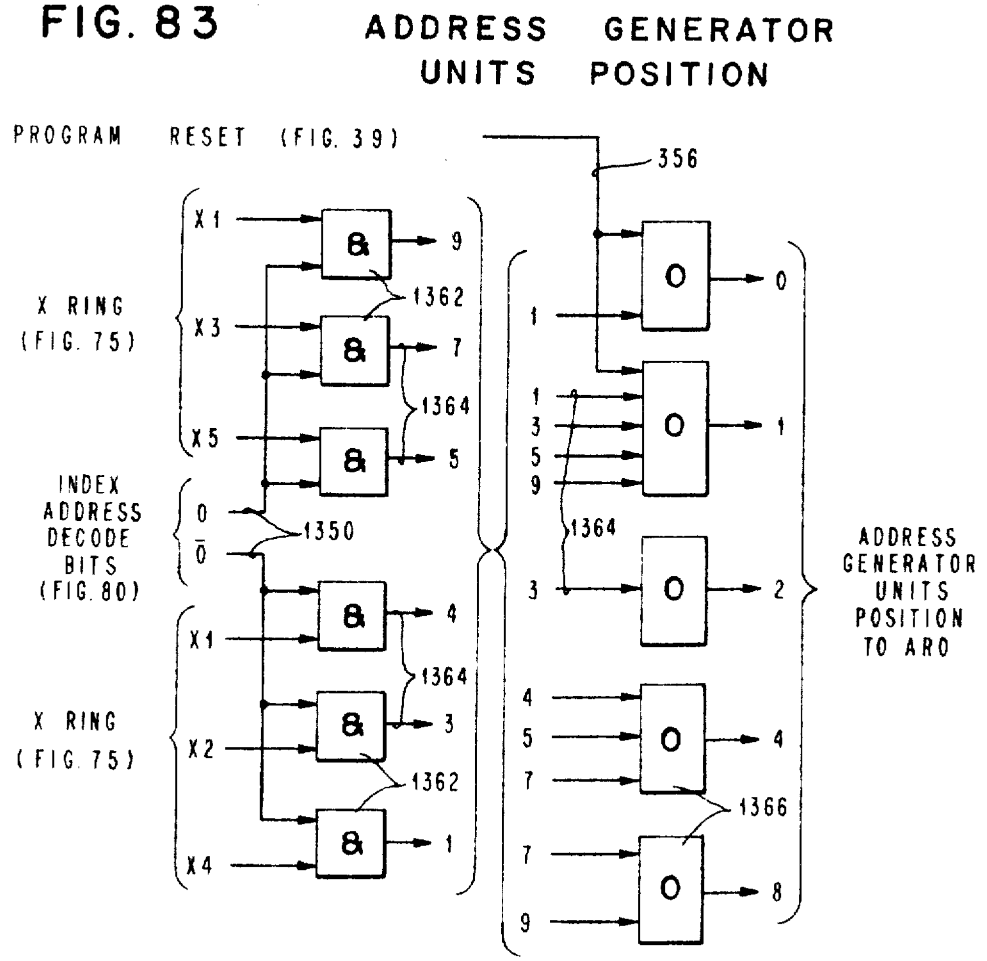
Figure 84:
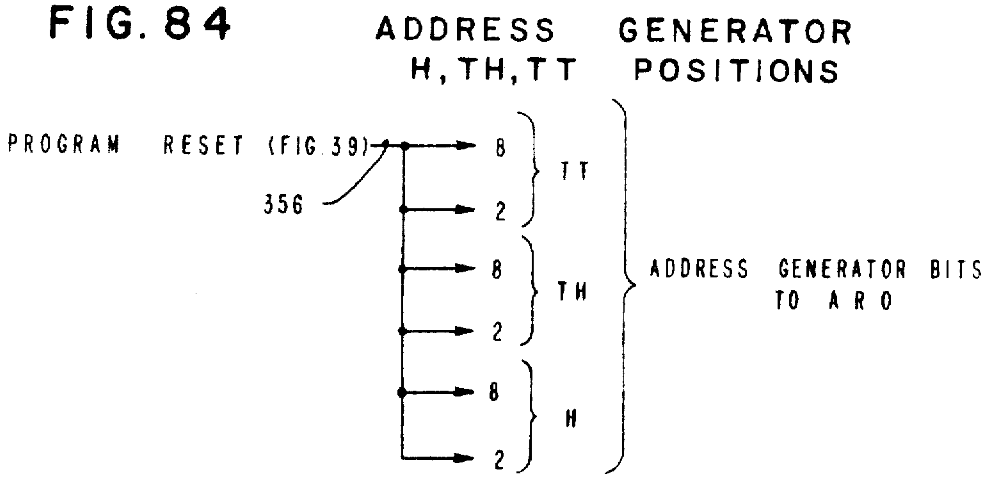

The ADDRESS GENERATOR is shown in FIGS. 82–84. In FIG. 82, the INDEX ADDRESS DECODE BITS from FIG. 81*a* are applied on lines 1350 to a plurality of decoding AND circuits 1356 which generate decimal values 20 through 90 on lines 1358. The reason for this is that fifteen registers in MEMORY, comprising five characters each, are located in MEMORY at addresses chosen to be 00025 through 00099. Thus the decimal values equal the TENS position of the addresses of the registers: INDEX REGISTER 0 is at addresses 25–29; INDEX REGISTER 1 is at addresses 30–44; INDEX REGISTER 2 is at addresses 35–39; and INDEX REGISTER 14 is at addresses 95–99. The INDEX ADDRESS DECODE BITS are therefore weighted to represent the INDEX REGISTER number, and this is decoded to equal the respective address.

The decimal values 20–90 on lines 1358 are applied to plurality of OR circuits 1360 to generate two-out-of-five code equivalents to the decimal values, on lines 1359. The two-out-of-five code combinations on lines 1359 comprise the address generator TENS position bits which are applied to the ARO 1302.

The PROGRAM RESET signal on line 256 forces an address of 0 by generating the 2-bit and 8-bit of the two-out-of-five code on lines 1359. This permits generating an INSTRUCTION ADDRESS of 00$\underline{0}$1 (the TENS position only being generated here), so as to permit starting on a program after reset.

The INDEX ADDRESS DECODE BITS on lines 1350 may be considered to be binary bits having the weights shown therein. If the address 20 (top of FIG. 82) were considered to be a base address of 0, and the address 90 to be a base 70, then the input to the AND circuit 1356 would be a B C D equivalent to these. Thus, the output of the AND circuits 1356 are ten times as great and twenty times higher than the B C D inputs; for instance the second AND circuit from the top generates an address of decimal 30 in response to an input of B C D 1, and the bottom AND circuit 1356 in FIG. 82 generates an address of decimal 90 in response to an input of B C D 7.

Bearing in mind the B C D equivalent to the index address decode bit output of FIG. 81*a* on line 1350, the 0 and $\bar{0}$ representations are applied to a plurality of AND circuits 1362 in FIG. 83. Where there is a $\bar{0}$ bit on one of the lines 1350, then the address is between 30 and 35, 40 and 45 . . . 50 and 55. On the other hand, when the 0 bit *is* present on the line 1350, then the address is between 25 and 30, 35 and 40 . . . 85 and 90. The output of the AND circuits 1362 on lines 1364 indicate the relationship just described. These outputs are applied to a plurality of OR circuits for encoding into the two-out-of-five code in the usual fashion; for instance, the output of the top AND circuit 1352 equals a decimal value of 9, which comprises an 8-bit and a 1-bit; therefore, the 9 is applied to the OR circuit 1366 which generates the 1-bit and to the OR circuit 1366 which generates the 8-bit.

The PROGRAM RESET signal on line 356 forces the UNITS 0 and 1 bits and the H, TH, TT 2 and 8 bits of the two-out-of-five code (FIGS. 83, 84) so as to generate the INSTRUCTION ADDRESS 0000$\underline{1}$, as mentioned above.

In summation, each address being read out with an instruction may or may not have zone bits in the T and H positions of the address. If there are zone bits, these indicate that an index operation is required, and the amount of the indexing is determined by a value stored in a particular index register at a particular address in memory. The particular address in memory is determined by the zone bits actually found over the H and T positions. This is decoded in a fashion which bears a relationship to the B C D code, the 1, 2 and 4 bit specifying the decimal values, a zero bit specifying it is the high half of the decimal value, and the lack of a zero bit specifying that it is in the low half of the decimal value. For instance, if index address decode bit of 0, 1 and 4 are present, the 1 and 4 will cause a decimal 70, and the zero will indicate that it is between 75 and 79. The zero indication is converted into ADDRESS GENERATOR UNIT POSITION values, whereas the decimal portion is converted to ADDRESS GENERATOR TENS POSITION values, both in the two-out-of-five code. The address generator hundreds, thousands and tens thousands positions are normally set to zero, which equals 8 and 2 in the two-out-of-five code.

21. ADDRESS MODIFICATION

Inasmuch as one character or two characters may be processed, and plus or minus scan may be used, the address modification circuitry in the present embodiment is capable of modifying any address by plus or minus one, or by plus or minus two; additionally, in order to utilize the ADDRESS BUS 1300 (FIG. 80) for moving addresses around within the ADDRESS CIRCUITS, it is necessary that the ADDRESS MODIFICATION circuit 1310 be able to pass information without modification; therefore a modify by zero capability is also provided.

*a. Mod by 0*

Figure 85:
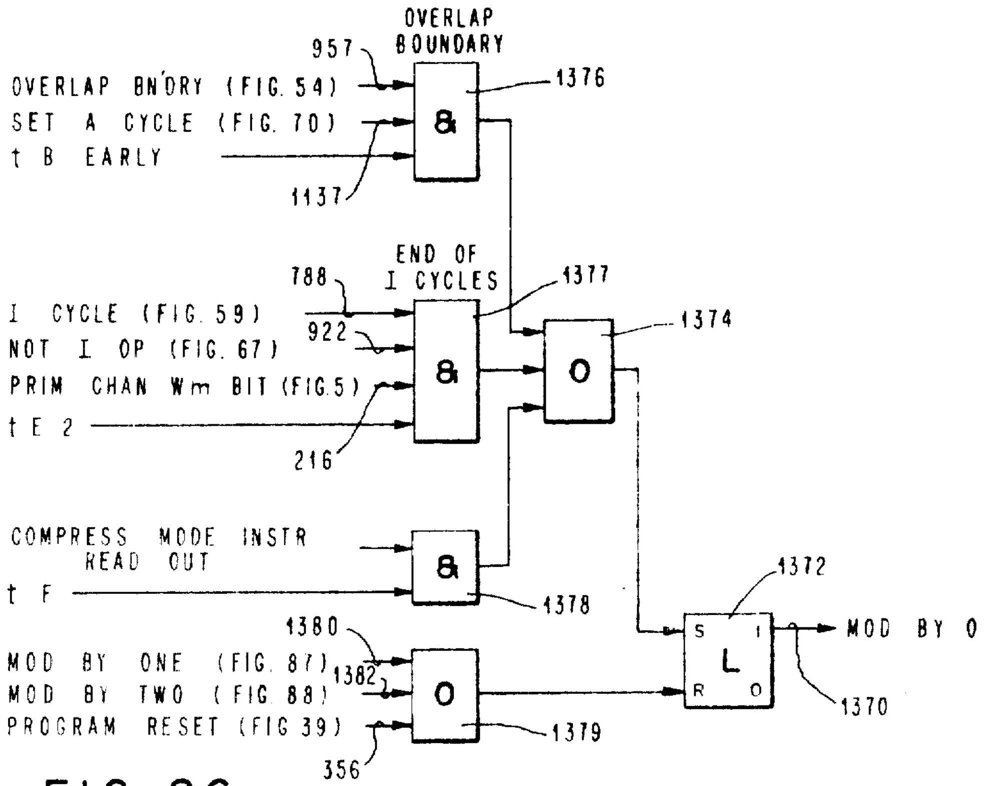

A MOD BY 0 is generated on a line 1370 in FIG. 85 by a latch 1372 which may be set by an OR circuit 1374 in response to any one of three AND circuits 1376–1378.

Figure 94A:
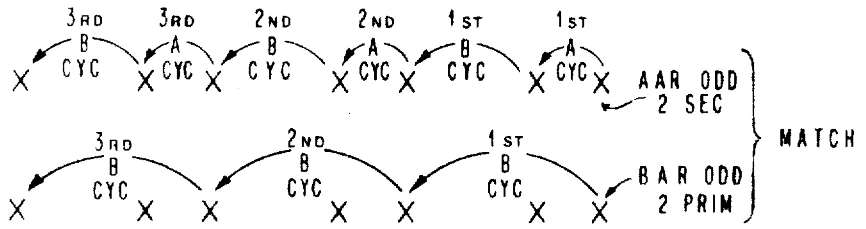
Figure 94B:
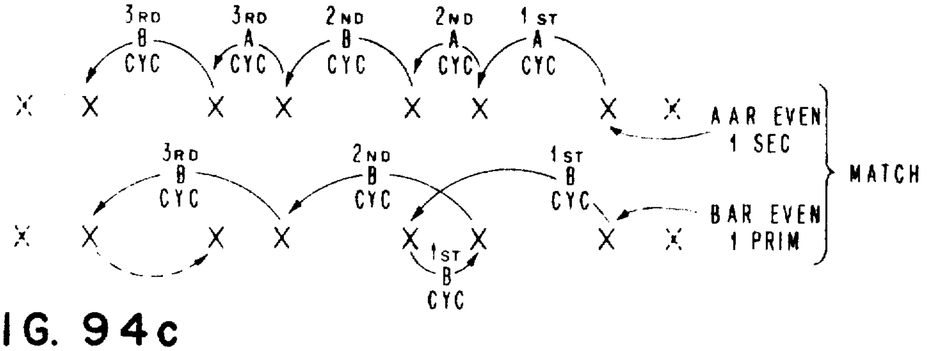
Figure 94C:
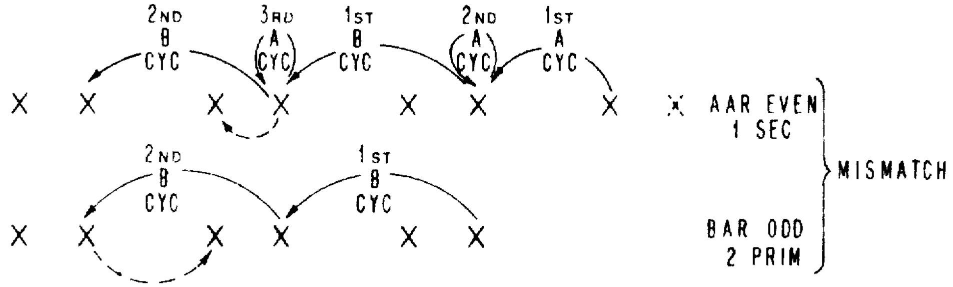

The AND circuit 1376 is used in an OVERLAP BOUNDARY situation (due to the signal on line 957) at the start of each A CYCLE (1137) at time B early (see FIG. 94*c*). Thus, whenever only one A field character, but two B field characters are available at the first addresses, the OVERLAP BOUNDARY latch will go on during the first A cycle (FIG. 54); during said first A cycle that A field will be modified by 1, but during all subsequent A cycles (after overlap boundary is turned on) the A address is modified by 0, and, as will be seen in FIG. 88, will be modified by two during each B cycle instead.

The AND circuit 1377 accounts for the address modification at the end of an I CYCLE. During each I cycle (788), the sensing of a PRIMARY CHANNEL WM bit (216), at other than I OP time (922) indicates that the entire instruction has been read out, and further, that the first character of the following instruction has also been read out. This is utilized to test the length of the instruction to see that it is accurate; it also means that the IAR has been set to the address of the first character of the next instruction. Therefore, further modification of the instruction address is to be inhibited, so that when the following instruction is to be read out, the IAR will still be set to the address of the first character ADDRESS. Thus, when the first character of the next instruction is sensed, the MOD BY 0 signal on line 1370 must be generated so that this same address will be available when the time comes to read out said next instruction.

The AND circuit 1378 illustrates how additional computer modes might be accommodated to generate the MOD BY 0 signal, by application of a COMPRESS MODE INSTRUCTION READ OUT signal, for instance.

The latch 1372 is reset by an OR circuit 1379 in response to a MOD BY 1 signal on a line 1380 (developed in FIG. 87), a MOD BY 2 signal on a line 1382 (developed in FIG. 88), or by the PROGRAM RESET signal on line 356. Thus, developing any other MOD BY signal will cause the MOD BY 0 latch to be reset so that only one MOD BY signal appears at any one time; furthermore, as described briefly above and in detail hereinafter, when the MOD BY 2 signal is generated for modifying A addresses during B cycles of an OVERLAP BOUNDARY condition, this fact is what resets the MOD BY 0 latch after it has been set as a result of the AND circuit 1376.

*b. Mod by 1*

Figure 87:
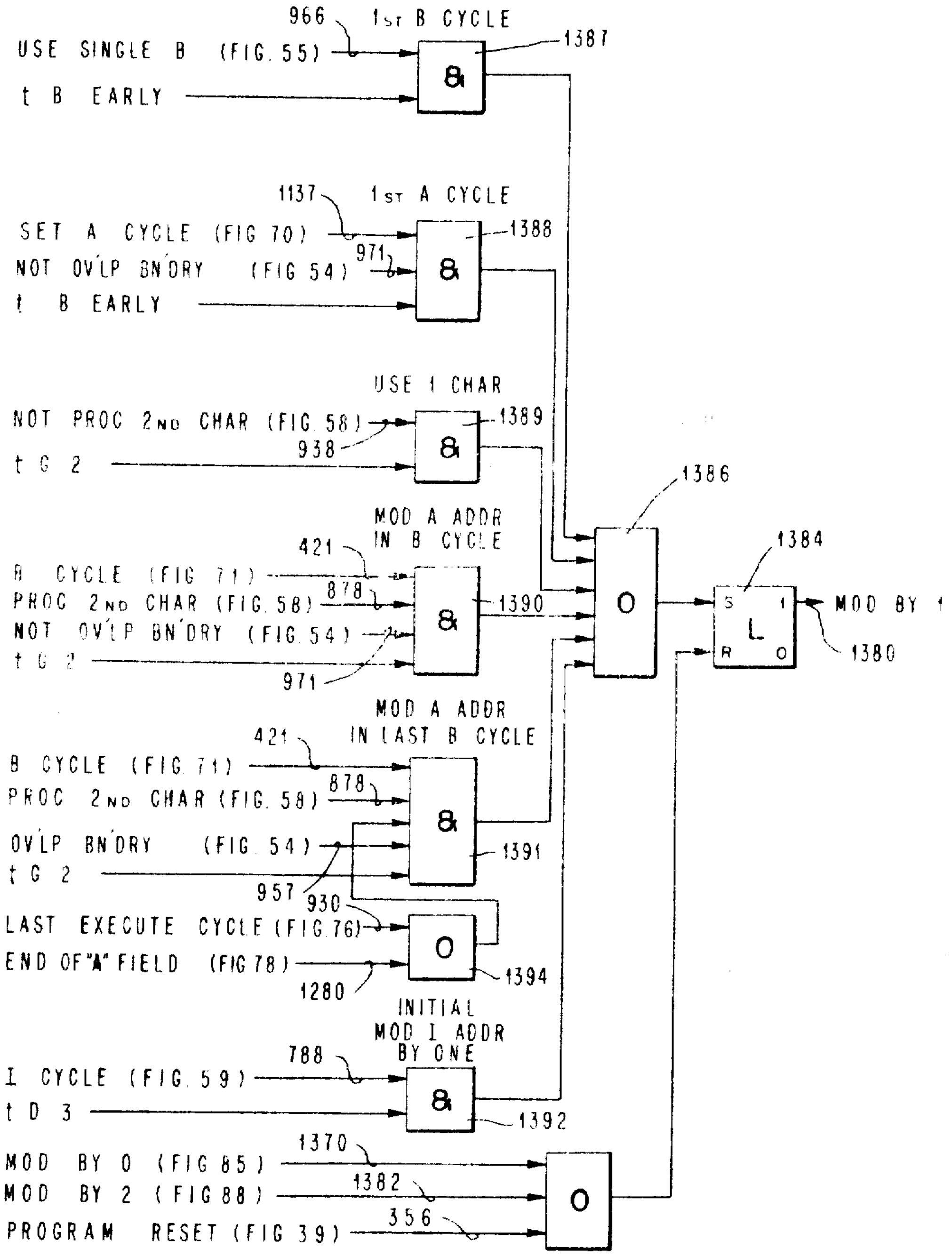

The MOD BY 1 signal on line 1380 is generated in FIG. 87 by a latch 1384 which is set by an OR circuit 1386 in response to any one of six AND circuits 1387–1392, each of which handles a different situation.

Figure 94D:
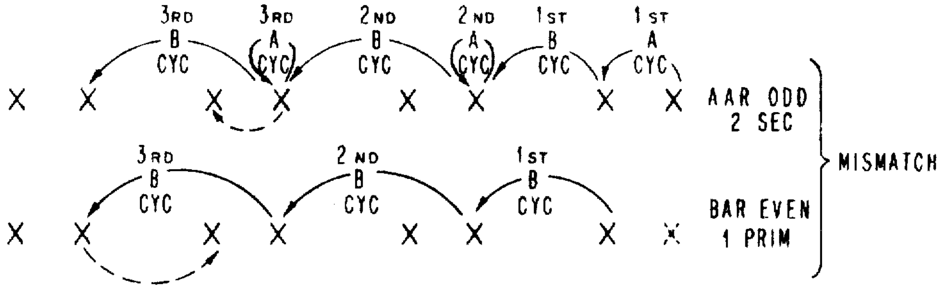

The AND circuit 1387 is operative during a first B cycle to account for the use SINGLE B situation which results when there is one B field character available to the PRIMARY CHANNEL, but two A field characters characters available to the SECONDARY CHANNEL during the first processing time (see FIG. 94*d*). Thus, the USE SINGLE B signal on line 966 is operative to set the latch 1384 at time B early.

The AND circuit 1388 takes care of a first A cycle (FIGS. 94*a, b, c, d*)—and all other A cycles wherein there is *not* an OVERLAP BOUNDARY situation (FIGS. 94*a, b*) at time B early—under control of the signals on lines 1137 and 971.

The AND circuit 1389 is operative whenever only one character can be processed due to the presence of a NOT PROCESS 2ND CHARACTER signal on line 938, to cause a B or I address to be remodified by one (see dotted lines at left of FIGS. 94*b, c, d*, for example).

The AND circuit 1390 accounts for the normal modification of an A field address by one increment during a B cycle (FIGS. 94*a, b*). The address modification scheme herein contemplates the modification of the A field by one during normal addressing within an A cycle, modifying the B field by two during the first half during the first process time of a B cycle, and thereafter either remodifying the B field by one, or modifying the A field again by one. Thus, if two characters are processed, then the B field (modified by two) is correct, and the A field (modified by one) is incorrect. Therefore, a normal two processing cycle requires that the A field be modified again to give it a total modification of two during each normal cycle. The AND circuit 1390 causes the MODIFY BY 1 signal 1380 to appear in this situation. The AND circuit 1390 will respond to B CYCLE, PROCESS 2ND CHARACTER, and NOT OVERLAP BOUNDARY signals on lines 421, 878, and 971, respectively, at time G2.

The AND circuit 1391 accounts for modifying the A address during a last B CYCLE wherein the OVERLAP BOUNDARY situation has existed (see the AAR dotted line near the left of FIG. 94*c*). The A address is normally modified by two during a B cycle of an overlap boundary situation. If the A field has been one character ahead of the B field due to the boundary adjusting situation which results in an OVERLAP BOUNDARY condition, when the operation is to be terminated, the A address wants to be left specifying the character adjacent to the last character processed. Thus, a modification of two during a last B cycle will cause the A address to specify A field characters not yet read out of memory, whereas in fact one extra A field character had been read out of memory and stored in the A data registers due to OVERLAP BOUNDARY condition. The AND circuit 1391 takes care of this situation at time G2 by recognizing a LAST EXECUTE CYCLE or the END OF "A" FIELD by the signals on lines 930 and 1280, respectively, applied to an OR circuit 1394, provided that a B CYCLE (421) occurs in an OVERLAP BOUNDARY CONDITION (957) and there has been a PROCESS 2ND CHARACTER signal on line 878.

The AND circuit 1392 causes the IAR to be modified by one during the first I cycle as the result of the I CYCLE signal on line 788 causing a MOD BY 1 signal on line 1380 at time D3; at time E2, the IAR will again be modified, by zero or two depending upon whether one or two characters are processed. As in the case of the MOD BY 0, the MOD BY 1 latch 1384 is reset by either of the other MOD BY signals, or by PROGRAM RESET (due to the signals on line 1370, 1382, and 1356, respectively).

*c. Mod by 2*

Figure 88:
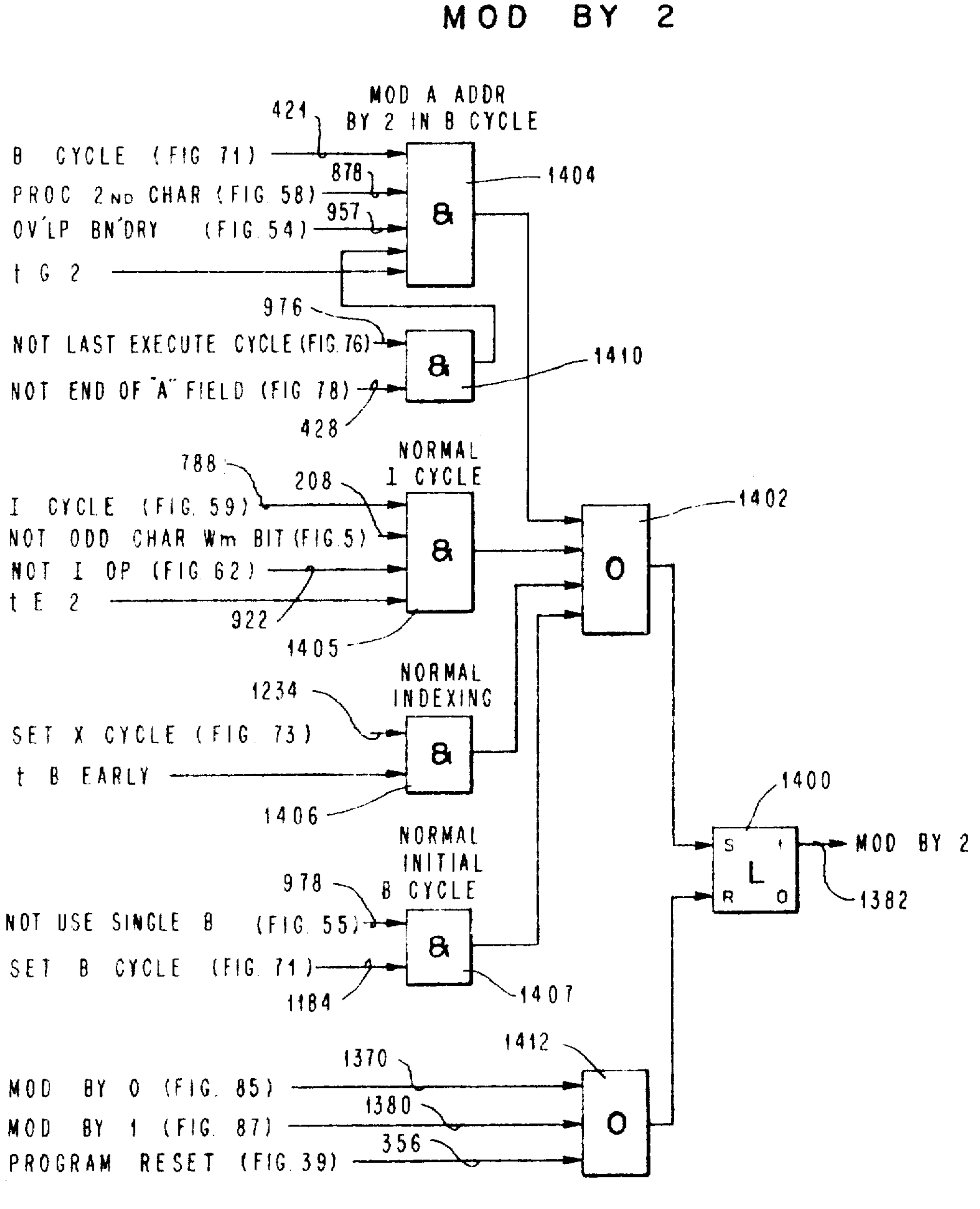

The MOD BY 2 signal on line 1382 is generated in FIG. 88 by a latch 1400 which is set by an OR circuit 1402 in response to any one of four AND circuits 1404–1407, each of which handles a different situation.

The AND circuit 1404 takes care of the situation where the A address is modified by two during each B cycle (421); that is the case where the A field is being accessed in an overlapped fashion with respect to the B field, which condition is indicated by the OVERLAP BOUNDARY signal on line 957 (see FIGS. 94*c, d*). However, unless two characters are processed, then the A field is *not* to be modified by two (see AAR dotted line near left of FIGS. 94*c, d*); therefore the AND circuit 1304 requires a PROCESS 2ND CHARACTER signal on line 878. Further, if there is an END OF "A" FIELD, or if the current cycle is a LAST EXECUTE CYCLE, then there will not be one or the other of the signals on line 428, for 976 to an AND circuit 1410, thereby blocking the AND circuit 1404. In other words, in order to modify the A address by two during a B cycle, there must be a boundary overlap condition, and two characters must be processed; further, it must be known that there will be another character processed (i.e., not the end of the field) because the A field is one character of the B field during the OVERLAP BOUNDARY situation. If either of the signals, NOT LAST EXECUTE CYCLE or NOT END OF "A" FIELD are absent, then it is known that the current cycle will be the last cycle, and that the overlap A character (the A character which is in advance of B characters) will not be utilized. In this situation a modification of the A address by one rather than by two is required, and the AND circuit 1404 will not be operative.

The AND circuit 1405 handles a normal I CYCLE of the kind wherein two characters are to be processed, and neither one of them is the last character to be used. The last character in an instruction readout is actually the first character of the following instruction. This causes the address circuits to be left set to read out the next instruction, and further, allows checking for the correct length of an instruction. In order to achieve two character instruction readout, it is necessary to account for the situation when the first character read out is in fact the first character of the next instruction; in the case the address is set for the next instruction and a MOD BY 0 will result, as described hereinbefore. If the first character is not the last one to be read out, then perhaps the second character is. If this is so, then a modification of one was correct, thereby leaving the IAR set to read the second one of the characters out during the next instruction time since said second character is in fact the first character (operational part) of the following instruction. On the other hand, if neither of a pair of characters read out in an instruction cycle contains a WM bit, then it is possible to take out two more characters. In order to achieve this, the IAR is modified by one during first process line (the last half of B and all of E) and if the modification by one was incorrect, the instruction address (as it originally was) is remodified by zero or two as necessary.

The AND circuit 1405 accomplishes the remodification by two where neither of two characters read out have a WM bit indicating the end of the instruction. The AND circuit 1405 is operative in an I CYCLE (788) at other than I OP time (922) if there is no WM bit in the ODD character: the ODD character is always the second character on an instruction read out because PLUS SCAN is always used for instructions in this embodiment. Thus, a look-ahead situation exists whereby the presence or absence of a WM bit in the second character may be determined before the second character is actually gated onto the PRIMARY CHANNEL. The NOT ODD CHARACTER WM BIT signal on line 208 signifies the fact that modification by two may be used provided that some other modification has not preempted the modification by two.

The AND circuit 1406 is used for normal indexing, and is operative during the start of each X CYCLE (1234), at time D EARLY, to generate a MOD BY 2 signal on line 1382.

The AND circuit 1407 takes care of the first modification in all B cycles; as described hereinbefore, since there is insufficient time to correctly modify both addresses during second process time, the A address is modified by one (which permits checking for A address equal B address, as described in Section 14*f*, hereinbefore) and the B address is modified by two (see FIGS. 94*a–c*). If two characters are to be processed, the B address was correctly modified, and only the A address needs to be changed during second character process time; on the other hand, if only one character is processed, both addresses should have been modified by one, and only the B address will be corrected during second process time. The AND circuit 1407 takes care of the initial, presumed modification of the B address by causing a MOD BY 2 signal on line 1382. At the start of each B CYCLE, a SET B CYCLE signal appears on line 1184, and provided it is NOT USE SINGLE B situation (wherein only one B character will be available but there are two A characters available), then the modification of the B address can be by two. In a situation where A equals one and B equals one on the first memory cycle (FIG. 94*b*), the modification of the B field address will still be by two initially, but at the end of the signal character process time, at time G2, the B field will be modified again, by only one this time, as a result of an AND circuit 1389 (FIG. 87). Thus, the only time the BAR is originally modified by other than two is in a USE SINGLE B situation (FIG. 94*c*), in which case the AND circuit 1407 is blocked by the NOT USE SINGLE B signal on line 978.

The latch 1400 is reset by an OR circuit 1412 as a result of the MOD BY 0, MOD BY 1, or PROGRAM RESET signals on lines 1370, 1380, and 356, respectively.

*d. Plus and minus mod by's*

Within the PLUS/MINUS scan circuits of FIG. 86, the MOD BY signals are combined with PLUS SCAN and MINUS SCAN in a plurality of AND circuits 1414 so as to generate the −2, −1, +1, and +2 MOD BY'S signals on lines 1416. These signals are the ones actually used in the address modification per se, which is described in succeeding paragraphs.

*e. Address modification per se*

The ADDRESS MODIFICATION circuits 1310 include the MOD BY generation described in immediately preceding paragraphs, as well as the circuits which actually perform the modification under control of the MOD BY signals.

Figure 89:
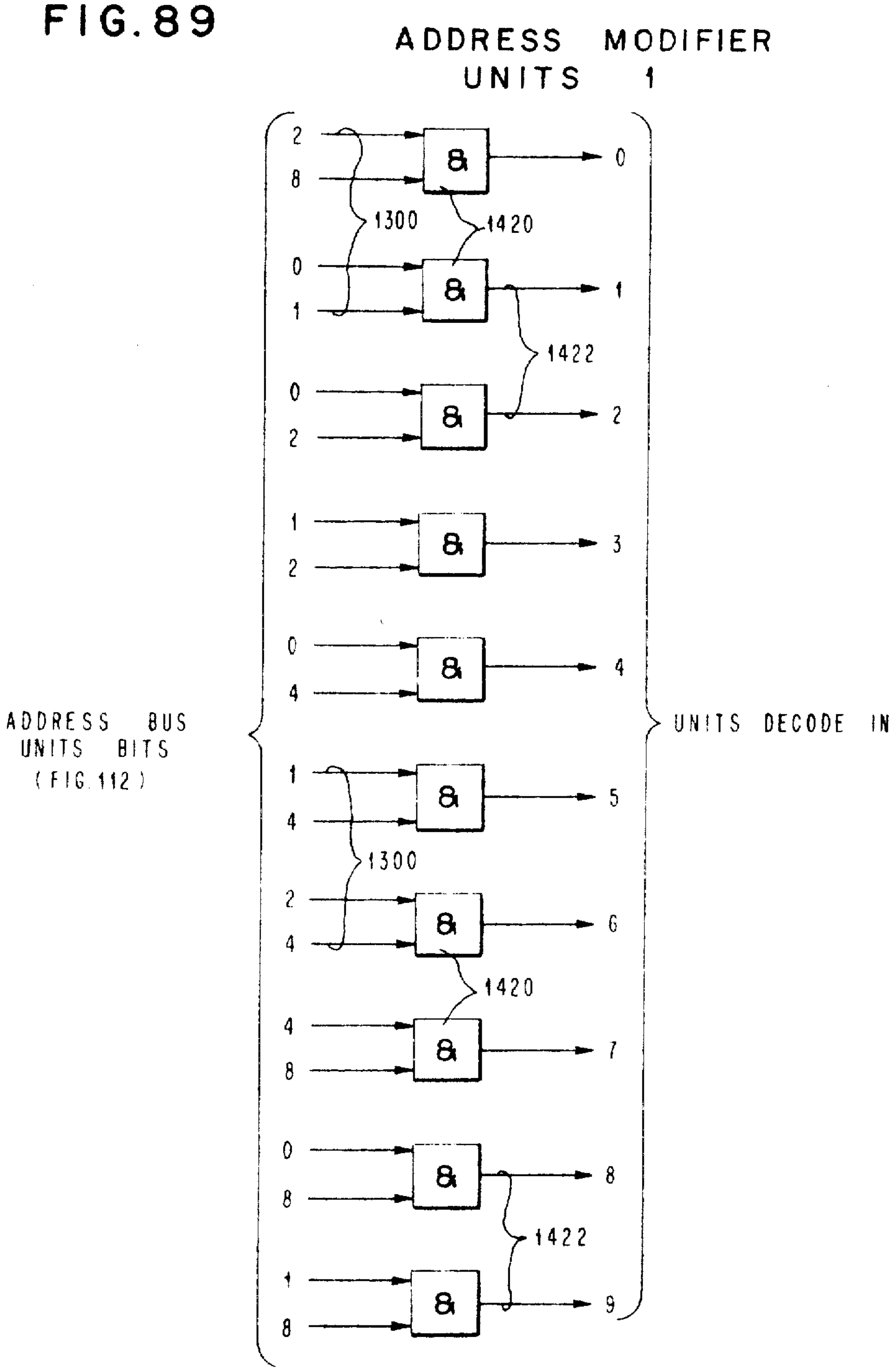

In FIG. 89, there is shown a first portion of the ADDRESS MODIFIER UNITS position of the address modification circuits. There, the UNITS BITS of the ADDRESS BUS 1300 are applied to a plurality of AND circuits 1420 which convert the two-out-of-five code into some intermediary code; in this embodiment, decimal code is used. Thus the AND circuits 1420 each generate a particular decimal signal on one of the lines 1422; for example, the top AND circuit in FIG. 89 responds to two-out-of-five code bits of two and eight, to generate a decimal zero; similarly, the bottom AND circuit 1422 responds to the 2/5 code one and eight bits so as to generate a decimal nine on the lines 1422. The UNITS DECODE IN signals on lines 1422 are applied to a circuits second portion of the ADDRESS MODIFIER UNITS position in FIG. 90. This is a straightforward gating matrix, wherein each decimal value is applied to a gate with one of the choices of modifications also being applied to the same gate. For instance, in FIG. 90, the uppermost input line 1422 relates to decimal eight, and if modified by +2, by an AND circuit 1426, this will result in an OR circuit 1428 generating a UNITS DECODE OUT signal on the one of the lines 1326 which has a decimal value of 0. Similarly, a decimal input value of two applied concurrently with a MOD BY −2 to an AND circuit 1432 will cause the OR circuit 1428 to generate a decimal value of 0 as well. In the case of the eight and +2 generating a 0, it also generates a UNITS CARRY signal on a line 1434, as a result of an OR circuit 1436. Similarly, a nine modified by +1 in an AND circuit 1438 will cause the OR circuit 1428 to generate a 0, and will cause the OR circuit 1436 to generate a UNITS CARRY. If a nine is modified by +2, in an AND circuit 1440, it will cause an OR circuit 1442 to generate a decimal 1 output and will also cause the OR circuit 1436 to generate a UNITS CARRY SIGNAL on line 1434.

Figure 90:
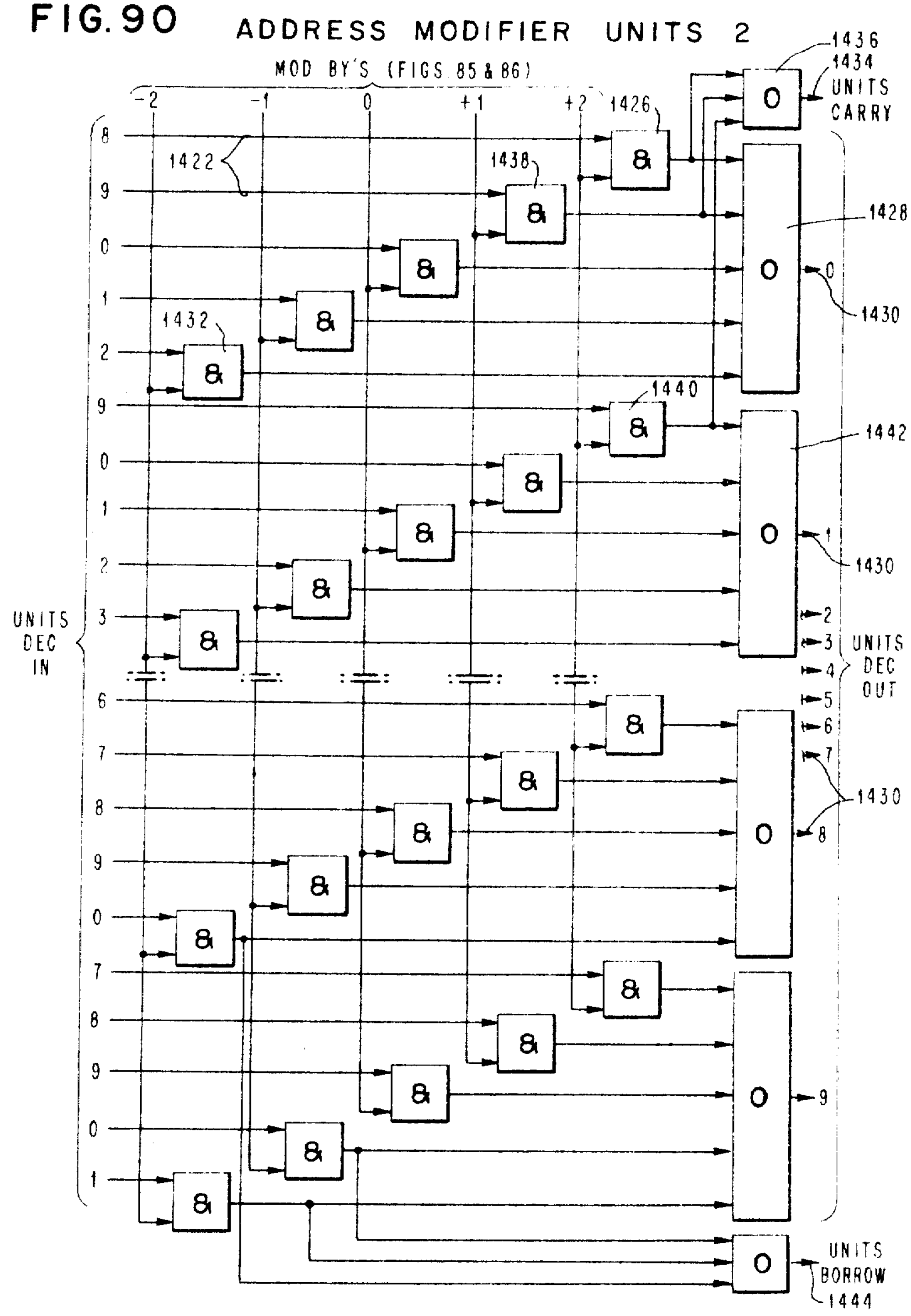

At the bottom of FIG. 90, values of 0 and 1 which are modified by −1 and −2, respectively, will cause a decimal 9 to be generated and will also cause a UNITS BORROW signal to be generated on a line 1444 due to the fact that a subtraction has occurred, and the subtraction results in changing decades.

The UNITS DECODE OUT signals on lines 1430 are utilized in FIG. 91 to generate ADDRESS MODIFIER BUS UNITS signals on a plurality of lines 1326, by having each UNITS DECODE OUT signal connected to corresponding ones of a plurality of OR circuits 1452, so as to generate the necessary two-out-of-five code bits.

Figure 93:
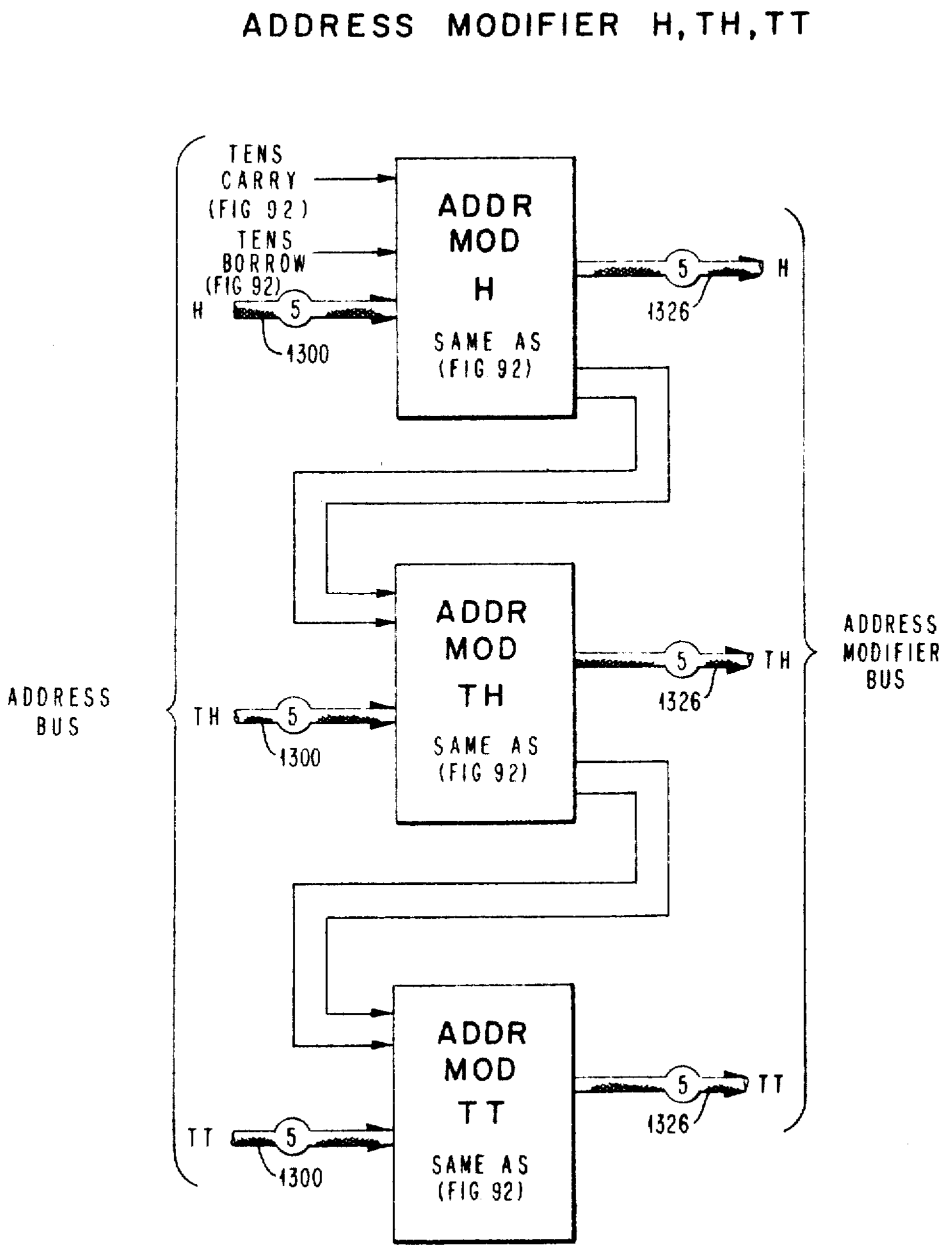

The UNITS CARRY and UNITS BORROW signals on lines 1434 and 1444 respectively are used in FIG. 92 so as to provide any necessary modification to the TENS position of the address being modified. FIG. 92 is actually very similar to the circuits of FIGS. 89–91 except for the fact that the modification of the tens is either by +1, due to a CARRY, a −1 due to a BORROW, or by 0, due to the lack of a CARRY or a BORROW. This circuit will generate a TENS CARRY signal on a line 1454, a TENS BORROW signal on a line 1456, and ADDRESS MODIFIER BUS TENS signals on the bus 1326. The address modification for the hundreds, thousands and ten thousands orders is the same as that for the tens order, and is illustrated briefly in FIG. 93. There, each responds to the next lower CARRY and BORROW signal and to the appropriate position of the ADDRESS BUS 1300 to generate new address signals on the respective five bit portions of the twenty five bit ADDRESS MODIFIER BUS 1326, which bus feeds each of the ADDRESS registers 1312–1320 (as shown in FIG. 80).

It should be understood that any address modification scheme which is capable of modifying by plus or minus one, plus or minus two, or zero, may be utilized in place of the circuits shown in FIGS. 89–93, those circuits being exemplary only.

22. ADDRESS ENTRY CHANNEL DECODE AND GATE

Figure 95:
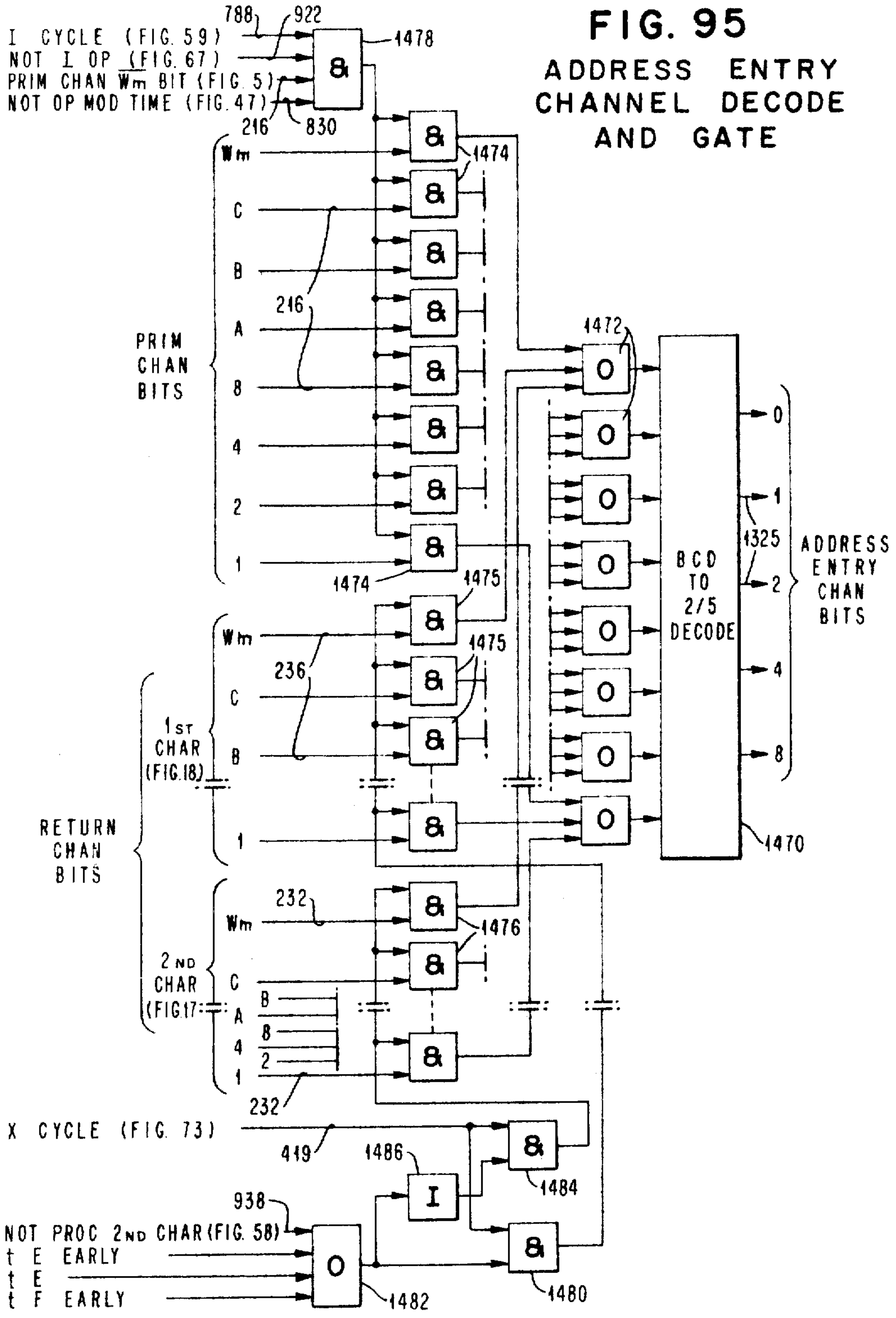

The ADDRESS ENTRY CHANNEL DECODE AND GATE circuit is shown in the overall ADDRESS CIRCUITS diagram of FIG. 80, and is described in detail in FIG. 95. In FIG. 95, the ADDRESS ENTRY CHANNEL 1325 is energized in an encoded fashion by a B C D TO 2/5 DECODE circuit 1470, which may be of any well known type. The details of this circuit are not shown elsewhere herein due to the fact that there are any number of suitable circuits available in the art, and the particular circuit used is not critical to the embodiment of the invention herein.

The B C D TO 2/5 DECODE circuit 1470 receives information from a plurality of OR circuits 1472 which in turn are responsive to plurality of AND circuits 1474–1476, which provide gating function of the ADDRESS ENTRY CHANNEL DECODE AND GATE circuit. For instance, the PRIMARY CHANNEL 216 may be gated to the OR circuit 1472 by the AND circuits 1474 in response to a gating signal from another AND circuit 1478. The AND circuit 1478 is operative during an I CYCLE (788) at other than I OP time (922) or OP MOD time (830), provided there is no PRIMARY CHANNEL WM (216). Thus the AND circuit 1478 causes the *addresses* read out with an instruction to be gated from the PRIMARY CHANNEL into the ADDRESS ENTRY CHANNEL; the I CYCLE gate 1478 excludes the operational and operation modifier portions of the instructions, which of course are not to be gated into the address registers.

The other entry into the ADDRESS ENTRY CHANNEL is from the RETURN CHANNEL, both the 1ST CHARACTER bus 236 and the 2ND CHARACTER bus 232. The 1ST CHARACTER bus 236 is gated by an AND circuit 1480 in response to an OR circuit 1482 which will be operative during the entire normal first processing time (refer to FIG. 36, Sheet 22), which includes times E, E EARLY, and F EARLY. In fact, of course, *t*E EARLY and *t*F EARLY completely circumscribe *t*E; the application of *t*E is utilized only for purposes of illustration. The OR circuit 1482 will also respond to a NOT PROCESS 2ND CHARACTER signal on line 938. Thus, even though PROCESS 2ND CHARACTER is energized (meaning that there is no signal on line 938), the OR circuit 1482 will cause the AND circuit 1480 to gate the 1ST CHARACTER bus to the ADDRESS ENTRY CHANNEL at times E EARLY and F EARLY. Thereafter, provided only one character is processed, the NOT PROCESS 2ND CHARACTER signal will continue on line 938, thereby continuing to activate the AND circuit 1480.

The 2ND CHARACTER bus 232 of the RETURN CHANNEL is gated by an AND circuit 1484 during an X CYCLE whenever there is a signal from an inverter 1486. Thus, the AND circuit 1484 can only operate when the AND circuit 1480 is *not* operative. During an X CYCLE, the first character to be indexed (added to an increment) of two possible characters within a memory cycle, will be gated through the 1ST CHARACTER gates 1475, and thereafter the second character will be gated through the 2ND CHARACTER gates 1476. Whenever two characters are to be indexed in a single cycle, the PROCESS 2ND CHARACTER latch will turn on, thereby causing the NOT PROCESS 2ND CHARACTER signal to disappear from line 938. Therefore after time F EARLY has expired (beginning at time G EARLY), the OR circuit 1482 will be inoperative causing a signal to be applied by the inverter 1486 to the AND circuit 1484. In other words, when a single character is to be indexed during an X CYCLE, the 1ST CHARACTER bus is gated to the ADDRESS ENTRY CHANNEL throughout the cycle. If two characters are to be processed, the 1ST CHARACTER bus of the RETURN CHANNEL is gated during times E EARLY and F EARLY; and thereafter the PROCESS 2ND CHARACTER latch turns on, causing the 1ST CHARACTER bus 236 to no longer be gated, and the 2ND CHARACTER bus 232 to be gated through to the ADDRESS ENTRY CHANNEL 1325.

23. *ADDRESS REGISTERS*

*a. Setting and resetting address registers A–D*

Referring again briefly to FIG. 80, it will be observed that the address registers AAR, BAR . . . DAR may respond to either the five bit ADDRESS ENTRY CHANNEL 1325, or to the 25 bit ADDRESS MODIFIER BUS 1326. In the case of the ADDRESS ENTRY CHANNEL, only one position (or a character) of each address may be applied at one time, since the ADDRESS ENTRY CHANNEL 1325 has only a five bit capacity. On the other hand, the ADDRESS MODIFIER BUS 1326 has a 25 bit capacity, and therefore all five characters (or positions) may be carried at one time. Thus, each of the address registers AAR, BAR . . . DAR may respond to five positions in parallel, or to one position at a time, depending upon which of the buses 1325, 1326 is servicing them. In the case of the IAR 1312, it is responsive only to the output of the ADDRESS MODIFIER BUS 1326.

In order to handle the complex gating necessary, a plurality of ADDRESS REGISTER SET and RESET signals are generated in FIGS. 96–101. The SET and RESET signals which are utilized whenever the ADDRESS MODIFIER BUS 1326 is to be set into any one of the address registers are generated in FIG. 97. A MOD RESET AAR signal is generated on a line 1510 by an OR circuit 1511 in response to the RESET ADDRESS REGISTERS signal on line 674, which signal appears only at the times that the machine is initially turned on by the start switch on the console as described with reference to FIG. 59, Section 12, hereinbefore. The OR circuit 1511 is also responsive to an AND circuit 1512 and another OR circuit 1513. The AND circuit 1512 is used to permit resetting of the AAR at the start of an indexing operation in response to the I5 and X1 signals. The OR circuit 1513 resets the ARR, just prior to setting, in all other cases. The OR circuit 1513 is responsive to a first AND circuit 1514 which is operative to case the resetting and later the setting of the AAR due to the automatic modification of the A address during A cycles without regard to whether the modification is by zero, one, or two (see FIGS. 94*a–d*). The OR circuit 1513 also responds to an AND circuit 1516 which is used to case the resetting and later the setting of the AAR during a B cycle (1184) at other than the END OF "A" FIELD (428) whenever a 2ND CHARACTER is processed (878), or whenever only one B character is going to be used (and therefore the next reference to the memory must achieve two more A characters so as to be ready for the boundary overlap condition), due to the USE SIGNAL B signal on line 966, sensed by an OR circuit 1517. The output of the OR circuit 1513 also feeds a delay unit 1518 which causes the RESET signal to later be applied as a MOD SET AAR signal on line 1519 during the conditions described within this paragraph. The length of the delay is whatever is necessary for the address register circuits to achieve a stable reset condition so that they may be set with new information immediately thereafter.

The MOD RESET BAR signal on a line 1520 is generated by an OR circuit 1522 which responds to the RESET ADDRESS REGISTERS signal on line 674 (as does the AAR reset), and also responds to an index start AND circuit 1524, which causes the BAR to be reset at the start of B address indexing, which occurs after I10 and X1 time. The OR circuit 1522 is responsive to another OR circuit 1526 which may be operated by an AND circuit 1528 during a B CYCLE 1184 wherein only one character can be processed (938) in other than a USE SINGLE B situation (978). In other words, when only one character can be processed at other than the first cycle, an event which may occur due to the termination of the B field of the termination of the A field, the AND circuit 1528 will cause the BAR to first be reset and later set for the one character remodification of the BAR. (left sides of FIGS. 94*b*, *c*, *d*). As will be described in detail hereinafter, when the BAR has been modified by two, but it should have been modified by one, the original B address which is latched in the ARO is again put through the modifier and modified by one; the B-plus-one modification is then substituted for the previous B-plus-two modification. The AND circuit 1528 is what permits the resetting and setting of the BAR at that time. The OR circuit 1526 also responds to an AND circuit 1530 during each time B4 of every B CYCLE (1184) for the normal initial modification of the B address by 2. The OR circuit 1526 feeds a delay unit 1532 which causes the RESET signal to be delayed and then applied as a MOD SET BAR signal on a line 1533.

It should be understood that the AAR/BAR MODIFIER SET/RESET circuits are so named because the parallel set and reset of the AAR and BAR are utilized primarily as a necessity for handling the entire output of the ADDRESS MODIFICATION circuit on the 25 bit bus 1326; however, these resets are also used to prepare the AAR and the BAR for indexing operations as described hereinbefore.

In FIG. 96, a SERIAL SET signal is generated on line 1500 by an OR circuit 1502 in response to any one of four AND circuits 1504–1507. AND circuit 1504 is operative at time F3 in an X CYCLE to generate a SERIAL SET signal for setting address registers in response to the first character result of indexing; similarly, the AND circuit 1505 is operative at Time A1 of an X CYCLE for causing the second character result to be set into the address registers. The AND circuits 1506 and 1507 each respond to another AND circuit 1508 to cause the address registers to be responsive to setting during an I CYCLE other than I OP time (922) or OP MOD time (830); in other words the AND circuit 1508 will activate the AND circuits 1506, 1507 throughout the address portion of each instruction readout. It should be understood that the SERIAL SET signal on line 1500 is only one of a plurality of signals used to actually effect setting of a particular address register at a particular time.

*b. Serial setting and resetting A–D*

Serial control over the AAR, BAR . . . DAR is effected by a plurality of SERIAL SELECTS signals (FIG. 98) on lines 1550–1553 corresponding to each of the address registers, and a plurality of SERIAL RESET signals (FIG. 100) on lines 1554–1557. As each of these registers is to have information entered therein from the ADDRESS ENTRY CHANNEL, the appropriate register is first reset, and then a combination of the appropriate SERIAL SELECTS, together with a one of a plurality of POSITION SELECTION BITS (FIG. 99) on corresponding lines 1558–1562 are used to actually enter the informa-This is so because the five bit ADDRESS ENTRY CHANNEL can only enter information into one particular position of one of the address registers at a single time.

Figure 98:
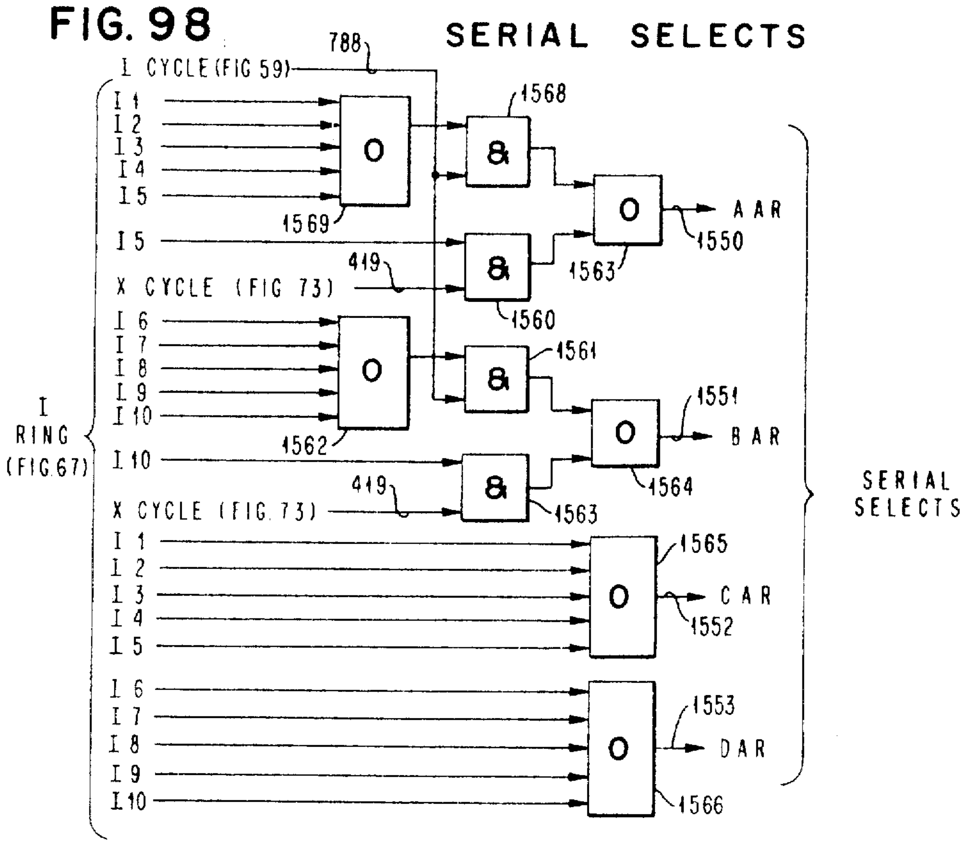

In FIG. 98, the SERIAL SELECT signals on lines 1550–1553, are generated by corresponding OR circuits 1563–1566. The OR circuits 1565–1566 generate the CAR and DAR SERIAL SELECT signals on lines 152 and 1553; these are relatively simple circuits inasmuch as the CAR receives the first five addresses of an instruction, and the DAR receives the next five addresses of an instruction. Therefore, these OR circuits are gated by I1–I5, and I6–I10, respectively. On the other hand the AAR and BAR SERIAL SELECT signals, generated by OR circuits 1563 and 1564, handles not only the initial storing of addresses read out during an instruction readout, but also must account for serially entering the results of an indexing operation. The OR circuit 1563 may respond to an AND circuit 1568 during an I CYCLE (788) in response to any one of the I ring positions I1–I5 operating an OR circuit 1569. An AND circuit 1560 is operative during an X CYCLE (419) which follows I5 time; the I RING is held up at I5 time whenever indexing is required, to permit the five necessary X cycles to be taken. During this entire time, the AAR SERIAL SELECT line will be energized.

The OR circuit 1564 will respond to an AND circuit 1561 during I6–I10 portions of an instruction readout time, due to the operation of an OR circuit 1562 and the I CYCLE signal on line 788. The OR circuit 1564 also responds to an AND circuit 1563 which is operative during each X CYCLE (419) following I10 time, which is the time within which indexing of the B address will occur.

Figure 99:
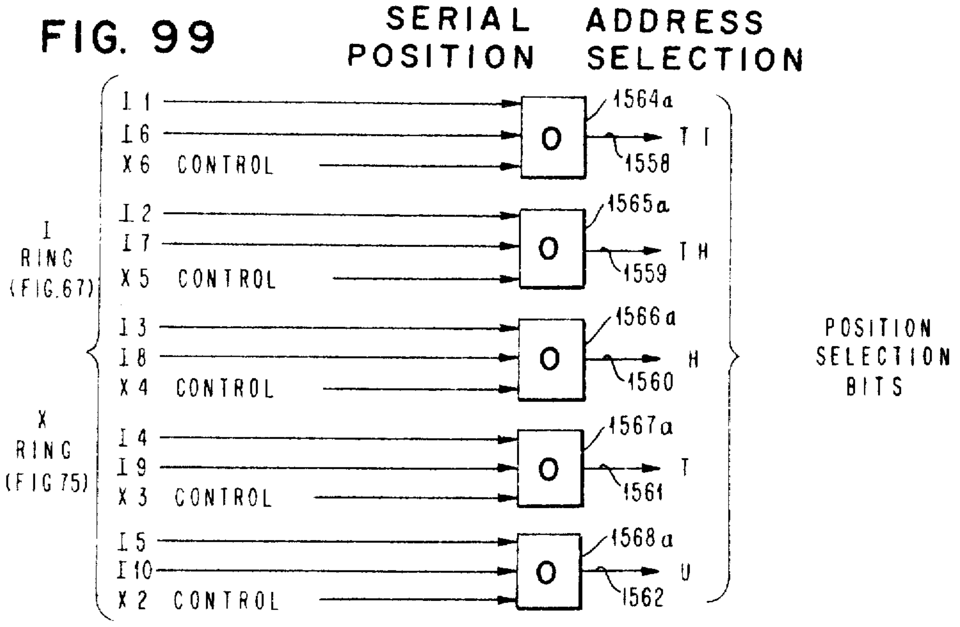

The POSITION SELECTION BITS on lines 1558–1562 are generated in FIG. 99 by corresponding OR circuits **1564*a*–1568*a***; the control over these OR circuits is rather complex, and is based on the fact that two character processing is guaranteed through certain of the indexing cycles due to the fact that the index registers are defined to be in blocks of five storage locations, each address being from five through nine, or from zero through four: the first index register is at address 00025 through 00029, the second is from 00030 through 00034, and the last is from 00090–00094. Thus, in an indexing operation, the scan is known (MINUS SCAN), and the addresses are fixed; this is a special situation in variable word length flexible address machine due to the fact that this portion of the memory is actually being used for purposes for which external registers are normally provided. Therefore, it is possible to define the registers, and once they are defined, the handling of the registers becomes greatly simplified in a two character serial processing machine as disclosed in the present embodiment.

Indexing is done from low order to high order and therefore the UNITS position of an index register is read out first. As each position is read out, it may have added thereto any value from zero to nine, and this value may carry into the next higher order position (such as from UNITS TO TENS) by the normal operation of the adding circuit (such as may be included in the ARITHMETIC & LOGIC CIRCUITS 226, FIG. 1). In order to perform adding required for indexing, it is therefore necessary to read out the units order first. This is accomplished as in all ADD operations by a MINUS SCAN. Thus, considering index register number 1, having the address 00025–00029, the units position would be in address location 00029, and the ten thousands position would be in address 00025.

On the other hand, instruction readout in the present embodiment takes place from low address to high address; that is, the ten thousands position is read out first, and then the thousands position, etc. Thus, scanning of memory for loading into address registers during instruction readout is in one direction of scan, and the memory is scanned oppositely during indexing; therefore the POSITION SELECTION BITS must follow one another in either of two opposite sequential orders.

In FIG. 99, the OR circuit **1564*a* responds first during instruction cycles since I1 and I6 are applied thereto; the OR circuit 1568*a* is last to respond because it is controlled by I5 and I10. Thus during the first five I ring times, the ten thousands, thousands . . . and units positions are read out, in that order, to read out the A address. This order is repeated for the second five I RING times (I6–I10) in order to successfully read out the characters of the B address starting with the high order and ending with the lowest order. On the other hand, the OR circuit 1568*a* is operated first during an index operation, followed by the OR circuit 1567*a*, and ultimately the OR circuit 1564*a***. These circuits are operated by the X CONTROL stages of the X ring in order to permit a push pull sort of operation which is necessary due to the fact that a second character is being read out for indexing at the same time that the result of a first character is being returned following indexing. It will be recalled that the CYCLE CHART of FIG. 36 illustrates that the index cycle includes all of the logic times A through H, in order to permit indexing operations without extending the basic cycle of the machine. By referring to FIG. 36 it is apparent that the logic time F is included in the time required for indexing a first character as well as a second character. Thus, during time F, the result of the first indexing is actually being returned to the appropriate address register, and at the same time, the character to be indexed is being read out of the next position of the address register so that it may be indexed. Since this is so, it would be necessary to have X2 available for gating out the second character at time F, and still have something significantly related to X1 available for gating in the result of the first character. For this reason, the X2 CONTROL signal (which precedes X2 and overlaps with it) is used for gating the first result at the same time that X2 is used for gating out the second character for indexing. In this sence, the control output of the index register, as used in FIG. 99, can be considered to X1 LATE, X2 LATE . . . X5 LATE rather than X2 CONTROL, X3 CONTROL . . . X6 CONTROL. The utilization of these signals would fit such a description perfectly. The nomenclature chosen, however, was utilized to best illustrate the operation of the X RING itself.

Thus, the POSITION SELECTION bits generated in FIG. 99 select the proper one of the five character positions of any address register so that the five bit ADDRESS ENTRY CHANNEL 1325 (FIG. 80) may enter address information serially by character from high order to low order during instruction readout time, and enter indexing results serial by character from low order to high order during indexing operations.

Figure 100:
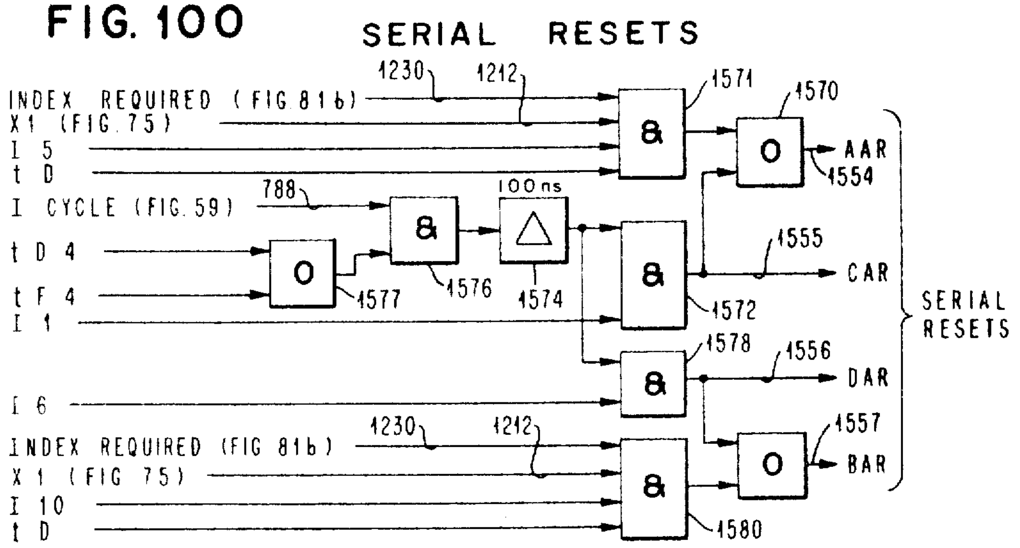

The SERIAL RESET signals generated in FIG. 100 on lines 1554–1557 are used to reset appropriate address registers prior to the setting of said registers by the corresponding SERIAL SELECT signals of FIG. 98 and the POSITION SELECTION BITS of FIG. 99. The AAR SERIAL RESET signal on line 1554 is generated by an OR circuit 1570 in response to either of two AND circuits 1571, 1572.

The AND circuit 1571 responds at time D during the first index time X1 (1212), where INDEX is REQUIRED (1230), following I5 time of an instruction readout.

The AND circuit 1572 is operative during a first I RING time (I1) to respond to a delay unit 1574 which is activated by an AND circuit 1576 due to an I CYCLE (788) at time F4 or D4 (1577). Thus, the AND circuit 1572 controls serial resetting of the AAR following instruction read out time; the AND circuit 1572 also generates the SERIAL RESET CAR signal on line 1555; the reason for this is that during instruction readout time the A address is stored in the AAR and the CAR, and the CAR is used as the source of the original address for indexing, the AAR thereby being available to store the result. If indexing is not required, than the A address is appropriately already available in the AAR.

The AND circuit 1578 responds to the same signals as AND circuit 1572 with the exception of the fact that it is operative at I6 time, so as to control serial resets for the B address (rather than the A address) part of an instruction.

An AND circuit 1580 responds to the same signals as does the AND circuit 1571 with the exception of the fact that it is operative at I10 time rather than at I5 time, and causes the BAR to be reset prior to indexing of the B address following I10 time.

*c. Setting and resetting IAR*

Figure 101:
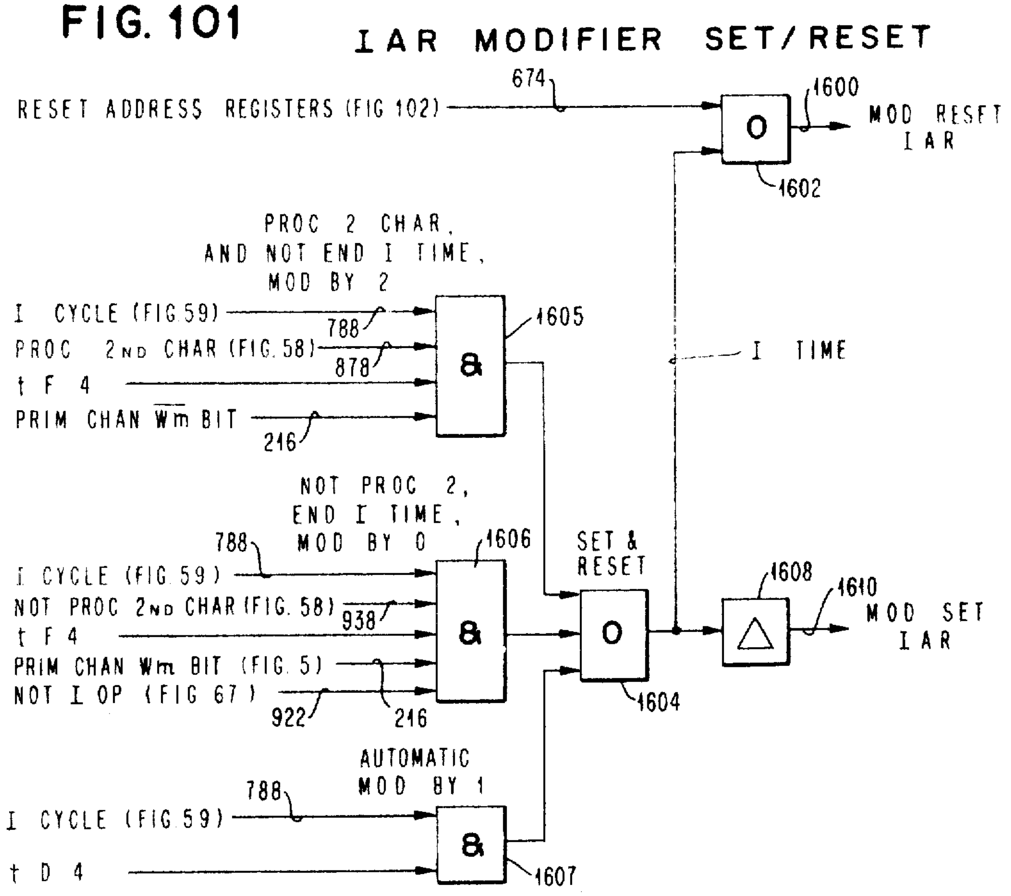

An IAR MOD RESET signal on line 1600 is generated in FIG. 101 by an OR circuit 1602 in response to the RESET ADDRESS REGISTER signal on line 674 or in response to an OR circuit 1604. The OR circuit 1604 responds to any one of three AND circuits 1605–1607, each operative during an I CYCLE (788). The AND circuit 1607 accounts for the automatic modification by one of the instruction address during first process time of an I CYCLE, at time D4. The AND circuits 1605 and 1606 selectively allow resetting and again setting of the IAR during a time F4 which is within second processing time. If there is no PRIMARY CHANNEL WM bit, then the AND circuit 1605 will ready the IAR for an additional modification (remodification by two) provided there is a PROCESS 2ND CHARACTER signal on line 878. If there is a NOT PROCESS 2ND CHARACTER signal on line 938, and there is a PRIMARY CHANNEL WM bit (216) at NOT I OP time (922) the AND circuit 2606 recognizes the fact that the first character sensed is actually the first character of the next instruction, and that the IAR has been advanced by one (in a modification operation which was permitted by the AND circuit 1607), and that it is necessary therefore to take the original IAR address now latched in ARO, modify it by zero, and return it to the IAR; this will remove from IAR the last modification (by one).

The output of the OR circuit 1604 is fed to a delay unit 1608 to generate a MOD SET IAR signal on a line 1610 slightly later than the MOD RESET IAR signal on line 1600. Thus, the IAR is reset just prior to a time when it must be set, and additionally may be reset (when the computer is turned on) by the RESET ADDRESS REGISTERS signal on line 674, as described above.

*d. Address registers—Example: AAR*

The AAR 1314 is shown in block form in FIG. 102. The AAR comprises, essentially, 25 latches 1612, there being one latch for each bit of the two-out-of-five code, for each of the five orders of the A address: units, tens . . . ten thousands. Each of the latches 1612 may be set by a corresponding OR circuit 1614 under the control of either one of two related AND circuits 1616, 1618, depending upon whether information to be stored in the latches 1612 is coming from the ADDRESS ENTRY CHANNEL 1325 or the ADDRESS MODIFIER BUS 1326, respectively. The ADDRESS ENTRY CHANNEL 1325 will set the ten thousands order, then the thousands, then the hundreds, tens and units orders of the AAR of the A address into the AAR latches 1612 during successive I RING times I1–I5 of successive I CYCLES. During an indexing operation, the AND circuits 1616 will gate successive characters on the ADDRESS ENTRY CHANNEL 1325 in the opposite order: the units, tens, hundreds, thousands and ten thousands, (as described with reference to FIG. 99, Sheet 58, wherein the POSITION SELECTION BITS on lines 1558–1562 are generated).

The AND circuits 1618 are all operative simultaneously to gate five address characters from the ADDRESS MODIFIER BUS 1326 into the respective latches 1612. In order to utilize the ADDRESS ENTRY CHANNEL 1325, it is necessary to have a SERIAL RESET AAR signal on line 1554 concurrently with a SERIAL SELECT AAR signal on line 1550 so that an AND circuit 1620 will pass a signal through an OR circuit 1622 to reset each of the latches 1612. Thereafter, the SERIAL SELECT AAR signal is combined with a SERIAL SET AAR signal on line 1500 so as to permit successive POSITION SELECTION BITS on lines 1558–1562 to gate successive characters from the ADDRESS ENTRY CHANNEL 1325 into the latches 1612. Utilization of the ADDRESS MODIFIER BUS 1326 requires only a MOD RESET AAR signal on line 1510 to reset the registers followed by a MOD SET AAR signal on line 1519 to gate the information, through all of the AND circuits 1618 at one time, into corresponding latches 1612. The details of this circuit are described in FIG. 103.

A portion of the AAR units position is shown in FIG. 103. There, latches 1612 are shown for 0, 1 and 8 bits; a total of five latches (including the 2 bit and the 4 bit) are actually used. Each of the latches 1612 responds to an OR circuit 1614 which in turn is responsive to either of two AND circuits 1616, 1618 as before described. During an entry operation, the SERIAL SET line 1500, SERIAL SELECT AAR line 1550, SERIAL RESET line 1554 will each be energized so as to cause the latches 1612 to be reset by the AND circuit 1620, and thereafter the POSITION SELECT UNITS signal on line 1562 will gate the various bits of the ADDRESS ENTRY CHANNEL 1325 through corresponding AND circuits 1616, the related OR circuits 1614, into the latches 1612. In an operation wherein the AAR is to receive information from the ADDRESS MODIFICATION circuitry on the ADDRESS MODIFIER BUS 1316, the MOD RESET AAR signal on line 1510 will cause the OR circuit 1622 to reset each of the latches 1612, following which the MOD SET AAR signal on line 1519 will cause the AND circuit 1618 to simultaneously pass information from the various bit positions of the ADDRESS MODIFIER BUS 1326 through to corresponding latches 1612.

24. ARO—ADDRESS READ-OUT

*a. Gating and resetting controls for ARO*

The address read-out circuitry, ARO 1302 (FIG. 80), is responsive to any of the address registers, and to the INDEX REGISTERS & ADDRESS GENERATOR 1322 a shown in FIG. 80. The ARO will respond to any address register whenever there is a gate signal generated for the corresponding register. Thus, the setting of ARO is controlled by the individual gates which correspond to each of the sources of information which may be applied to ARO.

Figure 104:
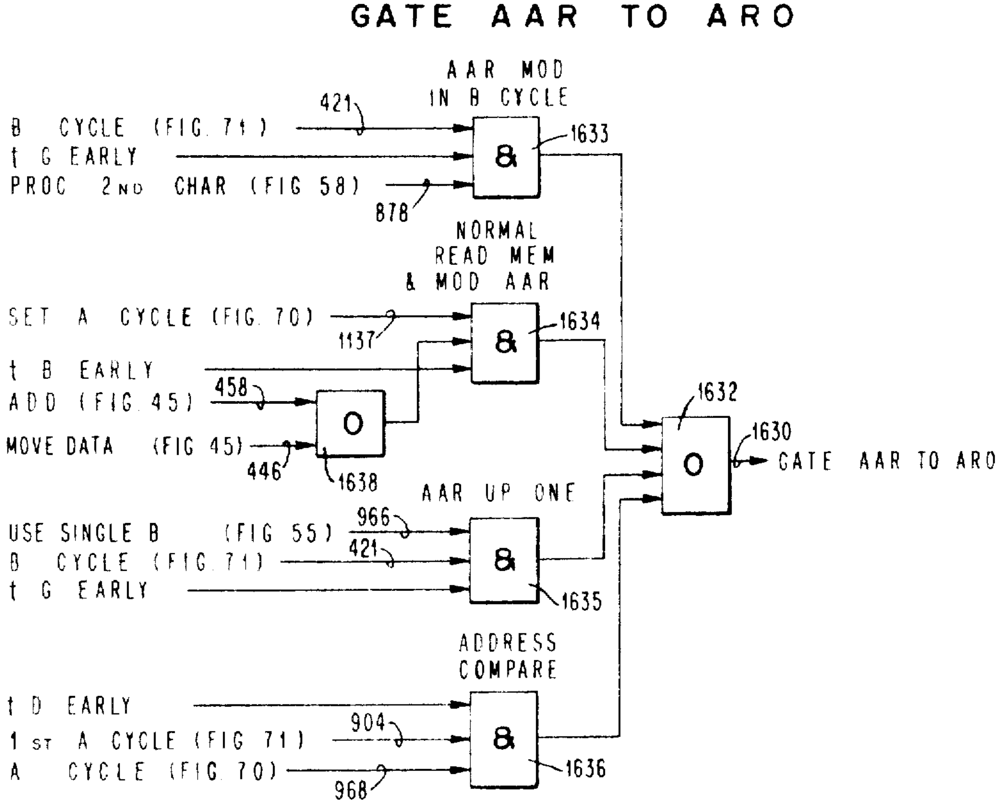

A GATE AAR TO ARO signal is generated on a line 1630 in FIG. 104 by an OR circuit 1632 in response to any one of four AND circuits 1633–1636. The AND circuit 1636 will be operative during an A CYCLE (968), which is a 1ST A CYCLE (904) to gate the AAR to ARO at TIME D EARLY, so that the A address (previously incremented by one) may be compared with the B address, to determine whether or not a SERIAL SCAN operation is involved, as described in Section 14*f*, hereinbefore.

The AND circuit 1634 provides for reading the AAR out to the ADDRESS MODIFICATION circuit for the normal incrementing of the A address in any A CYCLE. This AND circuit is responsive to a SET A CYCLE signal on line 1137 at time B EARLY during either an ADD (450A) or MOVE DATA (446) instruction, as a result of an OR circuit 1638.

The AND circuit 1633 permits gating the AAR to the address modification circuits during a B CYCLE (421) at time G EARLY, so that an additional increment may be added to the A address due to the fact that two characters will be processed, as indicated by the PROCESS 2ND CHARACTER signal on line 878.

The AND circuit 1635 permits adding one to the A address in a B CYCLE (421) at time G EARLY, when the USE SINGLE B signal appears on line 966. This is the case where only one B character is available but two A characters are available. The one B character, and one of the A characters, will be processed, leaving one A character remaining. In order to acquire a new pair of characters, the A address should have been modified by two rather than by only one, so that a second modification is required (in a fashion similar to the extra modification required in the situation handled by the AND circuit 1633 above).

Thus, a GATE AAR TO ARO signal is generated on line 1630 in any of the cases where the A address is to be modified, and also is generated to permit comparison of the A and B addresses.

Figure 105:
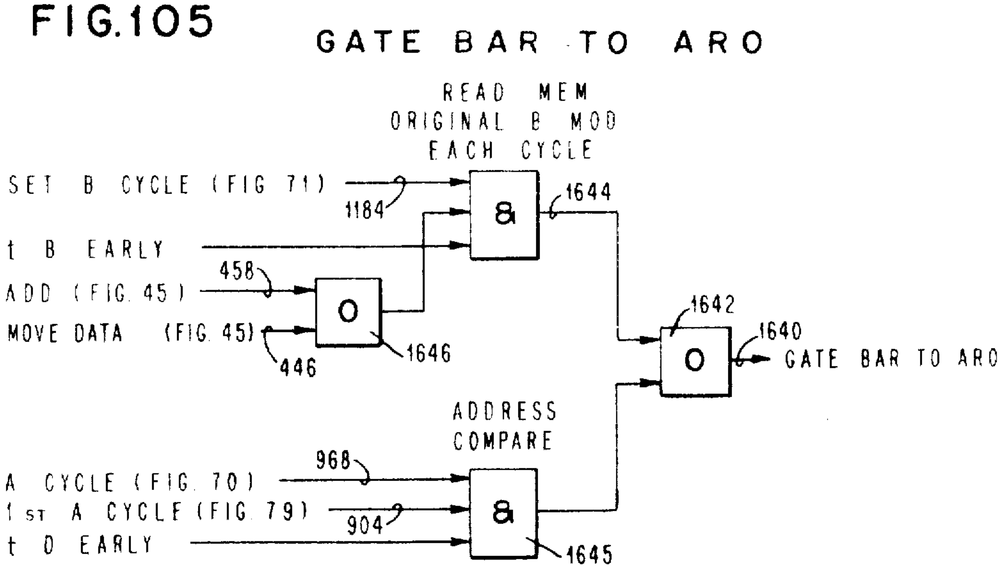

A gate BAR to ARO signal is generated on a line 1640 in FIG. 105 by an OR circuit 1642 in response to either of two AND circuits 1644, 1645. The AND circuit 1645 causes the B address to be read out onto the ADDRESS BUS for comparing with the A address during time D EARLY of each A CYCLE (960) which is a FIRST A CYCLE (904). This AND circuit 1645 is therefore responsive in a fashion identical to that of the AND circuit 1636 in FIG. 104.

The AND circuit 1644 causes reading out of the BAR for normal modification of the B address at time B EARLY of each B CYCLE (1184) in either an ADD operation (458) or a MOVE DATA operation (446), due to an OR circuit 1646. Thus, the AND circuit 1644 is to the BAR what the AND circuit 1634 is to the AAR.

It may be noticed here, that the BAR must be read out for modification only during the initial or original modification of the B address in each memory cycle. If the B address is to be remodified, the original B address is read out of ARO (where it is latched) for the remodification. On the other hand, since the B address is latched in ARO, if the A address need remodification, it must again be read out of the A register and modified by an additional increment. Thus, the address modification herein encompasses having to modify the A address only in a forward direction by additional increments, and modifying the B address by a maximum amount, and remodifying it by a smaller amount, if necessary; the original B address being stored in ARO until it is known whether the A or B address is to be corrected.

Figure 106:
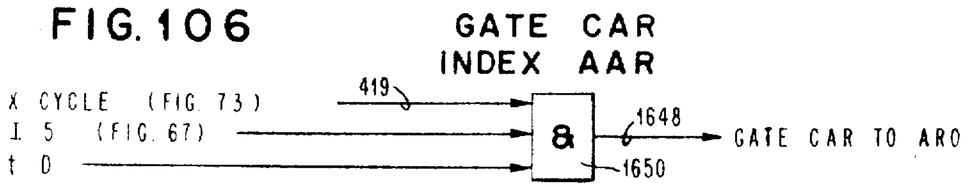

A GATE CAR TO ARO signal on a line 1648 is generated in FIG. 106 by an AND circuit 1650 in response to an X CYCLE signal on line 419 at time D after the fifth instruction cycle (I5). This permits reading the CAR out to ARO so that the A address (which is stored in CAR as well as AAR) may be carried on the ADDRESS EXIT CHANNEL (1332, in FIG. 80) to the SECONDARY CHANNEL (224 in FIG. 1) to have an increment added to the basic A address (the increment is stored in an index register). Through each of the index cycles which occur following I5 time, the I5 position of the I RING will be energized since the I RING does not advance until completion of indexing; this will cause the CAR to be read out at time D of each of the five index cycles (X1–X5) following I5.

Figure 107:
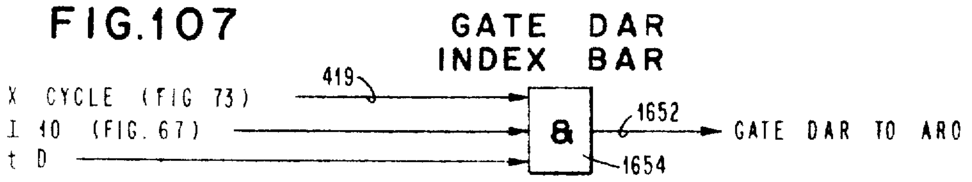

Similarly, a GATE DAR TO ARO signal is generated on a line 1652 in FIG. 107 by an AND circuit 1654 which is operative at every time D of the five X cycles (X1–X5) following I10 time, thereby permitting indexing of the B address (which is stored in DAR as well as AAR).

Figure 108:
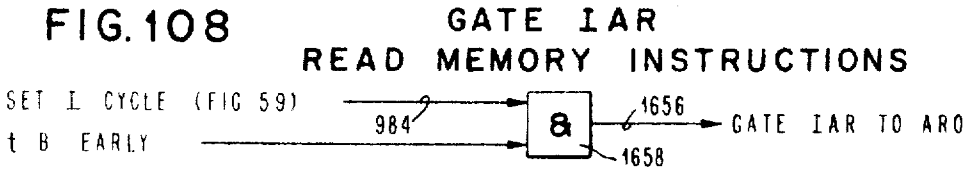

A GATE IAR TO ARO signal on a line 1656 is generated in FIG. 108 by an AND circuit 1658 at time B EARLY in response to the SET I CYCLE signal on line 948. The SET I CYCLE signal will in fact come up during *t* LAST of the LAST EXECUTION cycle, or whenever the next cycle is to be an I CYCLE (see FIG. 59), so as to prepare for reading out of the next instruction; therefore, the GATE IAR TO ARO signal is available to ARO at time B EARLY of each instruction.

Figure 109:
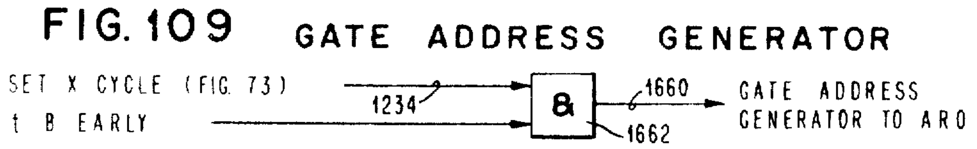

A GATE ADDRESS GENERATOR TO ARO signal is generated on a line 1660 in FIG. 109 by an AND circuit 1662 at time B EARLY in response to a SET X CYCLE signal; this will occur during the last instruction time prior to the X CYCLE, since SET X CYCLE is generated in response to I5 or I10 following a time when there have been some indexing tag bits sensed in the circuit of FIG. 81*b* (Sheet 45). This signal of course permits the ADDRESS GENERATOR to supply the address of one of the index registers to the ARO, so that the MAR may cause the MEMORY to read out the contents of the index register for indexing purposes.

*b. Reset controls for ARO*

Figure 110:
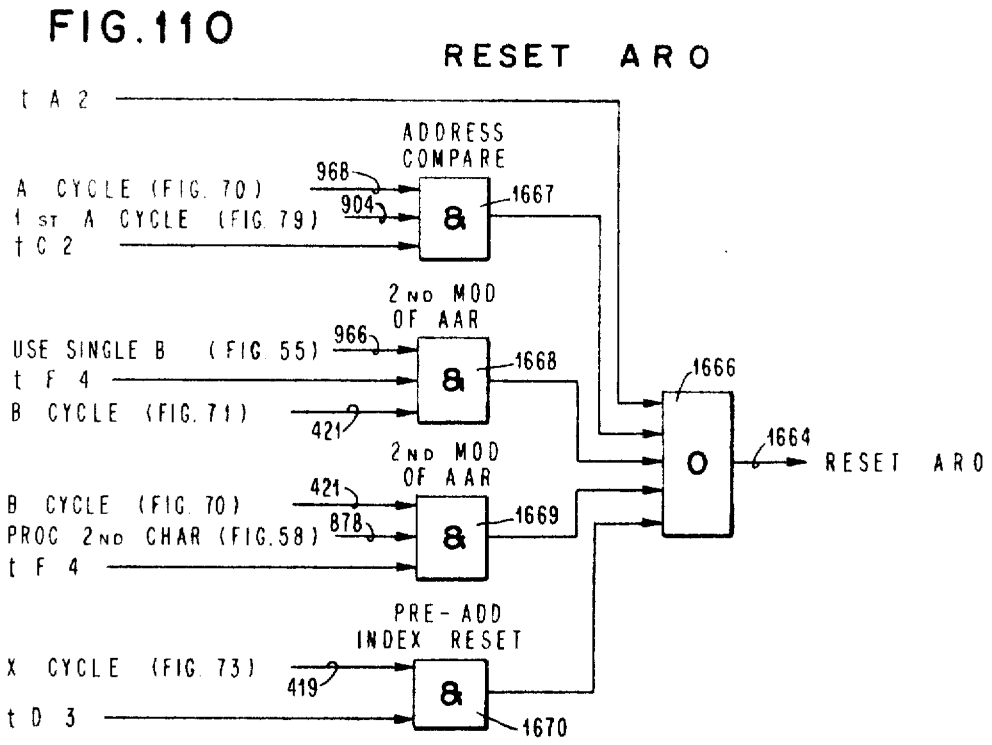

A RESET ARO signal is generated on a line 1664 in FIG. 110 by an OR circuit 1666 in response to any one of three AND circuits 1667–1670. The AND circuit 1667 is responsive to time C2 to an A CYCLE (968) which is a 1ST A CYCLE (904) to cause the ARO to be reset just prior to the time that the AAR and BAR will supply A and B addresses to ARO for comparison on the address bus.

The AND circuits 1668 and 1669 generate a RESET ARO signal on line 1664 in the cases where the A address must be corrected by adding another increment to it. This always occurs during a B CYCLE (421) at time F4. The AND circuit 1668 will respond to a USE SINGLE B signal on line 966 whereas the AND circuit 1669 responds to the PROCESS 2ND CHARACTER signal on line 878. It will be recalled (FIGS. 94*a–d*) that correction of the A address during a B CYCLE required resetting of ARO, since ARO has the B address latched in it. On the other hand, correction of the B address during the second half of a B CYCLE does not require the ARO to be reset; on the contrary, the only way the B address can be remodified, without actually subtracting from it, is to save the original B address in ARO, modify it again by a smaller amount, and substitute this new modified B address for the previously modified one found in the B address register.

The AND circuit 1670 is used to reset ARO at time D3 of every X CYCLE (419). This must be done because the address bus is used to read out one character of the address to be indexed onto the SECONDARY CHANNEL so that indexing may take place in the main adder, and the ARO must be used again to cause the memory to read out the next INDEX register pair (for indexing with the A or B address on the exit channel). Therefore, during each indexing operation, the ARO must carry an address to MAR so as to specify a particular one of the index registers, and must also carry the data (to be indexed) from the A address register out into the ARITHMETIC & LOGIC CIRCUITS. The resetting of ARO prior to addressing is accomplished in every single cycle by a time A2 signal (at the top of FIG. 110); the resetting of ARO prior to using ARO for carrying CAR or DAR information is caused by the AND circuit 1670 at the bottom of FIG. 110.

c. *ARO circuits*

Figure 111:
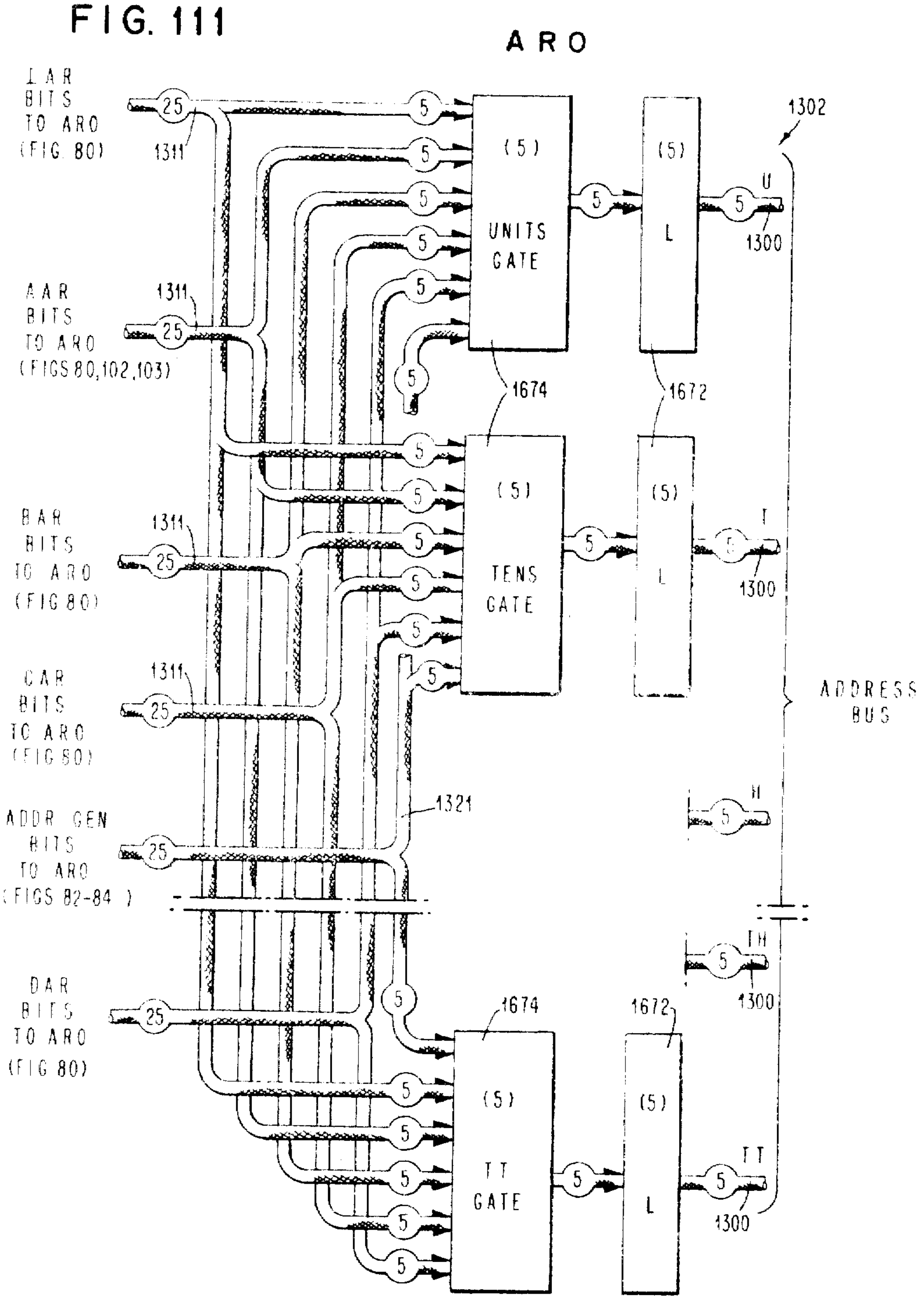

A block diagram of ARO, shown in FIG. 111, comprises essentially five sets of latches (only three are shown, for the units, tens and ten thousands orders), each set including five latches 1672, one for each of the bit positions in the two-out-of-five address code. Each of the latches is set by a corresponding one of a plurality of gates 1674 in response to any one of the address registers IAR, AAR . . . DAR on the buses 1311, or in response to the ADDRESS GENERATOR on the bus 1321. The output of ARO comprises the ADDRESS BUS 1300.

Figure 112:
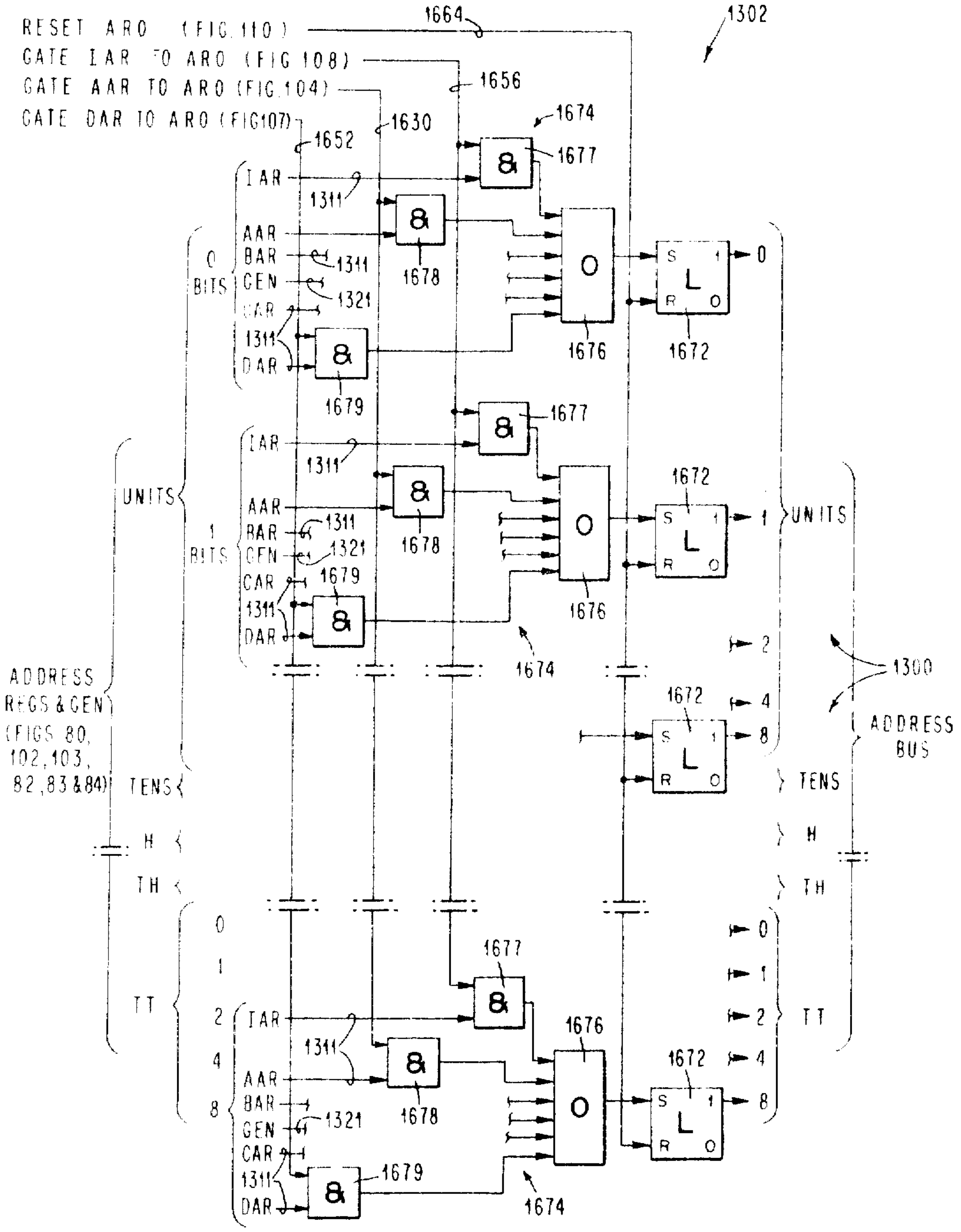

Details of ARO 1302 are shown in FIG. 112. There, only a few of the latches 1672 are illustrated, those for the units position bits 0, 1 and 8, and the one for the 8 bit of the ten thousands position. Each of the latches 1672 is response to a corresponding OR circuit 1676 which may respond to one of several AND circuits 1677–1679. The AND circuits 1677 are responsive to the GATE IAR TO ARO signal on line 1656 to gate bits from the IAR through to the OR circuit 1676. The AND circuits 1678 are responsive to the GATE AAR TO ARO signal on line 1630 to gate bits from the AAR through to the OR circuit 1676. Similarly, the AND circuits 1679 are responsive to the GATE DAR TO ARO signal on line 1652 to cause bits from the DAR to be gated through to the OR circuit 1676. The BAR, CAR and address generator portions of this circuitry have been omitted for simplicity, the operation being the same for each. Thus, each of the bit positions of the ARO is set by a corresponding bit position of one of the address registers as determined by which one of the gate signals (such as those on lines 1656, 1630 and 1652) are energized at a particular time. Each of the latches 1672 is reset by the RESET ARO signal on line 1664. The output of the latches 1672 comprise the ADDRESS BUS 1300 as before described.

The OR circuits 1676 and related AND circuits 1677–1679 comprise the gates 1674 shown in FIG. 111.

25. MAR: MEMORY ADDRESS REGISTER

Figure 113:
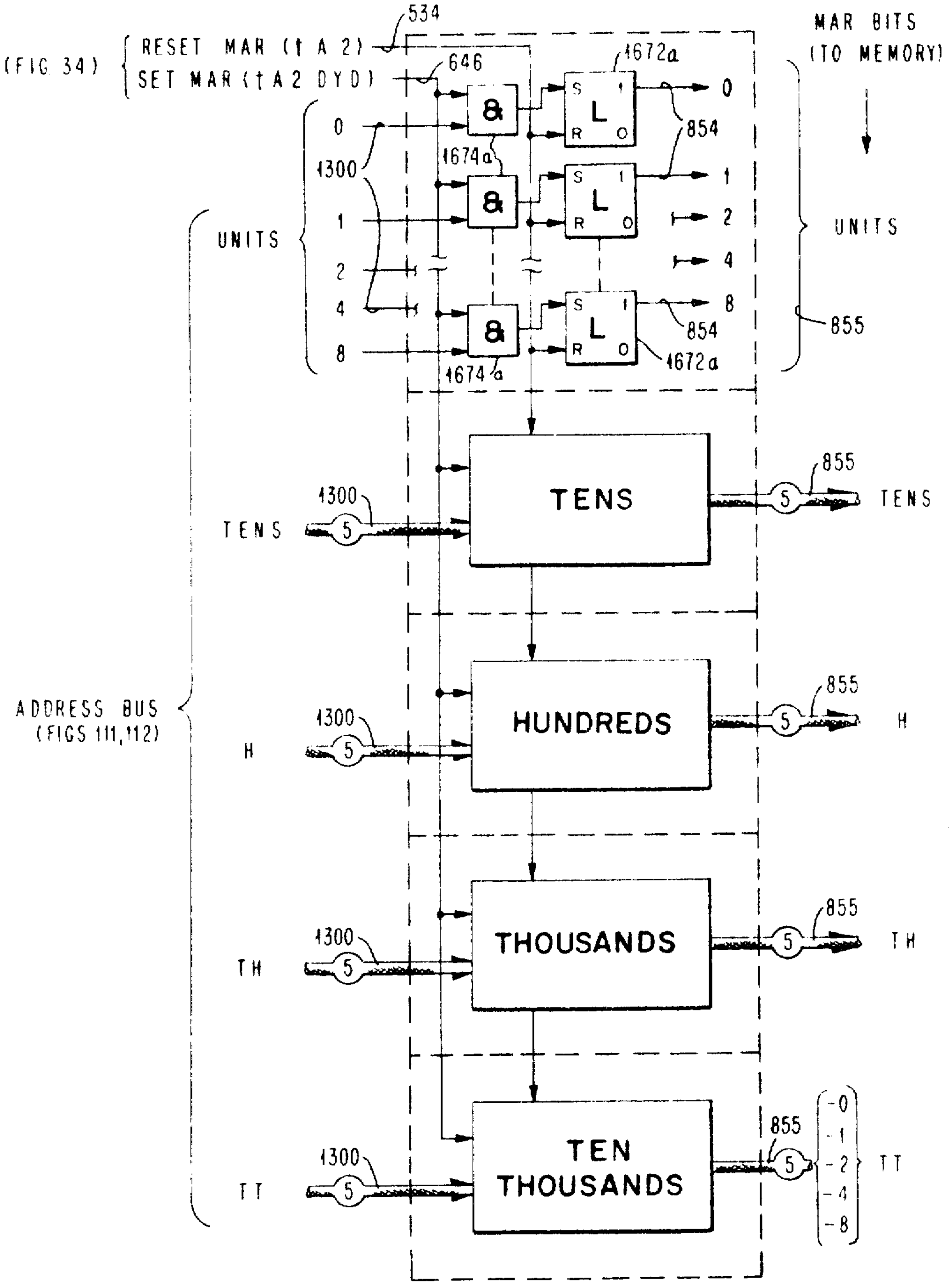

The memory address register is shown briefly in FIG. 113, wherein a plurality of latches **1672*a* each comprise one of the two-out-of-five bit positions of one of the orders of an address. Each of the latches 1672*a* may be set by a corresponding circuit 1674*a* in accordance with the bits of the ADDRESS BUS 1300 whenever the SET MAR signal is present at (time A2) on line 646. Just prior to this set signal, the RESET MAR signal would appear on line 534; these signals are generated in FIG. 34 (Sheet 22) and in fact, the RESET MAR signal on line 534 is simply time A2, whereas the set MAR signal on line 646** is time A2 delayed.

The output of the various stages of the MAR comprise address bits on the buses 855 which are applied to the MEMORY for actual internal addressing of the MEMORY (not shown).

Figure 114:
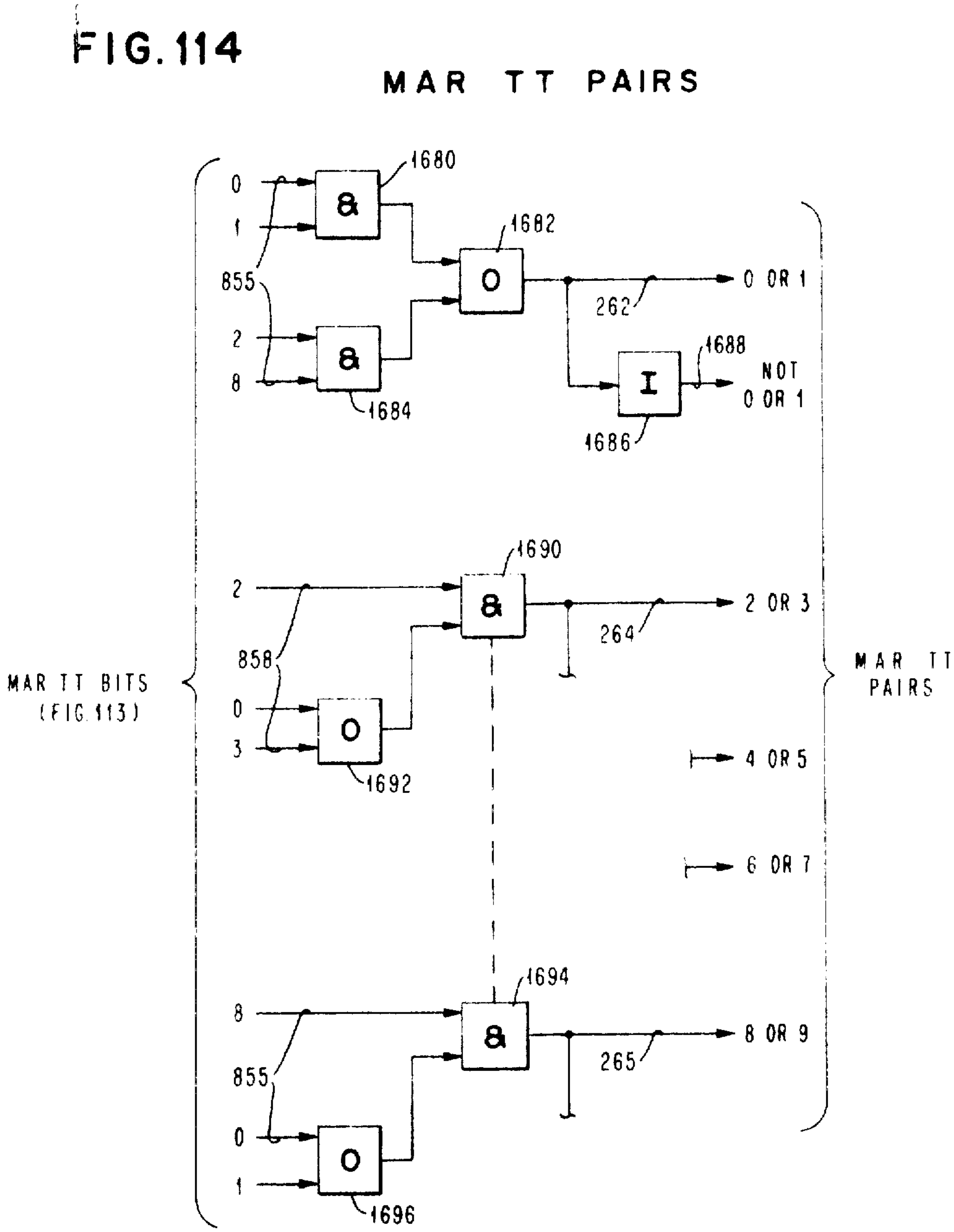

The ten thousands order of the MAR (in FIG. 113) is applied to the MAR TT PAIRS circuit of FIG. 114, wherein the setting of the ten thousands order of MAR is decoded into pairs. Thus, the bits of the ten thousands order of the MAR on line 855, are applied to various circuits so as to recognize any of the possible pairs. The 0 and 1 bits are applied to an AND circuit 1680 and cause an OR circuit 1682 to generate a 0 OR 1 signal on a line 262. The 2 and 8 bits are applied to an AND circuit and cause the OR circuit 1682 to generate the 0 or 1 signal as well. The 0 or 1 signal is inverted, by an inverter 1686, to generate the NOT 0 OR 1 signal on a line 1688. This is merely illustrative of the fact that any one of the MAR TT PAIRS signals 0 OR 1, 2 OR 3 . . . 8 OR 9, may be inverted to provide the complement thereto such as the NOT 0 OR 1 signal on line 1688. As used in the data flow circuits to gate characters in and out of MEMORY, it has been assumed that the complement signals would be available to anyone skilled in the art.

The 2 bit (in the 2/5 code) is used with the zero to generate a 2, and used with a 1 to generate a 3; therefore, an AND circuit 1690 recognizes a 2 bit, and whether it has a zero or a 3 bit with it, it will generate a 2 OR 3 signal on a line 264 in response to an OR circuit 1692. Similarly, the 8 bit is used in an AND circuit 1694, with either a 0 bit or a 1 bit from OR circuit 1696, to generate the 8 OR 9 MAR TT PAIRS signal on a line 265. The other signals may be generated similarly, or in any other way suitable to the purposes of this embodiment, in accordance with the skill in the art.

26. ADDRESS BUS VALIDITY CHECK

Figure 115:
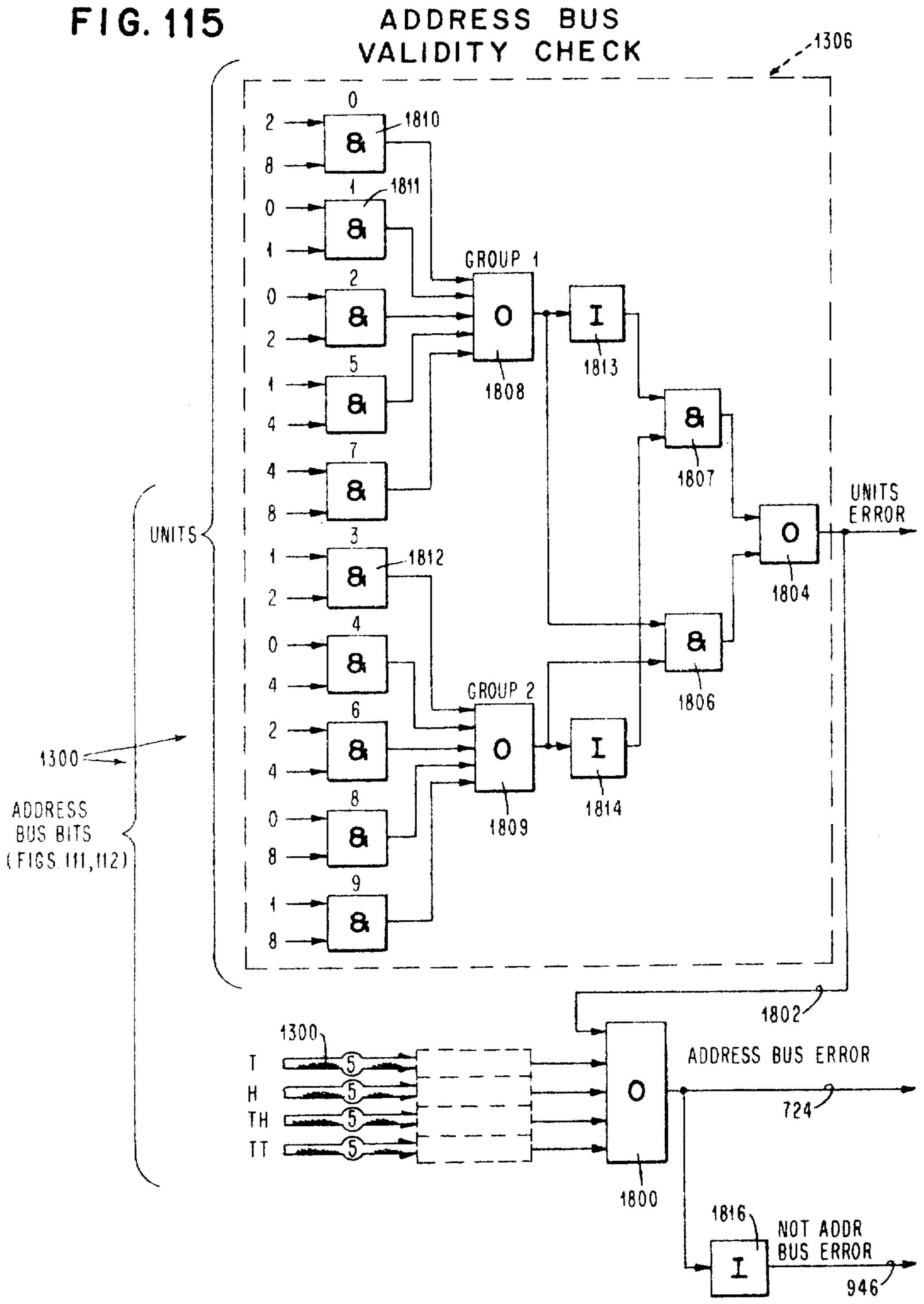

The ADDRESS BUS VALIDITY CHECK circuit 1306, which is used to test the validity of all two-out-of-five characters on the ADDRESS BUS, and additionally used as an address comparing means, is shown in FIG. 115. In FIG. 115, the address bus error signal 724 is generated by an OR circuit 1800 in response to any one of a plurality of error signals corresponding to the various five characters on the ADDRESS BUS 1300. By way of example, a complete validity checker for the UNITS position of the ADDRESS BUS is shown in the upper portions of FIG. 115. There, a UNITS ERROR signal is generated on a line 1802 in response to an OR circuit 1804 which in turn responds to either of two AND circuits 1806, 1807. The AND circuit 1806 will be operative if there are signals from a GROUP 1 OR circuit 1808 and from a GROUP 2 OR circuit 1809, simultaneously. The OR circuit 1808 senses various combinations of the 2/5 code, which combinations are included in GROUP 1; the OR circuit 1809 senses the remaining combinations of the 2/5; this being considered GROUP 2. The 2/5 code is such that if there is one character in GROUP 1, there cannot be another character in GROUP 2 at the same time. This is so because it requires more than two bits to specify two different characters, and a two-bit character is all that will be recognized as valid. For instance: an AND circuit 1810 senses decimal 0 by responding to the 2 bit and the 8 bit; an AND circuit 1811 senses decimal 1 by recognizing a 0 bit and a 1 bit; and an AND circuit 1812 senses decimal 3 by the concurrence of a 1 bit and a 2 bit. It would be impossible, in accordance with the definition of the 2/5 code to have two of these characters on the bus at once, for instance, in order to have a decimal 1 and a decimal 3, it would be necessary to have the 0 and 1 and the 1 and 2 bits (totalling 0, 1 and 2 bits) on the channel at one time. This, of course would cause both AND circuits 1811 and 1812 to generate signals which the corresponding OR circuits 1808, 1809 would pass to the AND circuit 1806 thereby causing the OR circuit 1804 to generate the UNITS ERROR signal on line 1802.

GROUP 1 and GROUP 2 are chosen in such a fashion that any time a *pair* of characters are generated in one of the groups, this will *automatically* cause a character to be generated in the other group. For instance, assume that a decimal one and a decimal two are generated in GROUP 1. This will be in response to the 2/5 code bits 0, 1 and 0, 2. Thus, there will be generated a decimal three value in GROUP 2 as a result of both the 1 bit and the 2 bit of the 2/5 code being available to the uppermost AND circuit of GROUP 2. Similarly, inspection will show that any pair of characters in one group will result in an invalid character being generated in the other group: therefore, it is impossible to have more than one correct character generated without having a response from both GROUP 1 and GROUP 2.

The AND circuit 1807 responds to a pair of inverters 1813, 1814 which account for the situation where there is no character in *either* group. If both inverters 1813, 1814 have an output, this means that there is no character in GROUP 1 and no character in GROUP 2. Having no characters whatsoever is invalid, it being required that there be 2 bits at all times (for instance, the decimal 0 value is specified by the 2 bit and the 8 bit). Thus the inverters 1813, 1814 will recognize the case where there is *nothing* on the ADDRESS BUS by sending signals to an AND circuit 1807 which will cause the OR circuit 1804 to generate the error signal on line 1802. The output of the OR circuit 1800 (which comprises the ADDRESS BUS ERROR signal on line 724) is also fed to an inverter 1816 which will generate the NOT ADDRESS BUS ERROR signal on line 946 (unless there is an error signal on line 724). This NOT ADDRESS BUS ERROR signal (946) is the same as "A address equals B address" when the validity check circuit is used to compare the A and B addresses as described in Section 14*f*, hereinbefore.

The use of this checking circuit as a comparing means is disclosed and claimed in a commonly-owned copending application of the same inventors entitled "Means for Comparing Digital Values," Serial No. 332,727 filed on even date herewith.

The ADDRESS BUS VALIDITY CHECK circuit 1306 could be made responsive to the ADDRESS MODIFIER BUS 1326 instead of the ADDRESS BUS 1300 in order to check the output of the ADDRESS MODIFICATION circuits 1310, if desired. In that case, a MOD BY 0 signal would essentially cause the circuits 1310 to part of the ADDRESS BUS 1300, effecting no change in data passed therethrough.

27. USE OF INVENTION IN OTHER EMBODIMENTS

*a. Use in large word binary machines*

The present invention has been shown in an embodiment wherein the memory is capable of presenting two B C D characters, each character comprising a total of eight bits. In the disclosed embodiment, either one or both of the characters may be processed during a single multiple processing cycle. Multiple processing is accomplished in this embodiment serially, one character after the other during two adjacent processing times.

It should be obvious, that instead of a pair of eight bit characters, a pair of binary words of any length could be utilized in a particular embodiment, and the only alteration would be to provide sufficient processing widths throughout the machine so as to handle the desired number of bits. In order to transform the secondary register in such an embodiment, it would only be necessary to provide a high enough bit-width (such as the width of eight bits in this embodiment) to handle the particular number of bits being used. If a large word binary machine is to access an entire word of so many bytes, but process the bytes serially, then the SECONDARY REGISTER would have to be as wide as any one byte, and rather than just X, Y and Z registers, there would have to be available; in place of the X and Z registers, a number of registers equal to the number of bytes in a word; in place of the Y register, there would need to be provided one less register than the number of bytes in a word.

*b. Use in parallel processors*

The present embodiment could be adapted for use in a two character parallel processor merely by providing a two character width on the PRIMARY and SECONDARY CHANNELS, and parallel gating separately into the 1ST CHARACTER BUS and 2ND CHARACTER BUS of the RETURN CHANNEL. Of course, the ARITHMETIC & LOGIC CIRCUITS would also have to have a two character capability. However, the SECONDARY REGISTER is capable, as is, of handling two character parallel processing in the same fashion that it handles two character serial processing.

To handle parallel processing in excess of two, it would be necessary to provide at least as many registers as there are characters (or bytes) in the processing width of the computer in place of the X and Z registers, and one less register (than the number of characters) would be required in place of the Y register (as in the case of the serial processor, sub-section *a.*, above). However, when widths greater than two are encountered, it becomes more expedient to provide two sets of registers, one corresponding to the X register and one corresponding to the Y register, each set comprising a register for as many characters or bytes as can be processed at one time. The sets of registers would then be gated out by address circuits rather than by CG1 and CG2. In order for a most economical operation using a large parallel processor, the address circuits would probably be changed from the present register and modifier combination: each of the present registers would be converted into a counter which would handle its own modification as each character was processed. The counters would not only control memory addressing per se, but would control the reading out of successive correct stages of the two groups of registers in the same fashion as CG1 and CG2 control reading out of the X and Y registers in the present embodiment. This form of address counter and address count control over parallel registers has been utilized in a prior art computer of the type discussed in Section 2*a*, hereinbefore. It is suggested that all of this is within the skill of the art, following the comprehensive teachings herein.

*c. Double field boundary adjusting*

The present embodiment has two special address situations. One of them is BOUNDARY OVERLAP, which referred to the situation which exists when the A field is overlapped in such a fashion that it accesses one more character than necessary so as to have enough characters to handle all the B characters at one time. The other special address situation is the USE SINGLE B situation. This is a case where if only one B character is available, it will be used whether there is one or two A characters available. In other words, boundary adjusting was provided for A characters only in the present embodiment, no boundary adjusting being provided for the B field characters. This being so, the A field is always adjusted so that when a pair of B field characters are read out (perhaps not on the first cycle, but on successive cycles) the A field would then be adjusted to the B field. In fact, this is a case where the A field is adjusted to the processor capacity, and the B field is made to be adjusted to the processor capacity merely by first handling a single B character, if the first B field address will deliver only one useful character.

It is possible to adjust both fields in accordance with teaching herein. For instance, if a primary register of the same type as the disclosed SECONDARY REGISTER were provided, it would be possible to take two B cycles as necessary so there would always be two B field characters available for any processing cycle (if there are at least two B characters in a field) in the same fashion as is true with respect to the A character field. Thus, with two complete sets of boundary adjusting registers (one is shown herein for the A field) both fields could be adjusted so that all cycles (except in terminating conditions) would be able to process two characters. In large parallel machines, such as a machine which might handle five characters at one time, it is not economical to take one cycle just to adjust one field as is done in the single B situation in the present embodiment. In a large parallel machine, therefore, provision of binary adjusting in accordance with the present invention for both fields would most likely be utilized.

In summation, the teachings of the present invention with respect to boundary adjusting, and certain of the other aspects of the invention herein, may be adapted so as to be utilized in a processor having either serial or parallel multiple processing, large or small capacity, and with a large or small width (if in a parallel processor).

While the invention has been particularly shown and described with reference to preferred embodiments thereof, it will be understood by those skilled in the art that the foregoing and other changes in form and detail may be made therein without departing from the spirit and scope of the invention.

What is claimed is:

1. In a data processing system having memory means which will deliver a plurality of data bit groups upon each access; each group being specifically addressable by the data processing system; at least a first part of a word to be handled by processing means of said processing system being manifested by at least one of said groups in dependence upon the address of the first group in comparison with the addresses of all the data bits groups delivered by said memory means in the same access thereof; a word being at least one group; said data processing system having a processing capacity in excess of a single group; said data processing system being capable of generating and responding to successive cycle signals so as to perform successive cycles of operation as will access successive memory group sets in said memory means; said memory group sets each containing as many groups as the lesser of the number of groups related to said first group and the capacity of said system; a boundary adjusting means comprising:

addressing means for generating, in a first cycle, manifestations of an address within said memory wherein the first group of said first word is stored, said addressing means exercising control over said memory means so as to cause said memory to deliver a plurality of groups, including the group related to the address specified by said addressing means, in one access of said memory; said addressing means also capable of generating the address of a group other than said first group;

analyzing means responsive to said addressing means for determining a maximum number of groups related to said first group which are delivered by said memory means at each access thereof;

external storage means responsive to the groups delivered by said memory means for storing a plurality of groups related to groups specified by said addressing means;

and means responsive to said analyzing means for causing an initial access response, of one or more initial memory accesses, to occur, as necessary, so as to provide sufficient groups to said external storage means to utilize the processing capacity of said system during a processing cycle first following said initial access response, said processing means processing at least said first group after said initial memory response.

2. The device described in claim 1, additionally comprising:

means responsive to said address analyzing means to modify the address of said first operand by a plurality of increments in response to the delivery by said memory of more than one group related to said first group.

3. The device described in claim 1, additionally comprising:

means responsive to said address analyzing means to modify the address of said first operand by a plurality of increments in response to the delivery by said memory of more than one group related to said first group, and to modify said address of said first operand by a single increment in response to the delivery by said memory of only one related group.

4. The device described in claim 1, wherein:

said external storage means comprises a first register means and a second register means;

and means responsive to said analyzing means for causing said first group of said operands to be stored in said first register whenever less than the processing capacity of said machine will be processed with said first group and for causing the first group of said first operand to be stored in said second register when said first group will be processed with sufficient other groups so as to utilize the capacity of said system.

5. The device described in claim 1, wherein said processing capacity is two groups, and further comprising:

first, second and third registers, each register having a storage capacity equal to one group, each register being set in accordance with the data content of one group under control of said address analyzing means;

means responsive to the data manifestations delivered by the first of two initial accesses to store the first group in said third register, said data group being thereafter advanced from said third register into said first register;

means responsive to the data manifestations delivered by a second one of said initial accesses for storing a second group in said second register and a third group in third register;

and means operative after completion of said first and second accesses for reading the data groups out of said first and second register for processing.

6. The device described in claim 1 additionally comprising:

means responsive to said analyzing means and to said groups for causing said memory to store a group related to said first processing group set in locations specified by said first address in said processing cycle and for causing said memory to store groups related to any remaining portion of said first memory group set in locations specified by other than said first address during said second processing cycle.

7. The device described in claim 1 additionally comprising:

handling means responsive to said analyzing means for handling groups related to said first group, said handling means generating a result group corresponding to each group related to said first group;

and loading means responsive to said analyzing means and to said handling means for causing said memory means to store said result groups.

8. The device described in claim 7 additionally comprising:

regeneration means for said memory means, responsive to said loading means and to said memory means for causing said memory means to store groups delivered by said memory means which are not related to said first group.

9. The invention of claim 1, additionally comprising: process control means responsive to said analyzing means and to said groups for causing said processing means to respond to a first set of groups, including said first group, in a first processing cycle, and to cause said processing means to respond to those groups of the remaining groups in said external storage means which are related to said first group, during a second processing cycle, said remaining groups having remained in said external storage means after presentation thereto during said initial access response.

10. The invention of claim 9 wherein said process control means is also responsive to said cycle signals.

11. In a data processing system of the type having a memory which will deliver two data bit groups upon each access, each group being specifically addressable by the data processing system, at least a first one and a second one of said specifically addressed groups being at least part of first and second operands, respectively, of an operation to be performed by said processing system, said processing system having a processing capacity of two groups; a boundary adjusting means comprising:

addressing means for producing manifestations of addresses of memory locations wherein said first and second groups are stored, said addressing means exercising control over said memory so that said memory will deliver a plurality of groups including the group related to the address specified by said addressing means in response to at least one access for each of said first and second groups;

address analyzing means responsive to said addressing means for determining whether or not an additional accessed group is related to each of said first and second groups, respectively, which are delivered by said memory at corresponding accesses thereof;

external storage means responsive to said memory means for storing at least one group related to at least one of said first groups;

and means responsive to said address analyzing means for causing a plurality of initial memory accesses of groups related to said first group to occur, as necessary, so as to provide sufficient groups related to said first group to utilize the groups related to said second group provided by said initial accesses during the processing time first following the initial access of said memory.

12. The device described in claim 11 further comprising:

address means for initially modifying the address of said first group by a first increment, and said second group by a second increment;

and remodification means responsive to said address analyzing means including first means for thereafter remodifying the address of said first operand by at least one additional increment and for remodifying the address of second operand by zero, and including second means responsive to said addressing analyzing means for incrementing said second operand address by an increment less than said second increment, and substituting the remodified result for the initial modified result, in response to said memory delivering a plurality of groups related to each of said operands for processing.

13. The device described in claim 12 additionally comprising:

means responsive to terminating conditions in said processing system for generating a process inhibit signal;

and means responsive to said process inhibit signal for forcing the operation of said remodification means notwithstanding the operation of said address analyzing means.

14. The device described in claim 11 wherein:

said external storage means comprises a first register means and a second register means;

and means responsive to said analyzing means for causing said first group of said operands to be stored in said first register whenever less than the processing capacity of said machine will be processed with said group and for causing the first group of said first operand to be stored in said second register when said first group will be processed with sufficient other groups so as to utilize the capacity of said system.

15. The device described in claim 11, wherein said processing capacity is two groups, and further comprising:

first, second and third registers, each register having a storage capacity equal to one group, each register being set in accordance with the data content of one group under control of said address analyzing means;

means responsive to the data manifestations delivered by the first of two initial accesses to store the first group in said third register, said data group being thereafter advanced from said third register into said first register;

means responsive to the data manifestations delivered by a second one of said initial accesses for storing a second group in said second register and a third group in said third register;

and means operative after completion of said first and second accesses to read the data groups out of said first and second register for processing.

16. The device described in claim 11 additionally comprising:

means responsive to said analyzing means and to said groups for causing said memory to store a group related to said first processing group set in locations specified by said first address in said first processing cycle and for causing said memory to store groups related to any remaining portion of said first memory group set in locations specified by other than said first address during said second processing cycle.

17. The device described in claim 11 additionally comprising:

handling means responsive to said analyzing means for handling groups related to said first group, said handling means generating a result group corresponding to each group related to said first group;

and loading means responsive to said analyzing means and to said handling means for causing said memory means to store said result groups.

18. The device described in claim 17 additionally comprising:

regeneration means for said memory means, responsive to said loading means and to said memory means for causing said memory means to store groups delivered by said memory means which are not related to said first group.

19. The device described in claim 11 wherein said means responsive to said address analyzing means additionally comprises:

means responsive to said address analyzing means for generating a signal when a first memory access will deliver more operands of said first group than of said second group;

and means responsive to said signal to cause said processing system to process all the groups of said second operand with a like number of groups of said first operand without an additional memory access, and for thereafter generating an overlap signal to control the accessing of memory by said system.

20. The device described in claim 11 wherein said means responsive to said address analyzing means additionally comprises:

means responsive to said address analyzing means for generating a signal when a first memory access response will deliver less operands of said first group than of said second group;

and means responsive to said signal to cause said memory to access additional groups of said first operand prior to accessing the groups of said second operand.

21. The device described in claim 11 wherein said means responsive to said address analyzing means additionally comprises:

first means responsive to said address analyzing means for generating a first signal when first memory accesses will deliver less operands of said first group than of said second group;

second means responsive to said address analyzing means for generating a second signal when first memory accesses will deliver more operands of said first group than of said second group;

means responsive to said first signal to cause said memory to access additional groups of said first operand prior to accessing the groups of said second operand and thereafter generate an overlap signal for controlling the operation of said memory;

and means responsive to said signal to cause said processing system to process all the groups of said second operand with a like number of groups of said first operand without an additional memory access.

22. The invention described in claim 11 wherein said data processing system has but a single memory.

23. A data processing system of the type having a memory apparatus capable of delivering a plurality of groups of data bits at each access thereof, each group of data bits being specifically addressable by an address means of said system, comprising:

control means for generating a plurality of control signals;

a primary channel gate responsive to said memory apparatus;

a plurality of channels responsive to said primary channel gate, said primary channel gate being responsive to control signals for selecting at least one of said groups for application to said channels;

processing means responsive to said channels to provide a group of data bits in response to a combination of the groups of data bits on said channels;

a return channel second group gate responsive to said processing means and to said channels;

a return channel second group bus responsive to said return channel second group gate, said return channel second group gate being operative in response to control signals to selectively apply a data bit group from either said processing means or one of said channels to said second group bus;

a return channel first group register and gate responsive to said second group bus;

a return channel first group bus responsive to said return channel first group register and gate, said return channel first group register and gate being operative in response to control signals to temporarily store a data bit group on said second group bus, and further operative in response to control signals to cause a group stored therein to be applied to said first group bus;

a memory load circuit responsive to said second group bus and to said first group bus, said memory load circuit being operative to cause a group on either of said buses to be applied to said memory for storage therein in response to control signals.

24. The invention of claim 23 wherein said plurality of channels includes a primary channel responsive to said primary channel gate;

a secondary channel register responsive to said primary channel for temporarily storing a plurality of data bit groups;

a secondary channel;

and a secondary channel gate responsive to said secondary channel register, said secondary channel gate being responsive to control signals for selecting a data bit group from said secondary channel register for application to said secondary channel.

25. The invention of claim 23 wherein said memory means includes:

a latched regeneration loop, the latches of said loop receiving and storing the groups delivered by said memory, and wherein said memory load circuit is also responsive to said latches and operative to regenerate groups in locations of said memory which are not responsive to a group on either of said buses, in further response to said control signals.

26. In a data processing system of the type having memory means which will deliver a plurality of separately addressable data bit groups at each access thereof, each group being specifically addressable by addressing circuits within said system, a character control means comprising:

address means for specifying the addresses of at least first and second groups in said memory means;

instruction means for designating operations to be performed by said system;

timing means for generating signals defining a plurality of times for processing a plurality of groups, respectively, one after the other;

scan means responsive to said instruction means for designating positive or negative scanning of said memory means, said means generating a plus scan signal in response to said operations when said memory means requires accessing successively higher-addressed storage locations, and generating a minus scan signal in response to said operations when said memory means requires accessing successively lower-addressed locations;

analyzing means responsive to said address means, said timing means, and to said plus and minus scan signals, for initially generating a first gate signal or a second gate signal, alternatively, said analyzing means initially generating a first gate signal in response to said address means specifying the lowest-addressed group related to said first or second group during a positive scan and in response to said address means specifying the highest-addressed group related to said first or second group during a minus scan, alternatively; said analyzing means initially generating a second gate signal when said address means specifies the highest-addressed group related to said first or second group during a plus scan, and when said address means specifies the lowest-addressed group related to said first or second group during a minus scan; and for generating at least one additional gate following generation of said first gate;

channel means for handling groups to be processed by said processing means;

and gating means responsive to said memory means, said scan means, and said analyzing means, for providing one or more groups to said primary channel means in response to said gate signals and said scan signals.

27. The invention in claim 26 wherein said plurality of times comprises a sequence of times, and wherein each of said groups comprises a character.

28. The invention of claim 27 wherein said sequence of times comprises first and second times, and wherein said second gate signal when generated following the generation of said first gate signal, is generated during a second character processing time following a first character processing time, said first character processing time comprising the time at which the said first character gate is generated.

29. The device described in claim 28 wherein said timing means additionally comprises:

error responsive means for generating an error signal in response to faulty operation of said processing system during said first processing time;

means responsive to said error signal to prevent the processing of an additional group;
and means responsive to said timing signals at the end of a cycle, following the time in which said additional group would have been processed, to cause said system to stop, whereby a complete cycle is performed, yet the processing of any additional group is inhibited if an error is sensed during the processing of one of said groups.

30. In a data processing system of the type in which a plurality of data groups may be processed during a single processing cycle, each of said data groups being specifically addressable in a memory means, said system capable of performing operations which involve two locations in memory of each effective step of said operations, process controlling means, comprising:

addressing means including first and second address registers, said registers specifying first and second locations in memory involved in one of said operations, said addressing means including means for comparing the addresses in said first and second registers; said addressing means generating an equals signal if said addresses indicate overlapping of data groups related to said first and second addresses;
and means responsive to said equals signal to inhibit the processing of more than the data bit groups initially specified by said first and second address registers.

31. The invention described in claim 30 wherein said addressing means includes means for modifying the address in a first one of said registers by one increment and for comparing the result of said modification with the address in the second one of said registers, said addressing means generating said equal signal if said result equals the address in said second register.

32. The invention described in claim 30 wherein the last-named means operates so as to cause said system to complete a cycle, yet the processing of any additional group is inhibited in response to the presence of said equal signal.

33. In a data processing system having memory means which will delivery a plurality of data bit groups upon each access; at least a first part of a word to be handled by processing means of said processing system being manifested by at least one of said groups in dependence upon the address of the first group in comparison with the addresses of all the data bits groups delivered by said memory means in the same access thereof, a word being at least one group; said data processing system having a processing capacity in excess of a single group; said data processing system being capable of generating and responding to successive cycle signals so as to perform successive cycles of operation as will access successive groups in said memory means; each containing as many groups as the lesser of the number of groups related to said first group and the capacity of said system; a process control comprising:

addressing means for secifying addresses of storage locations within said memory where a set of said groups are stored;
address analyzing means to compare the address of a first location of one of said groups with the address of the group delivery by said memory means in the same access thereof;
means for producing a plurality of process control timing signals for subdividing the cycles of said processing system into successive times when different ones of said groups may be processed;
first means for generating signals indicative of conditions within said processing system which relate to termination of current operations of said processing system;
second means for generating signals indicative of operations within which only a single group should be processed in a given cycle;
third means for generating an error signal;
fourth means responsive to said first, second, and third means for generating a process inhibiting signal;
fifth means responsive to said address analyzing means for generating a plural group indicating signal in response to the presence of a plurality of groups related to a single operand which groups may be processed;
means responsive to said signal and to the absence of said process inhibiting signal at times within a first portion of a cycle for generating a processing signal, said processing signal manifesting the ability of said processing system for processing more than one group in a current cycle.

34. The invention described in claim 33 wherein said first means generates signals indicative of the termination of an instruction read-out operation, and wherein said second means generates signals indicative of blank instructions within which only a single instruction group is to be processed in a given cycle.

35. In a variable word length data processing system address modification means, comprising:

a plurality of address register means for storing manifestations of a plurality of memory location addesses;
address modification means capable of modifying an address by at least one positive increment, at least one negative increment, and by zero, a modification by zero being included as an "increment" herein;
a gate circuit responsive to each of said plurality of address register means, said gate circuit operative to connect at least one of said register means to said address modification means, said gating means including latch circuits so that information gated to said address modification means from one of said address register means may be temporarily stored in said gating means;
control means responsive to control signals generated in said data processing system for first causing said gating means to respond to a first one of said address register means and pass a first address manifestation therefrom to said address modification means, said control means causing said modification means to modify said first address by at least one increment in a first direction thereby to generate a second address manifestiation, said gating means storing said manifestations, said control means also operative in response to said control signals to selectively cause said gating means to again present said first address manifestation to said address modification means for modifying by a lesser increment in the same direction as said first direction thereby to generate a third address manifestation whereby an address may be first modified by a given amount in one direction and later remodified by a lesser amount in the same direction.

36. The device described in claim 35 additionally comprising:

means responsive to said control signals to cause said address register means to be set by said address modifier bus in response to said second address manifestation as a result of said first modification, and to selectively be re-set by said address modifier bus in response to said third address manifestation as a result of said second modification.

37. In a data processing system of the type within which a plurality of data bit groups may be handled serially, one after the other, in a single machine cycle, in successive processing times, said cycle times and said processing times being identified in said system by timing signals, a process control, comprising:

error responsive means for generating an error signal in response to faulty operation of said processing system during the processing time of one of said groups;
means responsive to said error signal to prevent the handling of an additional group;

and means responsive to said timing signals at the end of a cycle, following the time in which said additional group would have been handled, to cause said system to stop, whereby a complete cycle is performed, yet the handling of any additional group is inhibited if an error is sensed during the handling of one of said groups.

38. A clocking circuit for generating a sequence of signal groups, each group being subdivided into a sequence, each group of signals containing one or more signals, comprising:

a plurality of stages, one for each of said signals;

a control means for generating set signals, stages within any one group responding to the same set signal;

a start signal for a first one of said stages;

connection means for interconnecting said stages so that, in combination with said set signals, a signal output from a stage of a first one of said groups together with the absence of a signal output from a second one of said groups will cause the setting of a corresponding stage of a third one of said groups, the presence of a signal out of one of the stages of said first group together with the presence of a signal from said second group will set a related stage of a fourth one of said groups, the presence of a signal out of the highest order stage of said fourth group together with the presence of a signal from said second group will cause the setting of a fifth group, the presence of a signal from said fifth group together with the presence of signal out of said second group will cause the setting of a sixth group, the presence of a signal out of said sixth group will cause the resetting of said second group, and the presence of a signal out of said sixth group together with the absence of a signal out of said second group will set a seventh one of said groups.

39. A clocking circuit for a data processing system, comprising:

a plurality of signal generators, each of said generators being settable to an on condition and resettable to an off condition, there being a first group of generators, a second group of generators, a special generator and an extra generator;

means for generating first set and first reset signals for said first group of generators and said extra generator, and second set and second reset signals for said second group and said third group of generators, respectively;

means for generating a start signal for said first group of generators;

connection means for interconnecting said generators so that the presence of a signal output from one of said first group, together with the absence of a signal from said special generator, will cause the setting of a corresponding one of said second group, the presence of a signal out of one of said first group together with the presence of a signal from said special generator will set a related one of said third group, the presence of a signal out of a selected one of said third group will set said extra generator, the presence of a signal out of said extra generator together with the presence of a signal from said special stage will set a second selected one of said third group, and the presence of a signal out of said extra generator and the absence of a signal out of said special generator will set a third selective one of said third group;

and means responsive to alternatively present signals to selectively cause either one of said second group or one of said third group to respond to said start signal.

40. A clocking circuit for a data processing system, comprising:

a plurality of bistable stages, each of said stages being settable to an on condition and resettable to an off condition, there being N control stages, 2 N ring stages and a special stage;

means for generating set and reset signals for said control stages and set and reset signals for said ring stages, respectively;

means for generating a start signal for said control stages;

connecting means for interconnecting said control stages and said ring stages so that the presence of a signal output from one of the first N–1 of said control stages, together with the absence of a signal from said special stage, will cause the setting of a corresponding one of a first group of N–1 of said ring stages, the presence of a signal out of one of the first N–1 of said control stages together with the presence of a signal from said special stage will set a related one of a second group of N–1 of said ring stages, the presence of a signal out of the Nth one of said control stages together with the presence of a signal from said special stage will set the 2n–1th of said ring stages, and the presence of a signal out of said Nth control stage and the absence of a signal out of said special stage will set the 2Nth one of said ring stages;

and means responsive to alternatively-present signals to selectively cause either of a first control stage or some other control stage to respond to said start signal.

41. A multiple processing computer having a parallel, bounded memory, comprising:

addressing means for specifying addresses of storage locations with said memory where a set of operand manifestations are stored, said memory being responsive to said addressing means to deliver as many manifestations in a single access thereof as correspond to the capacity of said system;

address analyzing means to compare the address of a first location of one of said operands with the boundary addresses of said memory system;

and means responsive to said address analyzing means for adjusting the boundary of said operand manifestations to be coextensive with the processing capacity of said system.

42. In a data processing system, an index apparatus comprising:

a plurality of addresses registers, each having an input gating means;

an address register bus connected to each of said input gating means;

a pair of first gates, either a first one of said first gates or the second one of said first gates being operative, alternatively, in cooperation with said address bus;

a plurality of second gates, each of said second gates connected to a corresponding one of said second gates;

a source of address manifestations, said source being connected to a first one of said second gates, the second one of said second gates being responsive to the first one of said second gates;

and timing signals operative to cause all of said second gates and the second one of said first gates to be operative at certain times, and to cause only the first one of said second gates and the first one of said first gates to be operative at times which alternate with successive ones of said certain times.

43. In a data processing system of the type having a memory apparatus for storing manifestations of instructions which may be performed by the data processing system, manifestations of data and manifestations of addresses related to storage locations within said memory which contain data related to said instructions, said data processing system including arithmetic means for generating arithmetic combinations of manifestations, a combination comprising:

a source of data bit groups;

a plurality of return channel buses, a first one of said buses having a related gate which is operable to cause said first bus to be responsive to said source, the second one of said buses having a related gate which is operable to said second bus to be responsive to said first bus;

a third bus having a related gate which is operable to cause said third bus to be selectively responsive to either said first bus or said second bus;

a plurality of registers each having a related input means operable so as to selectively render the corresponding one of said registers responsive to said third bus;

a function control clocking ring having a plaurality of stages, for generating a sequence of successive control signals;

means responsive to a first signal to said sequence for gating information from said source through a selected one of the gates related to said first and second bus, and responsive to a subsequent signal in said sequence for gating bits, from either said first or said second bus to said third bus through said third bus gate, and into one of said registers;

cycle control means for first operating both said first and said second bus gates so as to pass a first group of bits from said source onto said second bus, and for thereafter blocking said second bus gate so that bits will pass from said source only to said first bus.

44. In a data processing system of the type having a memory apparatus for storing manifestations of instructions which may be performed by the data processing system, manifestations of data and manifestations of addresses relate to storage locations within said memory which contain data related to said instructions, said data processing system including arithmetic means for generating arithmetic combinations of manifestations; the combination comprising:

a primary channel means and a secondary channel means, said channel means responsive to said memory apparatus for providing manifestations to said arithmetic means;

a plurality of return channel buses, a first one of said busses having a related gate which is operable to cause said first bus to be responsive to said arithmetic means, the second one of said buses having a related gate which is operable to cause said second bus to be responsive to said first bus;

a third bus having a related gate which is operable to cause said third bus to be selectively responsive to either said first bus or said second bus alternatively;

a plurality of registers each having a related input means operable so as to selectively render the corresponding one of said registers responsive to said third bus;

a function control clocking ring having a plurality of output stages, each output stage being associated with an input stage, each input stage being operative to select the corresponding output stage for operation, each output stage being operative to select the input stage corresponding to the next subsequent output stage for operation, said function control clocking ring including a further stage which is selected for operation by the operation of the highest order output stage in said sequence;

means responsive to said output stages for gating information through said arithmetic means and through the gate related to said first bus, and responsive to said additional stage and the input stages related to all except said first stage for gating information, from either said first bus or said second bus to said third bus through its related gate, and into one of said registers;

cycle control means for first operating both said first and said second bus gates so as to pass a first group of manifestations from said arithmetic unit into said second bus, and for thereafter blocking said second bus gate so that information will pass from said arithmetic means only to said first bus.

45. In a data processing system of the type in which a plurality of data groups may be handled during a single processing cycle, each of said data groups being specifically addressable in a memory means, said system capable of reading out groups which identify instructions for performing operations, said instructions including a blank, or dummy, instruction, an instruction readout process controlling means, comprising:

instruction decoding means responsive to said memory means for decoding instructions read out of said memory means, said decoding means generating a no-op signal in response to a group specifying said blank instruction;

and means responsive to said no-op signal to inhibit the handling of more than one of the data bit groups initially accessed from said memory means.

46. A data processing system of the type having a memory apparatus which delivers a plurality of groups of data bits at each access thereof, each group being specifically addressable within said memory apparatus, said memory apparatus including a latched regeneration loop, the latches of said loop receiving and storing the groups delivered by said memory, said system processing a plurality of groups of at least one operand in each cycle, comprising:

control means for generating a plurality of control signals;

external storage means for one operand;

address means for specifying a pair of addresses of locations within said memory apparatus in which are stored the first group of two different operands to be handled during an operation of said processing system;

processing means responsive to said memory apparatus and said external storage for handling at least one group of each operand in a processing cycle, said processing means capable of handling in a single processing cycle as many groups as there are in the capacity of said system, said system having a processing capacity in excess of one group;

a means responsive to the number of groups processed by said processing means in a cycle so as to cause said addressing means to generate the addresses of groups of said operands to be delivered by said memory in subsequent accesses thereof for processing.

References Cited by the Examiner

UNITED STATES PATENTS

| | | | |
|---|---|---|---|
| 3,161,855 | 12/1964 | Propster et al. | 340—172.5 |
| 3,195,109 | 7/1965 | Behnke | 340—172.5 |

ROBERT C. BAILEY, *Primary Examiner.*

G. D. SHAW, *Assistant Examiner.*